(12) United States Patent
Azuma et al.

(10) Patent No.: US 11,021,562 B2
(45) Date of Patent: Jun. 1, 2021

(54) POLYISOCYANATE COMPOSITION, BLOCKED POLYISOCYANATE COMPOSITION, HYDROPHILIC POLYISOCYANATE COMPOSITION, COATING MATERIAL COMPOSITION, AND COATING FILM

(71) Applicant: ASAHI KASEI KABUSHIKI KAISHA, Tokyo (JP)

(72) Inventors: Koichiro Azuma, Tokyo (JP); Yuichi Miwa, Tokyo (JP); Katsuhiro Fujimoto, Tokyo (JP); Yoshijiro Harada, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 165 days.

(21) Appl. No.: 16/339,763

(22) PCT Filed: Oct. 13, 2017

(86) PCT No.: PCT/JP2017/037271
§ 371 (c)(1),
(2) Date: Apr. 5, 2019

(87) PCT Pub. No.: WO2018/070536
PCT Pub. Date: Apr. 19, 2018

(65) Prior Publication Data
US 2020/0040124 A1 Feb. 6, 2020

(30) Foreign Application Priority Data

Oct. 14, 2016 (JP) .............................. JP2016-203082
Oct. 14, 2016 (JP) .............................. JP2016-203083
(Continued)

(51) Int. Cl.
*C08G 18/28* (2006.01)
*C08G 18/62* (2006.01)
(Continued)

(52) U.S. Cl.
CPC ......... *C08G 18/285* (2013.01); *C08G 18/283* (2013.01); *C08G 18/286* (2013.01);
(Continued)

(58) Field of Classification Search
None
See application file for complete search history.

(56) References Cited

U.S. PATENT DOCUMENTS 5,354,834 A 10/1994 Yoshida et al.
5,714,564 A 2/1998 Shaffer
(Continued)

FOREIGN PATENT DOCUMENTS

EP 0524501 A1 1/1993
EP 2999030 3/2016
(Continued)

OTHER PUBLICATIONS

English Machine Translation of WO2001062819A1, prepared Nov. 7, 2020. (Year: 2020).*
(Continued)

*Primary Examiner* — Christopher M Rodd
(74) *Attorney, Agent, or Firm* — Greenblum & Bernstein, P.L.C.

(57) ABSTRACT

The present invention provides a polyisocyanate composition and the like that contain a polyisocyanate compound represented by general formula (I), (II), (III) or (IV) (wherein the pluralities of $R^{11}$, $R^{21}$, $R^{31}$ and $R^{41}$ each independently represent an organic group, at least one of the pluralities of $R^{11}$, $R^{21}$, $R^{31}$ and $R^{41}$ is a group represented by general formula (V) (wherein each of the plurality of $Y^1$ independently represents a single bond or the like, $R^{51}$ represents a hydrogen atom or the like, and the wavy line indicates a bonding site) or the like, and in general formula (III), $R^{32}$ represents a residue in which one hydroxyl group has been removed from a monohydric or polyhydric alcohol).

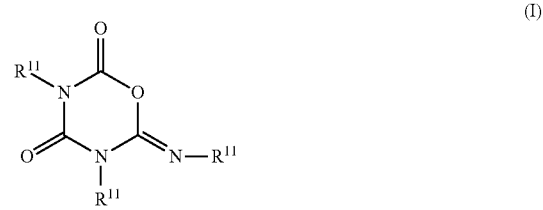

(I)

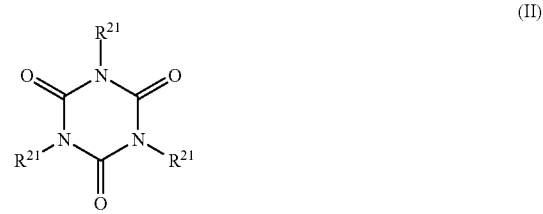

(II)

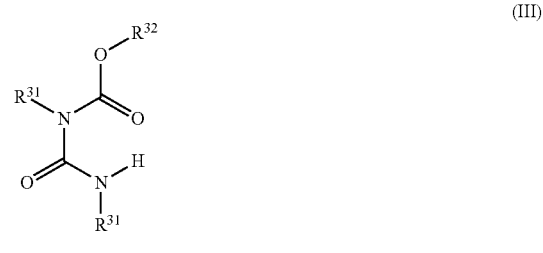

(III)

(Continued)

-continued

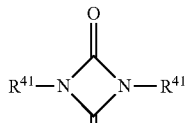
(IV)

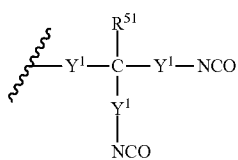

(V)

39 Claims, No Drawings

(30) Foreign Application Priority Data

| Oct. 14, 2016 | (JP) | JP2016-203088 |
|---|---|---|
| Oct. 14, 2016 | (JP) | JP2016-203089 |
| Oct. 14, 2016 | (JP) | JP2016-203090 |
| Oct. 14, 2016 | (JP) | JP2016-203095 |
| Oct. 14, 2016 | (JP) | JP2016-203097 |
| Oct. 14, 2016 | (JP) | JP2016-203111 |

(51) Int. Cl.
*C08G 18/72* (2006.01)
*C08G 18/73* (2006.01)
*C08G 18/79* (2006.01)
*C08G 18/80* (2006.01)
*C09D 175/04* (2006.01)

(52) U.S. Cl.
CPC ....... *C08G 18/6225* (2013.01); *C08G 18/725* (2013.01); *C08G 18/73* (2013.01); *C08G 18/792* (2013.01); *C08G 18/798* (2013.01); *C08G 18/8064* (2013.01); *C08G 18/8077* (2013.01); *C09D 175/04* (2013.01)

(56) References Cited

U.S. PATENT DOCUMENTS

| 6,100,326 | A | 8/2000 | Richter et al. |
|---|---|---|---|
| 2004/0014927 | A1 | 1/2004 | Watanabe et al. |
| 2004/0049003 | A1 | 3/2004 | Asahina et al. |
| 2009/0131603 | A1 | 5/2009 | Asahina et al. |
| 2014/0343280 | A1 | 11/2014 | Richter et al. |
| 2017/0349771 | A1* | 12/2017 | Sato ............... B41M 5/0088 |

FOREIGN PATENT DOCUMENTS

| EP | 3275905 | | 1/2018 | |
|---|---|---|---|---|
| JP | 53-135931 | A | 11/1978 | |
| JP | 57-198760 | A | 12/1982 | |
| JP | 57-198761 | A | 12/1982 | |
| JP | 60-044561 | A | 3/1985 | |
| JP | 63-015264 | B | 4/1988 | |
| JP | 05-222007 | A | 8/1993 | |
| JP | 11-286649 | A | 10/1997 | |
| JP | 10-010723 | A | 1/1998 | |
| JP | 10-048822 | A | 2/1998 | |
| JP | 10-087782 | A | 4/1998 | |
| JP | 2000-044649 | A | 2/2000 | |
| JP | 3055197 | B2 | 6/2000 | |
| JP | 2000-302745 | A | 10/2000 | |
| JP | 2006-348235 | A | 12/2006 | |
| JP | 3891934 | B2 | 3/2007 | |
| JP | 4036750 | B2 | 1/2008 | |
| JP | 2008-024828 | A | 2/2008 | |
| JP | 5178200 | B2 | 4/2013 | |
| JP | 5334361 | B | 11/2013 | |
| JP | 2015-500900 | | 1/2015 | |
| JP | 2015-535139 | A | 12/2015 | |
| JP | 2016-113523 | A | 6/2016 | |
| KR | 10-2016-0032545 | A | 1/2015 | |
| WO | 01/62819 | A1 | 8/2001 | |
| WO | WO-0162819 | A1 * | 8/2001 | ......... C08G 18/4252 |
| WO | 2004/078819 | A1 | 9/2004 | |
| WO | 2016/152254 | A1 | 9/2016 | |
| WO | WO-2016152254 | A1 * | 9/2016 | ............. C08G 18/00 |

OTHER PUBLICATIONS

Supplementary European Search Report issued in European Patent Office (EPO) Patent Application No. 17859624.3, dated Oct. 8, 2019.

International Search Report issued in International Bureau of WIPO Patent Application No. PCT/JP2017/037271, dated Dec. 12, 2017, along with an English translation thereof.

Written Opinion issued by the International Searching Authority for International Patent Application No. PCT/JP2017/037271, dated Dec. 12, 2017, along with an English translation thereof.

* cited by examiner

POLYISOCYANATE COMPOSITION, BLOCKED POLYISOCYANATE COMPOSITION, HYDROPHILIC POLYISOCYANATE COMPOSITION, COATING MATERIAL COMPOSITION, AND COATING FILM

TECHNICAL FIELD

The present invention relates to a polyisocyanate composition, a blocked polyisocyanate composition, a hydrophilic polyisocyanate composition, a coating material composition, and a coating film.

Priority is claimed on Japanese Patent Application No. 2016-203095, filed Oct. 14, 2016, Japanese Patent Application No. 2016-203088, filed Oct. 14, 2016, Japanese Patent Application No. 2016-203082, filed Oct. 14, 2016, Japanese Patent Application No. 2016-203111, filed Oct. 14, 2016, Japanese Patent Application No. 2016-203090, filed Oct. 14, 2016, Japanese Patent Application No. 2016-203089, filed Oct. 14, 2016, Japanese Patent Application No. 2016-203097, filed Oct. 14, 2016, and Japanese Patent Application No. 2016-203083, filed Oct. 14, 2016, the contents of which are incorporated herein by reference.

BACKGROUND ART

Conventionally, urethane coating films formed from polyurethane coating materials have exhibited extremely superior levels of flexibility, chemical resistance and stain resistance. In particular, coating films that use a non-yellowing polyisocyanate obtained from an aliphatic diisocyanate typified by hexamethylene diisocyanate (hereafter also referred to as HDI) as a curing agent also exhibit excellent weather resistance, and the demand for such coating films continues to increase.

However, one problem with these aliphatic polyisocyanates is poor drying properties.

One known technique for addressing this problem involves increasing the number of isocyanate group functional groups in the polyisocyanate, but increasing the number of isocyanate group functional groups generally causes the viscosity of the polyisocyanate to increase, leading to a deterioration in the handling properties, and therefore there is a limit to this technique.

Accordingly, techniques that use only a low-viscosity triisocyanate compound (for example, see Patent Documents 3, 6 and 7) or a technique in which a portion of a triisocyanate compound is isocyanurated (for example, see Patent Document 8) have been disclosed. When these types of triisocyanate compounds are used, polyisocyanates having reduced viscosity and somewhat improved drying properties can be obtained.

Further, in recent years, as awareness of global environmental protection has increased, technical developments aimed at reducing the viscosity of polyisocyanates used as curing agents have been keenly pursued. This is because reducing the viscosity of these polyisocyanates enables the amount of organic solvent used in coating material compositions to be reduced (for example, see Patent Documents 1 and 5).

Further, a technique for reducing the viscosity while maintaining the number of isocyanate group functional groups has also been disclosed (for example, see Patent Document 2).

On the other hand, techniques for improving problems associated with the coating film external appearance (for example, seeding and popping) have also been disclosed (for example, see Patent Document 4).

Furthermore, one property required of polyurethane coating films is rain streaking resistance. Addressing this issue requires that the surface of the coating film is made hydrophilic. In order to achieve this hydrophilicity, a silicate compound is added to the curing agent phase, and therefore compatibility between the curing agent and silicate compounds is important. Techniques for improving the compatibility with silicates in polyisocyanates that use a diisocyanate have already been disclosed (for example, see Patent Document 9).

Furthermore, in recent years, enhanced awareness of global environmental protection means there is a growing demand for a combination of reduced viscosity for the polyisocyanate used as a curing agent, and improved drying properties in order to enhance operational efficiency, and much technical development is being actively pursued. In particular, a technique has been disclosed in which an isocyanurate structure is used as the main backbone in order to achieve reduced viscosity and improved drying properties (see Patent Document 2).

Further, techniques that use a low-viscosity triisocyanate compound have also been disclosed (for example, see Patent Document 14).

Moreover, in the field of coating materials for exterior construction materials, from the viewpoint of the operating environment, an organic solvent of low polarity is highly desirable. In particular, it has been disclosed that polyisocyanates having an allophanate structure of a monoalcohol have low viscosity and exhibit excellent solubility in low-polarity organic solvents (see Patent Documents 10 and 11), and these polyisocyanates are able to achieve objectives unachievable in Patent Documents 2 and 14.

Moreover, techniques using a low-viscosity triisocyanate compound that have been disclosed include a technique for improving the quick drying properties by performing blending with a triisocyanate compound (Patent Document 12), and a technique for lowering the viscosity and achieving quicker drying by increasing the number of isocyanate structures by including prescribed amounts of triisocyanate nurate and allophanate structures (Patent Document 8), with these techniques attempting to provide further reductions in the viscosity and improved drying properties.

Furthermore, from the perspective of global environmental protection, the development of water-based urethane coating materials that use almost no solvent is also being actively pursued, and a technique for maintaining the number of isocyanate groups without adding hydrophilic groups, lowering the viscosity to enable water dispersion, and enhancing the durability of the obtained coating film has been disclosed as a technique for a curing agent that exhibits excellent performance in both solvent systems and water systems (Patent Document 13).

PRIOR ART LITERATURE

Patent Documents

Patent Document 1: Japanese Patent (Granted) Publication No. 3055197

Patent Document 2: Japanese Patent (Granted) Publication No. 5178200

Patent Document 3: Japanese Examined Patent Application, Second Publication No. Sho 63-15264

Patent Document 4: Japanese Patent (Granted) Publication No. 4036750

Patent Document 5: Japanese Unexamined Patent Application, First Publication No. Hei 05-222007

Patent Document 6: Japanese Unexamined Patent Application, First Publication No. Sho 53-135931

Patent Document 7: Japanese Unexamined Patent Application, First Publication No. Sho 60-44561

Patent Document 8: Japanese Unexamined Patent Application, First Publication No. Hei 10-87782

Patent Document 9: Japanese Unexamined Patent Application, First Publication No. 2006-348235

Patent Document 10: Japanese Patent (Granted) Publication No. 5334361 Patent Document 11: Japanese Patent (Granted) Publication No. 3891934 Patent Document 12: Japanese Unexamined Patent Application, First Publication No. Sho 57-198761

Patent Document 13: Japanese Unexamined Patent Application, First Publication No. Hei 11-286649

Patent Document 14: Japanese Unexamined Patent Application, First Publication No. Sho 57-198760

Patent Document 15: Japanese Unexamined Patent Application, First Publication No. 2008-024828

SUMMARY OF INVENTION

Problems to be Solved by the Invention

However, when the polyisocyanates disclosed in Patent Documents 1 and 5 are used, a reduction in the number isocyanate group functional groups sometimes caused a deterioration in the drying properties.

Further, in the case of the polyisocyanate disclosed in Patent Document 2, further reductions in the viscosity were sometimes desirable.

Moreover, in the case of the polyisocyanates disclosed in Patent Documents 3 and 4, when multilayer coating films were formed, the adhesion to the substrate was sometimes unsatisfactory.

In this manner, polyisocyanates are widely used in multilayer coating film materials as a curing agent for urethane coating films, and not only is low viscosity desirable for improving the external appearance, but there has also been a strong desire for a material that exhibits excellent drying properties and excellent adhesion to the substrate.

The present invention has been developed in light of these circumstances, and provides a polyisocyanate that has low viscosity, and also exhibits excellent coating film properties such as quick drying, substrate concealment and substrate adhesion.

Further, as a result of increased demands for better operational economy and improved durability, compatibility with high-polarity polyols has been sought in order to achieve further improvements in the polyisocyanate drying properties and form a coating film having excellent acid resistance and hydrolysis resistance. Furthermore, it is also desirable that the coating film has superior crack resistance even under severe conditions.

However, with the triisocyanates and polyisocyanates disclosed in Patent Documents 3 and 6 to 8, achieving reduced viscosity while also satisfying the above demands has proven problematic.

The present invention has been developed in light of these circumstances, and provides a polyisocyanate composition that has low viscosity, exhibits excellent compatibility with polar polyols, and can form a coating film that exhibits excellent crack resistance even under conditions of repeated temperature changes and humidity changes.

Further, as a result of increased demands for better operational economy and improved durability, further improvements in the polyisocyanate drying properties and the ability to form coating films having excellent hardness and water resistance have been keenly sought.

However, with the triisocyanates and polyisocyanates disclosed in Patent Documents 3 and 6 to 8, resolving all of these demands simultaneously has proven difficult.

The present invention has been developed in light of these circumstances, and provides a polyisocyanate composition that can form a coating film having excellent drying properties, hardness and water resistance.

Furthermore, as a result of increased demands for better operational economy and improved durability, further improvements in the polyisocyanate drying properties and improvements in the adhesion to substrates have also been sought. However, with the triisocyanates and polyisocyanates disclosed in Patent Documents 3 and 6 to 8, achieving a combination of favorable drying properties and superior adhesion to substrates has proven difficult.

The present invention has been developed in light of these circumstances, and has the objects of providing a polyisocyanate composition, a coating material composition and a coating film that have favorable drying properties, and can form a coating film with favorable adhesion to substrates even in environments exposed to temperature changes and humidity changes.

Further, as mentioned above, compatibility with silicate compounds is desirable for improving the rain streaking resistance, but with the triisocyanate compounds and polyisocyanates disclosed in Patent Documents 1, 3, and 5 to 8, achieving compatibility with silicate compounds has proven difficult.

Furthermore, in the case of the polyisocyanate composition disclosed in Patent Document 9, although the compatibility with silicate compounds is improved, a drawback arose in that the drying properties deteriorated.

The present invention has been developed in light of these circumstances, and provides a polyisocyanate composition having low viscosity and excellent compatibility with silicate compounds, a coating material composition having favorable drying properties and recoat adhesion, and a coating film having excellent scratch resistance.

Furthermore, as a result of increased demands for better operational economy and improved durability, further improvements in the polyisocyanate drying properties and better compatibility with high-polarity polyols to enable the formation of coating films having excellent acid resistance and hydrolysis resistance have also been sought. However, with the triisocyanates and polyisocyanates disclosed in Patent Documents 3 and 6 to 8, achieving reduced viscosity while also satisfying the above demands has proven problematic.

The present invention provides a polyisocyanate composition having low viscosity, as well as quick drying properties and favorable compatibility with polar polyols.

Further, the polyisocyanates disclosed in Patent Documents 10 and 11 suffer from a problem in that if the number of functional groups is reduced to lower the viscosity, then the drying properties deteriorate, whereas if the number of functional groups is increased, the viscosity increases, and satisfying demands for both favorable drying properties and low viscosity has proven difficult.

With the polyisocyanates disclosed in Patent Documents 8 and 12, although the drying properties can be improved while maintaining a low viscosity, achieving a superior level for both properties is not easy, and even if an attempt is made to dissolve the polyisocyanate in an environmentally friendly low-polarity organic solvent in order to further reduce the viscosity, the degree of solubility was not satisfactory.

Moreover, the polyisocyanates disclosed in Patent Documents 2, 8 and 10 to 12 are used in solvent systems, and dispersing these polyisocyanates in water for use as curing agents in water-based coating materials has proven difficult. Patent Document 13 discloses a technique for using a polyisocyanate as a water-dispersed curing agent without reducing the number of isocyanate groups, but the time for which the water-dispersed state can be maintained is short, and use in typical coating materials has been problematic.

In the fields of coating materials for exterior construction materials and coating materials for interior and exterior automotive components, it is desirable that the curing agents for coating materials have low viscosity to enable a reduction in the amount of solvent used, have quick drying properties to enable a shortening of the coating time, and from the viewpoint of the operating environment, can either be dissolved in a low-polarity organic solvent or can be used in a water-based coating material in which the amount of solvent can be dramatically reduced, and a curing agent that can satisfy all of these demands has been keenly sought. However, satisfying all of these demands simultaneously has proven difficult.

The present invention has been developed in light of these circumstances, and provides a polyisocyanate composition that has low viscosity, quick drying properties and excellent solubility in low-polarity organic solvents, and is consequently suitable as a curing agent for solvent-based coating materials, but can also be easily dispersed in water, and can therefore also be used as a curing agent for water-based coating materials.

Further, when the polyisocyanate disclosed in Patent Document 2 is used, further reductions in viscosity are sometimes required, and when the polyisocyanate disclosed in Patent Document 14 is used, the drying properties have sometimes deteriorated.

Furthermore, in the polyisocyanates disclosed in Patent Documents 11 and 15, the reduction in the number of functional groups sometimes caused a deterioration in the drying properties.

For example, in the field of coating materials for exterior construction materials or the like, a curing agent that is able to satisfy the demands for a reduced viscosity to enable a reduction in the amount of solvent used, quick drying properties for shortening the coating time, and improved solubility in low-polarity organic solvents from the perspective of the operating environment is keenly sought. However, satisfying all of these demands simultaneously has proven difficult.

The present invention has been developed in light of these circumstances, and provides a polyisocyanate having low viscosity, quick drying properties, and excellent solubility in low-polarity organic solvents.

Means for Solving the Problems

As a result of intensive research, the inventors of the present invention discovered that a polyisocyanate composition having a specific structure was able to achieve the objects described above, and they were therefore able to complete the present invention.

In other words, the present invention includes the following aspects.

[1] A polyisocyanate composition containing a polyisocyanate compound represented by general formula (I), (II), (III) or (IV) shown below.

[Chemical formula 1]

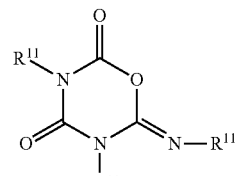
(I)

[Chemical formula 2]

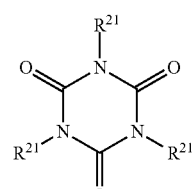
(II)

[Chemical formula 3]

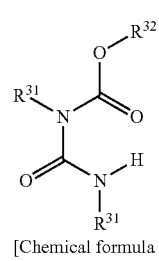
(III)

[Chemical formula 4]

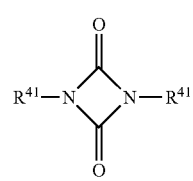
(IV)

[In general formulas (I), (II), (III) and (IV), each of the pluralities of $R^{11}$, $R^{21}$, $R^{31}$ and $R^{41}$ independently represents an organic group, and at least one of the pluralities of $R^{11}$, $R^{21}$, $R^{31}$ and $R^{41}$ is a group represented by general formula (V) or general formula (VI). The pluralities of $R^{11}$, $R^{21}$, $R^{31}$ and $R^{41}$ may be the same or different. In general formula (III), $R^{32}$ represents a residue in which one hydroxyl group has been removed from a monohydric or polyhydric alcohol.]

[Chemical formula 5]

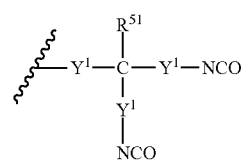
(V)

[In general formula (V), each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

[Chemical formula 6]

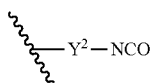

(VI)

[In general formula (VI), $Y^2$ represents a divalent hydrocarbon group of 1 to 20 carbon atoms containing an ester structure. The wavy line indicates a bonding site.]

[2] The polyisocyanate composition according to [1], containing polyisocyanate compounds of general formula (I) and general formula (II).

[Chemical formula 7]

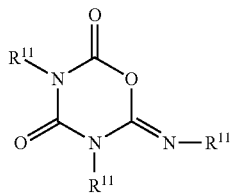

(I)

[Chemical formula 8]

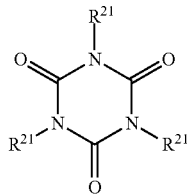

(II)

[In general formulas (I) and (II), each of the pluralities of $R^{11}$ and $R^{21}$ independently represents an organic group, and at least one of the pluralities of $R^{11}$ and $R^{21}$ is a group represented by general formula (V). The pluralities of $R^{11}$ and $R^{21}$ may be the same or different.]

[Chemical formula 9]

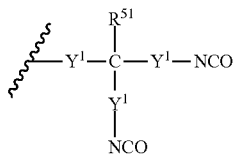

(V)

[In general formula (V), each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

[3] The polyisocyanate composition according to [2], containing polyisocyanate compounds of the above general formula (I) and general formula (II), wherein the molar ratio between iminooxadiazinedione structures and isocyanurate structures is at least 0.01 but not more than 1.5.

[4] The polyisocyanate composition according to [2] or [3], further containing a triisocyanate represented by general formula (V)-1.

[Chemical formula 10]

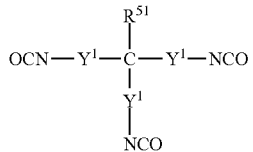

(V)-1

[In general formula (V)-1, each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms.]

[5] The polyisocyanate composition according to any one of [2] to [4], containing a polyisocyanate compound represented by the above general formula (II), wherein the theoretical reaction rate calculated from the NCO % of the polyisocyanate composition is not more than 47%.

[6] The polyisocyanate composition according to any one of [2] to [4], containing a polyisocyanate compound represented by the above general formula (II), wherein the theoretical reaction rate calculated from the NCO % of the polyisocyanate composition is at least 95% but not more than 150%.

[7] The polyisocyanate composition according to [4], containing a polyisocyanate compound (A) represented by the above general formula (II), and a triisocyanate compound (B) represented by the above general formula (V)-1, wherein the surface area ratio ((A)/[(A)+(B)]) between the peak surface area (A) of the number average molecular weight of the polyisocyanate compound (A) and the peak surface area (B) of the number average molecular weight of the triisocyanate compound (B), obtained by a gel permeation chromatography (GPC) measurement, is at least 0.8 but less than 1.

[8] The polyisocyanate composition according to [7], wherein when a monomer trimer which is a triisocyanate represented by the general formula (II) in which all the $R^{21}$ groups are represented by the above general formula (V) is deemed to be a compound (C), the peak surface area ratio ((C)/[(A)+(B)] between the peak surface area (A) of the number average molecular weight of the polyisocyanate compound (A), the peak surface area (B) of the number average molecular weight of the triisocyanate compound (B), and the peak surface area (C) of the number average molecular weight of the compound (C), obtained by a gel permeation chromatography (GPC) measurement, is at least 0.3 but less than 1.

[9] The polyisocyanate composition according to [7] or [8], wherein the isocyanate group functional value is at least 4 but not more than 12.

[10] The polyisocyanate composition according to [1], containing polyisocyanate compounds represented by general formula (II) and general formula (III), wherein the molar ratio between isocyanurate structures and allophanate structures is from 100/0.1 to 100/15.

[Chemical formula 11]

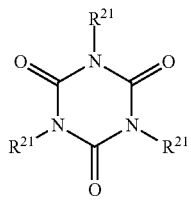

(II)

[Chemical formula 12]

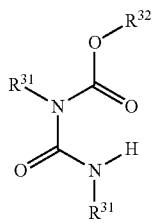

(III)

[In general formula (II) and general formula (III), each of the pluralities of $R^{21}$ and $R^{31}$ independently represents an organic group, and at least one of the pluralities of $R^{21}$ and $R^{31}$ is a group represented by general formula (V). The pluralities of $R^{21}$ and $R^{31}$ may be the same or different. $R^{32}$ represents a residue in which one hydroxyl group has been removed from a monohydric or polyhydric alcohol.]

[Chemical formula 13]

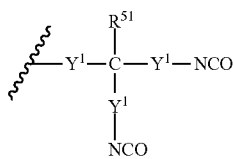

(V)

[In general formula (V), each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

[11] The polyisocyanate composition according to [10], further containing a triisocyanate represented by general formula (V)-1.

[Chemical formula 14]

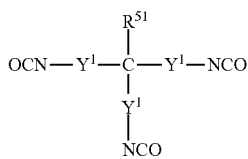

(V)-1

[In general formula (V)-1, each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms.]

[12] The polyisocyanate composition according to [1], containing polyisocyanate compounds represented by general formula (II) and general formula (IV), wherein the molar ratio between isocyanurate structures and uretdione structures is from 100/0.1 to 100/100.

[Chemical formula 15]

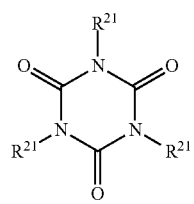

(II)

[Chemical formula 16]

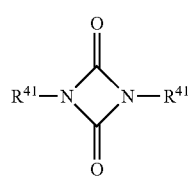

(IV)

[In general formulas (II) and (IV), each of the pluralities of $R^{21}$ and $R^{41}$ independently represents an organic group, and at least one of the pluralities of $R^{21}$ and $R^{41}$ is a group represented by general formula (V). The pluralities of $R^{21}$ and $R^{41}$ may be the same or different.]

[Chemical formula 17]

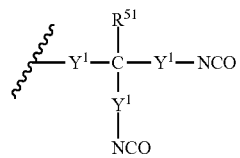

(V)

[In general formula (V), each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

[13] The polyisocyanate composition according to [12], further containing a triisocyanate represented by general formula (V)-1.

[Chemical formula 18]

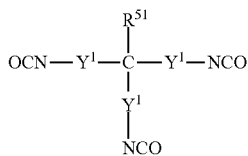

(V)-1

[In general formula (V)-1, each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms.]

[14] The polyisocyanate composition according to [1], containing a polyisocyanate compound represented by general formula (II).

[Chemical formula 19]

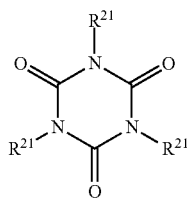

(II)

[In general formula (II), $R^{21}$ represents an organic group, and at least one of the plurality of $R^{21}$ is a group represented by general formula (V) or a group represented by general formula (VI). The plurality of $R^{21}$ may be the same or different.]

[Chemical formula 20]

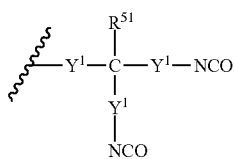

(V)

[In general formula (V), each of the plurality of $Y^1$ independently represents a divalent hydrocarbon group of 1 to 20 carbon atoms containing an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

[Chemical formula 21]

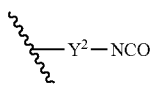

(VI)

[In general formula (VI), $Y^2$ represents a divalent hydrocarbon group of 1 to 20 carbon atoms containing an ester structure. The wavy line indicates a bonding site.]

[15] The polyisocyanate composition according to [14], wherein the ratio ($V^h/V^p$) of the reaction rate ($V^p$) between the polyisocyanate composition and a monohydric alcohol, relative to the reaction rate ($V^h$) between a polyisocyanate derived from hexamethylene diisocyanate and a monohydric alcohol, is at least 5 but less than 13. [16] The polyisocyanate composition according to [14] or [15], further containing a triisocyanate represented by general formula (V)-1 or a diisocyanate represented by general formula (VI)-1.

[Chemical formula 22]

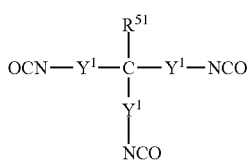

(V)-1

[In general formula (V)-1, each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms.]

[Chemical formula 23]

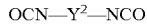

OCN—$Y^2$—NCO  (VI)-1

[In general formula (VI)-1, $Y^2$ represents a divalent hydrocarbon group of 1 to 20 carbon atoms that may contain an ester structure.]

[17] The polyisocyanate composition according to [1], containing a polyisocyanate compound represented by general formula (III), wherein
the number of nitrogen elements contained in allophanate structures (excluding the nitrogen elements contained in $R^{31}$ and $R^{32}$), relative to the total number of nitrogen elements contained in isocyanate groups, allophanate structures, isocyanurate structures, uretdione structures, iminooxadiazinedione structures, urethane structures and biuret structures contained within the polyisocyanate composition, is at least 1.5% but not more than 60%.

[Chemical formula 24]

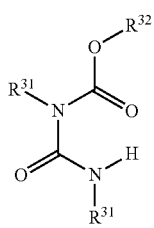

(III)

[In general formula (III), $R^{31}$ represents an organic group, and at least one of the plurality of $R^{31}$ is a group represented by general formula (V). $R^{32}$ represents a residue in which one hydroxyl group has been removed from a monohydric or polyhydric alcohol.]

[Chemical formula 25]

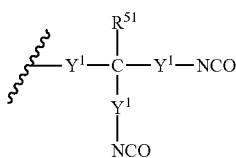

(V)

[In general formula (V), each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

[18] The polyisocyanate composition according to [17], wherein $R^{32}$ contained in the allophanate structures is a residue in which a hydroxyl group has been removed from a dihydric or polyhydric alcohol.

[19] The polyisocyanate composition according to [17] or [18], wherein $R^{32}$ contained in the allophanate structures is a residue in which a hydroxyl group has been removed from a monohydric or polyhydric alcohol having 3 to 50 carbon atoms.

[20] The polyisocyanate composition according to [1], containing a polyisocyanate compound represented by general formula (III).

[Chemical formula 26]

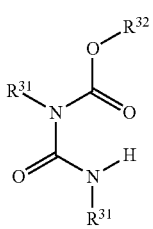

(III)

[In general formula (III), each of the plurality of $R^{31}$ independently represents an organic group, and at least one of the plurality of $R^{31}$ is a group represented by general formula (V) or a group represented by general formula (VI). The plurality of $R^{31}$ may be the same or different. $R^{32}$ represents a residue in which one hydroxyl group has been removed from a monohydric or polyhydric alcohol.]

[Chemical formula 27]

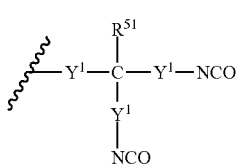

(V)

[In general formula (V), each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

[Chemical formula 28]

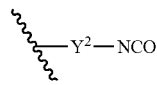

(VI)

[In general formula (VI), $Y^2$ represents a divalent hydrocarbon group of 1 to 20 carbon atoms containing an ester structure. The wavy line indicates a bonding site.]

[21] The polyisocyanate composition according to [20], wherein when the molar ratios of allophanate structures, uretdione structures, iminooxadiazinedione structures, isocyanurate structures, urethane structures and biuret structures are termed a, b, c, d, e and f respectively, the molar ratio of allophanate structures (a/(a+b+c+d+e+f)) is at least 0.02 but not more than 0.95.

[22] The polyisocyanate composition according to [20] or [21], wherein the ratio ($V^h/V^p$) of the reaction rate ($V^p$) between the polyisocyanate composition and a monohydric alcohol, relative to the reaction rate ($V^h$) between a polyisocyanate derived from hexamethylene diisocyanate and a monohydric alcohol, is at least 5 but less than 13.

[23] The polyisocyanate composition according to any one of [20] to [22], further containing a triisocyanate represented by general formula (V)-1 or a diisocyanate represented by general formula (VI)-1.

[Chemical formula 29]

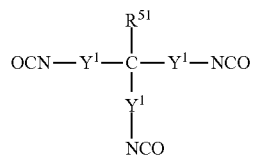

(V)-1

[In general formula (V)-1, each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms.]

[Chemical formula 30]

OCN—$Y^2$—NCO            (VI)-1

[In general formula (VI)-1, $Y^2$ represents a divalent hydrocarbon group of 1 to 20 carbon atoms that may contain an ester structure.]

[24] A blocked polyisocyanate composition in which at least a portion of the isocyanate groups of the polyisocyanate compound represented by the above general formula (I), (II), (III) or (IV) contained in the polyisocyanate composition according to any one of [1] to [23] are protected with a blocking agent.

[25] A hydrophilic polyisocyanate composition in which a hydrophilic group is added to at least a portion of the isocyanate groups of the polyisocyanate compound represented by the above general formula (I), (II), (III) or (IV) contained in the polyisocyanate composition according to any one of [1] to [24].

[26] A hydrophilic polyisocyanate composition in which a hydrophilic group is added to at least a portion of the isocyanate groups of the polyisocyanate compound represented by the above general formula (I), (II), (III) or (IV) contained in the blocked polyisocyanate composition according to [22].

[27] A coating material composition containing the polyisocyanate composition according to any one of [1] to [23] and a polyol.

[28] A coating material composition containing the blocked polyisocyanate composition according to [24] and a polyol.

[29] A coating material composition containing the hydrophilic polyisocyanate composition according to [25] or [26] and a polyol.

[30] A coating film obtained by curing the coating material composition according to any one of [27] to [29].

[31] A water dispersion containing water, and the polyisocyanate composition according to any one of [17] to [20] dispersed in the water.

[32] A water dispersion containing water and the blocked polyisocyanate composition according to [26].

[33] A water dispersion containing water and the hydrophilic polyisocyanate composition according to [24].

Effects of the Invention

The present invention can provide a polyisocyanate composition that has low viscosity, and also exhibits excellent coating film properties such as quick drying, substrate concealment and substrate adhesion.

The present invention can also provide a polyisocyanate composition that has low viscosity, exhibits excellent compatibility with polar polyols, and can form a coating film that exhibits excellent crack resistance even under severe conditions of temperature changes, humidity changes or ultraviolet exposure.

The present invention can also provide a polyisocyanate composition that exhibits excellent drying properties, and can form a coating film having excellent hardness and water resistance.

The present invention can also provide a polyisocyanate composition that exhibits favorable drying properties, and can form a coating film with favorable adhesion to substrates even when placed in an environment exposed to temperature changes and humidity changes.

The present invention can also provide a polyisocyanate composition that has low viscosity and excellent compatibility with silicates. Further, a coating material composition that uses a polyisocyanate composition according to this aspect of the present invention has excellent drying properties and recoat adhesion. Moreover, a coating film formed from the coating material composition has favorable scratch resistance.

The present invention can also provide a polyisocyanate composition that has low viscosity and exhibits excellent quick drying properties. Further, a coating material composition that uses the polyisocyanate composition according to this aspect of the present invention has excellent drying properties and substrate adhesion.

The present invention can also provide a polyisocyanate composition that has low viscosity and also exhibits excellent quick drying properties and excellent compatibility with polar polyols.

The present invention can also provide a polyisocyanate composition that enables a combination of solubility in low-polarity solvents and quick drying properties to be achieved, is of low viscosity and therefore enables the amount of solvent to be reduced, and can also be dispersed in water and used as a curing agent for a water-based coating material.

The present invention can also provide a polyisocyanate composition that has low viscosity, exhibits quick drying properties, and also exhibits excellent solubility in low-polarity organic solvents.

EMBODIMENTS FOR CARRYING OUT THE INVENTION

Embodiments for implementing the present invention are described below in further detail. However, the embodiments described below for implementing the present invention are merely examples used for describing the present invention, and in no way limit the present invention to the content described below. The present invention may also be implemented with appropriate modifications that fall within the scope of the invention.

In this description, a "polyisocyanate" refers to a polymer obtained by bonding together a plurality of a monomer having at least one isocyanate group (—NCO).

In this description, a "polyol" refers to a compound having two or more hydroxyl groups (—OH).

<Polyisocyanate Composition>

Embodiment 1

A polyisocyanate composition of an embodiment 1 of the present invention contains a polyisocyanate compound represented by general formula (I), (II), (III) or (IV).

[Chemical formula 31]

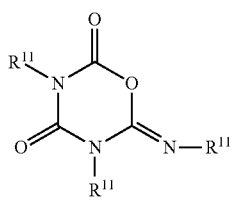
(I)

[Chemical formula 32]

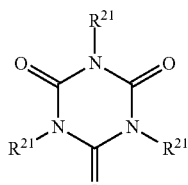
(II)

[Chemical formula 33]

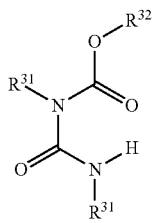
(III)

[Chemical formula 34]

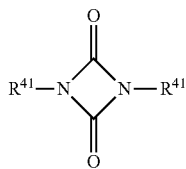
(IV)

[In general formulas (I), (II), (III) and (IV), each of the pluralities of $R^{11}$, $R^{21}$, $R^{31}$ and $R^{41}$ independently represents an organic group, and at least one of the pluralities of $R^{11}$, $R^{21}$, $R^{31}$ and $R^{41}$ is a group represented by general formula (V) or general formula (VI). The pluralities of $R^{11}$, $R^{21}$, $R^{31}$ and $R^{41}$ may be the same or different. In general formula (III), $R^{32}$ represents a residue in which one hydroxyl group has been removed from a monohydric or polyhydric alcohol.]

[Chemical formula 35]

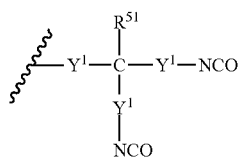
(V)

[In general formula (V), each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

[Chemical formula 36]

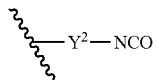
(VI)

[In general formula (VI), $Y^2$ represents a divalent hydrocarbon group of 1 to 20 carbon atoms containing an ester structure. The wavy line indicates a bonding site.]

Embodiment 1-1

A polyisocyanate composition of an embodiment 1-1 of the present invention contains a polyisocyanate compound of general formula (I) or general formula (II).

[Chemical formula 37]

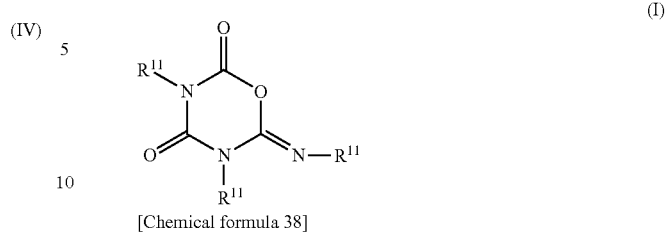
(I)

[Chemical formula 38]

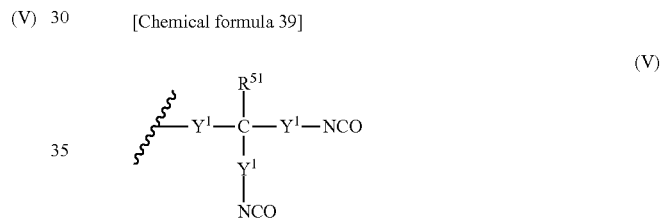
(II)

[In general formulas (I) and (II), each of the pluralities of $R^{11}$ and $R^{21}$ independently represents an organic group, and at least one of the pluralities of $R^{11}$ and $R^{21}$ is a group represented by general formula (V). The pluralities of $R^{11}$ and $R^{21}$ may be the same or different.]

[Chemical formula 39]

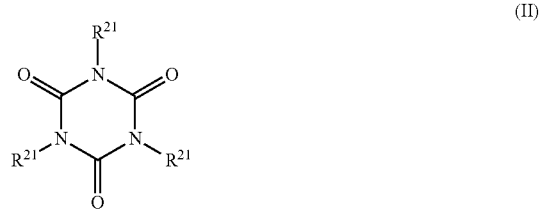
(V)

[In general formula (V), each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

The general formula (I), the general formula (II) and the general formula (V) are described below.

General Formula (I)

[Chemical formula 40]

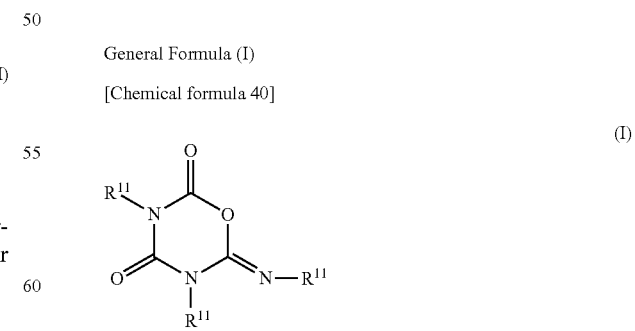
(I)

Polyisocyanate compounds represented by general formula (I) have an iminooxadiazinedione structure. An iminooxadiazinedione structure is a polyisocyanate formed from three molecules of an isocyanate monomer.

[$R^{11}$]

In general formula (I), each of the plurality of $R^{11}$ independently represents an organic group. The plurality of $R^{11}$ may be the same or different.

In the embodiment 1-1, of the three $R^{11}$ groups, at least one represents a group represented by the above general formula (V), and it is preferable that two of $R^{11}$ are groups represented by general formula (V), and more preferable that all three $R^{11}$ are groups represented by general formula (V).

Of the $R^{11}$ groups, examples of the groups other than the groups represented by the above general formula (III) include residues in which one isocyanate group has been removed from tetramethylene diisocyanate (TMDI), pentamethylene diisocyanate (PDI), hexamethylene diisocyanate (HDI), 2,2,4-trimethylhexane-1,6-diisocyanate, 2-methylpentane-1,5-diisocyanate (MPDI), 1,3-bis(isocyanatomethyl)-cyclohexane (1,3-H6-XDI), 3(4)-isocyanatomethyl-1-methyl-cyclohexyl isocyanate (IMCI), isophorone diisocyanate (IPDI), bis(isocyanatomethyl)-norbornane (NBDI), 1,3-bis(isocyanatomethyl)-benzene, 1,3-bis(2-isocyanatopropyl-2)benzene, or 4,4'-dicyclohexylmethane diisocyanate (H12MDI).

-General Formula (II)

[Chemical formula 41]

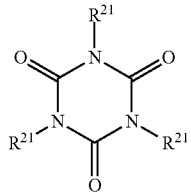

(II)

Polyisocyanate compounds represented by general formula (II) have an isocyanurate structure. An isocyanurate structure is a polyisocyanate formed from three molecules of an isocyanate monomer.

[$R^{21}$]

In general formula (II), each of the plurality of $R^{21}$ independently represents an organic group. The plurality of $R^{21}$ may be the same or different.

In the embodiment 1-1, of the three $R^{21}$ groups, at least one represents a group represented by the above general formula (V), and it is preferable that two of $R^{21}$ are groups represented by general formula (V), and more preferable that all three $R^{21}$ are groups represented by general formula (V).

Of the $R^{21}$ groups, examples of the groups other than the groups represented by the above general formula (V) include the same groups as those listed above in relation to general formula (I).

General Formula (V)

[Chemical formula 42]

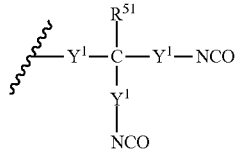

(V)

[$Y^1$]

In general formula (V), each of the plurality of $Y^1$ independently represents a single bond or a divalent hydrocarbon group of 1 to 20 carbon atoms that may contain an ester structure [—C(=O)—O—] and/or an ether structure (—O—). The plurality of $Y^1$ may be the same or different.

Examples of the divalent hydrocarbon group of 1 to 20 carbon atoms that may contain an ester structure and/or an ether structure include groups represented by —$(CH_2)_{n1}$—X—$(CH_2)_{n2}$— (wherein each of n1 and n2 independently represents an integer of 0 to 10, provided that n1 and n2 are not both 0, and X represents an ester group or an ether group).

When it is desirable to increase the reaction rate, X is preferably an ester group.

Further, n1 and n2 are preferably from 0 to 4, and more preferably from 0 to 2. Examples of preferred combinations of n1 and n2 include a combination in which n1=0 and n2=2, and a combination in which n1=2 and n2=2.

[$R^{51}$]

$R^{51}$ represents a hydrogen atom or a monovalent hydrocarbon group of 1 to 12 carbon atoms. There are no particular limitations on the hydrocarbon group for $R^{51}$, and examples include alkyl groups, alkenyl groups and alkynyl groups. $R^{51}$ is preferably a hydrogen atom.

The molecular weight of the triisocyanate that represents the origin of the group represented by general formula (V) in the embodiment 1-1 is preferably at least 139 but not more than 1,000.

The lower limit for the molecular weight is preferably at least 150, more preferably at least 180, and particularly preferably 200 or greater. Further, the upper limit for the molecular weight is preferably not more than 800, more preferably not more than 600, and particularly preferably 400 or less. By ensuring that the molecular weight is at least as large as the above lower limit, the crystallinity can be more easily controlled. Further, by ensuring that the molecular weight is not more than the above upper limit, a reduction in viscosity can be more easily achieved.

In order to achieve a low viscosity for the triisocyanate that represents the origin of the group represented by general formula (V) in the embodiment 1-1, the hydrocarbon groups among the plurality of $Y^{31}$ preferably have an aliphatic and/or aromatic group. Further, $R^{51}$ is preferably a hydrogen atom.

Further, it is preferable that the plurality of $Y^1$ are composed only of hydrocarbon groups.

Furthermore, in order to improve the weather resistance in those cases where the polyisocyanate composition is used as a coating material composition curing agent, the hydrocarbon groups among the plurality of $Y^1$ preferably have an aliphatic group or an alicyclic group.

In a separate consideration, in order to maintain heat resistance, it is preferable that at least one of the plurality of $Y^1$ has an ester group.

Further, in order to maintain hydrolysis resistance, it is preferable that at least one of the plurality of $Y^1$ has a hydrocarbon group or a hydrocarbon group containing an ether structure.

Examples of the triisocyanate that represents the origin of the group represented by general formula (V) in the embodiment 1-1 include 4-isocyanatomethyl-1,8-octamethylene diisocyanate (hereafter sometimes referred to as NTI, molecular weight: 251) disclosed in Japanese Examined Patent Application, Second Publication No. Sho 63-15264, 1,3,6-hexamethylene triisocyanate (hereafter sometimes referred to as HTI, molecular weight: 209) disclosed in Japanese Unexamined Patent Application, First Publication No. Sho 57-198760, bis(2-isocyanatoethyl) 2-isocyanatoglutarate (hereafter referred to as GTI, molecular weight: 311) disclosed in Japanese Examined Patent Application, Second Publication No. Hei 04-1033, and lysine triisocyanate (hereafter referred to as LTI, molecular weight: 267) disclosed in Japanese Unexamined Patent Application, First Publication No. Sho 53-135931.

Among these, from the viewpoint of further enhancing the reactivity of the isocyanate groups, NTI, GTI or LTI is preferred, NTI or LTI is more preferred, and LTI is particularly desirable.

The triisocyanate that represents the origin of the group represented by general formula (V) in the embodiment 1-1 can be obtained by isocyanation of an amine such as an amino acid derivative, an ether amine, or an alkyltriamine or the like. Examples of amino acid derivatives that may be used include 2,5-diaminovaleric acid, 2,6-diaminohexanoic acid, aspartic acid and glutamic acid. These amino acids are either diamino monocarboxylic acids or monoamino dicarboxylic acids, and therefore the carboxyl group(s) are esterified with an alkanolamine such as ethanolamine. Accordingly, the resulting triamine having an ester group can be converted to a triisocyanate containing an ester structure by phosgenation or the like.

Examples of the ether amines include the product "D403" manufactured by Mitsui Fine Chemicals, Inc., which is a polyoxyalkylene triamine. This product is a triamine, and can be converted to a triisocyanate containing an ether structure by phosgenation or the like of the amines.

Examples of the alkyltriamines include triisocyanatononane (4-aminomethyl-1,8-octanediamine). This compound is a triamine, and can be converted to a triisocyanate containing only hydrocarbon groups by phosgenation or the like of the amines.

Examples of the method used for producing the iminooxadiazinedione structure or the isocyanurate structure include methods that use a catalyst. For example, the catalysts (1) to (10) described below, which are generally well known as catalysts, may be used.

(1) (Poly) hydrogen fluorides represented by a general formula M[Fn] or a general formula M[Fn(HF)m] (wherein m and n are integers that satisfy the relationship m/n>0, and M is a cation (mixture) with an n charge, or one or more radicals having a total valency of n) such as tetramethylammonium fluoride hydrate and tetraethylammonium fluoride.
(2) Compounds composed of 3,3,3-trifluorocarboxylic acid, 4,4,4,3,3-pentafluorobutanoic acid, 5,5,5,4,4,3,3-heptafluoropetnaoic acid, or a compound of general formula $R^1$—C(2R')—C(O)O— or general formula $R^2$=CR'—C(O)O— such as 3,3-difluoropropan-2-enoic acid (in these general formulas, $R^1$ and $R^2$ are perfluoroalkyl groups of 1 to 30 carbon atoms which may be branched, cyclic and/or unsaturated as required, R' represents a hydrogen atom or a group selected from the group consisting of alkyl groups and aryl groups of 1 to 20 carbon atoms and may include a hetero atom if required, and the plurality of R' may be the same or different), and either a quaternary ammonium cation or a quaternary phosphonium cation.
(3) Hydroxides of a tetraalkylammonium ion such as a tetramethylammonium, tetraethylammonium or tetrabutylammonium ion; and weak organic acid salts thereof such as acetates, octylates, myristates and benzoates.
(4) Hydroxides of a hydroxyalkylammonium ion such as a trimethylhydroxyethylammonium, trimethylhydroxypropylammonium, triethylhydroxyethylammonium or triethylhydroxypropylammonium ion; and weak organic acid salts thereof such as acetates, octylates, myristates and benzoates.
(5) Metal salts such as tin, zinc and lead salts of alkylcarboxylic acids such as acetic acid, caproic acid, octylic acid and myristic acid.
(6) Metal alcoholates such as sodium and potassium alcoholates.
(7) Aminosilyl group-containing compounds such as hexamethylenedisilazane.
(8) Mannich bases.
(9) Combinations of a tertiary amine and an epoxy compound.
(10) Phosphorus-based compounds such as tributylphosphine.

Among the above, from the viewpoint of ease of availability, tetramethylammonium fluoride hydrate is preferred as the catalyst. Further, from the viewpoint of safety, compounds of (2) above are preferred. Further, from the viewpoint of suppressing the production of unwanted by-products, weak organic acid salts of quaternary ammonium ions are preferred.

From the viewpoint of catalyst miscibility, these catalysts may be diluted with a solvent or added together with a solvent. Examples of the solvent include 1-methylpyrrolidone, ethylene glycol monoethyl ether, diethylene glycol monoethyl ether, ethylene glycol monomethyl ether, diethylene glycol monomethyl ether, dipropylene glycol monomethyl ether, propylene glycol monomethyl ether, methyl ethyl ketone, acetone, methyl isobutyl ketone, propylene glycol monomethyl ether acetate, ethanol, methanol, iso-propanol, 1-propanol, iso-butanol, 1-butanol, 2-ethylhexanol, cyclohexanol, ethylene glycol, diethylene glycol, triethylene glycol, propylene glycol, dipropylene glycol, 1,4-butanediol, 1,3-butanediol, ethyl acetate, isopropyl acetate, butyl acetate, toluene, xylene, pentane, iso-pentane, hexane, iso-hexane, cyclohexane, solvent naphtha, mineral spirit, and dimethylformamide. These catalysts may be used individually, or a mixture of two or more catalysts may be used.

Among the above solvents, from the viewpoint of production of the iminooxadiazinedione, ethanol, methanol, iso-propanol, 1-propanol, iso-butanol, 1-butanol, 2-ethylhexanol, cyclohexanol, ethylene glycol, diethylene glycol, triethylene glycol, propylene glycol, dipropylene glycol, 1,4-butanediol or 1,3-butanediol is preferred, and iso-butanol, 1-butanol or 2-ethylhexanol is more preferred.

The reaction temperature for producing the iminooxadiazinedione structure or isocyanurate structure is preferably at least 40° C. but not more than 120° C. The lower limit for the temperature is preferably at least 50° C., and more preferably 55° C. or higher. Further, the upper limit for the temperature is preferably not more than 100° C., more preferably not more than 90° C., and even more preferably 80° C. or lower. By ensuring that the reaction temperature is at least as high as the above lower limit, the reaction rate can be maintained, whereas by ensuring that the reaction temperature is not higher than the above upper limit, coloration of the polyisocyanate composition can be suppressed.

Although there are no particular limitations, the reaction may be stopped, for example, by adding phosphoric acid or an acidic compound such as an acidic phosphate ester.

The conversion ratio for the polyisocyanate composition of the embodiment 1-1 is preferably at least 1% but not more than 100%, more preferably at least 10% but not more than 80%, and particularly preferably at least 20% but not more than 70%. At values at least as high as the above lower limit, the curability tends to be superior, whereas at values not higher than the above upper limit, the viscosity tends to be low and the workability excellent.

The above conversion ratio was determined by using a gel permeation chromatograph (GPC) to measure the polystyrene-equivalent number average molecular weight, and then determining the surface area proportion of the peaks having a larger number average molecular weight than the unreacted triisocyanate.

The lower limit for the molar ratio of the iminooxadiazinedione structure relative to the isocyanurate structure in the polyisocyanate composition of the embodiment 1-1 is preferably at least 0.01, more preferably at least 0.02, even more preferably at least 0.05, and particularly preferably 0.1 or greater. Further, the upper limit for the molar ratio is preferably not more than 1.5, more preferably not more than 1.3, even more preferably not more than 0.8, and particularly preferably 0.4 or less. Provided the molar ratio is at least as large as the above lower limit, the adhesion to base coating films tends to be more favorable, whereas provided the molar ratio is not higher than the above upper limit, the drying properties tend to be more favorable.

Although there are no particular limitations on the amount of polyisocyanate compounds in the polyisocyanate composition of embodiment 1-1, the amount is preferably at least 1% by mass but not more than 100% by mass, more preferably at least 10% by mass but not more than 90% by mass, even more preferably at least 12% by mass but not more than 80% by mass, still more preferably at least 15% by mass but not more than 77% by mass, still more preferably at least 15% by mass but not more than 75% by mass, and particularly preferably at least 20% by mass but not more than 70% by mass. Provided the amount is at least as large as the above lower limit, the weather resistance tends to be superior, whereas provided the amount is not higher than the above upper limit, the viscosity tends to be low and the workability excellent.

Furthermore, the polyisocyanate composition of the embodiment 1-1 may also include, in addition to the polyisocyanate compound represented by general formula (I) or general formula (II), a compound having an uretdione structure, a compound having an allophanate structure, a compound having a urethane structure, or a compound having a biuret structure.

Uretdione structures, allophanate structures, urethane structures and biuret structures are represented by the following formulas (VII), (VIII), (IX) and (X) respectively. Among these, from the viewpoint of coating film hardness, a compound having an allophanate structure or a compound having an uretdione structure is preferred.

[Chemical formula 43]

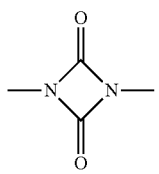
(VII)

-continued

[Chemical formula 44]

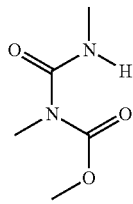
(VIII)

[Chemical formula 45]

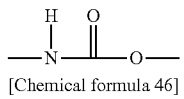
(IX)

[Chemical formula 46]

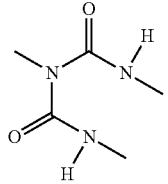
(X)

The polyisocyanate composition of the embodiment 1-1 preferably also contains a triisocyanate represented by general formula (V)-1 shown below.

General Formula (V)-1

[Chemical formula 47]

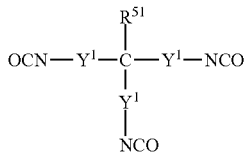
(V)-1

[In general formula (V)-1, each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms.]

[$R^{51}$, $Y^1$]

Descriptions relating to $R^{51}$ and $Y^1$ in general formula (V)-1 are the same as the descriptions relating to $R^{51}$ and $Y^1$ in the general formula (V) described above.

In the embodiment 1-1, at least one of the plurality of $Y^1$ preferably contains an ester structure and/or an ether structure.

Further, $R^{51}$ and $Y^1$ in general formula (V)-1 may be the same as, or different from, $R^{51}$ and $Y^1$ in the above general formula (V).

In those cases where conventional polyisocyanate compositions are produced from volatile diisocyanates such as 1,6-hexamethylene diisocyanate, 1,5-pentane diisocyanate, toluene diisocyanate or isophorone diisocyanate, it is necessary to use distillation or the like to remove unreacted starting material diisocyanate down to a level of less than 2% by weight, and preferably less than about 1% by weight, relative to the weight of the polyisocyanate composition of the final product. However, when producing the polyisocyanate composition of the embodiment 1-1, because the triisocyanate used in the embodiment 1-1 has three NCO groups, the triisocyanate does not reduce the crosslinking ability of the polyisocyanate composition of the embodiment 1-1 with polyols, and therefore need not necessarily be removed.

In those cases where unreacted triisocyanate is removed, a thin film distillation method or solvent extraction method or the like may be used to separate the triisocyanate from the polyisocyanate composition.

Although there are no particular limitations on the viscosity at 25° C. of the polyisocyanate composition of the embodiment 1-1, the viscosity is preferably at least 5 mPa·s but not more than 1,000 mPa·s, more preferably at least 8 mPa·s but not more than 800 mPa·s, even more preferably at least 10 mPa·s but not more than 500 mPa·s, and particularly preferably at least 10 mPa·s but not more than 100 mPa·s. At viscosity values at least as large as the above lower limit, the curability tends to be excellent, whereas at values not more than the above upper limit, the workability tends to be superior. The viscosity can be measured using an E-type viscometer (manufactured by Tokimec Inc.).

In the polyisocyanate composition of the embodiment 1-1, it is preferable that the composition contains a polyisocyanate compound represented by the above general formula (II), and that the theoretical reaction rate calculated from the NCO % of the polyisocyanate composition is not more than 47%.

The above theoretical reaction rate is more preferably at least 1% but not more than 47%, even more preferably at least 10% but not more than 45%, and particularly preferably at least 15% but not more than 45%. At values at least as high as the above lower limit, the curability tends to be superior, whereas at values not more than the above upper limit, the viscosity tends to be lower meaning improved workability, and the crack resistance of the coating film tends to be superior.

The theoretical reaction rate mentioned above is a value that is expressed as the reaction rate when all the multimers are assumed to be trimers. The theoretical reaction rate c (%) is determined from the NCO % (x %) of the synthesized polyisocyanate composition, the NCO % (a %) of the triisocyanate that is used (see formula [B] below) and the NCO % (b %) of the triisocyanate trimer (see formula [C] below), using a formula [D] shown below.

NCO % of triisocyanate used: $(a)$=(molecular weight of NCO/molecular weight of triisocyanate used)×100(%)   [B]

NCO % of triisocyanate trimer: $(b)$=(molecular weight of NCO/molecular weight of triisocyanate trimer)×100(%)   [C]

Theoretical reaction rate $c(\%)=[(x-a)/(b-a)]\times100(\%)$   [D]

In the polyisocyanate composition of the embodiment 1-1, it is preferable that the composition contains a polyisocyanate compound represented by the above general formula (II), and that the theoretical reaction rate calculated from the NCO % of the polyisocyanate composition is at least 95% but not more than 150%. The theoretical reaction rate is more preferably at least 100% but not more than 130%, and particularly preferably at least 100% but not more than 120%. At values at least as high as the above lower limit, the hardness of the coating film and the water resistance tend to be excellent, whereas at values not more than the above upper limit, the amount of solvent used tends to be low, enabling a reduced-solvent coating material to be produced.

In the above embodiment 1-1, it is preferable that the composition contains a polyisocyanate compound (A) represented by the above general formula (II) and a triisocyanate compound (B) represented by the above general formula (V)-1, and that the surface area ratio ((A)/[(A)+(B)]) between the peak surface area (A) of the number average molecular weight of the polyisocyanate compound (A) and the peak surface area (B) of the number average molecular weight of the triisocyanate compound (B), obtained by a gel permeation chromatography (GPC) measurement, is at least 0.8 but less than 1.

This surface area ratio ((A)/[(A)+(B)]) determined by GPC measurement can be calculated using the method described in the examples.

The surface area ratio between (A) and (B) (namely, (A)/[(A)+(B)]) determined by GPC measurement is preferably at least 0.85 but less than 1, and more preferably at least 0.9 but less than 1.

Further, when the monomer trimer which is a triisocyanate represented by the general formula (II) in which all the $R^{21}$ groups are represented by the above general formula (V) is deemed to be a compound (C), the peak surface area ratio ((C)/[(A)+(B)] between the peak surface area (A) of the number average molecular weight of the polyisocyanate compound (A), the peak surface area (B) of the number average molecular weight of the triisocyanate compound (B), and the peak surface area (C) of the number average molecular weight of the compound (C), obtained by a gel permeation chromatography (GPC) measurement, is preferably at least 0.3 but less than 1 from the viewpoint of achieving superior levels of drying properties, adhesion to base substrates and workability. The above ratio is more preferably at least 0.35 but less than 1, and particularly preferably at least 0.4 but less than 1.

Furthermore, from the viewpoint of achieving superior levels of drying properties, adhesion to base substrates and workability, the isocyanate group functional value is preferably at least 4 but not more than 12. This isocyanate group functional value is more preferably at least 5 but not more than 11, and particularly preferably at least 6 but not more than 9.

Embodiment 1-2

A polyisocyanate composition of an embodiment 1-2 of the present invention contains polyisocyanate compounds represented by general formula (II) and general formula (III), wherein the molar ratio between isocyanurate structures and allophanate structures is from 100/0.1 to 100/15.

[Chemical formula 48]

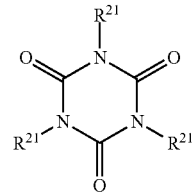

(II)

-continued

[Chemical formula 49]

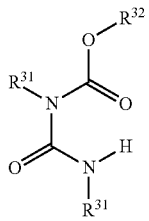

(III)

[In general formula (II) and general formula (III), each of the pluralities of $R^{21}$ and $R^{31}$ independently represents an organic group, and at least one of the pluralities of $R^{21}$ and $R^{31}$ is a group represented by general formula (V). The pluralities of $R^{21}$ and $R^{31}$ may be the same or different. $R^{32}$ represents a residue in which one hydroxyl group has been removed from a monohydric or polyhydric alcohol.]

[Chemical formula 50]

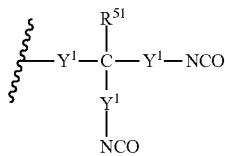

(V)

[In general formula (V), each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

The general formula (II), the general formula (III) and the general formula (V) are described below.

General Formula (II)

[Chemical formula 51]

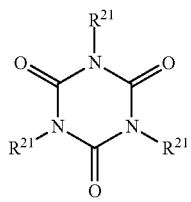

(II)

Polyisocyanate compounds represented by general formula (II) have an isocyanurate structure. An isocyanurate structure is a polyisocyanate formed from three molecules of an isocyanate monomer.

[$R^{21}$]

In general formula (II), each of the plurality of $R^{21}$ independently represents an organic group. The plurality of $R^{21}$ may be the same or different.

In the embodiment 1-2, of the three $R^{21}$ groups, at least one represents a group represented by the above general formula (V), and it is preferable that two of $R^{21}$ are groups represented by general formula (V), and more preferable that all three $R^{21}$ are groups represented by general formula (V).

Of the $R^{21}$ groups, examples of the groups other than the groups represented by the above general formula (V) include residues in which one isocyanate group has been removed from tetramethylene diisocyanate (TMDI), pentamethylene diisocyanate (PDI), hexamethylene diisocyanate (HDI), 2,2,4-trimethylhexane-1,6-diisocyanate, 2-methylpentane-1,5-diisocyanate (MPDI), 1,3-bis(isocyanatomethyl)-cyclohexane (1,3-H6-XDI), 3(4)-isocyanatomethyl-1-methyl-cyclohexyl isocyanate (IMCI), isophorone diisocyanate (IPDI), bis(isocyanatomethyl)-norbornane (NBDI), 1,3-bis(isocyanatomethyl)-benzene, 1,3-bis(2-isocyanatopropyl-2)benzene, or 4,4'-dicyclohexylmethane diisocyanate (H12MDI).

General Formula (III)

[Chemical formula 52]

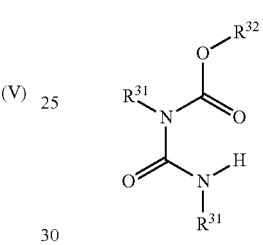

(III)

Polyisocyanate compounds represented by general formula (III) have an allophanate structure. An allophanate structure is a polyisocyanate composed of two molecules of a triisocyanate monomer and a monohydric or polyhydric alcohol.

[$R^{31}$]

In general formula (III), each of the plurality of $R^{31}$ independently represents an organic group. The plurality of $R^{31}$ may be the same or different.

In the embodiment 1-2, at least one of the three $R^{31}$ groups is a group represented by the above general formula (V), and it is preferable that two of $R^{31}$ are groups represented by general formula (V), and more preferable that all three $R^{31}$ are groups represented by general formula (V).

Of the $R^{31}$ groups, examples of the groups other than the groups represented by the above general formula (V) include the same groups as those listed above in relation to general formula (II).

[$R^{32}$]

In general formula (III), $R^{32}$ is a residue in which one hydroxyl group has been removed from a monohydric or polyhydric alcohol.

More specific examples of $R^{32}$ include residues in which one hydroxyl group has been removed from a monohydric alcohol, including saturated aliphatic alcohols such as methanol, ethanol, 1-propanol, 2-propanol, 1-butanol, 2-butanol, iso-butanol, 1-pentanol, 2-pentanol, isoamyl alcohol, 1-hexanol, 2-hexanol, 1-heptanol, 1-octanol, 2-ethyl-1-hexanol, 3,3,5-trimethyl-1-hexanol, tridecanol and pentadecanol, saturated cyclic aliphatic alcohols such as cyclohexanol and cyclopentanol, and unsaturated aliphatic alcohols such as allyl alcohol, butenol, hexenol and 2-hydroxyethyl acrylate.

Further examples include residues in which one hydroxyl group has been removed from a dihydric alcohol such as ethylene glycol, propanediol, 1,4-butanediol, 1,3-butanediol, 1,6-hexanediol, 1,4-hexanediol, 1,6-cyclohexanediol, 1,4-cyclohexanediol, methylpentanediol, cyclohexanedimethanol, methylpentanediol, neopentyl glycol, diethylene glycol, triethylene glycol, polyethylene glycol, polypropylene glycol and hydrogenated bisphenol A.

Further examples include residues in which one hydroxyl group has been removed from a trihydric alcohol such as glycerol, 2-methyl-2-hydroxymethyl-1,3-propanediol, 2,4-hydroxy-3-hydroxymethylpentane, and 1,2,6-hexanetriol.

Further examples include residues in which one hydroxyl group has been removed from a tetrahydric alcohol such as a sugar alcohol, including tetritols such as erythrose, pentitols such as xylitol, and hexitols such as sorbitol.

Further examples may include residues in which one hydroxyl group has been removed from a phenol such as phenol, benzylphenol, o-cresol, p-cresol, catechol, ethylphenol, octylphenol, xylenol, naphthol, nonylphenol or bisphenol A.

Further examples include residues in which one hydroxyl group has been removed from an alcohol such as a polyester polyol, polypropylene glycol, polyethylene glycol or polytetraethylene glycol that has been produced using one of the above alcohols as a raw material.

A residue in which one hydroxyl group has been removed from an acrylic polyol having hydroxyl groups is also possible.

Of the above, from the viewpoints of the compatibility with silicates and the coating film hardness, $R^{32}$ in the embodiment 1-2 is preferably a residue in which one hydroxyl group has been removed from a monohydric alcohol, is more preferably a residue in which one hydroxyl group has been removed from a monohydric alcohol of 3 to 9 carbon atoms, and is most preferably a residue in which one hydroxyl group has been removed from 1-butanol, iso-butanol or 2-ethyl-1-hexanol. Provided the number of carbon atoms is at least 3, the compatibility with silicates is favorable, whereas provided the number of carbon atoms is not more than 9, satisfactory scratch resistance can be imparted to the coating film.

The polyisocyanate composition of the embodiment 1-2 has isocyanurate structures and allophanate structures. The molar ratio between the isocyanurate structures and allophanate structures is within a range from 100/0.1 to 100/15, and is preferably from 100/1 to 100/12, more preferably from 100/2 to 100/10, and even more preferably from 100/4 to 100/8. Provided the molar ratio is not higher than the above upper limit, the scratch resistance upon coating film formation is favorable, whereas provided the molar ratio is at least as high as the above lower limit, the compatibility with silicates is satisfactory. The molar ratio between the isocyanurate structures and allophanate structures in the polyisocyanate composition can be measured, for example, using $^{13}$C-NMR.

General Formula (V)

[Chemical formula 53]

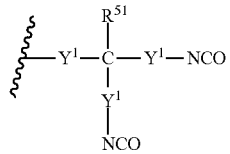

(V)

[$Y^1$]

In general formula (V), each of the plurality of $Y^1$ independently represents a single bond or a divalent hydrocarbon group of 1 to 20 carbon atoms that may contain an ester structure [—C(=O)—O—] and/or an ether structure (—O—). The plurality of $Y^1$ may be the same or different.

Examples of the divalent hydrocarbon group of 1 to 20 carbon atoms that may contain an ester structure and/or an ether structure include groups represented by —$(CH_2)_{n1}$—X—$(CH_2)_{n2}$— (wherein each of n1 and n2 independently represents an integer of 0 to 10, provided that n1 and n2 are not both 0, and the value of n1 or n2 on the side that is bonded to NCO is preferably 1. X represents an ester group or an ether group).

When it is desirable to increase the reaction rate, X is preferably an ester group. Further, n1 and n2 are preferably from 0 to 4, and more preferably from 0 to 2. Examples of preferred combinations of n1 and n2 include a combination in which n1=0 and n2=2, and a combination in which n1=2 and n2=2.

[$R^{51}$]

$R^{51}$ represents a hydrogen atom or a monovalent hydrocarbon group of 1 to 12 carbon atoms. There are no particular limitations on the hydrocarbon group for $R^{51}$, and examples include alkyl groups, alkenyl groups and alkynyl groups. $R^{51}$ is preferably a hydrogen atom.

The molecular weight of the triisocyanate that represents the origin of the group represented by general formula (V) in the embodiment 1-2 is preferably at least 139 but not more than 1,000.

The lower limit for the molecular weight is preferably at least 150, more preferably at least 180, and particularly preferably 200 or greater. Further, the upper limit for the molecular weight is preferably not more than 800, more preferably not more than 600, and particularly preferably 400 or less. By ensuring that the molecular weight is at least as large as the above lower limit, the crystallinity can be more easily controlled. Further, by ensuring that the molecular weight is not more than the above upper limit, a reduction in viscosity can be more easily achieved.

In order to achieve a low viscosity for the triisocyanate that represents the origin of the group represented by general formula (V) in the embodiment 1-2, the hydrocarbon groups among the plurality of $Y^1$ preferably have an aliphatic and/or aromatic group. Further, $R^{51}$ is preferably a hydrogen atom.

Furthermore, in order to improve the weather resistance in those cases where the polyisocyanate composition is used as a coating material composition curing agent, the hydrocarbon groups among the plurality of $Y^1$ preferably have an aliphatic group or an alicyclic group.

Further, it is preferable that the plurality of $Y^1$ are composed only of hydrocarbon groups.

In a separate consideration, in order to maintain heat resistance, it is preferable that at least one of the plurality of $Y^1$ has an ester group.

Further, in order to maintain hydrolysis resistance, it is preferable that at least one of the plurality of $Y^{31}$ has a hydrocarbon group or a hydrocarbon group containing an ether structure.

Examples of the triisocyanate that represents the origin of the group represented by general formula (V) in the embodiment 1-2 include 4-isocyanatomethyl-1,8-octamethylene diisocyanate (hereafter sometimes referred to as NTI, molecular weight: 251) disclosed in Japanese Examined Patent Application, Second Publication No. Sho 63-15264, 1,3,6-hexamethylene triisocyanate (hereafter sometimes referred to as HTI, molecular weight: 209) disclosed in Japanese Unexamined Patent Application, First Publication No. Sho 57-198760, bis(2-isocyanatoethyl) 2-isocyanatoglutarate (hereafter referred to as GTI, molecular weight: 311) disclosed in Japanese Examined Patent Application, Second Publication No. Hei 04-1033, and lysine triisocyanate (hereafter referred to as LTI, molecular weight: 267) disclosed in Japanese Unexamined Patent Application, First Publication No. Sho 53-135931.

Among these, from the viewpoint of further enhancing the reactivity of the isocyanate groups, NTI, GTI or LTI is preferred, NTI or LTI is more preferred, and LTI is particularly desirable.

The triisocyanate that represents the origin of the group represented by general formula (V) in the embodiment 1-2 can be obtained by isocyanation of an amine such as an amino acid derivative, an ether amine, or an alkyltriamine or the like. Examples of amino acid derivatives that may be used include 2,5-diaminovaleric acid, 2,6-diaminohexanoic acid, aspartic acid and glutamic acid. These amino acids are either diamino monocarboxylic acids or monoamino dicarboxylic acids, and therefore the carboxyl group(s) are esterified with an alkanolamine such as ethanolamine. Accordingly, the resulting triamine having an ester group can be converted to a triisocyanate containing an ester structure by phosgenation or the like.

Examples of the ether amines include the product "D403" manufactured by Mitsui Fine Chemicals, Inc., which is a polyoxyalkylene triamine. This product is a triamine, and can be converted to a triisocyanate containing an ether structure by phosgenation or the like of the amines.

Examples of the alkyltriamines include triisocyanatononane (4-aminomethyl-1,8-octanediamine). This compound is a triamine, and can be converted to a triisocyanate containing only hydrocarbon groups by phosgenation or the like of the amines.

Examples of the method used for producing the isocyanurate structure and/or the allophanate structure include methods that use an isocyanuration catalyst. There are no particular limitations on the isocyanuration catalyst, but in general, catalysts that have basicity are preferred, and examples include the following.
(1) Hydroxides of a tetraalkylammonium ion such as a tetramethylammonium, tetraethylammonium or tetrabutylammonium ion; and weak organic acid salts thereof such as acetates, octylates, myristates and benzoates.
(2) Hydroxides of a hydroxyalkylammonium ion such as a trimethylhydroxyethylammonium, trimethylhydroxypropylammonium, triethylhydroxyethylammonium or triethylhydroxypropylammonium ion; and weak organic acid salts thereof such as acetates, octylates, myristates and benzoates.
(3) Metal salts such as tin, zinc and lead salts of alkylcarboxylic acids such as acetic acid, caproic acid, octylic acid and myristic acid.
(4) Metal alcoholates such as sodium and potassium alcoholates.
(5) Aminosilyl group-containing compounds such as hexamethylenedisilazane.
(6) Mannich bases.
(7) Combinations of a tertiary amine and an epoxy compound.
(8) Phosphorus-based compounds such as tributylphosphine.

Among the above, from the viewpoint of suppressing the production of unwanted by-products, weak organic acid salts of quaternary ammonium ions are preferred, and weak organic acid salts of tetraalkylammonium ions are more preferred.

From the viewpoint of catalyst miscibility, these catalysts may be diluted with a solvent or added together with a solvent. Examples of the solvent include 1-methylpyrrolidone, ethylene glycol monoethyl ether, diethylene glycol monoethyl ether, ethylene glycol monomethyl ether, diethylene glycol monomethyl ether, dipropylene glycol monomethyl ether, propylene glycol monomethyl ether, methyl ethyl ketone, acetone, methyl isobutyl ketone, propylene glycol monomethyl ether acetate, ethanol, methanol, isopropanol, 1-propanol, iso-butanol, 1-butanol, 2-ethylhexanol, cyclohexanol, ethylene glycol, diethylene glycol, triethylene glycol, propylene glycol, dipropylene glycol, 1,4-butanediol, 1,3-butanediol, ethyl acetate, isopropyl acetate, butyl acetate, toluene, xylene, pentane, iso-pentane, hexane, iso-hexane, cyclohexane, solvent naphtha, mineral spirit and dimethylformamide, and mixtures of two or more of these solvents may also be used.

The reaction temperature for the isocyanuration is preferably at least 50° C. but not more than 120° C., and is more preferably at least 60° C. but not more than 90° C. Ensuring that the reaction temperature is not higher than the above upper limit tends to enable coloration and the like to be effectively suppressed, and is consequently preferred.

Although there are no particular limitations, the isocyanuration reaction may be stopped, for example, by adding phosphoric acid or an acidic compound such as an acidic phosphate ester.

The conversion ratio for the polyisocyanate composition of the embodiment 1-2 is preferably at least 1% but not more than 100%, more preferably at least 10% but not more than 80%, and particularly preferably at least 20% but not more than 70%. At values at least as high as the above lower limit, the curability tends to be superior, whereas at values not higher than the above upper limit, the viscosity tends to be low and the workability excellent.

The above conversion ratio was determined by using a gel permeation chromatograph (GPC) to measure the polystyrene-equivalent number average molecular weight, and then determining the surface area proportion of the peaks having a larger number average molecular weight than the unreacted triisocyanate.

The amount of polyisocyanate compounds in the polyisocyanate composition of embodiment 1-2 is preferably at least 1% by mass but not more than 100% by mass, more preferably at least 10% by mass but not more than 90% by mass, and even more preferably at least 20% by mass but not more than 80% by mass. Provided the amount is at least as large as the above lower limit, the weather resistance tends to be superior, whereas provided the amount is not higher than the above upper limit, the viscosity tends to be low and the workability excellent.

Furthermore, the polyisocyanate composition of the embodiment 1-2 may also include, in addition to the polyisocyanate compound represented by general formula (I) or general formula (II), a compound having an uretdione structure, a compound having an iminooxadiazinedione structure, a compound having a urethane structure, or a compound having a biuret structure.

Uretdione structures, iminooxadiazinedione structures, urethane structures and biuret structures are represented by the following formulas (VII), (XI), (IX) and (X) respectively. Among these, from the viewpoint of the permeation into a lower layer in a multilayer coating film, a compound having an uretdione structure or a compound having an iminooxadiazinedione structure is preferred.

[Chemical formula 54]

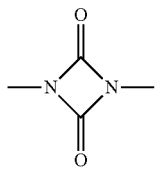

(VII)

[Chemical formula 55]

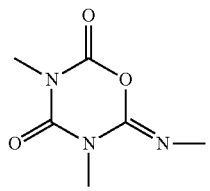

(XI)

[Chemical formula 56]

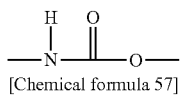

(IX)

[Chemical formula 57]

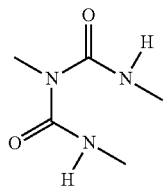

(X)

The polyisocyanate composition of the embodiment 1-2 preferably also contains a triisocyanate represented by general formula (V)-1 shown below.

General Formula (V)-1

[Chemical formula 58]

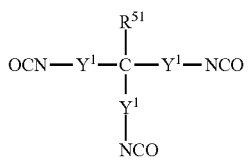

(V)-1

[In general formula (V)-1, each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms.]

[$R^{51}$, $Y^1$]

Descriptions relating to $R^{51}$ and $Y^1$ in general formula (V)-1 are the same as the descriptions relating to $R^{51}$ and $Y^1$ in the general formula (V) described above.

In the embodiment 1-2, at least one of the plurality of $Y^1$ preferably contains an ester structure and/or an ether structure.

Further, $R^{51}$ and $Y^1$ in general formula (V)-1 may be the same as, or different from, $R^{51}$ and $Y^1$ in the above general formula (V).

In those cases where conventional polyisocyanate compositions are produced from volatile diisocyanates such as 1,6-hexamethylene diisocyanate, 1,5-pentane diisocyanate, toluene diisocyanate or isophorone diisocyanate, it is necessary to use distillation or the like to remove unreacted starting material diisocyanate down to a level of less than 2% by weight, and preferably less than about 1% by weight, relative to the weight of the polyisocyanate composition of the final product. However, when producing the polyisocyanate composition of the embodiment 1-2, because the triisocyanate used in the embodiment 1-2 has three NCO groups, the triisocyanate does not reduce the crosslinking ability of the polyisocyanate composition of the embodiment 1-2 with polyols, and therefore need not necessarily be removed.

In those cases where unreacted triisocyanate is removed, a thin film distillation method or solvent extraction method or the like may be used to separate the triisocyanate from the polyisocyanate composition.

Although there are no particular limitations on the viscosity at 25° C. of the polyisocyanate composition of the embodiment 1-2, the viscosity is preferably at least 5 mPa·s but not more than 2,000 mPa·s, more preferably at least 10 mPa·s but not more than 1,800 mPa·s, and even more preferably at least 15 mPa·s but not more than 250 mPa·s. At viscosity values at least as large as the above lower limit, the curability tends to be excellent, whereas at values not more than the above upper limit, the workability tends to be superior. The viscosity can be measured using an E-type viscometer (manufactured by Tokimec Inc.).

Embodiment 1-3

A polyisocyanate composition of an embodiment 1-3 of the present invention contains polyisocyanate compounds represented by general formula (II) and general formula (IV), wherein the molar ratio between isocyanurate structures and uretdione structures is from 100/0.1 to 100/100, and preferably from 100/0.1 to 100/45.

Provided the molar ratio is at least as larger as the above lower limit, the adhesion to base coating films tends to be more favorable, whereas provided the molar ratio is not higher than the above upper limit, the drying properties tend to be more favorable.

[Chemical formula 59]

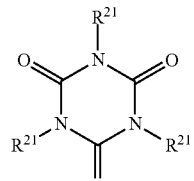

(II)

[Chemical formula 60]

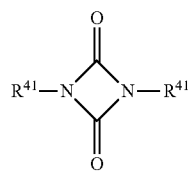

(IV)

[In general formulas (II) and (IV), each of the pluralities of $R^{21}$ and $R^{41}$ independently represents an organic group, and at least one of the pluralities of $R^{21}$ and $R^{41}$ is a group represented by general formula (V). The pluralities of $R^{21}$ and $R^{41}$ may be the same or different.]

[Chemical formula 61]

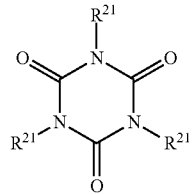
(V)

[In general formula (V), each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

The general formula (II), the general formula (IV) and the general formula (V) are described below.

General Formula (II)

[Chemical formula 62]

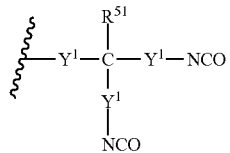
(II)

Polyisocyanate compounds represented by general formula (II) have an isocyanurate structure. An isocyanurate structure is a polyisocyanate formed from three molecules of an isocyanate monomer.

[$R^{21}$]

In general formula (II), each of the plurality of $R^{21}$ independently represents an organic group. The plurality of $R^{21}$ may be the same or different.

In the embodiment 1-3, of the three $R^{21}$ groups, at least one represents a group represented by the above general formula (V), and it is preferable that two of $R^{21}$ are groups represented by general formula (V), and more preferable that all three $R^{21}$ are groups represented by general formula (V).

Of the $R^{21}$ groups, examples of the groups other than the groups represented by the above general formula (V) include residues in which one isocyanate group has been removed from tetramethylene diisocyanate (TMDI), pentamethylene diisocyanate (PDI), hexamethylene diisocyanate (HDI), 2,2,4-trimethylhexane-1,6-diisocyanate, 2-methylpentane-1,5-diisocyanate (MPDI), 1,3-bis(isocyanatomethyl)-cyclohexane (1,3-H6-XDI), 3(4)-isocyanatomethyl-1-methyl-cyclohexyl isocyanate (IMCI), isophorone diisocyanate (IPDI), bis(isocyanatomethyl)-norbornane (NBDI), 1,3-bis(isocyanatomethyl)-benzene, 1,3-bis(2-isocyanatopropyl-2) benzene, or 4,4'-dicyclohexylmethane diisocyanate (H12MDI).

General Formula (IV)

[Chemical formula 63]

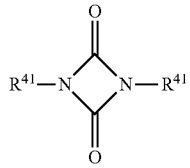
(IV)

In general formula (IV), the plurality of $R^{41}$ are the same as $R^{21}$ described above in relation to general formula (II).

General Formula (V)

[Chemical formula 64]

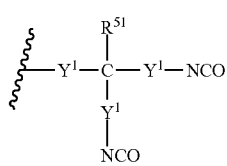
(V)

[$Y^1$]

In general formula (V), each of the plurality of $Y^1$ independently represents a single bond or a divalent hydrocarbon group of 1 to 20 carbon atoms that may contain an ester structure [—C(=O)—O—] and/or an ether structure (—O—). The plurality of $Y^1$ may be the same or different.

Examples of the divalent hydrocarbon group of 1 to 20 carbon atoms that may contain an ester structure and/or an ether structure include groups represented by —$(CH_2)_{n1}$—X—$(CH_2)_{n2}$— (wherein each of n1 and n2 independently represents an integer of 0 to 10, provided that n1 and n2 are not both 0, and the value of n1 or n2 on the side that is bonded to NCO is preferably 1 or greater. X represents an ester group or an ether group).

When it is desirable to increase the reaction rate, X is preferably an ester group. Further, n1 and n2 are preferably from 0 to 4, and more preferably from 0 to 2. Examples of preferred combinations of n1 and n2 include a combination in which n1=0 and n2=2, and a combination in which n1=2 and n2=2.

[$R^{51}$]

$R^{51}$ represents a hydrogen atom or a monovalent hydrocarbon group of 1 to 12 carbon atoms. There are no particular limitations on the hydrocarbon group for $R^{51}$, and examples include alkyl groups, alkenyl groups and alkynyl groups. $R^{51}$ is preferably a hydrogen atom.

The molecular weight of the triisocyanate that represents the origin of the group represented by general formula (V) in the embodiment 1-3 is preferably at least 139 but not more than 1,000.

The lower limit for the molecular weight is preferably at least 150, more preferably at least 180, and particularly preferably 200 or greater. Further, the upper limit for the molecular weight is preferably not more than 800, more preferably not more than 600, and particularly preferably 400 or less. By ensuring that the molecular weight is at least as large as the above lower limit, the crystallinity can be more easily controlled. Further, by ensuring that the molecular weight is not more than the above upper limit, a reduction in viscosity can be more easily achieved.

In order to achieve a low viscosity for the triisocyanate that represents the origin of the group represented by general formula (V) in the embodiment 1-3, the hydrocarbon groups among the plurality of $Y^1$ preferably have an aliphatic and/or aromatic group. Further, $R^{51}$ is preferably a hydrogen atom.

Furthermore, in order to improve the weather resistance in those cases where the polyisocyanate composition is used as a coating material composition curing agent, the hydrocarbon groups among the plurality of $Y^1$ preferably have an aliphatic group or an alicyclic group.

Further, it is preferable that the plurality of $Y^1$ are composed only of hydrocarbon groups.

In a separate consideration, in order to maintain heat resistance, it is preferable that at least one of the plurality of $Y^1$ has an ester group.

Further, in order to maintain hydrolysis resistance, it is preferable that at least one of the plurality of $Y^{31}$ has a hydrocarbon group or a hydrocarbon group containing an ether structure.

Examples of the triisocyanate that represents the origin of the group represented by general formula (V) in the embodiment 1-3 include 4-isocyanatomethyl-1,8-octamethylene diisocyanate (hereafter sometimes referred to as NTI, molecular weight: 251) disclosed in Japanese Examined Patent Application, Second Publication No. Sho 63-15264, 1,3,6-hexamethylene triisocyanate (hereafter sometimes referred to as HTI, molecular weight: 209) disclosed in Japanese Unexamined Patent Application, First Publication No. Sho 57-198760, bis(2-isocyanatoethyl) 2-isocyanatoglutarate (hereafter referred to as GTI, molecular weight: 311) disclosed in Japanese Examined Patent Application, Second Publication No. Hei 04-1033, and lysine triisocyanate (hereafter referred to as LTI, molecular weight: 267) disclosed in Japanese Unexamined Patent Application, First Publication No. Sho 53-135931.

Among these, from the viewpoint of further enhancing the reactivity of the isocyanate groups, NTI, GTI or LTI is preferred, NTI or LTI is more preferred, and LTI is particularly desirable.

The triisocyanate that represents the origin of the group represented by general formula (V) in the embodiment 1-3 can be obtained by isocyanation of an amine such as an amino acid derivative, an ether amine, or an alkyltriamine or the like. Examples of amino acid derivatives that may be used include 2,5-diaminovaleric acid, 2,6-diaminohexanoic acid, aspartic acid and glutamic acid. These amino acids are either diamino monocarboxylic acids or monoamino dicarboxylic acids, and therefore the carboxyl group(s) are esterified with an alkanolamine such as ethanolamine. Accordingly, the resulting triamine having an ester group can be converted to a triisocyanate containing an ester structure by phosgenation or the like.

Examples of the ether amines include the product "D403" manufactured by Mitsui Fine Chemicals, Inc., which is a polyoxyalkylene triamine. This product is a triamine, and can be converted to a triisocyanate containing an ether structure by phosgenation or the like of the amines.

Examples of the alkyltriamines include triisocyanatononane (4-aminomethyl-1,8-octanediamine). This compound is a triamine, and can be converted to a triisocyanate containing only hydrocarbon groups by phosgenation or the like of the amines.

Examples of the method used for producing the isocyanurate structure and/or the allophanate structure include methods that use an isocyanuration catalyst. There are no particular limitations on the isocyanuration catalyst, but in general, catalysts that have basicity are preferred, and examples include the following.

(1) Hydroxides of a tetraalkylammonium ion such as a tetramethylammonium, tetraethylammonium or tetrabutylammonium ion; and weak organic acid salts thereof such as acetates, octylates, myristates and benzoates.

(2) Hydroxides of a hydroxyalkylammonium ion such as a trimethylhydroxyethylammonium, trimethylhydroxypropylammonium, triethylhydroxyethylammonium or triethylhydroxypropylammonium ion; and weak organic acid salts thereof such as acetates, octylates, myristates and benzoates.

(3) Metal salts such as tin, zinc and lead salts of alkylcarboxylic acids such as acetic acid, caproic acid, octylic acid and myristic acid.

(4) Metal alcoholates such as sodium and potassium alcoholates.

(5) Aminosilyl group-containing compounds such as hexamethylenedisilazane.

(6) Mannich bases.

(7) Combinations of a tertiary amine and an epoxy compound.

(8) Phosphorus-based compounds such as tributylphosphine.

Among the above, from the viewpoint of suppressing the production of unwanted by-products, weak organic acid salts of quaternary ammonium ions are preferred, and weak organic acid salts of tetraalkylammonium ions are more preferred.

From the viewpoint of catalyst miscibility, these catalysts may be diluted with a solvent or added together with a solvent. Examples of the solvent include 1-methylpyrrolidone, ethylene glycol monoethyl ether, diethylene glycol monoethyl ether, ethylene glycol monomethyl ether, diethylene glycol monomethyl ether, dipropylene glycol monomethyl ether, propylene glycol monomethyl ether, methyl ethyl ketone, acetone, methyl isobutyl ketone, propylene glycol monomethyl ether acetate, ethanol, methanol, isopropanol, 1-propanol, iso-butanol, 1-butanol, 2-ethylhexanol, cyclohexanol, ethylene glycol, diethylene glycol, triethylene glycol, propylene glycol, dipropylene glycol, 1,4-butanediol, 1,3-butanediol, ethyl acetate, isopropyl acetate, butyl acetate, toluene, xylene, pentane, iso-pentane, hexane, iso-hexane, cyclohexane, solvent naphtha, mineral spirit and dimethylformamide, and mixtures of two or more of these solvents may also be used.

The reaction temperature for the isocyanuration is preferably at least 50° C. but not more than 120° C., and is more preferably at least 60° C. but not more than 90° C. Ensuring that the reaction temperature is not higher than the above upper limit tends to enable coloration and the like to be effectively suppressed, and is consequently preferred.

Although there are no particular limitations, the isocyanuration reaction may be stopped, for example, by adding phosphoric acid or an acidic compound such as an acidic phosphate ester.

Examples of the method used for producing the uretdione structure include methods that use an uretdionization catalyst, and methods that involve formation via a high-temperature treatment at 100° C. or higher without using an uretdionization catalyst.

There are no particular limitations on the uretdionization catalyst, and the uretdione structure can be generally be produced in the presence of a conventional uretdionization catalyst such as a trialkylphosphine such as triethylphosphine, dibutylethylphosphine, tri-n-propylphosphine, triamylphosphine or tribenzylmethylphosphine, or pyridine or the like, with the production conducted at a reaction temperature of 0 to 90° C., either in the absence of a solvent or in the presence of an inert solvent, including aromatic-based solvents such as toluene or xylene, ketone-based solvents such as methyl ethyl ketone or methyl isobutyl ketone, ester-based solvents such as ethyl acetate or butyl acetate, and glycol ether ester-based solvents such as propylene glycol methyl ether acetate or ethyl-3-ethoxypropionate.

From the viewpoint of catalyst miscibility, these catalysts may be diluted with a solvent or added together with a solvent. Examples of the solvent include 1-methylpyrrolidone, ethylene glycol monoethyl ether, diethylene glycol monoethyl ether, ethylene glycol monomethyl ether, diethylene glycol monomethyl ether, dipropylene glycol monomethyl ether, propylene glycol monomethyl ether, methyl ethyl ketone, acetone, methyl isobutyl ketone, propylene glycol monomethyl ether acetate, ethanol, methanol, isopropanol, 1-propanol, iso-butanol, 1-butanol, 2-ethylhexanol, cyclohexanol, ethylene glycol, diethylene glycol, triethylene glycol, propylene glycol, dipropylene glycol, 1,4-butanediol, 1,3-butanediol, ethyl acetate, isopropyl acetate, butyl acetate, toluene, xylene, pentane, iso-pentane, hexane, iso-hexane, cyclohexane, solvent naphtha, mineral spirit and dimethylformamide, and mixtures of two or more of these solvents may also be used.

In the present invention, a co-catalyst may also be optionally used in addition to the catalyst described above. The co-catalyst is preferably an organic compound that contains at least one hydrogen atom bonded to an oxygen, nitrogen or sulfur atom, and has a pKa of at least 6. Examples of preferred co-catalysts include low-molecular weight monohydric or polyhydric alcohols having a molecular weight of 32 to 200, and mixtures of such alcohols. Specific examples include methanol, ethanol, n-propanol, isopropanol, n-butanol, n-hexanol, 2-ethyl-1-hexanol, 1-methoxy-2-propanol, ethylene glycol, propylene glycol, isomeric butanediol, hexanediol, octanediol, diethylene glycol, dipropylene glycol, 2-ethyl-1,3-hexanediol, 2,2,4-trimethylpentanediol, glycerol, trimethylolpropane, and mixtures of these alcohols and/or other alcohols.

The reaction temperature when performing the uretdionization using the uretdionization catalyst is preferably at least 0° C. but not more than 100° C., and is more preferably at least 25° C. but not more than 90° C. Ensuring that the reaction temperature is not higher than the above upper limit tends to enable coloration and the like to be effectively suppressed, and is consequently preferred.

Although there are no particular limitations, the uretdionization reaction may be stopped when a desired reaction rate is achieved, for example, by adding a solution of phosphoric acid, methyl para-toluenesulfonate or sulfur or the like to inactivate the uretdionization catalyst.

The uretdione structure can also be formed without using an uretdionization catalyst, by performing a high-temperature treatment. The treatment temperature when forming the uretdione structure is preferably at least 100° C. but not more than 200° C., more preferably at least 120° C. but not more than 180° C., and even more preferably at least 150° C. but not more than 170° C. Ensuring that the reaction temperature is not higher than the above upper limit tends to enable coloration and the like to be effectively suppressed, whereas ensuring a temperature at least as high as the above lower limit tends to enable more efficient formation, and is consequently preferred.

When the uretdione structure is produced using this method, the heat treatment may be performed in the presence of the triisocyanate monomer following synthesis of the other structures, or the uretdione structure may be synthesized first by performing the heat treatment with only the triisocyanate monomer, and the other structures then synthesized thereafter. This enables the uretdione-containing polyisocyanate composition to be synthesized in a single batch.

The conversion ratio for the polyisocyanate composition of the embodiment 1-3 is preferably at least 1% but not more than 100%, more preferably at least 10% but not more than 80%, and particularly preferably at least 20% but not more than 70%. At values at least as high as the above lower limit, the curability tends to be superior, whereas at values not higher than the above upper limit, the viscosity tends to be low and the workability excellent.

The above conversion ratio was determined by using a gel permeation chromatograph (GPC) to measure the polystyrene-equivalent number average molecular weight, and then determining the surface area proportion of the peaks having a larger number average molecular weight than the unreacted triisocyanate.

The amount of polyisocyanate compounds in the polyisocyanate composition of embodiment 1-3 is preferably at least 1% by mass but not more than 100% by mass, more preferably at least 10% by mass but not more than 90% by mass, and even more preferably at least 20% by mass but not more than 80% by mass. Provided the amount is at least as large as the above lower limit, the weather resistance tends to be superior, whereas provided the amount is not higher than the above upper limit, the viscosity tends to be low and the workability excellent.

Furthermore, the polyisocyanate composition of the embodiment 1-3 may also include, in addition to the polyisocyanate compound represented by general formula (I) or general formula (II), a compound having an allophanate structure, a compound having an iminooxadiazinedione structure, a compound having a urethane structure, or a compound having a biuret structure.

Allophanate structures, iminooxadiazinedione structures, urethane structures and biuret structures are represented by the following formulas (VIII), (XI), (IX) and (X) respectively. Among these, from the viewpoint of the permeation into a lower layer in a multilayer coating film, a compound having an iminooxadiazinedione structure is preferred, whereas from the viewpoint of the compatibility with silicates, a compound having an allophanate structure is preferred.

[Chemical formula 65]

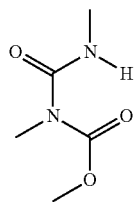

(VIII)

[Chemical formula 66]

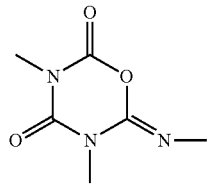

(XI)

[Chemical formula 67]

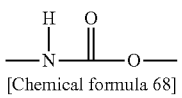
(IX)

[Chemical formula 68]

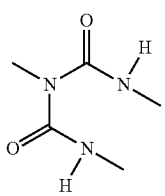
(X)

The polyisocyanate composition of the embodiment 1-3 preferably also contains a triisocyanate represented by general formula (V)-1 shown below.

General Formula (V)-1

[Chemical formula 69]

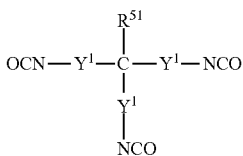
(V)-1

[In general formula (V)-1, each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms.]

[$R^{51}$, $Y^1$]

Descriptions relating to $R^{51}$ and $Y^1$ in general formula (V)-1 are the same as the descriptions relating to $R^{51}$ and $Y^1$ in the general formula (V) described above.

In the embodiment 1-3, at least one of the plurality of $Y^1$ preferably contains an ester structure and/or an ether structure.

Further, $R^{51}$ and $Y^1$ in general formula (V)-1 may be the same as, or different from, $R^{51}$ and $Y^1$ in the above general formula (V).

In those cases where conventional polyisocyanate compositions are produced from volatile diisocyanates such as 1,6-hexamethylene diisocyanate, 1,5-pentane diisocyanate, toluene diisocyanate or isophorone diisocyanate, it is necessary to use distillation or the like to remove unreacted starting material diisocyanate down to a level of less than 2% by weight, and preferably less than about 1% by weight, relative to the weight of the polyisocyanate composition of the final product. However, when producing the polyisocyanate composition of the embodiment 1-3, because the triisocyanate used in the embodiment 1-3 has three NCO groups, the triisocyanate does not reduce the crosslinking ability of the polyisocyanate composition of the embodiment 1-3 with polyols, and therefore need not necessarily be removed.

In those cases where unreacted triisocyanate is removed, a thin film distillation method or solvent extraction method or the like may be used to separate the triisocyanate from the polyisocyanate composition.

Although there are no particular limitations on the viscosity at 25° C. of the polyisocyanate composition of the embodiment 1-3, the viscosity is preferably at least 5 mPa·s but not more than 3,000 mPa·s, more preferably at least 10 mPa·s but not more than 1,800 mPa·s, and even more preferably at least 15 mPa·s but not more than 250 mPa·s. At viscosity values at least as large as the above lower limit, the curability tends to be excellent, whereas at values not more than the above upper limit, the workability tends to be superior. The viscosity can be measured using an E-type viscometer (manufactured by Tokimec Inc.).

Embodiment 1-4

A polyisocyanate composition of an embodiment 1-4 of the present invention contains a polyisocyanate compound represented by general formula (II).

[Chemical formula 70]

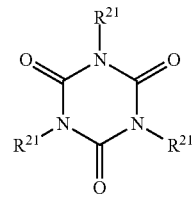
(II)

[In general formula (II), $R^{21}$ represents an organic group, and at least one of the plurality of $R^{21}$ is a group represented by general formula (V) or a group represented by general formula (VI). The plurality of $R^{21}$ may be the same or different.]

[Chemical formula 71]

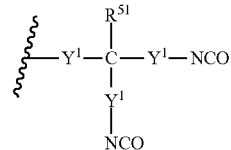
(V)

[In general formula (V), each of the plurality of $Y^1$ independently represents a single bond or divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

[Chemical formula 72]

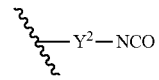
(VI)

[In general formula (VI), $Y^2$ represents a divalent hydrocarbon group of 1 to 20 carbon atoms containing an ester structure. The wavy line indicates a bonding site.]

The general formula (II), the general formula (V) and the general formula (VI) are described below.

General Formula (II)

[Chemical formula 73]

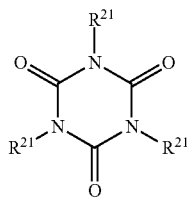

(II)

Polyisocyanate compounds represented by general formula (II) have an isocyanurate structure. An isocyanurate structure is a polyisocyanate formed from three molecules of an isocyanate monomer.

[$R^{21}$]

In general formula (II), $R^{21}$ represents an organic group. At least one of the plurality of $R^{21}$ is a group represented by the general formula (V) described below or a group represented by the general formula (VI) described below. The plurality of $R^{21}$ may be the same or different.

In the embodiment 1-4, of the three $R^{21}$ groups, at least one represents a group represented by general formula (V) described below or a group represented by general formula (VI) described below, and it is preferable that two of $R^{21}$ are groups represented by general formula (V) or general formula (VI), and more preferable that all three $R^{21}$ are groups represented by general formula (V) or general formula (VI).

Of the $R^{21}$ groups, examples of the groups other than the groups represented by the above general formula (V) or the above general formula (VI) include residues in which an isocyanate group has been removed from tetramethylene diisocyanate (TMDI), pentamethylene diisocyanate (PDI), hexamethylene diisocyanate (HDI), 2,2,4-trimethylhexane-1,6-diisocyanate, 2-methylpentane-1,5-diisocyanate (MPDI), 1,3-bis(isocyanatomethyl)-cyclohexane (1,3-H6-XDI), 3(4)-isocyanatomethyl-1-methyl-cyclohexyl isocyanate (IMCI), isophorone diisocyanate (IPDI), bis(isocyanatomethyl)-norbornane (NBDI), 1,3-bis(isocyanatomethyl)-benzene, 1,3-bis(2-isocyanatopropyl-2)benzene, or 4,4'-dicyclohexylmethane diisocyanate (H12MDI).

General Formula (V)

[Chemical formula 74]

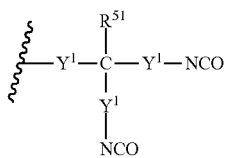

(V)

[$Y^1$]

In general formula (V), each of the plurality of $Y^1$ independently represents a single bond or a divalent hydrocarbon group of 1 to 20 carbon atoms that may contain an ester structure [—C(=O)—O—] and/or an ether structure (—O—). The plurality of $Y^1$ may be the same or different. However, at least one of the plurality of $Y^1$ contains an ester structure.

Examples of the divalent hydrocarbon group of 1 to 20 carbon atoms that may contain an ester structure and/or an ether structure include groups represented by —$(CH_2)_{n1}$—X—$(CH_2)_{n2}$— (wherein each of n1 and n2 independently represents an integer of 0 to 10, provided that n1 and n2 are not both 0, and the value of n1 or n2 on the side that is bonded to NCO is preferably 1 or greater. X represents an ester group or an ether group).

When it is desirable to increase the reaction rate, X is preferably an ester group.

Further, n1 and n2 are preferably from 0 to 4, and more preferably from 0 to 2. Examples of preferred combinations of n1 and n2 include a combination in which n1=0 and n2=2, and a combination in which n1=2 and n2=2.

[$R^{51}$]

$R^{51}$ represents a hydrogen atom or a monovalent hydrocarbon group of 1 to 12 carbon atoms. There are no particular limitations on the hydrocarbon group for $R^{51}$, and examples include alkyl groups, alkenyl groups and alkynyl groups. $R^{51}$ is preferably a hydrogen atom.

The molecular weight of the triisocyanate that represents the origin of the group represented by general formula (V) in the embodiment 1-4 is preferably at least 139 but not more than 1,000.

The lower limit for the molecular weight is preferably at least 150, more preferably at least 180, and particularly preferably 200 or greater. Further, the upper limit for the molecular weight is preferably not more than 800, more preferably not more than 600, and particularly preferably 400 or less. By ensuring that the molecular weight is at least as large as the above lower limit, the crystallinity can be more easily controlled. Further, by ensuring that the molecular weight is not more than the above upper limit, a reduction in viscosity can be more easily achieved.

In order to achieve a low viscosity for the triisocyanate that represents the origin of the group represented by general formula (V) in the embodiment 1-4, the hydrocarbon groups among the plurality of $Y^1$ preferably have an aliphatic and/or aromatic group. Further, $R^{51}$ is preferably a hydrogen atom.

Furthermore, in order to improve the weather resistance in those cases where the polyisocyanate composition is used as a coating material composition curing agent, the hydrocarbon groups for $Y^1$ preferably have an aliphatic group or an alicyclic group.

In a separate consideration, in order to maintain heat resistance, it is preferable that at least one of the plurality of $Y^1$ has an ester group.

Examples of the triisocyanate that represents the origin of the group represented by general formula (V) in the embodiment 1-4 include bis(2-isocyanatoethyl) 2-isocyanatoglutarate (hereafter referred to as GTI, molecular weight: 311) disclosed in Japanese Examined Patent Application, Second Publication No. Hei 04-1033, and lysine triisocyanate (hereafter referred to as LTI, molecular weight: 267) disclosed in Japanese Unexamined Patent Application, First Publication No. Sho 53-135931.

Among these, from the viewpoint of further enhancing the reactivity of the isocyanate groups, LTI is particularly preferred.

Further, in order to maintain hydrolysis resistance, it is preferable that at least one of the plurality of $Y^1$ has a hydrocarbon group containing an ether structure.

General Formula (VI)

[Chemical formula 75]

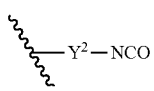
(VI)

[Y²]

In general formula (VI), Y² represents a divalent hydrocarbon group of 1 to 20 carbon atoms containing an ester structure.

In order to enhance the reactivity of the isocyanate groups when the polyisocyanate composition is used as a coating material composition curing agent, the diisocyanate that represents the origin of the group represented by general formula (VI) in the embodiment 1-4 has an ester structure.

Further, in order to achieve a low viscosity, the hydrocarbon group for Y² preferably has an aliphatic group or an aromatic group in the structure, whereas in order to maintain heat resistance, Y² preferably has a hydrocarbon group having an ester structure.

Examples of compounds that satisfy this classification include lysine diisocyanate (hereafter abbreviated as LDI).

The triisocyanate that represents the origin of the group represented by general formula (V) or the diisocyanate that represents the origin of the group represented by general formula (VI) in the embodiment 1-4 can be obtained by isocyanation of an amine such as an amino acid derivative or the like. Examples of amino acid derivatives that may be used include 2,5-diaminovaleric acid, 2,6-diaminohexanoic acid, aspartic acid and glutamic acid. These amino acids are either diamino monocarboxylic acids or monoamino dicarboxylic acids, and therefore by esterifying the carboxyl group(s) with an alkanolamine such as ethanolamine or by esterifying the carboxyl group(s) with methanol or the like, the number of amino groups can be controlled. The resulting amine having an ester group can be converted to a triisocyanate or diisocyanate containing an ester structure by phosgenation or the like.

Examples of the method used for forming the isocyanurate structure include methods that use a catalyst. There are no particular limitations on the isocyanuration catalyst, but in general, catalysts that have basicity are preferred, and examples include: (1) hydroxides of a tetraalkylammonium ion such as a tetramethylammonium, tetraethylammonium or tetrabutylammonium ion; and weak organic acid salts thereof such as acetates, octylates, myristates and benzoates, (2) hydroxides of a hydroxyalkylammonium ion such as a trimethylhydroxyethylammonium, trimethylhydroxypropylammonium, triethylhydroxyethylammonium or triethylhydroxypropylammonium ion; and weak organic acid salts thereof such as acetates, octylates, myristates and benzoates, (3) metal salts such as tin, zinc and lead salts of alkylcarboxylic acids such as acetic acid, caproic acid, octylic acid and myristic acid, (4) metal alcoholates such as sodium and potassium alcoholates, (5) aminosilyl group-containing compounds such as hexamethylenedisilazane, (6) Mannich bases, (7) combinations of a tertiary amine and an epoxy compound, and (8) phosphorus-based compounds such as tributylphosphine.

Among the above, from the viewpoint of suppressing the production of unwanted by-products, weak organic acid salts of quaternary ammonium ions are preferred, and weak organic acid salts of tetraalkylammonium ions are more preferred.

From the viewpoint of catalyst miscibility, these catalysts may be diluted with a solvent or added together with a solvent. Examples of the solvent include 1-methylpyrrolidone, ethylene glycol monoethyl ether, diethylene glycol monoethyl ether, ethylene glycol monomethyl ether, diethylene glycol monomethyl ether, dipropylene glycol monomethyl ether, propylene glycol monomethyl ether, methyl ethyl ketone, acetone, methyl isobutyl ketone, propylene glycol monomethyl ether acetate, ethanol, methanol, isopropanol, 1-propanol, iso-butanol, 1-butanol, 2-ethylhexanol, cyclohexanol, ethylene glycol, diethylene glycol, triethylene glycol, propylene glycol, dipropylene glycol, 1,4-butanediol, 1,3-butanediol, ethyl acetate, isopropyl acetate, butyl acetate, toluene, xylene, pentane, iso-pentane, hexane, iso-hexane, cyclohexane, solvent naphtha, mineral spirit and dimethylformamide, and mixtures of two or more of these solvents may also be used.

The reaction temperature for the isocyanuration is preferably at least 50° C. but not more than 120° C., and is more preferably at least 60° C. but not more than 90° C. Ensuring that the reaction temperature is not higher than the above upper limit tends to enable coloration and the like to be effectively suppressed, and is consequently preferred.

Although there are no particular limitations, the isocyanuration reaction may be stopped, for example, by adding phosphoric acid or an acidic compound such as an acidic phosphate ester.

The conversion ratio for the polyisocyanate composition of the embodiment 1-4 is preferably at least 1% but not more than 100%, more preferably at least 10% but not more than 80%, and particularly preferably at least 20% but not more than 70%. At values at least as high as the above lower limit, the curability tends to be superior, whereas at values not higher than the above upper limit, the viscosity tends to be low and the workability excellent.

The above conversion ratio was determined by using a gel permeation chromatograph (GPC) to measure the polystyrene-equivalent number average molecular weight, and then determining the surface area proportion of the peaks having a larger number average molecular weight than the unreacted triisocyanate.

The amount of polyisocyanate compound in the polyisocyanate composition of embodiment 1-4 is preferably at least 1% by mass but not more than 100% by mass, more preferably at least 10% by mass but not more than 90% by mass, and even more preferably at least 20% by mass but not more than 80% by mass. Provided the amount is at least as large as the above lower limit, the weather resistance tends to be superior, whereas provided the amount is not higher than the above upper limit, the viscosity tends to be low and the workability excellent.

Furthermore, the polyisocyanate composition of the embodiment 1-4 may also include, in addition to the polyisocyanate compound represented by the above general formula (II), a compound having a uretdione structure, a compound having an allophanate structure, a compound having an iminooxadiazinedione structure, a compound having a urethane structure, or a compound having a biuret structure.

Uretdione structures, allophanate structures, iminooxadiazinedione structures, urethane structures and biuret structures are represented by the following formulas (VII), (VIII), (XI), (IX) and (X) respectively. Among these, from the viewpoint of the permeation into a lower layer in a multilayer coating film, a compound having an allophanate structure, a compound having an uretdione structure or a compound having an iminooxadiazinedione structure is preferred.

[Chemical formula 76]

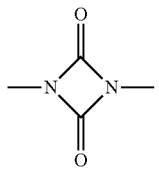

(VII)

[Chemical formula 77]

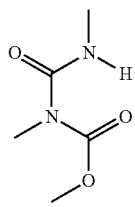

(VIII)

[Chemical formula 78]

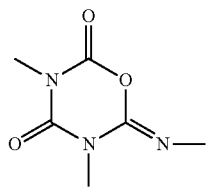

(XI)

[Chemical formula 79]

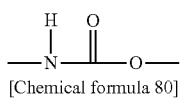

(IX)

[Chemical formula 80]

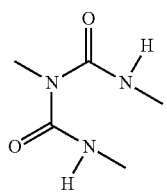

(X)

The polyisocyanate composition of the embodiment 1-4 has a ratio ($V^h/V^p$) of the reaction rate ($V^p$) between the polyisocyanate composition and a monohydric alcohol relative to the reaction rate ($V^h$) between a polyisocyanate derived from hexamethylene diisocyanate and a monohydric alcohol that is preferably at least 5 but less than 13.

From the viewpoint of the drying properties of the coating film, the ratio ($V^h/V^p$) of the reaction rate ($V^p$) between the polyisocyanate composition of the embodiment 1-4 and a monohydric alcohol relative to the reaction rate ($V^h$) between a polyisocyanate derived from hexamethylene diisocyanate and a monohydric alcohol is preferably greater than 1, and more preferably 5 or greater. Further, from the viewpoint of the usable time of the coating material, the ratio ($V^h/V^p$) is preferably less than 15, and more preferably less than 13.

The above upper limit and lower limit may be combined as desired, but in the embodiment 1-4, a ratio of at least 5 but less than 13 is preferred.

The reaction rate between the polyisocyanate composition and a monohydric alcohol can be measured, for example, using the method described below.

The polyisocyanate composition and the monohydric alcohol are mixed so that the molar ratio between the NCO groups of the polyisocyanate composition and the OH groups of the monohydric alcohol is 1, the mixture is stirred under heating at 70° C., the residual ratio of NCO groups is measured, and the rate of decrease in the NCO groups is deemed the reaction rate. The residual ratio of NCO groups can be determined, for example, by measuring the NCO content.

Examples of the monohydric alcohol include 1-butanol, iso-butanol, and 2-ethylhexanol. Further, examples of the polyisocyanate derived from hexamethylene diisocyanate include the products DURANATE TKA-100 and DURANATE TPA-100 manufactured by Asahi Kasei Corporation.

The polyisocyanate composition of the embodiment 1-4 can not only be produced by the above method (1) involving isocyanuration of the above triisocyanate, but may also be produced by a method (2) that involves reacting 0.4 mol to 0.6 mol of the NCO groups of the above triisocyanate with a thermally dissociable agent, subsequently performing isocyanuration, and then performing heating or the like to dissociate the thermally dissociable agent. Examples of the thermally dissociable agent include methyl ethyl ketoxime. In the above production method (2), a polyisocyanate composition having a fast reaction rate between the polyisocyanate composition and a monohydric alcohol can be obtained, which is desirable from the viewpoint of the drying properties of the coating material.

The polyisocyanate composition of the embodiment 1-4 preferably also contains a triisocyanate represented by general formula (V)-1 shown below or a diisocyanate represented by general formula (VI)-1 shown below.

General Formula (V)-1

[Chemical formula 81]

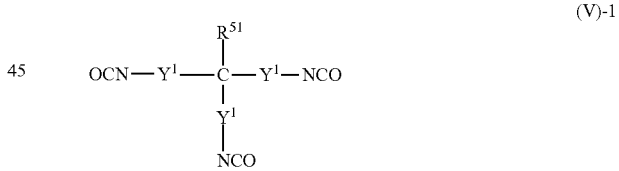

(V)-1

[In general formula (V)-1, each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms.]

[$R^{51}$, $Y^1$]

Descriptions relating to $R^{51}$ and $Y^1$ in general formula (V)-1 are the same as the descriptions relating to $R^{51}$ and $Y^1$ in the general formula (V) described above.

However, in general formula (V)-1, $Y^1$ may or may not contain an ester structure and/or an ether structure. In the embodiment 1-4, it is preferable that at least one of the plurality of $Y^1$ contains an ester structure and/or ether structure.

General Formula (VI)-1

[Chemical formula 82]

$$OCN-Y^2-NCO \quad (VI)\text{-}1$$

[In general formula (VI)-1, $Y^2$ represents a divalent hydrocarbon group of 1 to 20 carbon atoms that may contain an ester structure.]

[$Y^2$]

Descriptions relating to $Y^2$ in general formula (VI)-1 are the same as the descriptions relating to $Y^2$ in the general formula (VI) described above.

However, in general formula (VI)-1, $Y^2$ may or may not contain an ester structure and/or an ether structure. In the embodiment 1-4, it is preferable that $Y^2$ contains an ester structure and/or ether structure.

In those cases where, for example, conventional polyisocyanate compositions are produced from volatile diisocyanates such as 1,6-hexamethylene diisocyanate, 1,5-pentane diisocyanate, toluene diisocyanate or isophorone diisocyanate, it is necessary to use distillation or the like to remove unreacted starting material diisocyanate down to a level of less than 2% by weight, and preferably less than about 1% by weight, relative to the weight of the polyisocyanate composition of the final product. However, when producing the polyisocyanate composition of the embodiment 1-4, because the triisocyanate used in the embodiment 1-4 has three NCO groups, the triisocyanate does not reduce the crosslinking ability of the polyisocyanate composition of the embodiment 1-4 with polyols, and therefore need not necessarily be removed.

In those cases where unreacted triisocyanate is removed, a thin film distillation method or solvent extraction method or the like may be used to separate the triisocyanate from the polyisocyanate composition.

Although there are no particular limitations on the viscosity at 25° C. of the polyisocyanate composition of the embodiment 1-4, the viscosity is preferably at least 5 mPa·s but not more than 2,000 mPa·s, and more preferably at least 10 mPa·s but not more than 1,800 mPa·s. At viscosity values at least as large as the above lower limit, the curability tends to be excellent, whereas at values not more than the above upper limit, the workability tends to be superior. The viscosity can be measured using an E-type viscometer (manufactured by Tokimec Inc.).

Embodiment 1-5

A polyisocyanate composition of an embodiment 1-5 contains a polyisocyanate compound having an allophanate structure represented by general formula (III), wherein the number of nitrogen elements contained in allophanate structures (excluding the nitrogen elements contained in $R^{31}$ and $R^{32}$), relative to the total number of nitrogen elements contained in isocyanate groups, allophanate structures, isocyanurate structures, uretdione structures, iminooxadiazinedione structures, urethane structures and biuret structures contained within the polyisocyanate composition, is at least 1.5% but not more than 60%.

[Chemical formula 83]

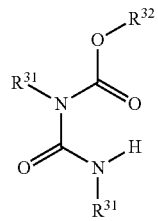

[In general formula (III), $R^{32}$ represents an organic group, and at least one of the plurality of $R^{32}$ is a group represented by general formula (V). $R^{32}$ represents a residue in which one hydroxyl group has been removed from a monohydric or polyhydric alcohol.]

[Chemical formula 84]

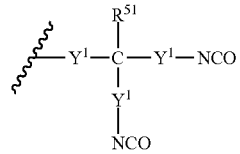

[In general formula (V), each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

The general formula (III) and the general formula (V) are described below.

General Formula (III)

[Chemical formula 85]

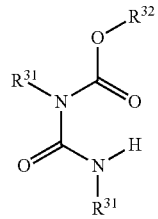

Compounds represented by general formula (III) are polyisocyanate compounds having an allophanate structure composed of two molecules of an isocyanate and a monohydric or polyhydric alcohol.

[$R^{31}$]

In general formula (III), at least one $R^{31}$ is a group represented by the above general formula (V).

[$R^{32}$]

In general formula (III), $R^{32}$ is a residue in which one hydroxyl group has been removed from a monohydric or polyhydric alcohol.

Specific examples of monohydric or polyhydric alcohols that may be used in the embodiment 1-5 include the following. Examples of monohydric alcohols include saturated aliphatic alcohols such as methanol, ethanol, 1-propanol, 2-propanol, 1-butanol, 2-butanol, iso-butanol, 1-pentanol, 2-pentanol, isoamyl alcohol, 1-hexanol, 2-hexanol, 1-heptanol, 1-octanol, 2-ethyl-1-hexanol, 3,3,5-trimethyl-1-hexanol, tridecanol and pentadecanol, saturated cyclic aliphatic alcohols such as cyclohexanol and cyclopentanol, and unsaturated aliphatic alcohols such as allyl alcohol, butenol, hexenol and 2-hydroxyethyl acrylate.

Examples of dihydric alcohols include ethylene glycol, propanediol, 1,4-butanediol, 1,3-butanediol, 1,6-hexanediol, 1,4-hexanediol, 1,6-cyclohexanediol, 1,4-cyclohexanediol, methylpentanediol, cyclohexanedimethanol, methylpentanediol, neopentyl glycol, diethylene glycol, triethylene glycol, polyethylene glycol, polypropylene glycol and hydrogenated bisphenol A.

Examples of trihydric alcohols include glycerol, 2-methyl-2-hydroxymethyl-1,3-propanediol, 2,4-hydroxy-3-hydroxymethylpentane, and 1,2,6-hexanetriol.

Examples of tetrahydric alcohols include sugar alcohols, including tetritols such as erythrose, pentitols such as xylitol, and hexitols such as sorbitol. Examples of phenols include phenol, benzylphenol, o-cresol, p-cresol, catechol, ethylphenol, octylphenol, xylenol, naphthol, nonylphenol or bisphenol A.

In addition, a compound such as a polyester polyol, polypropylene glycol, polyethylene glycol or polytetraethylene glycol that has been produced using one of the above alcohols as a raw material may also be used as the monohydric or polyhydric alcohol of the present invention. Furthermore, an acrylic polyol having hydroxyl groups may also be used as the monohydric or polyhydric alcohol.

From the viewpoint of improving the drying properties of the coating material, the alcohol used in the embodiment 1-5 is preferably a dihydric or polyhydric alcohol. In other words, in general formula (III), $R^{32}$ is preferably a residue in which a hydroxyl group has been removed from a dihydric or polyhydric alcohol.

From the viewpoint of enhancing the solubility in low-polarity organic solvents, use of an alcohol having 3 to 50 carbon atoms is preferred. In other words, in general formula (III), $R^{32}$ is preferably a residue in which a hydroxyl group has been removed from an alcohol having 3 to 50 carbon atoms. Further, from the viewpoint of improving the dispersion stability upon dispersion in water, the use of a monohydric alcohol having 1 to 10 carbon atoms is preferred.

General Formula (V)

[Chemical formula 86]

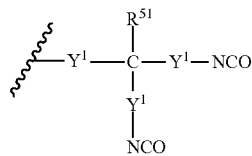

(V)

[$Y^1$]

In general formula (V), each of the plurality of $Y^1$ independently represents a single bond or a divalent hydrocarbon group of 1 to 20 carbon atoms that may contain an ester structure [—C(═O)—O—] and/or an ether structure (—O—). The plurality of $Y^1$ may be the same or different.

Examples of the divalent hydrocarbon group of 1 to 20 carbon atoms that may contain an ester structure and/or an ether structure include groups represented by —(CH$_2$)$_{n1}$—X—(CH$_2$)$_{n2}$— (wherein each of n1 and n2 independently represents an integer of 0 to 10, provided that n1 and n2 are not both 0, and the value of n1 or n2 on the side that is bonded to NCO is preferably 1 or greater. X represents an ester group or an ether group).

When it is desirable to increase the reaction rate, X is preferably an ester group.

Further, n1 and n2 are preferably from 0 to 4, and more preferably from 0 to 2. Examples of preferred combinations of n1 and n2 include a combination in which n1=0 and n2=2, and a combination in which n1=2 and n2=2.

[$R^{51}$]

$R^{51}$ represents a hydrogen atom or a monovalent hydrocarbon group of 1 to 12 carbon atoms. There are no particular limitations on the hydrocarbon group for $R^{51}$, and examples include alkyl groups, alkenyl groups and alkynyl groups. $R^{51}$ is preferably a hydrogen atom.

The molecular weight of the triisocyanate that represents the origin of the group represented by general formula (V) in the embodiment 1-5 is preferably at least 139 but not more than 1,000.

The lower limit for the molecular weight is preferably at least 139, more preferably at least 150, even more preferably at least 180, and particularly preferably 200 or greater. Further, the upper limit for the molecular weight is preferably not more than 1,000, more preferably not more than 800, even more preferably not more than 600, and particularly preferably 400 or less. By ensuring that the molecular weight is at least as large as the above lower limit, the crystallinity can be more easily controlled. Further, by ensuring that the molecular weight is not more than the above upper limit, a reduction in viscosity can be more easily achieved.

In order to achieve a low viscosity for the triisocyanate that represents the origin of the group represented by general formula (V) in the embodiment 1-5, the hydrocarbon groups among the plurality of $Y^1$ preferably have an aliphatic or aromatic group. Further, $R^{51}$ is preferably a hydrogen atom.

Furthermore, in order to improve the weather resistance in those cases where the polyisocyanate composition is used as a coating material composition curing agent, the hydrocarbon groups among the plurality of $Y^1$ preferably have an aliphatic group or an alicyclic group.

Further, it is preferable that the plurality of $Y^1$ are composed only of hydrocarbon groups.

In a separate consideration, in order to maintain heat resistance, it is preferable that at least one of the plurality of $Y^1$ has an ester group.

Further, in order to maintain hydrolysis resistance, it is preferable that at least one of the plurality of $Y^{31}$ has a hydrocarbon group or a hydrocarbon group containing an ether structure.

Examples of the triisocyanate that represents the origin of the group represented by general formula (V) in the embodiment 1-5 include 4-isocyanatomethyl-1,8-octamethylene diisocyanate (hereafter referred to as NTI, molecular weight: 251) disclosed in Japanese Examined Patent Application, Second Publication No. Sho 63-15264, 1,3,6-hexamethylene triisocyanate (hereafter referred to as HTI, molecular weight: 209) disclosed in Japanese Unexamined Patent Application, First Publication No. Sho 57-198760, bis(2-isocyanatoethyl) 2-isocyanatoglutarate (hereafter referred to as GTI, molecular weight: 311) disclosed in Japanese Examined Patent Application, Second Publication No. Hei 04-1033, and lysine triisocyanate (hereafter referred to as LTI, molecular weight: 267) disclosed in Japanese Unexamined Patent Application, First Publication No. Sho 53-135931.

Among these, from the viewpoint of further enhancing the reactivity of the isocyanate groups, NTI, GTI or LTI is preferred, NTI or LTI is more preferred, and LTI is particularly desirable.

Further, in order to maintain hydrolysis resistance, at least one of the plurality of $Y^1$ preferably has a hydrocarbon group containing an ether structure.

The triisocyanate that represents the origin of the group represented by general formula (V) in the embodiment 1-5 can be obtained by isocyanation of an amine such as an amino acid derivative, an ether amine, or an alkyltriamine or the like. Examples of amino acid derivatives that may be used include 2,5-diaminovaleric acid, 2,6-diaminohexanoic acid, aspartic acid and glutamic acid. These amino acids are either diamino monocarboxylic acids or monoamino dicarboxylic acids, and therefore the carboxyl group(s) may be either esterified with an alkanolamine such as ethanolamine, or esterified with methanol or the like, to control the number of amino groups. The thus obtained amine having an ester group can be converted to a triisocyanate or diisocyanate containing an ester structure by phosgenation or the like.

Examples of the ether amines include the product "D403" manufactured by Mitsui Fine Chemicals, Inc., which is a polyoxyalkylene triamine. This product is a triamine, and can be converted to a triisocyanate containing an ether structure by phosgenation or the like of the amines.

Examples of the alkyltriamines include triisocyanatononane (4-aminomethyl-1,8-octanediamine). This compound is a triamine, and can be converted to a triisocyanate containing only hydrocarbon groups by phosgenation or the like of the amines.

In the embodiment 1-5, the number of nitrogen elements contained in allophanate structures (excluding the nitrogen elements contained in $R^{31}$ and $R^{32}$) relative to the total number of nitrogen elements derived from isocyanate groups in the polyisocyanate composition is at least 1.5% but not more than 60%. By ensuring that the number of nitrogen elements contained in allophanate structures falls within this range, the solubility in low-polarity organic solvents and the dispersibility in water can be improved, the weather resistance and water resistance of the obtained coating film can be increased to superior levels, and quick drying properties can be achieved.

The above range for the nitrogen elements is preferably at least 3% but not more than 50%, more preferably at least 5% but not more than 40%, and particularly preferably at least 7% but not more than 30%.

Here, the nitrogen elements derived from isocyanate groups refer to isocyanate groups, as well as sites produced as a result of a reaction between isocyanate groups such as allophanate structures, isocyanurate structures, uretdione structures, iminooxadiazinedione structures, urethane structures and biuret structures, and sites produced as a result of a reaction between an isocyanate group and another functional group. The ratio between the number of nitrogen elements derived from isocyanate groups and the number of nitrogen elements contained within allophanate structures can be determined by $^{13}$C-NMR. Further, in those cases where the composition contains two or more types of different isocyanates, the ratio may be determined, as appropriate, by H-NMR measurements, or by separating the components using a liquid chromatogram or the like and then performing NMR measurements of each component.

Because the peak positions vary depending on the apparatus used, the measurement conditions and the substances used, it is preferable that a standard substance or the like is used to determine the peak positions, with the proportion of each of the structures then calculated accordingly.

Examples of the method used for producing an allophanate structure include methods that involve heating of isocyanate molecules, and methods that use a catalyst. There are no particular limitations on the allophanation catalyst, and at least one compound selected from the group consisting of zirconyl compounds represented by formula (XV) shown below and zirconium alcoholates represented by formula (XIX) shown below may be used. In order to obtain a polyisocyanate composition having a higher production rate of allophanate structures, the use of a zirconyl compound is preferred.

A zirconyl compound is a compound having a structure represented by formula (XV) shown below.

[Chemical formula 87]

(XV)

[In general formula (XV), each of $R^{61}$ and $R^{62}$ independently represents an alkylcarboniumoxy group, alkoxy group, alkyl group, halogen atom, or inorganic acid hydrogen residue.

Here, an alkylcarboniumoxy group means a residue in which a hydrogen has been removed from an organic carboxylic acid. In other words, in those cases where $R^{61}$ and $R^{62}$ in the above formula (XV) are both alkylcarboniumoxy groups, the zirconium compound is a zirconium carboxylic acid salt. Examples of the organic carboxylic acid include aliphatic carboxylic acids, alicyclic carboxylic acids, unsaturated carboxylic acids, hydroxyl group-containing carboxylic acids and halogenated alkyl carboxylic acids, as well as polybasic carboxylic acids such as dicarboxylic acids and tricarboxylic acids.

Specific examples of the zirconyl compound include zirconyl halides, zirconyl carboxylates, dialkyl zirconyl compounds, zirconyl dialcoholates, zirconyl carbonates, zirconyl sulfates, and zirconyl nitrates. Among these, zirconyl carboxylates are preferred. Specific examples of zirconyl carboxylates include saturated aliphatic carboxylates such as zirconyl formate, zirconyl acetate, zirconyl propionate, zirconyl butanoate, zirconyl pentanoate, zirconyl hexanoate, zirconyl caproate, zirconyl octanoate, zirconyl 2-ethylhexanoate, zirconyl decanoate, zirconyl dodecanoate, zirconyl tetradecanoate and zirconyl pentadecanoate, saturated cyclic carboxylates such as zirconyl cyclohexanecarboxylate and zirconyl cyclopentanecarboxylate, mixtures of the above carboxylates such as zirconyl naphthenate, unsaturated aliphatic carboxylates such as zirconyl oleate, zirconyl linolate and zirconyl linoleate, and aromatic carboxylates such as zirconyl benzoate, zirconyl toluate and zirconyl diphenylacetate. Among these, zirconyl naphthenate, zirconyl 2-ethylhexanoate and zirconyl acetate are particularly preferred in terms of industrial availability.

A zirconium alcoholate is a compound having a structure represented by formula (XIX) shown below.

[Chemical formula 88]

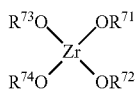

(XIX)

[In general formula (IV), each of $R^{71}$, $R^{72}$, $R^{73}$ and $R^{74}$ independently represents an alkyl group, alkenyl group or alkynyl group.]

Examples of the raw material alcohol for the zirconium alcoholate include saturated aliphatic alcohols such as methanol, ethanol, 1-propanol, 2-propanol, 1-butanol, 2-butanol, iso-butanol, 1-pentanol, 2-pentanol, isoamyl alcohol, 1-hexanol, 2-hexanol, 1-heptanol, 1-octanol, 2-ethyl-1-hexanol, 3,3,5-trimethyl-1-hexanol, tridecanol and pentadecanol, saturated cyclic aliphatic alcohols such as cyclohexanol, and unsaturated aliphatic alcohols such as ethanal, propanal, butanal and 2-hydroxyethyl acrylate. Further, diols such as ethylene glycol, propanediol, 1,4-butanediol, 1,3-butanediol, 1,6-hexanediol, 1,4-hexanediol, 1,6-cyclohexanediol and 1,4-cyclohexanediol, triols such as glycerol, and polyhydric alcohols may also be used. Among the various zirconium alcoholates, tetra-n-propoxy zirconium, tetraisopropoxy zirconium, tetra-n-propoxy zirconium and tetra-n-butoxy zirconium are preferred in terms of industrial availability.

The allophanation reaction temperature is preferably at least 60° C. but not more than 160° C., more preferably at least 70° C. but not more than 160° C., and particularly preferably at least 80° C. but not more than 160° C. By ensuring the temperature is not higher than the above upper limit, any side reactions are minimal, and coloration of the obtained polyisocyanate composition tends to be more effectively suppressed, both of which are preferable.

Although there are no particular limitations, the allophanation reaction may be stopped, for example, by adding an acidic compound such as a phosphorus acid acidic compound, sulfuric acid, nitric acid, chloroacetic acid, benzoyl chloride or a sulfonate ester, or an ion exchange resin, a chelating agent, or a chelating resin or the like.

Examples of the phosphorus acid acidic compound include phosphoric acid, pyrophosphoric acid, metaphosphoric acid, polyphosphoric acid, or alkyl esters of these acids, and in the present invention, it is preferable that at least one of these phosphorus acid acidic compounds is used as a reaction terminator.

The amount of polyisocyanate compound in the polyisocyanate composition of embodiment 1-5 is preferably from 5 to 100% by mass, more preferably from 10 to 90% by mass, and even more preferably from 20 to 70% by mass. Provided the amount is at least 5% by mass, the quick drying properties tend to be superior, and by ensuring the amount is not higher than 100%, the viscosity can be lowered. In those cases where workability is very important, the amount of polyisocyanate is preferably reduced.

Furthermore, the polyisocyanate composition of the embodiment 1-5 may also include, in addition to the polyisocyanate compound represented by the above general formula (III), a compound having a uretdione structure, a compound having an allophanate structure, a compound having an iminooxadiazinedione structure, a compound having a urethane structure, or a compound having a biuret structure.

Uretdione structures, allophanate structures, iminooxadiazinedione structures, urethane structures and biuret structures are represented by the following formulas (VII), (VIII), (XI), (IX) and (X) respectively. Among these, from the viewpoint of the permeation into a lower layer in a multi-layer coating film, a compound having an allophanate structure, a compound having an uretdione structure or a compound having an iminooxadiazinedione structure is preferred.

[Chemical formula 89]

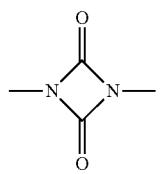

(VII)

[Chemical formula 90]

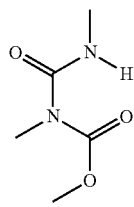

(VIII)

[Chemical formula 91]

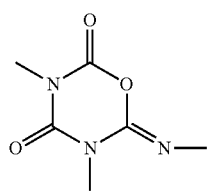

(XI)

[Chemical formula 92]

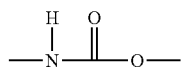

(IX)

[Chemical formula 93]

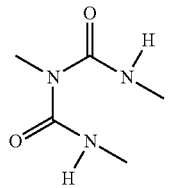

(X)

The polyisocyanate composition of the embodiment 1-5 may also contain a triisocyanate represented by general formula (V)-1 shown below.

General Formula (V)-1

[Chemical formula 94]

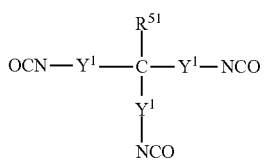

(V)-1

[In general formula (V)-1, each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms.]

In those cases where conventional polyisocyanate compositions are produced from volatile diisocyanates such as 1,6-hexamethylene diisocyanate, 1,5-pentane diisocyanate, toluene diisocyanate or isophorone diisocyanate, it is necessary to use distillation or the like to remove unreacted starting material diisocyanate down to a level of less than 2% by weight, and preferably less than about 1% by weight, relative to the weight of the polyisocyanate composition of the final product. However, when producing the polyisocyanate composition of the embodiment 1-5, because the triisocyanate used in the embodiment 1-5 has three NCO groups, the triisocyanate does not reduce the crosslinking ability of the polyisocyanate composition of the embodiment 1-5 with polyols, and therefore need not necessarily be removed.

In those cases where unreacted triisocyanate is removed, a thin film distillation method or solvent extraction method or the like may be used to separate the triisocyanate from the polyisocyanate composition.

Although there are no particular limitations on the viscosity at 25° C. of the polyisocyanate composition of the embodiment 1-5, the viscosity is preferably at least 10 mPa·s but not more than 300 mPa·s, more preferably at least 10 mPa·s but not more than 200 mPa·s, and particularly preferably at least 10 mPa·s but not more than 100 mPa·s. At viscosity values at least as large as the above lower limit, the curability tends to be excellent, whereas at values not more than the above upper limit, the workability tends to be superior. The viscosity can be measured using an E-type viscometer (manufactured by Tokimec Inc.).

The polyisocyanate composition of the embodiment 1-5 may be used in a mixture with different isocyanate compounds, and polyisocyanates obtained from these isocyanate compounds.

Examples of these different isocyanate compounds include di- or poly-isocyanates having aliphatic, alicyclic or aromatic isocyanate groups. Examples of diisocyanates include tetramethylene diisocyanate (TMDI), pentamethylene diisocyanate (PDI), hexamethylene diisocyanate (HDI), 2,2,4-trimethylhexane-1,6-diisocyanate, 2-methylpentane-1,5-diisocyanate (MPDI), 1,3-bis(isocyanatomethyl)-cyclohexane (1,3-H6-XDI), 3(4)-isocyanatomethyl-1-methyl-cyclohexyl isocyanate (IMCI), isophorone diisocyanate (IPDI), bis(isocyanatomethyl)-norbornane (NBDI), 1,3-bis(isocyanatomethyl)-benzene, 1,3-bis(2-isocyanatopropyl-2)benzene, 4,4'-dicyclohexylmethane diisocyanate (H12MDI), and LDI. Among these, in terms of the weather resistance and ease of availability, HDI and IPDI are preferred. These diisocyanates may be used individually, or a combination of two or more compounds may be used.

The above polyisocyanates include compounds having an isocyanurate structure, uretdione structure, allophanate structure, iminooxadiazinedione structure, urethane structure or biuret structure.

Embodiment 1-6

A polyisocyanate composition of an embodiment 1-6 of the present invention contains a polyisocyanate compound represented by general formula (III).

[Chemical formula 95]

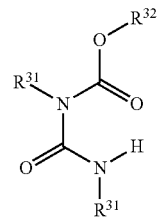

(III)

[In general formula (III), each of the plurality of $R^{31}$ independently represents an organic group, and at least one of the plurality of $R^{31}$ is a group represented by general formula (V) or a group represented by general formula (VI). The plurality of $R^{31}$ may be the same or different. $R^{32}$ represents a residue in which one hydroxyl group has been removed from a monohydric or polyhydric alcohol.]

[Chemical formula 96]

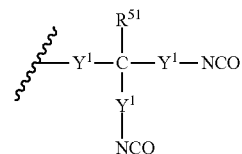

(V)

[In general formula (V), each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms. The wavy line indicates a bonding site.]

[Chemical formula 97]

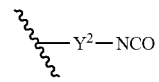

(VI)

[In general formula (VI), $Y^2$ represents a divalent hydrocarbon group of 1 to 20 carbon atoms containing an ester structure. The wavy line indicates a bonding site.]

The general formula (III), the general formula (V) and the general formula (VI) are described below.

General Formula (III)

[Chemical formula 98]

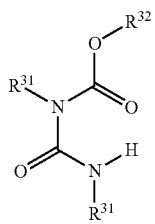
(III)

Polyisocyanate compounds represented by general formula (III) have an allophanate structure. An allophanate structure is a bonded structure composed of two isocyanate groups and one hydroxyl group.

[$R^{31}$]

In general formula (III), each of the plurality of $R^{31}$ independently represents an organic group. The plurality of $R^{31}$ may be the same or different.

In the embodiment 1-6, at least one of the two $R^{31}$ groups is a group represented by the above general formula (V) or a group represented by the above general formula (VI), and it is preferable that both of the two $R^{31}$ groups are groups represented by either general formula (V) or general formula (VI).

Of the $R^{31}$ groups, examples of the groups other than the groups represented by the above general formula (V) or the above general formula (VI) include residues in which one isocyanate group has been removed from tetramethylene diisocyanate (TMDI), pentamethylene diisocyanate (PDI), hexamethylene diisocyanate (HDI), 2,2,4-trimethylhexane-1,6-diisocyanate, 2-methylpentane-1,5-diisocyanate (MPDI), 1,3-bis(isocyanatomethyl)-cyclohexane (1,3-H6-XDI), 3(4)-isocyanatomethyl-1-methyl-cyclohexyl isocyanate (IMCI), isophorone diisocyanate (IPDI), bis(isocyanatomethyl)-norbornane (NBDI), 1,3-bis (isocyanatomethyl)-benzene, 1,3-bis(2-isocyanatopropyl-2) benzene, or 4,4'-dicyclohexylmethane diisocyanate (H12MDI).

[$R^{32}$]

In general formula (III), $R^{32}$ is a residue in which one hydroxyl group has been removed from a monohydric or polyhydric alcohol.

More specific examples of $R^{32}$ include residues in which one hydroxyl group has been removed from a monohydric alcohol, including saturated aliphatic alcohols such as methanol, ethanol, 1-propanol, 2-propanol, 1-butanol, 2-butanol, iso-butanol, 1-pentanol, 2-pentanol, isoamyl alcohol, 1-hexanol, 2-hexanol, 1-heptanol, 1-octanol, 2-ethyl-1-hexanol, 3,3,5-trimethyl-1-hexanol, tridecanol and pentadecanol, saturated cyclic aliphatic alcohols such as cyclohexanol and cyclopentanol, and unsaturated aliphatic alcohols such as allyl alcohol, butenol, hexenol and 2-hydroxyethyl acrylate.

Further examples include residues in which one hydroxyl group has been removed from a dihydric alcohol such as ethylene glycol, propanediol, 1,4-butanediol, 1,3-butanediol, 1,6-hexanediol, 1,4-hexanediol, 1,6-cyclohexanediol, 1,4-cyclohexanediol, methylpentanediol, cyclohexanedimethanol, methylpentanediol, neopentyl glycol, diethylene glycol, triethylene glycol, polyethylene glycol, polypropylene glycol and hydrogenated bisphenol A.

Further examples include residues in which one hydroxyl group has been removed from a trihydric alcohol such as glycerol, 2-methyl-2-hydroxymethyl-1,3-propanediol, 2,4-hydroxy-3-hydroxymethylpentane, and 1,2,6-hexanetriol.

Further examples include residues in which one hydroxyl group has been removed from a tetrahydric alcohol such as a sugar alcohol, including tetritols such as erythrose, pentitols such as xylitol, and hexitols such as sorbitol.

Further examples include residues in which one hydroxyl group has been removed from a phenol such as phenol, benzylphenol, o-cresol, p-cresol, catechol, ethylphenol, octylphenol, xylenol, naphthol, nonylphenol or bisphenol A.

Further examples include residues in which one hydroxyl group has been removed from an alcohol such as a polyester polyol, polypropylene glycol, polyethylene glycol or polytetraethylene glycol that has been produced using one of the above alcohols as a raw material.

A residue in which one hydroxyl group has been removed from an acrylic polyol having hydroxyl groups is also possible.

General Formula (V)

[Chemical formula 99]

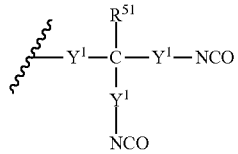
(V)

[$Y^1$]

In general formula (V), each of the plurality of $Y^1$ independently represents a single bond or a divalent hydrocarbon group of 1 to 20 carbon atoms that may contain an ester structure [—C(=O)—O—] and/or an ether structure (—O—). The plurality of $Y^1$ may be the same or different. However, at least one of the plurality of $Y^1$ contains an ester structure.

Examples of the divalent hydrocarbon group of 1 to 20 carbon atoms that may contain an ester structure and/or an ether structure include groups represented by —(CH$_2$)$_{n1}$—X—(CH$_2$)$_{n2}$— (wherein each of n1 and n2 independently represents an integer of 0 to 10, provided that n1 and n2 are not both 0, and the value of n1 or n2 on the side that is bonded to NCO is preferably 1 or greater. X represents an ester group or an ether group).

When it is desirable to increase the reaction rate, X is preferably an ester group. Further, n1 and n2 are preferably from 0 to 4, and more preferably from 0 to 2. Examples of preferred combinations of n1 and n2 include a combination in which n1=0 and n2=2, and a combination in which n1=2 and n2=2.

[$R^{51}$]

$R^{51}$ represents a hydrogen atom or a monovalent hydrocarbon group of 1 to 12 carbon atoms. There are no particular limitations on the hydrocarbon group for $R^{51}$, and examples include alkyl groups, alkenyl groups and alkynyl groups. $R^{51}$ is preferably a hydrogen atom.

The molecular weight of the triisocyanate that represents the origin of the group represented by general formula (V) in the embodiment 1-6 is preferably at least 139 but not more than 1,000.

The lower limit for the molecular weight is preferably at least 139, more preferably at least 150, even more preferably at least 180, and particularly preferably 200 or greater. Further, the upper limit for the molecular weight is preferably not more than 1,000, more preferably not more than 800, even more preferably not more than 600, and particularly preferably 400 or less. By ensuring that the molecular weight is at least as large as the above lower limit, the crystallinity can be more easily controlled. Further, by ensuring that the molecular weight is not more than the above upper limit, a reduction in viscosity can be more easily achieved.

In order to achieve a low viscosity for the triisocyanate that represents the origin of the group represented by general formula (V) in the embodiment 1-6, the hydrocarbon groups among the plurality of $Y^1$ preferably have an aliphatic and/or aromatic group. Further, $R^{51}$ is preferably a hydrogen atom.

Furthermore, in order to improve the weather resistance in those cases where the polyisocyanate composition is used as a coating material composition curing agent, the hydrocarbon groups for the plurality of $Y^1$ preferably have an aliphatic group or an alicyclic group.

In a separate consideration, in order to maintain heat resistance, it is preferable that at least one of the plurality of $Y^1$ has an ester group.

Examples of the triisocyanate that represents the origin of the group represented by general formula (V) in the embodiment 1-6 include bis(2-isocyanatoethyl) 2-isocyanatoglutarate (hereafter referred to as GTI, molecular weight: 311) disclosed in Japanese Examined Patent Application, Second Publication No. Hei 04-1033, and lysine triisocyanate (hereafter referred to as LTI, molecular weight: 267) disclosed in Japanese Unexamined Patent Application, First Publication No. Sho 53-135931.

Among these, from the viewpoint of further enhancing the reactivity of the isocyanate groups, LTI is particularly preferred.

Further, in order to maintain hydrolysis resistance, it is preferable that at least one of the plurality of $Y^1$ has a hydrocarbon group containing an ether structure.

General Formula (VI)

[Chemical formula 100]

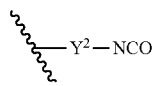
(VI)

$[Y^2]$

In general formula (VI), $Y^2$ represents a divalent hydrocarbon group of 1 to 20 carbon atoms containing an ester structure.

In order to enhance the reactivity of the isocyanate groups when the polyisocyanate composition is used as a coating material composition curing agent, the diisocyanate that represents the origin of the group represented by general formula (VI) in the embodiment 1-6 has an ester structure.

Further, in order to achieve a low viscosity, the hydrocarbon group for $Y^2$ preferably has an aliphatic group or an aromatic group in the structure, whereas in order to maintain heat resistance, $Y^2$ preferably has a hydrocarbon group having an ester structure.

Examples of compounds that satisfy this classification include lysine diisocyanate (hereafter abbreviated as LDI).

The triisocyanate that represents the origin of the group represented by general formula (V) or the diisocyanate that represents the origin of the group represented by general formula (VI) in the embodiment 1-6 can be obtained by isocyanation of an amine such as an amino acid derivative or the like. Examples of amino acid derivatives that may be used include 2,5-diaminovaleric acid, 2,6-diaminohexanoic acid, aspartic acid and glutamic acid. These amino acids are either diamino monocarboxylic acids or monoamino dicarboxylic acids, and therefore by esterifying the carboxyl group(s) with an alkanolamine such as ethanolamine or by esterifying the carboxyl group(s) with methanol or the like, the number of amino groups can be controlled. The resulting amine having an ester group can be converted to a triisocyanate or diisocyanate containing an ester structure by phosgenation or the like.

Examples of the method used for producing an allophanate structure include methods that use heating, and methods that use a catalyst. There are no particular limitations on the allophanation catalyst, and at least one compound selected from the group consisting of zirconyl compounds represented by general formula (XV) shown below and zirconium alcoholates represented by general formula (XIX) shown below may be used. In order to obtain a polyisocyanate composition having a higher production rate of allophanate structures, the use of a zirconyl compound is preferred.

A zirconyl compound is a compound having a structure represented by general formula (XV) shown below.

[Chemical formula 101]

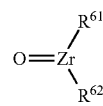
(XV)

[In general formula (XV), each of $R^{61}$ and $R^{62}$ independently represents an alkylcarboniumoxy group, alkoxy group, alkyl group, halogen atom, or inorganic acid hydrogen residue.

In this description, an "alkylcarboniumoxy group" means a residue in which a hydrogen has been removed from an organic carboxylic acid. In other words, in those cases where $R^{61}$ and $R^{62}$ in the above general formula (XV) are both alkylcarboniumoxy groups, the zirconium compound is a zirconium carboxylic acid salt.

Examples of the organic carboxylic acid include aliphatic carboxylic acids, alicyclic carboxylic acids, unsaturated carboxylic acids, hydroxyl group-containing carboxylic acids and halogenated alkyl carboxylic acids, as well as polybasic carboxylic acids such as dicarboxylic acids and tricarboxylic acids.

Specific examples of the zirconyl compound include zirconyl halides, zirconyl carboxylates, dialkyl zirconyl compounds, zirconyl dialcoholates, zirconyl carbonates, zirconyl sulfates, and zirconyl nitrates. Among these, zirconyl carboxylates are preferred. Specific examples of zirconyl carboxylates include saturated aliphatic carboxylates such as zirconyl formate, zirconyl acetate, zirconyl propionate, zirconyl butanoate, zirconyl pentanoate, zirconyl hexanoate, zirconyl caproate, zirconyl octanoate, zirconyl 2-ethylhexanoate, zirconyl decanoate, zirconyl dodecanoate, zirconyl tetradecanoate and zirconyl pentadecanoate, saturated cyclic carboxylates such as zirconyl cyclohexanecarboxylate and zirconyl cyclopentanecarboxylate, mixtures of the above carboxylates such as zirconyl naphthenate, unsaturated aliphatic carboxylates such as zirconyl oleate, zirconyl linolate and zirconyl linoleate, and aromatic carboxylates such as zirconyl benzoate, zirconyl toluate and zirconyl diphenylacetate. Among these, zirconyl naphthenate, zirconyl 2-ethylhexanoate and zirconyl acetate are particularly preferred as the zirconyl compound in terms of industrial availability.

A zirconium alcoholate is a compound having a structure represented by general formula (XIX) shown below.

[Chemical formula 102]

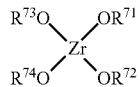

(XIX)

[In general formula (XIX), each of $R^{71}$, $R^{72}$, $R^{73}$ and $R^{74}$ independently represents an alkyl group, alkenyl group or alkynyl group.]

Examples of the raw material alcohol for the zirconium alcoholate include saturated aliphatic alcohols such as methanol, ethanol, 1-propanol, 2-propanol, 1-butanol, 2-butanol, iso-butanol, 1-pentanol, 2-pentanol, isoamyl alcohol, 1-hexanol, 2-hexanol, 1-heptanol, 1-octanol, 2-ethyl-1-hexanol, 3,3,5-trimethyl-1-hexanol, tridecanol and pentadecanol, saturated cyclic aliphatic alcohols such as cyclohexanol, and unsaturated aliphatic alcohols such as ethanal, propanal, butanal and 2-hydroxyethyl acrylate. Further, diols such as ethylene glycol, propanediol, 1,4-butanediol, 1,3-butanediol, 1,6-hexanediol, 1,4-hexanediol, 1,6-cyclohexanediol and 1,4-cyclohexanediol, triols such as glycerol, and polyhydric alcohols may also be used.

Among the various zirconium alcoholates, tetra-n-propoxy zirconium, tetraisopropoxy zirconium, tetra-n-propoxy zirconium and tetra-n-butoxy zirconium are preferred in terms of industrial availability.

The allophanation reaction temperature is preferably at least 60° C. but not more than 160° C., more preferably at least 70° C. but not more than 160° C., and particularly preferably at least 80° C. but not more than 160° C. By ensuring the temperature is not higher than the above upper limit, any side reactions are minimal, and coloration of the obtained polyisocyanate composition tends to be more effectively suppressed.

Although there are no particular limitations, the allophanation reaction may be stopped, for example, by adding an acidic compound such as a phosphorus acid acidic compound, sulfuric acid, nitric acid, chloroacetic acid, benzoyl chloride or a sulfonate ester, or an ion exchange resin, a chelating agent, or a chelating resin or the like.

Examples of the phosphorus acid acidic compound include phosphoric acid, pyrophosphoric acid, metaphosphoric acid, polyphosphoric acid, or alkyl esters of these acids, and in the embodiment 1-6, it is preferable that at least one of these phosphorus acid acidic compounds is used as a reaction terminator.

The conversion ratio for the polyisocyanate composition of the embodiment 1-6 is preferably at least 1% but not more than 100%, more preferably at least 10% but not more than 80%, and particularly preferably at least 20% but not more than 70%. At values at least as high as the above lower limit, the curability tends to be superior, whereas at values not higher than the above upper limit, the viscosity tends to be low and the workability excellent.

The above conversion ratio was determined by using a gel permeation chromatograph (hereafter referred to as a GPC) to measure the polystyrene-equivalent number average molecular weight, and then determining the surface area proportion of the peaks having a larger number average molecular weight than the unreacted triisocyanate.

The amount of polyisocyanate compound in the polyisocyanate composition of embodiment 1-6 is preferably at least 1% by mass but not more than 100% by mass, more preferably at least 10% by mass but not more than 90% by mass, and even more preferably at least 20% by mass but not more than 80% by mass. Provided the amount is at least as large as the above lower limit, the drying properties tend to be superior, whereas provided the amount is not higher than the above upper limit, the viscosity tends to be low and the workability excellent.

Furthermore, the polyisocyanate composition of the embodiment 1-6 may also include, in addition to the polyisocyanate compound represented by the above general formula (III), a compound having an isocyanurate structure, a compound having a uretdione structure, a compound having an iminooxadiazinedione structure, a compound having a urethane structure, or a compound having a biuret structure.

Isocyanurate structures, uretdione structures, iminooxadiazinedione structures, urethane structures and biuret structures are represented by the following formulas (XII), (VII), (XI), (IX) and (X) respectively. Among these, from the viewpoint of the coating film hardness, a compound having an isocyanurate structure, a compound having an uretdione structure or a compound having an iminooxadiazinedione structure is preferred.

[Chemical formula 103]

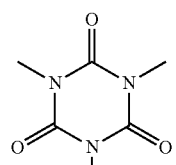

(XII)

[Chemical formula 104]

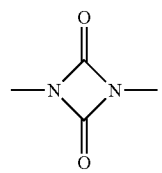

(VII)

[Chemical formula 105]

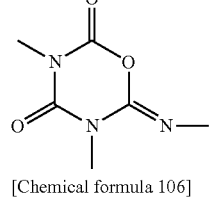

(XI)

[Chemical formula 106]

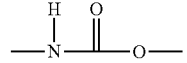

(IX)

-continued

[Chemical formula 107]

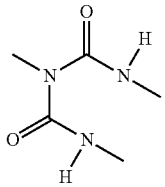
(X)

When the molar ratios of allophanate structures, uretdione structures, iminooxadiazinedione structures, isocyanurate structures, urethane structures and biuret structures within the polyisocyanate compounds contained in the polyisocyanate composition of the embodiment 1-6 are termed a, b, c, d, e and f respectively, the molar ratio of allophanate structures (a/(a+b+c+d+e+f)) is preferably at least 0.02 but not more than 0.95.

From the viewpoint of the solubility in low-polarity organic solvents, the lower limit for this ratio is preferably at least 0.02, more preferably at least 0.05, and particularly preferably 0.10 or greater. Further, from the viewpoint of the drying properties, the upper limit for the above ratio is preferably not more than 0.95, and is more preferably 0.90 or less.

The polyisocyanate composition of the embodiment 1-6 has a ratio ($V^h/V^p$) of the reaction rate ($V^p$) between the polyisocyanate composition and a monohydric alcohol relative to the reaction rate ($V^h$) between a polyisocyanate derived from hexamethylene diisocyanate and a monohydric alcohol that is preferably at least 5 but less than 13.

From the viewpoint of the drying properties of the coating film, the ratio ($V^h/V^p$) of the reaction rate ($V^p$) between the polyisocyanate composition of the embodiment 1-6 and a monohydric alcohol relative to the reaction rate ($V^h$) between a polyisocyanate derived from hexamethylene diisocyanate and a monohydric alcohol is preferably greater than 1, and more preferably 5 or greater. Further, from the viewpoint of the usable time of the coating material, the ratio ($V^h/V^p$) is preferably less than 15, and more preferably less than 13.

The above upper limit and lower limit may be combined as desired, but in the embodiment 1-6, a ratio of at least 5 but less than 13 is preferred.

The reaction rate between the polyisocyanate composition and a monohydric alcohol can be measured, for example, using the method described below.

The polyisocyanate composition and the monohydric alcohol are mixed so that the molar ratio between the NCO groups of the polyisocyanate composition and the OH groups of the monohydric alcohol is 1, the mixture is stirred under heating at 70° C., the residual ratio of NCO groups is measured, and the rate of decrease in the NCO groups is deemed the reaction rate. The residual ratio of NCO groups can be determined, for example, by measuring the NCO content.

Examples of the monohydric alcohol include 1-butanol, iso-butanol, and 2-ethylhexanol. Further, examples of the polyisocyanate derived from hexamethylene diisocyanate include the products DURANATE TKA-100 and DURANATE TPA-100 manufactured by Asahi Kasei Corporation.

The polyisocyanate composition of the embodiment 1-6 can not only be produced by the above method (1) involving isocyanuration of the above triisocyanate, but may also be produced by a method (2) that involves reacting 0.4 mol to 0.6 mol of the NCO groups of the above triisocyanate with a thermally dissociable agent, subsequently performing isocyanuration, and then performing heating or the like to dissociate the thermally dissociable agent. Examples of the thermally dissociable agent include methyl ethyl ketoxime. In the above production method (2), a polyisocyanate composition having a fast reaction rate between the polyisocyanate composition and a monohydric alcohol can be obtained, which is desirable from the viewpoint of the drying properties of the coating material.

The polyisocyanate composition of the embodiment 1-6 preferably also contains a triisocyanate represented by general formula (V)-1 shown below or a diisocyanate represented by general formula (VI)-1 shown below.

General Formula (V)-1

[Chemical formula 108]

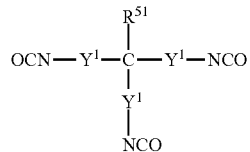
(V)-1

[In general formula (V)-1, each of the plurality of $Y^1$ independently represents a single bond or a divalent hydrocarbon group of 1 to 20 carbon atoms that may contain an ester structure and/or an ether structure. The plurality of $Y^1$ may be the same or different. $R^{51}$ represents a hydrogen atom or a monovalent hydrocarbon group of 1 to 12 carbon atoms.]

[$R^{51}$, $Y^1$]

Descriptions relating to $R^{51}$ and $Y^1$ in general formula (V)-1 are the same as the descriptions relating to $R^{51}$ and $Y^1$ in the general formula (V) described above.

However, in general formula (V)-1, $Y^1$ may or may not contain an ester structure and/or an ether structure. In the embodiment 1-6, it is preferable that at least one of the plurality of $Y^{21}$ contains an ester structure and/or ether structure.

Further, $R^{51}$ and $Y^1$ in general formula (V)-1 may be the same as, or different from, $R^{51}$ and $Y^1$ in the above general formula (V).

General Formula (VI)-1

[Chemical formula 109]

OCN—Y²—NCO         (VI)-1

[In general formula (VI)-1, $Y^2$ represents a divalent hydrocarbon group of 1 to 20 carbon atoms that may contain an ester structure.]

[$Y^2$]

Descriptions relating to $Y^2$ in general formula (VI)-1 are the same as the descriptions relating to $Y^2$ in the general formula (VI) described above.

However, in general formula (VI)-1, $Y^2$ may or may not contain an ester structure and/or an ether structure. In the embodiment 1-6, it is preferable that $Y^2$ contains an ester structure and/or ether structure.

Further, $Y^2$ in general formula (VI)-1 may be the same as, or different from, $Y^2$ in the above general formula (VI).

In those cases where, for example, conventional polyisocyanate compositions are produced from volatile diisocyanates such as 1,6-hexamethylene diisocyanate, 1,5-pentane diisocyanate, toluene diisocyanate or isophorone diisocyanate, it is necessary to use distillation or the like to remove unreacted starting material diisocyanate down to a level of less than 2% by weight, and preferably less than about 1% by weight, relative to the weight of the polyisocyanate composition of the final product. However, when producing the polyisocyanate composition of the embodiment 1-6, because the triisocyanate used in the embodiment 1-6 has three NCO groups, the triisocyanate does not reduce the crosslinking ability of the polyisocyanate composition of the embodiment 1-6 with polyols, and therefore need not necessarily be removed.

In those cases where unreacted triisocyanate is removed, a thin film distillation method or solvent extraction method or the like may be used to separate the triisocyanate from the polyisocyanate composition.

Although there are no particular limitations on the viscosity at 25° C. of the polyisocyanate composition of the embodiment 1-6, the viscosity is preferably at least 10 mPa·s but not more than 1,000 mPa·s, more preferably at least 10 mPa·s but not more than 500 mPa·s, and particularly preferably at least 10 mPa·s but not more than 90 mPa·s. At viscosity values at least as large as the above lower limit, the curability tends to be excellent, whereas at values not more than the above upper limit, the workability tends to be superior. The viscosity can be measured using an E-type viscometer (manufactured by Tokimec Inc.).

<Blocked Polyisocyanate Composition>

The isocyanate groups of the polyisocyanate composition of the present invention may be protected with a blocking agent to form a blocked polyisocyanate composition. Examples of the blocking agent include alcohol-based, alkylphenol-based, phenol-based, active methylene-based, mercaptan-based, acid amide-based, acid imide-based, imidazole-based, urea-based, oxime-based, amino-based, imide-based, and pyrazole-based compounds. Examples of more specific blocking agents are listed below.

(1) Alcohol-based compounds: alcohols such as methanol, ethanol, 2-propanol, n-butanol, sec-butanol, 2-ethyl-1-hexanol, 2-methoxyethanol, 2-ethoxyethanol, and 2-butoxyethanol.

(2) Alkylphenol-based compounds: mono- and di-alkylphenols having an alkyl group of 4 or more carbon atoms as a substituent, including monoalkylphenols such as n-propylphenol, iso-propylphenol, n-butylphenol, sec-butylphenol, t-butylphenol, n-hexylphenol, 2-ethylhexylphenol, n-octylphenol and n-nonylphenol, and dialkylphenols such as di-n-propylphenol, diisopropylphenol, isopropylcresol, di-n-butylphenol, di-t-butylphenol, di-sec-butylphenol, di-n-octylphenol, di-2-ethylhexylphenol and di-n-nonylphenol.

(3) Phenol-based compounds: phenol, cresol, ethylphenol, styrenated phenol, and hydroxybenzoate esters and the like.

(4) Active methylene-based compounds: dimethyl malonate, diethyl malonate, methyl acetoacetate, ethyl acetoacetate, and acetylacetone and the like.

(5) Mercaptan-based compounds: butyl mercaptan and dodecyl mercaptan and the like.

(6) Acid amide-based compounds: acetanilide, acetamide, ε-caprolactam, δ-valerolactam, and γ-butyrolactam and the like.

(7) Acid imide-based compounds: succinimide and maleimide and the like.

(8) Imidazole-based compounds: imidazole and 2-methylimidazole and the like.

(9) Urea-based compounds: urea, thiourea, ethylene urea and the like.

(10) Oxime-based compounds: formaldoxime, acetaldoxime, acetoxime, methyl ethyl ketoxime, and cyclohexanone oxime and the like.

(11) Amine-based compounds: diphenylamine, aniline, carbazole, di-n-propylamine, diisopropylamine, and isopropylethylamine and the like.

(12) Imine-based compounds: ethyleneimine and polyethyleneimine and the like.

(13) Bisulfites: sodium bisulfite and the like.

(14) Pyrazole-based compounds: pyrazole, 3-methylpyrazole, and 3,5-dimethylpyrazole and the like.

(15) Triazole-based compounds: 3,5-dimethyl-1,2,4-triazole and the like.

The blocking reaction between the polyisocyanate composition and the blocking agent may be performed regardless of whether or not a solvent is present. When a solvent is used, a solvent that is inert relative to isocyanate groups must be used. During the blocking reaction, a catalyst such as an organometal salt of tin, zinc, or lead or the like, a tertiary amine-based compound, or an alcoholate of an alkali metal such as sodium may be used. The reaction is generally conducted at a temperature of at least −20° C. but not more than 150° C., and preferably a temperature of at least 30° C. but not more than 100° C. At temperatures at least as high as the above lower limit, the reaction rate tends to be sufficiently fast, whereas at temperatures not higher than the above upper limit, side reactions tend not to occur.

Among the various blocking agents mentioned above, from the viewpoints of the ease of availability of the blocking agent, the viscosity of the produced blocked polyisocyanate composition, and the reaction temperature and reaction time, at least one blocking agent selected from the group consisting of oxime-based compounds, acid amide-based compounds, amine-based compounds, active methylene-based compounds and pyrazole-based compounds is preferred, methyl ethyl ketoxime, ε-caprolactam, diethyl malonate, ethyl acetoacetate, diisopropylamine or 3,5-dimethylpyrazole is more preferred, methyl ethyl ketoxime, diisopropylamine or 3,5-dimethylpyrazole is even more preferred, and 3,5-dimethylpyrazole is particularly preferred from the viewpoint of achieving a combination of low-temperature curability and polyol compatibility. A single thermally dissociable blocking agent may be used alone, or a combination of two or more such blocking agents may be used.

<Hydrophilic Polyisocyanate Composition>

The isocyanate groups of the polyisocyanate composition of the present invention may be reacted with a compound containing an active hydrogen atom and a hydrophilic group (a hydrophilic group-containing compound) to form a hydrophilic polyisocyanate composition having added hydrophilic groups.

There are no particular limitations on the types of hydrophilic group-containing compounds that may be reacted with the isocyanate groups, and examples include compounds containing nonionic, cationic or anionic hydrophilic groups.

There are no particular limitations on compounds that introduce a nonionic hydrophilic group, and examples include compounds in which ethylene oxide has been added to the hydroxyl group of an alcohol such as methanol, ethanol, butanol, ethylene glycol or diethylene glycol. These compounds have an active hydrogen that reacts with an isocyanate group. Among these compounds, monoalcohols which enable the water dispersibility of the hydrophilic polyisocyanate composition to be increased even when only a small amount of the hydrophilic compound is used are preferred. The number of added ethylene oxide moieties is preferably at least 4 but not more than 30, and is more preferably at least 4 but not more than 20. By ensuring that the number of added ethylene oxide moieties is at least 4, satisfactory hydrophilicity tends to be more easily ensured. Further, by ensuring that the number of added ethylene oxide moieties is not more than 30, precipitation tends to be less likely to occur when the hydrophilic polyisocyanate composition is stored at low temperature.

Examples of methods for introducing a cationic hydrophilic group include methods that use a compound having both a cationic group and a functional group that has a hydrogen capable of reacting with an isocyanate group, and methods in which a functional group such as a glycidyl group or the like is first added to the isocyanate group, and the introduced functional group is then reacted with a specific compound such as a sulfide or a phosphine. Among these, a method that uses a compound having both a cationic group and a functional group that has a hydrogen capable of reacting with an isocyanate group is simpler.

There are no particular limitations on the above functional group having a hydrogen capable of reacting with an isocyanate group, and examples include a hydroxyl group and a thiol group. There are also no particular limitations on the compound having both a cationic group and this functional group that has a hydrogen capable of reacting with an isocyanate group, and specific examples include dimethylethanolamine, diethylethanolamine, diethanolamine, methyldiethanolamine, N,N-dimethylaminohexanol, N,N-dimethylaminoethoxyethanol, N,N-dimethylaminoethoxyethoxyethanol, N,N,N'-trimethylaminoethylethanolamine, and N-methyl-N-(dimethylaminopropyl)aminoethanol. Further, a tertiary amino group (cationic hydrophilic group) that has been introduced into the aqueous blocked polyisocyanate composition may be quaternized using dimethyl sulfate or diethyl sulfate or the like.

Among the various options, a tertiary amino group is preferred as the cationic hydrophilic group. In those cases where the hydrophilic polyisocyanate composition has tertiary amino groups, the compound such as an anionic compound used in the neutralization described below can be easily volatilized by heating, and as a result, the water resistance tends to be further improved.

The introduction of a cationic hydrophilic group may be performed in the presence of a solvent. In such cases, the solvent preferably contains no functional groups capable of reacting with an isocyanate group. There are no particular limitations on this solvent, and examples include ethyl acetate, propylene glycol monomethyl ether acetate and dipropylene glycol dimethyl ether.

The cationic hydrophilic group that has been introduced into the hydrophilic polyisocyanate composition is preferably neutralized with a compound having an anionic group.

There are no particular limitations on this anionic group, and examples include a carboxyl group, sulfonate group, phosphate group, halogen group, or sulfate group.

There are no particular limitations on the compound having a carboxyl group, and examples include formic acid, acetic acid, propionic acid, butyric acid and lactic acid.

Further, there are no particular limitations on the compound having a sulfonate group, and examples include ethanesulfonic acid and the like.

Furthermore, there are no particular limitations on the compound having a phosphate group, and examples include phosphoric acid and acidic phosphate esters and the like.

Furthermore, there are no particular limitations on the compound having a halogen group, and examples include hydrochloric acid and the like.

Further, there are no particular limitations on the compound having a sulfate group, and examples include sulfuric acid and the like.

Among these compounds, the compound having an anionic group is preferably a compound having one carboxyl group, and is more preferably acetic acid, propionic acid or butyric acid.

There are no particular limitations on the anionic hydrophilic group, and examples include a carboxylate group, sulfonate group, phosphate group, halogen group, or sulfate group. A blocked polyisocyanate having anionic hydrophilic groups can be obtained, for example, by reacting the isocyanate groups of the precursor polyisocyanate composition with the active hydrogen of a compound having both an anionic group and an active hydrogen capable of reacting with an isocyanate group.

There are no particular limitations on the compound having an active hydrogen and a carboxylate group, and examples include monohydroxycarboxylic acids such as 1-hydroxyacetic acid, 3-hydroxypropanoic acid, 12-hydroxy-9-octadecanoic acid, hydroxypivalic acid and lactic acid; and polyhydroxycarboxylic acids such as dimethylolacetic acid, 2,2-dimethylolbutyric acid, 2,2-dimethylolpentanoic acid, dihydroxysuccinic acid and dimethylolpropionic acid. Among these, the compound having an active hydrogen and a carboxylate group is preferably hydroxypivalic acid or dimethylolpropionic acid.

There are no particular limitations on the compound having an active hydrogen and a carboxylate group, and examples include isethionic acid and the like.

Although there are no particular limitations, the anionic hydrophilic groups introduced into the hydrophilic polyisocyanate composition can be neutralized, for example, using a basic amine-based compound.

There are no particular limitations on this amine-based compound, and examples include ammonia and water-soluble amino compounds.

There are no particular limitations on the water-soluble amino compounds, and examples include primary and secondary amines such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine and morpholine, and tertiary amines such as triethylamine and dimethylethanolamine.

The polyisocyanate composition of the present invention may be used in a mixture with different isocyanate compounds.

Examples of the isocyanate compounds of the present invention include diisocyanates or polyisocyanates having aliphatic, alicyclic or aromatic isocyanate groups. Specific examples of the diisocyanates include tetramethylene diisocyanate (TMDI), pentamethylene diisocyanate (PDI), hexamethylene diisocyanate (HDI), 2,2,4-trimethylhexane-1,6-diisocyanate, 2-methylpentane-1,5-diisocyanate (MPDI), 1,3-bis(isocyanatomethyl)-cyclohexane (1,3-H6-XDI), 3(4)-isocyanatomethyl-1-methyl-cyclohexyl isocyanate (IMCI), isophorone diisocyanate (IPDI), bis(isocyanatomethyl)-norbornane (NBDI), 1,3-bis(isocyanatomethyl)-benzene, 1,3-bis(2-isocyanatopropyl-2)benzene, 4,4'-dicyclohexylmethane diisocyanate (H12MDI) and lysine diisocyanate (LDI). Among these, in terms of weather resistance and industrial availability, HDI or IPDI is preferred. These diisocyanates may be used individually, or a combination of two or more compounds may be used.

The polyisocyanates mentioned above are compounds obtained by polymerizing the above diisocyanates using a catalyst or heat, and include compounds having an isocyanurate structure, uretdione structure, allophanate structure, iminooxadiazinedione structure, urethane structure, or biuret structure or the like within the molecule. Among such polyisocyanates, from the viewpoint of weather resistance, a compound having an isocyanurate structure is preferred.

<Other Compounds>

From the viewpoints of preventing coloration upon long-term storage and improving the long-term storage stability, the polyisocyanate composition of the present invention preferably contains at least one compound selected from the group consisting of unsaturated bond-containing compounds, inactive compounds, metal atoms, basic amino compounds and carbon dioxide in an amount of at least 1.0 ppm by mass but not more than $1.0 \times 10^4$ ppm by mass based on the total mass of the polyisocyanate compounds. The lower limit for the above range is more preferably at least 3.0 ppm by mass, even more preferably at least 5.0 ppm by mass, and still more preferably 10 ppm by mass or higher, whereas the upper limit for the range is more preferably not more than $5.0 \times 10^3$ ppm by mass, even more preferably not more than $3.0 \times 10^3$ ppm by mass, and still more preferably $1.0 \times 10^3$ ppm by mass or less.

The unsaturated bond-containing compound of the present invention is preferably a compound in which the unsaturated bond is a carbon-carbon unsaturated bond, a carbon-nitrogen unsaturated bond, or a carbon-oxygen unsaturated bond. From the viewpoint of compound stability, a compound in which the unsaturated bond is a double bond is preferred, and a carbon-carbon double bond (C=C) or a carbon-oxygen double bond (C=O) is more preferred. Further, the carbon atom that constitutes the compound is preferably bonded to 3 or more atoms.

Generally, carbon-carbon double bonds sometimes include the carbon-carbon double bonds that constitute an aromatic ring, but the unsaturated bond contained in the unsaturated bond-containing compound of the present invention excludes the carbon-carbon double bonds that constitute aromatic rings.

Examples of compounds having a carbon-oxygen double bond include carbonic acid derivatives. Specific examples of these carbonic acid derivatives include urea compounds, carbonate esters, N-unsubstituted carbamate esters, and N-substituted carbamate esters.

Inactive compounds of the present invention may be classified into the compounds A to G described below.

Hydrocarbon compounds are classified as either a compound A or a compound B, ether compounds and sulfide compounds are classified as compounds C to E described below, halogenated hydrocarbon compounds are classified as a compound F described below, and silicon-containing hydrocarbons, silicon-containing ether compounds and silicon-containing sulfide compounds are classified as a compound G described below. The compounds A to G described here contain no unsaturated bonds other than aromatic rings, and do not include the compounds having an unsaturated bond described above.

Compound A: an aliphatic hydrocarbon compound having a linear, branched or cyclic structure.

Compound B: an aromatic hydrocarbon compound that may be substituted with an aliphatic hydrocarbon group.

Compound C: a compound having an ether linkage or a sulfide linkage, and also having an aliphatic hydrocarbon group, wherein aliphatic hydrocarbons of the same type or different types are linked via the ether linkage or sulfide linkage.

Compound D: a compound having an ether linkage or a sulfide linkage, and also having an aromatic hydrocarbon group, wherein aromatic hydrocarbons of the same type or different types are linked via the ether linkage or sulfide linkage.

Compound E: a compound having an ether linkage or a sulfide linkage, and also having an aliphatic hydrocarbon group and an aromatic hydrocarbon group.

Compound F: a halogenated compound in which at least one hydrogen atom that constitutes part of an aliphatic hydrocarbon compound, or at least one hydrogen atom that constitutes part of an aromatic hydrocarbon compound, has been substituted with a halogen atom.

Compound G: A compound in which some or all of the carbon atoms of an aforementioned compound A to compound E have each been substituted with a silicon atom.

The metal atoms of the present invention may exist as metal ions or as simple metal atoms. The metal atoms may be of a single type of metal atom, or a combination of a plurality of types of metal atoms. Metal atoms that adopt a divalent to tetravalent atomic valency are preferred, and among such metals, one or a plurality of metals selected from among iron, cobalt, nickel, zinc, tin, copper and titanium is preferred.

The basic amino compound of the present invention is a derivative of ammonia, and is a compound in which one hydrogen atom of ammonia has been substituted with an alkyl group or aryl group (primary compound), a compound in which two hydrogen atoms have been substituted (secondary compound), or a compound in which all three hydrogen atoms have been substituted (tertiary compound). Basic amino compounds that can be used favorably in the present invention are typically secondary or tertiary amino compounds, and aliphatic amines, aromatic amines, heterocyclic amines and basic amino acids can be used favorably.

The carbon dioxide may be a normal-pressure polyisocyanate soluble fraction, or may be dissolved in the polyisocyanate in a pressurized state inside a pressurized container. If carbon dioxide that contains moisture is used, then this can sometimes cause hydrolysis of the polyisocyanate compounds, and therefore the moisture content contained in the carbon dioxide is preferably controlled as necessary.

From the viewpoint of preventing coloration, the halogen atom content of the polyisocyanate composition of the present invention is preferably not more than $1.0 \times 10^2$ ppm by mass. There are no particular limitations on the halogen atoms, but chlorine and/or bromine is preferred, and at least one type of ion and/or compound selected from among chloride ions, bromide ions, hydrolyzable chlorine and hydrolyzable bromine is more preferred. Examples of the hydrolyzable chlorine include carbamoyl chloride compounds obtained by adding hydrogen chloride to an isocyanate group, whereas examples of the hydrolyzable bromine include carbamoyl bromide compounds obtained by adding hydrogen bromide to an isocyanate group.

<Coating Material Composition>

The polyisocyanate composition of the present invention can also be used favorably as a coating material composition curing agent or the like. In other words, a coating material composition containing the polyisocyanate composition of the present invention can be formed. The resin component of such a coating material composition preferably contains a compound having two or more active hydrogens that exhibit reactivity with isocyanate groups within each molecule. Examples of compound having two or more active hydrogens within the molecule include polyols, polyamines and polythiols and the like. Of these, polyols are preferred. Specific examples of these polyols include polyester polyols, polyether polyols, acrylic polyols, polyolefin polyols and fluorine polyols.

The coating material composition using the polyisocyanate composition of the present invention can be used with a solvent base or a water base.

In the case of a solvent-based coating material composition, the resin containing the compound having two or more active hydrogens within the molecule, or a solvent-diluted product thereof, is combined as necessary with additives which may include other resins, catalysts, pigments, leveling agents, antioxidants, ultraviolet absorbers, light stabilizers, plasticizers and surfactants, the polyisocyanate composition of the present invention is then added as a curing agent, and following addition of further solvent as required to adjust the viscosity, the mixture is stirred manually or stirred using a stirrer such as a Mazelar to obtain the solvent-based coating material composition.

In the case of a water-based coating material composition, a water dispersion or water solution of the resin containing the compound having two or more active hydrogens within the molecule is combined as necessary with additives which may include other resins, catalysts, pigments, leveling agents, antioxidants, ultraviolet absorbers, light stabilizers, plasticizers and surfactants, the polyisocyanate composition of the present invention is then added as a curing agent, and following addition of further water or a solvent as required, the mixture is stirred vigorously with a stirrer to obtain the water-based coating material composition.

Polyester polyols can be obtained, for example, by subjecting a single dibasic acid such as a carboxylic acid such as succinic acid, adipic acid, dimer acid, maleic anhydride, phthalic anhydride, isophthalic acid, terephthalic acid or 1,4-cyclohexane dicarboxylic acid, or a mixture of such dibasic acids, and a single polyhydric alcohol such as ethylene glycol, propylene glycol, diethylene glycol, 1,4-butanediol, neopentyl glycol, 1,6-hexanediol, trimethylpentanediol, cyclohexanediol, trimethylolpropane, glycerol, pentaerythritol, 2-methylolpropanediol or ethoxylated trimethylolpropane, or a mixture of such polyhydric alcohols, to a condensation reaction. For example, the condensation reaction can be performed by combining the above components and then heating at a temperature of about 160 to 220° C. Moreover, polycaprolactones or the like obtained by subjecting a lactone such as ε-caprolactone to ring-opening polymerization using a polyhydric alcohol may also be used as a polyester polyol. These polyester polyols can be modified using aromatic diisocyanates, aliphatic diisocyanates, alicyclic diisocyanates, or polyisocyanates obtained from these diisocyanates. In such cases, aliphatic diisocyanates, alicyclic diisocyanates, and polyisocyanates obtained from such diisocyanates are particularly preferred from the viewpoints of weather resistance and yellowing resistance and the like. When the polyester polyol is to be used in a water-based coating material, by leaving a portion of residual carboxylic acid such as a portion of the dibasic acid, and neutralizing this acid with a base such as an amine or ammonia, a water-soluble or water-dispersible resin can be formed.

Examples of the polyether polyols include polyether polyols obtained by using a hydroxide (such as lithium, sodium or potassium hydroxide), a strongly basic catalyst (such as an alcoholate or alkylamine), or a composite metal cyanide complex (such as a metal porphyrin or zinc hexacyanocobaltate complex) to add a single alkylene oxide (such as ethylene oxide, propylene oxide, butylene oxide, cyclohexene oxide or styrene oxide) or a mixture of alkylene oxides randomly or in a block-like manner to a single polyhydric hydroxy compound or a mixture of such polyhydric hydroxy compounds; polyether polyols obtained by reacting an alkylene oxide with a polyamine compound (such as ethylenediamine); and so-called polymer polyols obtained by polymerizing acrylamide or the like using these polyether polyols as a catalyst.

Examples of the polyhydric hydroxy compound mentioned above include (i) diglycerol, ditrimethylolpropane, pentaerythritol and dipentaerythritol, (ii) sugar alcohol-based compounds such as erythritol, D-threitol, L-arabinitol, ribitol, xylitol, sorbitol, mannitol, galactitol and rhamnitol, (iii) monosaccharides such as arabinose, ribose, xylose, glucose, mannose, galactose, fructose, sorbose, rhamnose, fucose, and ribodesose, (iv) disaccharides such as trehalose, sucrose, maltose, cellobiose, gentiobiose, lactose and melibiose, (v) trisaccharides such as raffinose, gentianose and melezitose, and (vi) tetrasaccharides such as stachyose.

Acrylic polyols can be obtained, for example, by subjecting a polymerizable monomer having at least one active hydrogen within the molecule and another monomer that is copolymerizable with the above polymerizable monomer to a copolymerization reaction.

For example, acrylic polyols can be obtained by using conventional methods to copolymerize, an essential component composed of at least one compound selected from the group consisting of acrylate esters having an active hydrogen (such as 2-hydroxyethyl acrylate, 2-hydroxypropyl acrylate or 2-hydroxybutyl acrylate), methacrylate esters having an active hydrogen (such as 2-hydroxyethyl methacrylate, 2-hydroxypropyl methacrylate, 2-hydroxybutyl methacrylate, 3-hydroxybutyl methacrylate or 4-hydroxybutyl methacrylate), (meth)acrylate esters having multiple active hydrogens such as (meth)acrylate monoesters of a triol such as glycerol or trimethylolpropane, monoethers of a polyether polyol (such as polyethylene glycol, polypropylene glycol or polybutylene glycol) and an aforementioned (meth)acrylate ester having an active hydrogen, addition products of glycidyl (meth)acrylate and a monobasic acid such as acetic acid, propionic acid or p-tert-butylbenzoic acid, and addition products obtained by performing a ring-opening polymerization of a lactone (such as ε-caprolactam or γ-valerolactone) using the active hydrogen of an aforementioned (meth)acrylate ester having an active hydrogen; together with one or more optional components selected as required from the group consisting of (meth)acrylate esters (such as methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, n-hexyl methacrylate, cyclohexyl methacrylate, lauryl methacrylate and glycidyl methacrylate), unsaturated carboxylic acids (such as acrylic acid, methacrylic acid, maleic acid and itaconic acid), unsaturated amides (such as acrylamide, N-methylolacrylamide and diacetone acrylamide), vinyl monomers having a hydrolyzable silyl group (such as vinyltrimethoxysilane, vinylmethyldimethoxysilane and γ-(meta)-acryloylpropyltrimethoxysilane), and other polymerizable monomers (such as styrene, vinyltoluene, vinyl acetate, acrylonitrile and dibutyl fumarate).

For example, acrylic polyols can be obtained by performing a solution polymerization of the above monomer components in the presence of a conventional radical polymerization initiator such as a peroxide or azo compound, and then performing dilution with an organic solvent or the like as required. In the case of a water-based acrylic polyol, the acrylic polyol can be produced by a method in which an olefinic unsaturated compound is subjected to solution polymerization and the product is then transferred into a water layer, and by known methods such as emulsion polymerization. In this case, it is possible to impart water solubility or water dispersibility by neutralizing the acidic portions of the carboxylic acid-containing monomers such as acrylic acid or methacrylic acid or the sulfonic acid-containing monomers with an amine or ammonia.

Fluorine polyols are polyols containing fluorine within the molecule, and examples include copolymers of fluoroolefins, cyclovinyl ethers, hydroxyalkyl vinyl ethers and monocarboxylic acid vinyl esters and the like disclosed in Japanese Unexamined Patent Application, First Publication No. Sho 57-34107 and Japanese Unexamined Patent Application, First Publication No. Sho 61-215311.

Although there are no particular limitations on the hydroxyl value of the above polyol, a hydroxyl value of at least 10 mgKOH/g but not more than 200 mgKOH/g is preferred. The lower limit is more preferably 20 mgKOH/g, and particularly preferably 30 mgKOH/g or greater. The acid value of the polyol is preferably at least 0 mgKOH/g but not more than 30 mgKOH/g. The hydroxyl value and the acid value can be measured in accordance with JIS K1557.

Among the above polyols, acrylic polyols are preferred from the viewpoints of weather resistance, chemical resistance and hardness, whereas polyester polyols are preferred from the viewpoints of mechanical strength and oil resistance.

The equivalence ratio (NCO/OH ratio) of the isocyanate groups of the polyisocyanate composition of the present invention relative to the hydroxyl groups of the aforementioned compound having two or more active hydrogen atoms within the molecule is preferably at least 0.2 but not more than 5.0, more preferably at least 0.4 but not more than 3.0, and particularly preferably at least 0.5 but not more than 2.0. Provided the equivalence ratio is at least as large as the above lower limit, a tougher coating film can be obtained. Provided the equivalence ratio is not higher than the above upper limit, the smoothness of the coating film can be further improved.

If necessary, melamine-based curing agents including totally alkyl, methylol alkyl and imino alkyl melamine-based curing agents may also be added.

The aforementioned compound having two or more active hydrogen atoms within the molecule, and the polyisocyanate composition and coating material composition of the present invention may each be used in the form of a mixture with an organic solvent. The organic solvent preferably has no functional groups that react with a hydroxyl group or an isocyanate group. Further, the organic solvent is preferably compatible with the polyisocyanate composition. Examples of such organic solvents include solvents typically used as coating material solvents, such as ester compounds, ether compounds, ketone compounds, aromatic compounds, ethylene glycol dialkyl ether-based compounds, polyethylene glycol dicarboxylate-based compounds, hydrocarbon-based solvents and aromatic solvents.

The above compound having two or more active hydrogen atoms within the molecule, and the polyisocyanate composition and coating material composition of the present invention may each be used, according to the intended purpose or application, in the form of a mixture with any of the various additives used in the technical field, including catalysts, pigments, leveling agents, antioxidants, ultraviolet absorbers, light stabilizers, plasticizers, surfactants and coating film surface hydrophilic agents, provided the effects of the present invention are not impaired.

Examples of catalysts used for accelerating curing include metal salts such as dibutyltin dilaurate, tin 2-ethylhexanoate, zinc 2-ethylhexanoate and cobalt salts; and tertiary amines such as triethylamine, pyridine, methylpyridine, benzyldimethylamine, N,N-dimethylcyclohexylamine, N-methylpiperidine, pentamethyldiethylenetriamine, N,N'-endo-ethylenepiperazine and N,N'-dimethylpiperazine.

For the coating film surface hydrophilic agents, silicate compounds are preferred. Examples include at least one silicate compound selected from among compounds represented by formula (XX) shown below, namely tetraalkoxysilanes, condensation products of tetraalkoxysilanes, and derivatives of tetraalkoxysilanes. By including a silicate compound, the coating film surface can be made hydrophilic and rain streaking resistance can be achieved when a coating film is produced in combination with the main polyol.

[Chemical formula 110]

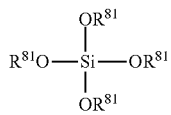

(XX)

[In general formula (XX), each of the plurality of $R^{81}$ independently represents an alkyl group of 1 to 10 carbon atoms or an aryl group. The plurality of $R^{81}$ may be the same or different.]

[$R^{81}$]

Each $R^{81}$ independently represents an alkyl group of 1 to 10 carbon atoms or an aryl group. The alkyl group of 1 to 10 carbon atoms for $R^{81}$ may be either a linear or branched group, and specific examples include a methyl group, ethyl group, n-propyl group, isopropyl group, n-butyl group, isobutyl group, sec-butyl group, tert-butyl group, n-pentyl group, isopentyl group, neopentyl group, tert-pentyl group, 1-methylbutyl group, n-hexyl group, 2-methylpentyl group, 3-methylpentyl group, 2,2-dimethylbutyl group, 2,3-dimethylbutyl group, n-heptyl group, 2-methylhexyl group, 3-methylhexyl group, 2,2-dimethylpentyl group, 2,3-dimethylpentyl group, 2,4-dimethylpentyl group, 3,3-dimethylpentyl group, 3-ethylpentyl group, 2,2,3-trimethylbutyl group, n-octyl group, isooctyl group, 2-ethyihexyl group, nonyl group and decyl group.

Examples of the aryl group for $R^{81}$ include a phenylene group, pentalenylene group, indenylene group, naphthylene group, anthracenylene group, heptalenylene group, octalenylene group and azulenylene group, as well as groups in which one or more of the hydrogen atoms of one of these aromatic hydrocarbon groups have each been substituted with a halogen atom, a hydroxyl group or an alkyl group of 1 to 10 carbon atoms. Examples of the alkyl group of 1 to 10 carbon atoms that may substitute a hydrogen atom include the same groups as the alkyl groups of 1 to 10 carbon atoms described above for $R^{51}$.

<Coating Film>

The coating material composition that uses the polyisocyanate composition of the present invention as a curing agent may be used as a coating material for roll coating, curtain flow coating, spray coating, bell coating and electrostatic coating. For example, the coating composition may be used as a primer or as an upper or intermediate coating material for materials such as metals (such as steel plate and surface-treated steel plate), plastics, wooden materials, films, and inorganic materials. The coating material composition is also useful as a coating material for imparting improved aesthetics, weather resistance, acid resistance, rust prevention, and chipping resistance and the like to vehicle coatings and precoated metals including rust preventive steel sheets and the like. Furthermore, the coating material composition is also useful as a urethane raw material for adhesives, pressure-sensitive adhesives, elastomers, foams and surface treatment agents and the like.

<Water Dispersion>

A water dispersion of the present invention is a water dispersion containing the polyisocyanate composition, blocked polyisocyanate composition or hydrophilic polyisocyanate composition of the present invention, and water.

The polyisocyanate composition, blocked polyisocyanate composition or hydrophilic polyisocyanate composition of the present invention exhibits favorable water dispersibility, and can therefore be dispersed easily in water.

The water dispersion of the present invention may also include a solvent other than water.

This solvent other than water may be added in an amount of up to 20% by mass. In such cases, there are no particular limitations on the solvent used, and examples include 1-methylpyrrolidone, ethylene glycol monoethyl ether, diethylene glycol monoethyl ether, ethylene glycol monomethyl ether, diethylene glycol monomethyl ether, dipropylene glycol monomethyl ether, propylene glycol monomethyl ether, 3-methoxy-3-methyl-1-butanol, ethylene glycol diethyl ether, diethylene glycol diethyl ether, ethylene glycol dimethyl ether, diethylene glycol dimethyl ether, dipropylene glycol dimethyl ether, propylene glycol dimethyl ether, methyl ethyl ketone, acetone, methyl isobutyl ketone, propylene glycol monomethyl ether acetate, ethanol, methanol, iso-propanol, 1-propanol, iso-butanol, 1-butanol, 2-ethylhexanol, cyclohexanol, ethylene glycol, diethylene glycol, triethylene glycol, propylene glycol, dipropylene glycol, 1,4-butanediol, 1,3-butanediol, ethyl acetate, isopropyl acetate, butyl acetate, toluene, xylene, pentane, iso-pentane, hexane, iso-hexane, cyclohexane, solvent naphtha and mineral spirit. These solvents may be used individually, or a combination of two or more solvents may be used. From the viewpoint of the dispersibility in water, a solvent that has a degree of solubility in water of at least 5% by mass is preferred, and specifically, dipropylene glycol dimethyl ether and dipropylene glycol monomethyl ether are preferred.

EXAMPLES

The present invention is described below in further detail using a series of examples and comparative examples, but the embodiments of the present invention are in no way limited by the following examples and comparative examples provided they remain within the scope of the present invention.

The physical properties of the polyisocyanate compositions in Examples (1-1)-1 to (1-1)-28 and Comparative Examples (1-1)-1 to (1-1)-10 were measured in the manner described below. Unless specifically stated otherwise, "parts" and "%" mean "parts by mass" and "% by mass" respectively.

<Viscosity>

The viscosity was measured at 25° C. using an E-type viscometer (manufactured by Tokimec Inc.). A standard rotor (1°34'×R24) was used for the measurement. The rotational rate was set as follows.

100 rpm (in the case of viscosity less than 128 mPa·s)

50 rpm (in the case of viscosity from 128 mPa·s to 256 mPa·s)

20 rpm (in the case of viscosity from 256 mPa·s to 640 mPa·s)

10 rpm (in the case of viscosity from 640 mPa·s to 1,280 mPa·s)

5 rpm (in the case of viscosity from 1,280 mPa·s to 2,560 mPa·s)

<NCO Content>

The NCO content (% by mass) was determined by neutralizing the isocyanate groups in the measurement sample with excess 2N amine, and then performing a back titration with 1N hydrochloric acid.

<Calculated NCO Content>

The NCO content of the polyisocyanate composition used in synthesizing a blocked polyisocyanate composition was determined using the method described above, and the mass of NCO [A] was determined from the amount of added polyisocyanate composition.

The following formula was used to determine the calculated NCO content.

Calculated NCO content (% by mass)=100×[$A$]/total added mass

<Conversion Ratio>

The conversion ratio was determined from the polystyrene-equivalent number average molecular weight obtained by GPC measurement using the apparatus described below, and was deemed to be the surface area proportion of peaks having a larger number average molecular weight than the unreacted triisocyanate.

Apparatus: HLC-8120GPC (product name), manufactured by Tosoh Corporation

Columns: 1×TSKgel Super H1000 column (product name), 1×TSKgel Super H2000 column (product name), and 1×TSKgel Super H3000 column (product name), all manufactured by Tosoh Corporation Carrier: tetrahydrofuran Detection method: refractive index detector Sample concentration: 5 wt/vol %

Elution rate: 0.6 mL/min

Column temperature: 30° C.

<Method for Quantifying Molar Ratio of Iminooxadiazinedione Structures relative to Isocyanurate Structures>

A Biospin Avance 600 (product name) manufactured by Bruker Corporation was used to conduct $^{13}$C-NMR measurements, and the molar ratio between iminooxadiazinedione structures and isocyanurate structures was determined.

Specific measurement conditions were as follows.

$^{13}$C-NMR apparatus: AVANCE 600 (manufactured by Bruker Corporation)

CryoProbe CPDUL 600S3-C/H-D-05Z (manufactured by Bruker Corporation)

Resonance frequency: 150 MHz

Concentration: 60 wt/vol %

Shift reference: CDCl$_3$ (77 ppm)

Accumulation number: 10,000

Pulse program: zgpg 30 (proton perfect decoupling methods, waiting time: 2 sec)

The signal integral values described below were divided by the number of measured carbons, and the resulting values were used to determine the various molar ratios.

Iminooxadiazinedione structure: near 144.5 ppm: integral value÷1

Isocyanurate structure: near 148.5 ppm: integral value÷3

Subsequently, based on these obtained molar ratios for the iminooxadiazinedione structure and the isocyanurate structure, the molar ratio of iminooxadiazinedione structures relative to isocyanurate structures was determined.

<Polyisocyanate Composition Degree of Viscosity Reduction (1)>

Using the viscosity measurement results for the polyisocyanate mixtures, values of less than 1,000 mPa·s at 25° C. were evaluated as o, and values of 1,000 mPa·s or greater at 25° C. were evaluated as x.

<Polyisocyanate Composition Drying Properties Evaluation Method (1)>

An acrylic polyol (SETALUX 1753, a product name of Nuplex Resin Inc., resin fraction concentration: 70%, hydroxyl value: 138.6 mgKOH/g) was blended with each of the polyisocyanate compositions so as to achieve an isocyanate group/hydroxyl group equivalence ratio of 1.0, and butyl acetate was used to adjust the solid fraction to 50% by mass. Each of the thus prepared coating material compositions was applied to a glass plate in an amount sufficient to generate a dried film thickness of 40 μm, and the composition was then cured at 23° C. and 50% RH. After a prescribed period of time had elapsed, a cotton ball (a circular cylindrical shape of diameter: 2.5 cm and height: 2.0 cm) was placed on the coating film, and a 100 g weight was then placed on top of the cotton ball for 60 seconds. Subsequently, the weight and the cotton were removed, and the level of cotton traces that remained on the coating film was inspected. Cases where the time taken for absolutely no cotton traces to be visible was 8 hours or less were evaluated as ⊚, cases where the time was greater than 8 hours but not more than 9 hours were evaluated as o, cases where the time was greater than 9 hours but not more than 10 hours were evaluated as Δ, and cases where the time was longer than 10 hours were evaluated as x.

<Blocked Polyisocyanate Composition Degree of Viscosity Reduction (1)>

Using the viscosity measurement results for the blocked polyisocyanate compositions, values of less than 1,000 mPa·s at 25° C. were evaluated as o, and values of 1,000 mPa·s or greater at 25° C. were evaluated as x.

<Blocked Polyisocyanate Composition Drying Properties Evaluation Method (1)>

An acrylic polyol (SETALUX 1753, a product name of Nuplex Resin Inc., resin fraction concentration: 70%, hydroxyl value: 138.6 mgKOH/g) was blended with each of the blocked polyisocyanate compositions so as to achieve an isocyanate group/hydroxyl group equivalence ratio of 1.0, and butyl acetate was used to adjust the solid fraction to 50% by mass. Each of the thus prepared coating material compositions was applied to a glass plate in an amount sufficient to generate a dried film thickness of 40 μm, and the composition was then cured at 100° C. for 30 minutes. A cotton ball (a circular cylindrical shape of diameter: 2.5 cm and height: 2.0 cm) was then placed on the coating film, and a 100 g weight was then placed on top of the cotton ball for 60 seconds. Subsequently, the weight and the cotton were removed, and the level of cotton traces that remained on the coating film was inspected. Cases where absolutely no cotton traces were visible were evaluated as o, cases where slight traces were visible were evaluated as A, and cases where clear traces were visible were evaluated as x.

<(Blocked) Polyisocyanate Composition Substrate Concealment Evaluation Method>

An acrylic polyol ACRYDIC (a registered trademark) A-801-P (resin fraction concentration: 50%, hydroxyl value: 50.0 mgKOH/g resin) manufactured by DIC Corporation was blended with various (blocked) polyisocyanate compositions, each having the same composition as one of the examples or comparative examples, so as to achieve an isocyanate group/hydroxyl group equivalence ratio of 1.0, and butyl acetate was used to adjust the solid fraction to 50% by mass. Subsequently, the resin solid fraction was adjusted to 50% by adding or removing solvent, and an applicator was used to apply the composition to a cationic electrodeposition coated sheet (black) manufactured by Standard Testpiece Co., Ltd. in an amount sufficient to generate a resin film thickness of 40 μm. Following application, the coated sheet was left to stand at room temperature for 30 minutes, and was then placed in an oven at 140° C. for 30 minutes. The coated sheet was then cooled, and once the coating film was confirmed as having reached 23° C., the arithmetic mean roughness Ra was measured using the following apparatus under the conditions described below. A smaller Ra value indicates superior substrate concealment.

Measurement apparatus: product name: NewView 600s, a scanning white light interference microscope manufactured by Zygo Corporation, magnification: 2.5×

Measurement method: measurement of Ra value (arithmetic deviation from centerline)

When the Ra value was 0.025 μm or less, the substrate concealment properties were evaluated as very favorable and recorded as ⊚, when the Ra value exceeded 0.025 μm but was not more than 0.04 μm, the substrate concealment properties were evaluated as substantially favorable and recorded as o, and when the Ra value exceeded 0.04 μm, the substrate concealment properties were evaluated as unsatisfactory and recorded as x.

<(Blocked) Polyisocyanate Composition Adhesion to Base Coating Film Evaluation Method>

An acrylic polyol (resin solid fraction concentration: 55%, hydroxyl value: 30 mgKOH/g resin) was applied to a soft steel sheet in an amount sufficient to generate a resin film thickness of 40 μm. Following standing for 30 minutes at room temperature, an acrylic polyol (SETALUX 1903, a product name of Nuplex Resin Inc., resin fraction concentration: 75%, hydroxyl value: 150 mgKOH/g resin) was blended with various (blocked) polyisocyanate compositions, each having the same composition as one of the examples or comparative examples, so as to achieve an isocyanate group/hydroxyl group equivalence ratio of 1.0, and butyl acetate was then used to adjust the coating material viscosity to a value of 20 seconds for a Ford cup No. 4, thus completing preparation of a series of coating material compositions. Each of the thus obtained coating material compositions was applied to the above resin film in an amount sufficient to generate a resin film thickness of 30 μm. Following standing for 15 minutes at room temperature, the coating film was cured in an oven at 140° C. for 30 minutes. An adhesion test of this coating film was performed in accordance with JIS K5600-5-6. Cases where no peeling of the coating film occurred were recorded as ⊚, cases where coating film peeling was greater than 0% but not more than 25% were recorded as o, cases where coating film peeling was greater than 25% but not more than 50% were recorded as Δ, and cases where coating film peeling was greater than 50% were recorded as x.

<Hydrophilic Polyisocyanate Composition Degree of Viscosity Reduction (1)>

Using the viscosity measurement results for the hydrophilic polyisocyanate compositions, values of less than 1,000 mPa·s at 25° C. were evaluated as o, and values of 1,000 mPa·s or greater at 25° C. were evaluated as x.

<Hydrophilic Polyisocyanate Composition Drying Properties Evaluation Method>

An acrylic dispersion (SETAQUA 6510, a product name of Nuplex Resin Inc., resin fraction concentration: 42%, hydroxyl group concentration: 4.2% (relative to the resin)) was blended with each of the hydrophilic polyisocyanate compositions so as to achieve an isocyanate group/hydroxyl group equivalence ratio of 1.0, and water was used to adjust the solid fraction to 40% by mass. Each of the thus prepared coating material compositions was applied to a glass plate in an amount sufficient to generate a dried film thickness of 40 μm, and the composition was then cured at 23° C. and 50% RH. After a prescribed period of time had elapsed, a cotton ball (a circular cylindrical shape of diameter: 2.5 cm and height: 2.0 cm) was placed on the coating film, and a 100 g weight was then placed on top of the cotton ball for 60 seconds. Subsequently, the weight and the cotton were removed, and the level of cotton traces that remained on the coating film was inspected. Cases where the time taken for absolutely no cotton traces to be visible was 9 hours or less were evaluated as ⊚, cases where the time was greater than 9 hours but not more than 10 hours were evaluated as o, and cases where the time was longer than 10 hours were evaluated as x.

<Hydrophilic Polyisocyanate Composition Substrate Concealment Evaluation Method>

An acrylic dispersion (SETAQUA 6510, a product name of Nuplex Resin Inc., resin fraction concentration: 42%, hydroxyl group concentration: 4.2% (relative to the resin)) was blended with various hydrophilic polyisocyanate compositions, each having the same composition as one of the examples or comparative examples, so as to achieve an isocyanate group/hydroxyl group equivalence ratio of 1.0, and ion-exchanged water was used to adjust the solid fraction to 40% by mass. Subsequently, the resin solid fraction was adjusted to 50% by adding or removing solvent, and an applicator was used to apply the composition to a cationic electrodeposition coated sheet (black) manufactured by Standard Testpiece Co., Ltd. in an amount sufficient to generate a resin film thickness of 40 μm. Following application, the coated sheet was left to stand at room temperature for 30 minutes, and was then placed in an oven at 120° C. for 30 minutes. The coated sheet was then cooled, and once the coating film was confirmed as having reached 23° C., the arithmetic mean roughness Ra was measured using the following apparatus under the conditions described below. A smaller Ra value indicates superior substrate concealment.

Measurement apparatus: product name: NewView 600s, a scanning white light interference microscope manufactured by Zygo Corporation, magnification: 2.5×

Measurement method: measurement of Ra value (arithmetic deviation from centerline)

When the Ra value was 0.025 μm or less, the substrate concealment properties were evaluated as very favorable and recorded as ⊚, when the Ra value exceeded 0.025 μm but was not more than 0.04 μm, the substrate concealment properties were evaluated as substantially favorable and recorded as o, and when the Ra value exceeded 0.04 μm, the substrate concealment properties were evaluated as unsatisfactory and recorded as x.

<Hydrophilic Polyisocyanate Composition Adhesion to Base Coating Film Evaluation Method>

An acrylic polyol (resin solid fraction concentration: 55%, hydroxyl value: 30 mgKOH/g resin) was applied to a soft steel sheet in an amount sufficient to generate a resin film thickness of 40 μm. Following standing for 30 minutes at room temperature, an acrylic dispersion (SETAQUA 6510, a product name of Nuplex Resin Inc., resin fraction concentration: 42%, hydroxyl group concentration: 4.2% (relative to the resin)) was blended with various (blocked) polyisocyanate compositions, each having the same composition as one of the examples or comparative examples, so as to achieve an isocyanate group/hydroxyl group equivalence ratio of 1.0, and ion-exchanged water was then used to adjust the coating material viscosity to a value of 40 seconds for a Ford cup No. 4, thus completing preparation of a series of coating material compositions. Each of the thus obtained coating material compositions was applied to the above resin film in an amount sufficient to generate a resin film thickness of 30 μm. Following standing for 15 minutes at room temperature, the coating film was cured in an oven at 140° C. for 30 minutes. An adhesion test of this coating film was performed in accordance with JIS K5600-5-6. Cases where no peeling of the coating film occurred were recorded as ⊚, cases where coating film peeling was greater than 0% but not more than 25% were recorded as o, cases where coating film peeling was greater than 25% but not more than 50% were recorded as Δ, and cases where coating film peeling was greater than 50% were recorded as x.

<Storage Stability Evaluation Method>

Three hundred grams of the polyisocyanate composition was placed in a 500 mL container, the atmosphere inside the container was replaced with nitrogen, and the composition was stored at 23° C. for 300 days.

If the change in the number average molecular weight (after storage/before storage) was less than 1.5, then the storage stability was evaluated as favorable.

Synthesis Example (1-1)-1

Synthesis of NTI

In a four-neck flask fitted with a stirrer, a thermometer and a gas inlet tube, 1,060 g of 4-aminomethyl-1,8-octamethylenediamine (hereafter sometimes referred to as "the triamine") was dissolved in 1,500 g of methanol, and 1,800 mL of a 35% concentrated hydrochloric acid solution was then added gradually to the flask in a dropwise manner under cooling. The reaction solution was concentrated by removing the methanol and water under reduced pressure, and the residue was then dried at 60° C. and 5 mmHg for 24 hours, yielding a triamine hydrochloride as a white solid. A 650 g sample of the obtained triamine hydrochloride was converted to a fine powder and suspended in 5,000 g of o-dichlorobenzene, the temperature of the reaction liquid was raised while the liquid was stirred, and when the temperature reached 100° C., phosgene was started to be blown into the flask at a rate of 200 g/hr, the temperature was further raised and then held at 180° C., and blowing of the phosgene was continued for 12 hours. Following removal of any dissolved phosgene and the solvent by distillation under reduced pressure, vacuum distillation was used to obtain 420 g of colorless and transparent 4-isocyanatomethyl-1,8-octamethylene diisocyanate (hereafter sometimes referred to as NTI) having a boiling point of 161 to 163° C. at 1.2 mmHg. The NCO content of this compound was 50.0% by weight.

Synthesis Example (1-1)-2

Synthesis of LTI

A four-neck flask fitted with a stirrer, a thermometer and a gas inlet tube was charged with 122.2 g of ethanolamine, 100 mL of o-dichlorobenzene and 420 mL of toluene, and ice-cooled hydrogen chloride gas was then introduced into the flask to convert the ethanolamine to a hydrochloride salt. Subsequently, 182.5 g of lysine hydrochloride was added, the reaction liquid was heated to 80° C. to dissolve the ethanolamine hydrochloride, and hydrogen chloride gas was then introduced to form lysine dihydrochloride. Additional hydrogen chloride gas was then passed through the reaction liquid at 20 to 30 mL/min., the reaction liquid was heated to 116° C., and this temperature was maintained until no more water distilled from the liquid. The thus produced reaction mixture was recrystallized from a mixed solution of methanol and ethanol, thus obtaining 165 g of lysine β-aminoethyl ester trihydrochloride. Subsequently, 100 g of this lysine β-aminoethyl ester trihydrochloride was converted to a fine powder and suspended in 1,200 mL of o-dichlorobenzene, the temperature of the reaction liquid was raised while the liquid was stirred, and when the temperature reached 120° C., phosgene was started to be blown into the flask at a rate of 0.4 mol/hr, blowing of the phosgene was continued for 10 hours, and the temperature was then raised to 150° C. The suspension almost completely dissolved. Following cooling, the reaction mixture was filtered, any dissolved phosgene and the solvent were removed by distillation under reduced pressure, and vacuum distillation was used to obtain 80.4 g of colorless and transparent LTI having a boiling point of 155 to 157° C. at 0.022 mmHg. The NCO content of this compound was 47.1% by weight.

Example (1-1)-1

Synthesis of P(1-1)-1

The inside of a four-neck flask fitted with a stirrer, a thermometer, a reflux condenser and a nitrogen inlet tube was flushed with nitrogen and then charged with 50 g of NTI as a monomer, and the temperature was then raised to 60° C. and held at that temperature for 2 hours. Subsequently, 5 mg of a catalyst of tetramethylammonium fluoride tetrahydrate containing 95% by mass of n-butanol was added, the reaction was allowed to proceed, and when the conversion ratio reached 41%, dibutyl phosphate was added to halt the reaction, thus obtaining a polyisocyanate P(1-1)-1. The viscosity of the obtained polyisocyanate P(1-1)-1 was 39 mPa·s at 25° C., the NCO content was 42.8% by mass, and the molar ratio of iminooxadiazinedione structures relative to isocyanurate structures was 0.25.

The degree of viscosity reduction for the polyisocyanate composition P(1-1)-1 was evaluated as o, the drying properties evaluation result was o, the substrate concealment evaluation result was ⊚, and the adhesion to a base coating film evaluation result was ⊚. These results were recorded in Table (1-1)-1.

Examples (1-1)-2 to (1-1)-8, Comparative Examples (1-1)-1 and (1-1)-2

Synthesis of P(1-1)-2 to P(1-1)-8, P(1-1)-10 and P(1-1)-11

With the exceptions of adjusting the monomer, the catalyst, the catalyst dilution solvent (concentration) and the conversion ratio as recorded in Table (1-1)-1, preparation was performed in the same manner as Example (1-1)-1. Further, the viscosity, the NCO content, the molar ratio of iminooxadiazinedione structures relative to isocyanurate structures, the degree of viscosity reduction, the drying properties evaluation result, the substrate concealment evaluation result, and the adhesion to a base coating film evaluation result for each of the obtained polyisocyanate compositions were recorded in Table (1-1)-1.

Example (1-1)-9

Synthesis of P(1-1)-9

Using the monomer, the catalyst, the catalyst dilution solvent (concentration) and the conversion ratio recorded in Table (1-1)-1, but with the exception of altering the amount added of the catalyst to 10 mg, preparation was performed in the same manner as Example (1-1)-1.

Further, the viscosity, the NCO content, the molar ratio of iminooxadiazinedione structures relative to isocyanurate structures, the degree of viscosity reduction, the drying properties evaluation result, the substrate concealment evaluation result, and the adhesion to a base coating film evaluation result for the obtained polyisocyanate composition were recorded in Table (1-1)-1.

Comparative Example (1-1)-3

Synthesis of P(1-1)-12

The reaction liquid obtained in Comparative Example (1-1)-2 was fed into a thin film evaporator, and unreacted HDI was removed to obtain a polyisocyanate composition P(1-1)-12. The viscosity of the polyisocyanate composition P(1-1)-12 was 2,300 mPa·s at 25° C., the NCO content was 21.5% by mass, and the molar ratio of iminooxadiazinedione structures relative to isocyanurate structures was 0.03.

Moreover, the degree of viscosity reduction for the polyisocyanate composition P(1-1)-12 was evaluated as x, the drying properties evaluation result was o, the substrate concealment evaluation result was x, and the adhesion to a base coating film evaluation result was o. These results were recorded in Table (1-1)-1.

Comparative Example (1-1)-4

The NTI monomer synthesized in Synthesis Example (1-1)-1 was used alone. The degree of viscosity reduction of the NTI was evaluated as o, the drying properties evaluation result was o, the substrate concealment evaluation result was ⊚, and the adhesion to a base coating film evaluation result was x. These results were recorded in Table (1-1)-1.

TABLE (1-1)-1

|  |  | Example (1-1)-1 | Example (1-1)-2 | Example (1-1)-3 | Example (1-1)-4 | Example (1-1)-5 | Example (1-1)-6 | Example (1-1)-7 |
|---|---|---|---|---|---|---|---|---|
| Polyisocyanate composition |  | P(1-1)-1 | P(1-1)-2 | P(1-1)-3 | P(1-1)-4 | P(1-1)-5 | P(1-1)-6 | P(1-1)-7 |
| Monomer |  | NTI | NTI | NTI | NTI | LTI | LTI | NTI |
| Catalyst |  | C(1-1)-1 | C(1-1)-2 | C(1-1)-3 | C(1-1)-4 | C(1-1)-1 | C(1-1)-1/ C(1-1)-4 = 5/95 | C(1-1)-1/ C(1-1)-4 = 25/75 |
| Catalyst dilution solvent concentration [% by mass] |  | n-butanol (95) | IPA (80) | iso-butanol (95) | 2-ethyl hexanol (99) | n-butanol (95) | n-butanol (95) | n-butanol (95) |
| Reaction temperature [° C.] |  | 60 | 60 | 80 | 80 | 60 | 60 | 60 |
| Conversion ratio [%] |  | 41 | 42 | 43 | 44 | 42 | 41 | 41 |
| Polyisocyanate composition | NCO content [% by mass] | 42.8 | 43.5 | 43.6 | 44 | 42.1 | 42.8 | 42.8 |
|  | Viscosity [mPa · s/25° C.] | 39 | 40 | 44 | 45 | 98 | 42 | 41 |
|  | Molar ratio of iminooxa-diazinedione groups to isocyanurate groups | 0.25 | 1.22 | 0.04 | 0.05 | 0.28 | 0.01 | 0.05 |
| Degree of viscosity reduction |  | ○ | ○ | ○ | ○ | ○ | ○ | ○ |
| Drying properties evaluation |  | ○ | Δ | ○ | ○ | ◎ | ◎ | ◎ |
| Substrate concealment evaluation |  | ◎ | ◎ | ◎ | ◎ | ○ | ◎ | ◎ |
| Adhesion to base coating film evaluation |  | ◎ | ◎ | ○ | ○ | ○ | Δ | ○ |

|  |  | Example (1-1)-8 | Example (1-1)-9 | Comparative example (1-1)-1 | Comparative example (1-1)-2 | Comparative example (1-1)-3 | Comparative example (1-1)-4 |
|---|---|---|---|---|---|---|---|
| Polyisocyanate composition |  | P(1-1)-8 | P(1-1)-9 | P(1-1)-10 | P(1-1)-11 | P(1-1)-12 | NTI |
| Monomer |  | NTI | NTI | NTI | HDI | Unreacted HDI removed from P(1-1)-11 |  |
| Catalyst |  | C(1-1)-1/ C(1-1)-4 = 50/50 | C(1-1)-1 | C(1-1)-4 | C(1-1)-3 |  |  |
| Catalyst dilution solvent concentration [% by mass] |  | n-butanol (95) | n-butanol (95) | PMA (87.5) methanol (7.5) | iso-butanol (95) |  |  |
| Reaction temperature [° C.] |  | 60 | 60 | 80 | 80 |  |  |
| Conversion ratio [%] |  | 41 | 41 | 48 | 40 |  |  |
| Polyisocyanate composition | NCO content [% by mass] | 42.8 | 42.8 | 42 | 43.1 | 21.5 | 50 |
|  | Viscosity [mPa · s/25° C.] | 40 | 37 | 46 | 12 | 2300 | 9 |
|  | Molar ratio of iminooxa-diazinedione groups to isocyanurate groups | 0.14 | 0.39 | 0 | 0.03 | 0.03 | 0 |
| Degree of viscosity reduction |  | ○ | ○ | ○ | ○ | × | ○ |
| Drying properties evaluation |  | ◎ | ○ | ○ | × | ○ | ○ |
| Substrate concealment evaluation |  | ◎ | ◎ | ◎ | ◎ | × | ◎ |
| Adhesion to base coating film evaluation |  | ◎ | ◎ | × | ○ | ○ | × |

In the above Table (1-1)-1, the catalysts and catalyst dilution solvents recorded using abbreviations refer to the materials listed below.
C(1-1)-1: tetramethylammonium fluoride tetrahydrate
C(1-1)-2: tetrabutylphosphonium hydrogen difluoride
C(1-1)-3: tetramethylammonium caprate
C(1-1)-4: benzyltrimethylammonium hydroxide
PMA: propylene glycol monomethyl ether acetate

Example (1-1)-10

Synthesis of Blocked Polyisocyanate Composition

The inside of a four-neck flask fitted with a stirrer, a thermometer, a reflux condenser and a nitrogen inlet tube was flushed with nitrogen and then charged with 20 g of the polyisocyanate composition P(1-1)-1 obtained in Example (1-1)-1 and 16.4 g of butyl acetate. The temperature was raised to 70° C., 20.2 g of 3,5-dimethylpyrazole was then added under constant stirring, and subsequent stirring for one hour with the temperature maintained at 70° C. resulted in an NCO content of 0.0% and yielded a blocked polyisocyanate composition. The viscosity of the obtained blocked polyisocyanate composition was 195 mPa·s at 25° C., and the calculated NCO content was 15.1% by mass.

The degree of viscosity reduction of the obtained blocked polyisocyanate composition was evaluated as ○, the drying properties evaluation result was ○, the substrate concealment evaluation result was ○, and the adhesion to a base coating film evaluation result was ⊚. These results were recorded in Table (1-1)-2.

Examples (1-1)-11 to (1-1)-17, Comparative Examples (1-1)-5 to (1-1)-7

Synthesis of Blocked Polyisocyanate Compositions

With the exceptions of adjusting the amount added of the 3,5-dimethylpyrazole, the amount added of the butyl acetate, and the type of polyisocyanate composition used in the manner recorded in Table (1-1)-2, preparation was performed in the same manner as Example (1-1)-10. Further, the viscosity, the calculated NCO content, the degree of viscosity reduction, the drying properties evaluation result, the substrate concealment evaluation result, and the adhesion to a base coating film evaluation result for each of the obtained blocked polyisocyanate compositions were recorded in Table (1-1)-2.

TABLE (1-1)-2

|  |  | Example (1-1)-10 | Example (1-1)-11 | Example (1-1)-12 | Example (1-1)-13 | Example (1-1)-14 | Example (1-1)-15 |
|---|---|---|---|---|---|---|---|
| Polyisocyanate composition |  | P(1-1)-1 | P(1-1)-2 | P(1-1)-3 | P(1-1)-5 | P(1-1)-6 | P(1-1)-7 |
| 3,5-dimethylpyrazole amount added [g] |  | 20.2 | 20.5 | 20.5 | 19.8 | 20.2 | 20.2 |
| Butyl acetate amount added [g] |  | 16.4 | 16.5 | 16.5 | 16.2 | 16.4 | 16.4 |
| Blocked polyisocyanate composition | Viscosity [mPa·s/25° C.] | 195 | 197 | 208 | 480 | 215 | 210 |
|  | Calculated NCO content [% by mass] | 15.1 | 15.3 | 15.3 | 15 | 15.1 | 15.1 |
| Degree of viscosity reduction |  | ○ | ○ | ○ | ○ | ○ | ○ |
| Drying properties evaluation |  | ○ | Δ | ○ | ○ | ⊚ | ⊚ |
| Substrate concealment evaluation |  | ○ | ⊚ | ⊚ | ○ | ⊚ | ⊚ |
| Adhesion to base coating film evaluation |  | ⊚ | ⊚ | ○ | ⊚ | Δ | ○ |

|  |  | Example (1-1)-16 | Example (1-1)-17 | Comparative Example (1-1)-5 | Comparative Example (1-1)-6 | Comparative Example (1-1)-7 |
|---|---|---|---|---|---|---|
| Polyisocyanate composition |  | P(1-1)-8 | P(1-1)-9 | P(1-1)-10 | P(1-1)-11 | P(1-1)-12 |
| 3,5-dimethylpyrazole amount added [g] |  | 20.2 | 20.2 | 19.8 | 20.3 | 10.1 |
| Butyl acetate amount added [g] |  | 16.4 | 16.4 | 16.2 | 16.4 | 12.5 |
| Blocked polyisocyanate composition | Viscosity [mPa·s/25° C.] | 205 | 190 | 222 | 105 | 1800 |
|  | Calculated NCO content [% by mass] | 15.1 | 15.1 | 15 | 15.2 | 10.1 |
| Degree of viscosity reduction |  | ○ | ○ | ○ | ○ | × |
| Drying properties evaluation |  | ⊚ | ○ | ○ | × | ○ |
| Substrate concealment evaluation |  | ⊚ | ⊚ | ⊚ | ⊚ | × |
| Adhesion to base coating film evaluation |  | ⊚ | ⊚ | × | ○ | ○ |

Example (1-1)-18

Synthesis of Hydrophilic Polyisocyanate Composition

The inside of a four-neck flask fitted with a stirrer, a thermometer, a reflux condenser and a nitrogen inlet tube was flushed with nitrogen and then charged with 20 g of the polyisocyanate composition P(1-1)-1 obtained in Example 41 and 8.6 g of a hydrophilic polyethylene oxide (product name: MPG-130, manufactured by Nippon Nyukazai Co., Ltd., number average molecular weight=420), and the temperature was then raised and held at 100° C. for 4 hours under constant stirring, thus obtaining a hydrophilic polyisocyanate. The viscosity of the obtained hydrophilic polyisocyanate composition was 49 mPa·s at 25° C., and the NCO content was 26.9% by mass.

Moreover, the degree of viscosity reduction was evaluated as o, the drying properties evaluation result was o, the substrate concealment evaluation result was ◉, and the adhesion to a base coating film evaluation result was ◉.

Examples (1-1)-19 to (1-1)-25, Comparative Examples (1-1)-8 to (1-1)-10

Synthesis of Hydrophilic Polyisocyanate Compositions

With the exceptions of adjusting the amount added of the MPG-130 and the type of polyisocyanate composition used in the manner recorded in Table (1-1)-3, preparation was performed in the same manner as Example (1-1)-18. Further, the viscosity, the NCO content, the degree of viscosity reduction, the drying properties evaluation result, the substrate concealment evaluation result, and the adhesion to a base coating film evaluation result for each of the obtained hydrophilic polyisocyanate compositions were recorded in Table (1-1)-3.

Example (1-1)-26

In this example, 0.03 g of 2,2,4-trimethylpentane was added to 300 g of the polyisocyanate composition P(1-1)-1 obtained in Example (1-1)-1.

For this polyisocyanate composition, the degree of viscosity reduction was evaluated as o, the drying properties evaluation result was o, the substrate concealment evaluation result was ◉, the adhesion to a base coating film evaluation result was ◉, and the storage stability evaluation result was favorable.

Example (1-1)-27

In this example, 0.03 g of hexadecane was added to 300 g of the polyisocyanate composition P(1-1)-1 obtained in Example (1-1)-1.

For this polyisocyanate composition, the degree of viscosity reduction was evaluated as o, the drying properties evaluation result was o, the substrate concealment evaluation result was ◉, the adhesion to a base coating film evaluation result was ◉, and the storage stability evaluation result was favorable.

Synthesis Example (1-1)-3

Synthesis of D(1-1)-1

The inside of a four-neck flask fitted with a stirrer, a thermometer, a reflux condenser and a nitrogen inlet tube was flushed with nitrogen and then charged with 20 g of NTI, the flask was then heated to 60° C., 7.7 g of methanol was added, and the temperature was maintained for 4 hours under constant stirring, thus obtaining an N-substituted carbamate ester D(1-1)-1.

Example (1-1)-28

In this example, 0.03 g of the N-substituted carbamate ester D(1-1)-1 was added to 300 g of the polyisocyanate composition P(1-1)-1 obtained in Example (1-1)-1.

For this polyisocyanate composition, the degree of viscosity reduction was evaluated as o, the drying properties evaluation result was o, the substrate concealment evaluation result was ◉, the adhesion to a base coating film evaluation result was ◉, and the storage stability evaluation result was favorable.

TABLE (1-1)-3

|  | Example (1-1)-18 | Example (1-1)-19 | Example (1-1)-20 | Example (1-1)-21 | Example (1-1)-22 | Example (1-1)-23 | Example (1-1)-24 | Example (1-1)-25 | Comparative Example (1-1)-8 | Comparative Example (1-1)-9 | Comparative Example (1-1)10 |
|---|---|---|---|---|---|---|---|---|---|---|---|
| Polyisocyanate composition | P(1-1)-1 | P(1-1)-2 | P(1-1)-3 | P(1-1)-5 | P(1-1)-6 | P(1-1)-7 | P(1-1)-8 | P(1-1)-9 | P(1-1)-10 | P(1-1)-11 | P(1-1)-12 |
| MPG-130 amount added [g] | 8.6 | 8.7 | 8.7 | 8.4 | 8.6 | 8.6 | 8.6 | 8.6 | 8.4 | 8.6 | 4.3 |
| Hydrophilic polyisocyanate composition — Viscosity [mPa·s/25° C.] | 49 | 50 | 52 | 109 | 51 | 51 | 50 | 48 | 54 | 33 | 2250 |
| NCO content [% by mass] | 26.9 | 27.3 | 27.3 | 26.7 | 26.9 | 26.9 | 26.9 | 26.9 | 26.6 | 27.1 | 15.9 |
| Degree of viscosity reduction | o | o | o | o | o | o | o | o | o | o | × |
| Drying properties evaluation | o | Δ | o | o | ◉ | ◉ | ◉ | o | o | × | o |
| Substrate concealment evaluation | ◉ | ◉ | ◉ | o | ◉ | ◉ | ◉ | ◉ | ◉ | ◉ | × |
| Adhesion to base coating film evaluation | ◉ | ◉ | o | ◉ | Δ | o | ◉ | ◉ | × | o | o |

The above results confirmed that the polyisocyanate composition, blocked polyisocyanate composition or hydrophilic polyisocyanate composition of each example had low viscosity, and also exhibited excellent drying properties, substrate concealment and adhesion to base coating films The physical properties of the polyisocyanate compositions in Examples (1-1)-29 to (1-1)-43 and Comparative Examples (1-1)-11 to (1-1)-18 were measured using the methods described below. Unless specifically stated otherwise, "parts" and "%" mean "parts by mass" and "% by mass" respectively.

<Viscosity>
As described above.
<NCO Content>
As described above.
<Calculated NCO Content>
As described above.
<Theoretical Reaction Rate>

The theoretical reaction rate is expressed as the reaction rate when all of the multimers are assumed to be trimers. The theoretical reaction rate c (%) is determined from the NCO % (x %) of the synthesized polyisocyanate composition, the NCO % (a %) of the triisocyanate that is used (see formula [B] below) and the NCO % (b %) of the triisocyanate trimer (see formula [C] below), using a formula [D] shown below.

NCO % of triisocyanate used: $(a)$=(molecular weight of NCO/molecular weight of triisocyanate used)×100(%)   [B]

NCO % of triisocyanate trimer: $(b)$=(molecular weight of NCO/molecular weight of triisocyanate trimer)×100(%)   [C]

Theoretical reaction rate $c(\%)=[(x-a)/(b-a)]\times 100(\%)$   [D]

<Polyisocyanate Composition Degree of Viscosity Reduction (2)>

Using the viscosity measurement results for the polyisocyanate mixtures, values of 100 mPa·s or less at 25° C. were evaluated as ⊚, values exceeding 100 mPa·s at 25° C. but not more than 1,000 mPa·s at 25° C. were evaluated as Δ, and values exceeding 1,000 mPa·s at 25° C. were evaluated as x.

<Blocked Polyisocyanate Composition Degree of Viscosity Reduction (2)>

Using the viscosity measurement results for the blocked polyisocyanate compositions, values of less than 400 mPa·s at 25° C. were evaluated as o, values of at least 400 mPa·s at 25° C. but less than 1,000 mPa·s at 25° C. were evaluated as Δ, and values of 1,000 mPa·s or greater at 25° C. were evaluated as x.

<Hydrophilic Polyisocyanate Composition Degree of Viscosity Reduction (2)>

Using the viscosity measurement results for the hydrophilic polyisocyanate compositions, values of less than 100 mPa·s at 25° C. were evaluated as o, values of at least 100 mPa·s at 25° C. but less than 1,000 mPa·s at 25° C. were evaluated as Δ, and values of 1,000 mPa·s or greater at 25° C. were evaluated as x.

<Hydrophilic Polyisocyanate Composition Water Dispersibility Evaluation Method>

An acrylic dispersion (SETAQUA 6510, a product name of Nuplex Resin Inc., resin fraction concentration: 42%, hydroxyl group concentration: 4.2% (relative to the resin)) was blended with each of the polyisocyanate compositions so as to achieve an isocyanate group/hydroxyl group equivalence ratio of 1.0, and water was used to adjust the solid fraction to 40% by mass. During preparation of each of the coating material compositions, compositions for which absolutely no gel-like material adhered to the stirring blade were evaluated as o, compositions for which slight adhesion was noticed were evaluated as Δ, and compositions for which a large amount of adhesion occurred were evaluated as x.

<Polar Polyol Compatibility Evaluation Method>

A polycarbonate diol DURANOL (a registered trademark) T-5652 manufactured by Asahi Kasei Corporation was blended with each of the polyisocyanate compositions so as to achieve an isocyanate group/hydroxyl group equivalence ratio of 1.0, and butyl acetate was used to adjust the solid fraction to 50% by mass. Each of the thus prepared coating material compositions was applied to a glass plate in an amount sufficient to generate a dried film thickness of 40 the composition was cured at 80° C. for 30 minutes, and the haze value of the coating film was measured using the apparatus described below.

Apparatus: Direct Readout Haze Computer HGM-2DP (product name) manufactured by Suga Test Instruments Co., Ltd.

Standard plate: glass plate of thickness 2 mm

Coating films for which the haze value was less than 0.1 were evaluated as ⊚, whereas haze values of at least 0.1 but less than 0.5 were evaluated as o, haze values of at least 0.5 but less than 1.0 were evaluated as Δ, and haze values of 1.0 or higher were evaluated as x.

<Coating Film Crack Resistance (Moist Heat Repetition Test)>

An acrylic polyol (SETALUX 1753, a product name of Nuplex Resin Inc., resin fraction concentration: 70%, hydroxyl value: 138.6 mgKOH/g) was blended with each of the polyisocyanate compositions and blocked polyisocyanate compositions so as to achieve an isocyanate group/hydroxyl group equivalence ratio of 1.0, and butyl acetate was used to adjust the solid fraction to 50% by mass. Each of the prepared coating material compositions was applied to a clear coating film (obtained by blending the product SETALUX 1753 manufactured by Nuplex Resin Inc. and an HDI-based polyisocyanate TKA-100 manufactured by Asahi Kasei Corporation so as to achieve an isocyanate group/hydroxyl group equivalence ratio of 1.0, adjusting the solid fraction to 50% by mass using butyl acetate, applying the thus prepared coating material composition to an aluminum plate in an amount sufficient to generate a dried film thickness of 50 μm, and then curing the composition at 100° C. for 60 minutes) in an amount sufficient to generate a dried film thickness of 40 μm, and was then cured at 100° C. for 30 minutes. Each thus obtained coating film sample was subjected to a cycle test (60 cycles) in which "60° C./90% RH/6 hours→60° C./30% RH/6 hours→10° C./90% RH/6 hours→10° C./30% RH/6 hours" was deemed one cycle, the state of the coating film following the cycle test was inspected, and coating films having absolutely no cracks were evaluated as o, coating films with localized cracks were evaluated as Δ, and coating films with multiple cracks across the entire surface were evaluated as x.

<Storage Stability Evaluation Method>
As described above.

Synthesis Example (1-1)-4

Synthesis of LTI

A four-neck flask fitted with a stirrer, a thermometer and a gas inlet tube was charged with 122.2 g of ethanolamine, 100 mL of o-dichlorobenzene and 420 mL of toluene, and ice-cooled hydrogen chloride gas was then introduced into the flask to convert the ethanolamine to a hydrochloride salt. Subsequently, 182.5 g of lysine hydrochloride was added, the reaction liquid was heated to 80° C. to dissolve the ethanolamine hydrochloride, and hydrogen chloride gas was then introduced to form lysine dihydrochloride. Additional hydrogen chloride gas was then passed through the reaction liquid at 20 to 30 mL/min., the reaction liquid was heated to 116° C., and this temperature was maintained until no more water distilled from the liquid. The thus produced reaction mixture was recrystallized from a mixed solution of methanol and ethanol, thus obtaining 165 g of lysine β-aminoethyl ester trihydrochloride. Subsequently, 100 g of this lysine β-aminoethyl ester trihydrochloride was converted to a fine powder and suspended in 1,200 mL of o-dichlorobenzene, the temperature of the reaction liquid was raised while the liquid was stirred, and when the temperature reached 120° C., phosgene was started to be blown into the flask at a rate of 0.4 mol/hr, blowing of the phosgene was continued for 10 hours, and the temperature was then raised to 150° C. The suspension almost completely dissolved. Following cooling, the reaction mixture was filtered, any dissolved phosgene and the solvent were removed by distillation under reduced pressure, and vacuum distillation was used to obtain 80.4 g of colorless and transparent LTI having a boiling point of 155 to 157° C. at 0.022 mmHg. The NCO content of this compound was 47.1% by weight.

Synthesis Example (1-1)-5

Synthesis of NTI

In a four-neck flask fitted with a stirrer, a thermometer and a gas inlet tube, 1,060 g of 4-aminomethyl-1,8-octamethyl-enediamine (hereafter sometimes referred to as "the triamine") was dissolved in 1,500 g of methanol, and 1,800 mL of a 35% concentrated hydrochloric acid solution was then added gradually to the flask in a dropwise manner under cooling. The reaction solution was concentrated by removing the methanol and water under reduced pressure, and the residue was then dried at 60° C. and 5 mmHg for 24 hours, yielding a triamine hydrochloride as a white solid. A 650 g sample of the obtained triamine hydrochloride was converted to a fine powder and suspended in 5,000 g of o-dichlorobenzene, the temperature of the reaction liquid was raised while the liquid was stirred, and when the temperature reached 100° C., phosgene was started to be blown into the flask at a rate of 200 g/hr, the temperature was further raised and then held at 180° C., and blowing of the phosgene was continued for 12 hours. Following removal of any dissolved phosgene and the solvent by distillation under reduced pressure, vacuum distillation was used to obtain 420 g of colorless and transparent 4-isocyanatomethyl-1,8-octamethylene diisocyanate (hereafter sometimes referred to as NTI) having a boiling point of 161 to 163° C. at 1.2 mmHg. The NCO content of this compound was 50.0% by weight.

Example (1-1)-29

Synthesis of P(1-1)-13

The inside of a four-neck flask fitted with a stirrer, a thermometer, a reflux condenser and a nitrogen inlet tube was flushed with nitrogen and then charged with 50 g of NTI as a monomer, and the temperature was then raised to 80° C. and held at that temperature for 2 hours. Subsequently, a solution prepared by dissolving 10 mg of an isocyanuration catalyst benzyltrimethylammonium caprate in 50 mg of isobutanol was added, an isocyanuration reaction was performed, and when the NCO % reached 47.7%, 26 mg of a 25% NTI solution of dibutyl phosphate was added to halt the reaction. The reaction liquid was then held at 120° C. for a further 15 minutes, thus obtaining a polyisocyanate composition P(1-1)-13. The viscosity of the obtained polyisocyanate P(1-1)-13 was 13 mPa·s at 25° C., and the theoretical reaction rate was 15.0%.

The degree of viscosity reduction for the polyisocyanate composition P(1-1)-13, and the results of the polar polyol compatibility evaluation and the coating film crack resistance evaluation were recorded in Table (1-1)-4.

Examples (1-1)-30 to (1-1)-36, Comparative Examples (1-1)-11 to (1-1)-14

Synthesis of P(1-1)-13 to P(1-1)-24

With the exceptions of adjusting the monomer, the catalyst, the reaction terminator, the reaction temperature, and the NCO % at the point where the reaction was halted as recorded in Table (1-1)-4, preparation was performed in the same manner as Example (1-1)-29. Further, the viscosity, the theoretical reaction rate, the degree of viscosity reduction, and the results of the polar polyol compatibility evaluation and the coating film crack resistance evaluation were recorded in Table (1-1)-4.

TABLE (1-1)-4

| | Example (1-1)-29 | Example (1-1)-30 | Example (1-1)-31 | Example (1-1)-32 | Example (1-1)-33 | Example (1-1)-34 | Example (1-1)-35 | Example (1-1)-36 | Comparative Example (1-1)-11 | Comparative Example (1-1)-12 | Comparative Example (1-1)-13 | Comparative Example (1-1)-14 |
|---|---|---|---|---|---|---|---|---|---|---|---|---|
| | P(1-1)-13 | P(1-1)-14 | P(1-1)-15 | P(1-1)-16 | P(1-1)-17 | P(1-1)-18 | P(1-1)-19 | P(1-1)-20 | P(1-1)-21 | P(1-1)-22 | P(1-1)-23 | P(1-1)-24 |
| Reaction temperature | 80° C. | 80° C. | 80° C. | 80° C. | 80° C. | 80° C. | 80° C. | 80° C. | 90° C. | 90° C. | 90° C. | 80° C. |
| NTI | 50 g | 50 g | 50 g | 50 g | 50 g | | | | 50 g | 50 g | 50 g | |
| LTI | | | | | | 50 g | 50 g | 50 g | | | | 50 g |
| Catalyst (amount added) | BTMA-A | BTMA-A | BTMA-A | TMA-A | BTMA-H | BTMA-A | BTMA-A | BTMA-A | BTMA-H | BTMA-H | BTMA-H | BTMA-A |
| Dilution solvent (amount of solvent) | 10 mg i-BuOH 50 mg | 10 mg i-BuOH 50 mg | 10 mg i-BuOH 50 mg | 7.5 mg i-BuOH 50 mg | 5 mg MeOH 7.5 mg i-BuOH 50 mg PMA 87.5 mg | 10 mg i-BuOH 50 mg | 10 mg i-BuOH 50 mg | 10 mg i-BuOH 50 mg | 25 mg MeOH 37.5 mg PMA 385 mg | 30 mg MeOH 45 mg PMA 525 mg | 24 mg MeOH 36 mg PMA 420 mg | 10 mg i-BuOH 50 mg |
| Reaction terminator (concentration) (amount added) | DBP 25% 26 mg | DBP 25% 26 mg | DBP 25% 26 mg | phosphoric acid 80% 15 mg | DBP 25% 13 mg | DBP 25% 26 mg | DBP 25% 26 mg | DBP 25% 26 mg | D2EHP 25% 200 mg | D2EHP 25% 250 mg | D2EHP 25% 200 mg | DBP 25% 26 mg |
| Theoretical reaction rate | 15.0% | 36.3% | 43.8% | 43.8% | 43.9% | 15.4% | 30.1% | 44.5% | 48.0% | 60.0% | 90.0% | 69.5% |

TABLE (1-1)-4-continued

|  | Example (1-1)-29 | Example (1-1)-30 | Example (1-1)-31 | Example (1-1)-32 | Example (1-1)-33 | Example (1-1)-34 | Example (1-1)-35 | Example (1-1)-36 | Comparative Example (1-1)-11 | Comparative Example (1-1)-12 | Comparative Example (1-1)-13 | Comparative Example (1-1)-14 |
|---|---|---|---|---|---|---|---|---|---|---|---|---|
| NCO % | 47.7% | 44.1% | 42.9% | 43.0% | 42.9% | 44.8% | 42.5% | 40.2% | 42.0% | 40.4% | 34.9% | 36.3% |
| Viscosity | 13 | 34 | 50 | 49 | 50 | 40 | 85 | 170 | 80 | 260 | 5500 | 460 |
| Polar polyol compatibility evaluation | ○ | ○ | ○ | Δ | Δ | ◎ | ◎ | ◎ | × | × | × | ○ |
| Coating film crack resistance (white plate/temperature and humidity variation) | ○ | ○ | ○ | Δ | Δ | ○ | Δ | Δ | Δ | Δ | × | × |
| Degree of viscosity reduction | ○ | ○ | ○ | ○ | ○ | ○ | ○ | Δ | ○ | Δ | × | Δ |

In the above Table (1-1)-4, the catalysts and reaction terminators recorded using abbreviations refer to the materials listed below.
BTMA-H: benzyltrimethylammonium hydroxide
BTMA-A: benzyltrimethylammonium caprate
TMA-A: tetramethylammonium caprate
DBP: dibutyl phosphate
D2EHP: di(2-ethylhexyl) phosphate Example (1-1)-37

Synthesis of Blocked Polyisocyanate Composition
The inside of a four-neck flask fitted with a stirrer, a thermometer, a reflux condenser and a nitrogen inlet tube was flushed with nitrogen and then charged with 20 g of the polyisocyanate composition P(1-1)-17 obtained in Example (1-1)-33 and 16.4 g of butyl acetate. The temperature was raised to 70° C., 20.2 g of 3,5-dimethylpyrazole was added under constant stirring, and subsequent stirring for one hour with the temperature maintained at 70° C. resulted in an NCO content of 0.0% and yielded a blocked polyisocyanate composition. The viscosity of the obtained blocked polyisocyanate composition was 290 mPa·s at 25° C., and the calculated NCO content was 15.2% by mass.

The degree of viscosity reduction for the obtained blocked polyisocyanate composition, and the evaluation results for the polar polyol compatibility and the coating film crack resistance were recorded in Table (1-1)-5.

Example (1-1)-38, Comparative Examples (1-1)-15 and (1-1)-16

Synthesis of Blocked Polyisocyanate Compositions
With the exceptions of adjusting the amount added of the 3,5-dimethylpyrazole, the amount added of the butyl acetate, and the type of polyisocyanate composition used in the manner recorded in Table (1-1)-5, preparation was performed in the same manner as Example (1-1)-37. Further, the viscosity, the calculated NCO content, the degree of viscosity reduction, and the evaluation results for the polar polyol compatibility and the coating film crack resistance for each of the obtained blocked polyisocyanate compositions were recorded in Table (1-1)-5.

TABLE (1-1)-5

|  | Example (1-1)-37 | Example (1-1)-38 | Comparative Example (1-1)-15 | Comparative Example (1-1)-16 |
|---|---|---|---|---|
| Polyisocyanate composition | P(1-1)-17 | P(1-1)-20 | P(1-1)-21 | P(1-1)-24 |
| 3,5-dimethylpyrazole amount added [g] | 20.2 | 18.9 | 19.8 | 17.1 |
| Butyl acetate amount added [g] | 16.4 | 15.9 | 16.3 | 15.2 |
| Viscosity [mPa·s/25° C.] | 290 | 835 | 495 | 3200 |
| NCO % | 15.2% | 14.7% | 15.0% | 13.9% |
| Degree of viscosity reduction | ○ | Δ | Δ | × |
| Polar polyol compatibility | Δ | ○ | × | Δ |
| Coating film crack resistance | ○ | ○ | Δ | × |

Example (1-1)-39

Synthesis of Hydrophilic Polyisocyanate Composition
The inside of a four-neck flask fitted with a stirrer, a thermometer, a reflux condenser and a nitrogen inlet tube was flushed with nitrogen and then charged with 20 g of the polyisocyanate composition P(1-1)-9 obtained in Example 41 and 8.6 g of a hydrophilic polyethylene oxide (product name: MPG-130, manufactured by Nippon Nyukazai Co., Ltd., number average molecular weight=420), and the temperature was then raised and held at 100° C. for 4 hours under constant stirring, thus obtaining a hydrophilic polyisocyanate. The viscosity of the obtained hydrophilic polyisocyanate composition was 49 mPa·s at 25° C., and the NCO content was 26.9% by mass.

Moreover, the degree of viscosity reduction was evaluated as o, the drying properties evaluation result was o, the substrate concealment evaluation result was ⊚, and the adhesion to a base coating film evaluation result was ⊚.

Example (1-1)-40, Comparative Examples (1-1)-17 and (1-1)-18

Synthesis of Hydrophilic Polyisocyanate Compositions

With the exceptions of adjusting the amount added of the MPG-130 and the type of polyisocyanate composition used in the manner recorded in Table (1-1)-6, preparation was performed in the same manner as Example (1-1)-39. Further, the viscosity, the degree of viscosity reduction, and the result of the water dispersibility evaluation for each of the obtained hydrophilic polyisocyanate compositions were recorded in Table (1-1)-6.

TABLE (1-1)-6

|  | Example (1-1)-39 | Example (1-1)-406 | Comparative Example (1-1)-17 | Comparative Example (1-1)-18 |
|---|---|---|---|---|
| Polyisocyanate composition | P(1-1)-17 | P(1-1)-20 | P(1-1)-21 | P(1-1)-24 |
| MPG-130 amount added [g] | 8.6 | 8.0 | 8.4 | 7.3 |
| Viscosity [mPa · s/25° C.] | 98 | 175 | 165 | 1120 |
| NCO % | 27.0% | 25.8% | 26.6% | 24.0% |
| Degree of viscosity reduction | ○ | Δ | Δ | × |
| Water dispersibility | Δ | ○ | × | Δ |

Example (1-1)-41

In this example, 0.03 g of 2,2,4-trimethylpentane was added to 300 g of the polyisocyanate composition P(1-1)-13 obtained in Example (1-1)-29.

Each evaluation result for this polyisocyanate composition was similar to that for Example (1-1)-29, and the storage stability evaluation result was favorable.

Example (1-1)-42

In this example, 0.03 g of hexadecane was added to 300 g of the polyisocyanate composition P(1-1)-13 obtained in Example (1-1)-29.

Each evaluation result for this polyisocyanate composition was similar to that for Example (1-1)-29, and the storage stability evaluation result was favorable.

Synthesis Example (1-1)-6

Synthesis of C(1-1)-5

The inside of a four-neck flask fitted with a stirrer, a thermometer, a reflux condenser and a nitrogen inlet tube was flushed with nitrogen and then charged with 20 g of NTI, the flask was then heated to 60° C., 7.7 g of methanol was added, and the temperature was maintained for 4 hours under constant stirring, thus obtaining an N-substituted carbamate ester C(1-1)-5.

Example (1-1)-43

In this example, 0.03 g of the N-substituted carbamate ester C(1-1)-5 was added to 300 g of the polyisocyanate composition P(1-1)-13 obtained in Example (1-1)-29.

Each evaluation result for this polyisocyanate composition was similar to that for Example (1-1)-29, and the storage stability evaluation result was favorable.

The above results confirmed that the polyisocyanate composition, blocked polyisocyanate composition or hydrophilic polyisocyanate composition of each example that applied the present invention had low viscosity, and also exhibited excellent compatibility with polar polyols, coating film crack resistance and water dispersibility.

The physical properties of the polyisocyanate compositions in Examples (1-1)-44 to (1-1)-58 and Comparative Examples (1-1)-19 to (1-1)-26 were measured using the methods described below. Unless specifically stated otherwise, "parts" and "%" mean "parts by mass" and "% by mass" respectively.

<Viscosity>
As described above.
<NCO Content>
As described above.
<Calculated NCO Content>
As described above.
<Theoretical Reaction Rate>
As described above.
<Polyisocyanate Composition Drying Properties Evaluation Method (2)>

An acrylic polyol (SETALUX 1753, a product name of Nuplex Resin Inc., resin fraction concentration: 70%, hydroxyl value: 138.6 mgKOH/g) was blended with each of the polyisocyanate compositions so as to achieve an isocyanate group/hydroxyl group equivalence ratio of 1.0, and butyl acetate was used to adjust the solid fraction to 40% by mass. Each of the thus prepared coating material compositions was applied to a glass plate in an amount sufficient to generate a dried film thickness of 40 μm, and the composition was then cured at 23° C. and 50% RH. After a prescribed period of time had elapsed, a cotton ball (a circular cylindrical shape of diameter: 2.5 cm and height: 2.0 cm) was placed on the coating film, and a 100 g weight was then placed on top of the cotton ball for 60 seconds. Subsequently, the weight and the cotton were removed, and the level of cotton traces that remained on the coating film was inspected. Cases where the time taken for absolutely no cotton traces to be visible was 7 hours or less were evaluated as ⊚, cases where the time was greater than 7 hours but not more than 8 hours were evaluated as o, cases where the time was greater than 8 hours but not more than 10 hours were evaluated as Δ, and cases where the time was longer than 10 hours were evaluated as x.

<Polyisocyanate Composition Coating Film Hardness Evaluation>

An acrylic polyol (SETALUX 1753, a product name of Nuplex Resin Inc., resin fraction concentration: 70%, hydroxyl value: 138.6 mgKOH/g) was blended with each of the polyisocyanate compositions so as to achieve an isocyanate group/hydroxyl group equivalence ratio of 1.0, and butyl acetate was used to adjust the solid fraction to 40% by mass. Each of the thus prepared coating material compositions was applied to a glass plate in an amount sufficient to generate a dried film thickness of 40 μm, and the composition was then cured for 15 minutes at 23° C. and 50% RH, and then for one hour at 120° C.

The coating film hardness of the cured coating film was measured using a pencil hardness tester (weight: 500 g, pencil hardness=HB, pencil angle: 45 degrees), and a relative evaluation was performed. The degree of scratching or marking was checked, and coating films having absolutely no blemishes were evaluated as ⊚, coating films having slight residual marks were evaluated as o, coating films on which scratches were visible, but those scratches did not reach the substrate were evaluated as Δ, and coating films in which scratches reached the substrate were evaluated as x.

<Blocked Polyisocyanate Composition Coating Film Hardness Evaluation>

An acrylic polyol (SETALUX 1753, a product name of Nuplex Resin Inc., resin fraction concentration: 70%, hydroxyl value: 138.6 mgKOH/g) was blended with each of the blocked polyisocyanate compositions so as to achieve an isocyanate group/hydroxyl group equivalence ratio of 1.0, and butyl acetate was used to adjust the solid fraction to 40% by mass. Each of the thus prepared coating material compositions was applied to a glass plate in an amount sufficient to generate a dried film thickness of 40 μm, and the composition was then cured at 150° C. for 30 minutes.

The coating film hardness of the cured coating film was measured using a pencil hardness tester (weight: 500 g, pencil hardness=HB, pencil angle: 45 degrees), and a relative evaluation was performed. The degree of scratching or marking was checked, and coating films having absolutely no blemishes were evaluated as ⊚, coating films having slight residual marks were evaluated as o, coating films on which scratches were visible, but those scratches did not reach the substrate were evaluated as Δ, and coating films in which scratches reached the substrate were evaluated as x.

<Hydrophilic Polyisocyanate Composition Drying Properties Evaluation Method>

As described above.

<Polyisocyanate Composition Coating Film Water Resistance Evaluation>

An acrylic polyol (SETALUX 1753, a product name of Nuplex Resin Inc., resin fraction concentration: 70%, hydroxyl value: 138.6 mgKOH/g) was blended with each of the blocked polyisocyanate compositions so as to achieve an isocyanate group/hydroxyl group equivalence ratio of 1.0, and butyl acetate was used to adjust the solid fraction to 40% by mass. Each of the thus prepared coating material compositions was applied to a glass plate in an amount sufficient to generate a dried film thickness of 40 μm, and the composition was then cured at 150° C. for 30 minutes. The cured coating film was immersed in water and left to stand for 3 days at room temperature, and the state of the coating film was then inspected visually. Coating films for which some form of coating film anomaly such as whitening or blistering (a state of bubble-like separation between the glass plate and the coating film) was observed across the entire surface were evaluated as x, coating films for which coating film anomalies were minor or only observed in localized areas were evaluated as Δ, and coating films for which absolutely no anomalies were observed were evaluated as o.

<Storage Stability Evaluation Method>

As described above.

Synthesis Example (1-1)-7

Synthesis of LTI

A four-neck flask fitted with a stirrer, a thermometer and a gas inlet tube was charged with 122.2 g of ethanolamine, 100 mL of o-dichlorobenzene and 420 mL of toluene, and ice-cooled hydrogen chloride gas was then introduced into the flask to convert the ethanolamine to a hydrochloride salt. Subsequently, 182.5 g of lysine hydrochloride was added, the reaction liquid was heated to 80° C. to dissolve the ethanolamine hydrochloride, and hydrogen chloride gas was then introduced to form lysine dihydrochloride. Additional hydrogen chloride gas was then passed through the reaction liquid at 20 to 30 mL/min., the reaction liquid was heated to 116° C., and this temperature was maintained until no more water distilled from the liquid. The thus produced reaction mixture was recrystallized from a mixed solution of methanol and ethanol, thus obtaining 165 g of lysine β-aminoethyl ester trihydrochloride. Subsequently, 100 g of this lysine β-aminoethyl ester trihydrochloride was converted to a fine powder and suspended in 1,200 mL of o-dichlorobenzene, the temperature of the reaction liquid was raised while the liquid was stirred, and when the temperature reached 120° C., phosgene was started to be blown into the flask at a rate of 0.4 mol/hr, blowing of the phosgene was continued for 10 hours, and the temperature was then raised to 150° C. The suspension almost completely dissolved. Following cooling, the reaction mixture was filtered, any dissolved phosgene and the solvent were removed by distillation under reduced pressure, and vacuum distillation was used to obtain 80.4 g of colorless and transparent LTI having a boiling point of 155 to 157° C. at 0.022 mmHg. The NCO content of this compound was 47.1% by weight.

Synthesis Example (1-1)-8

Synthesis of NTI

In a four-neck flask fitted with a stirrer, a thermometer and a gas inlet tube, 1,060 g of 4-aminomethyl-1,8-octamethyl-enediamine (hereafter sometimes referred to as "the triamine") was dissolved in 1,500 g of methanol, and 1,800 mL of a 35% concentrated hydrochloric acid solution was then added gradually to the flask in a dropwise manner under cooling. The reaction solution was concentrated by removing the methanol and water under reduced pressure, and the residue was then dried at 60° C. and 5 mmHg for 24 hours, yielding a triamine hydrochloride as a white solid. A 650 g sample of the obtained triamine hydrochloride was converted to a fine powder and suspended in 5,000 g of o-dichlorobenzene, the temperature of the reaction liquid was raised while the liquid was stirred, and when the temperature reached 100° C., phosgene was started to be blown into the flask at a rate of 200 g/hr, the temperature was further raised and then held at 180° C., and blowing of the phosgene was continued for 12 hours. Following removal of any dissolved phosgene and the solvent by distillation under reduced pressure, vacuum distillation was used to obtain 420 g of colorless and transparent 4-isocyanatomethyl-1,8-octamethylene diisocyanate (hereafter sometimes referred to as NTI) having a boiling point of 161 to 163° C. at 1.2 mmHg. The NCO content of this compound was 50.0% by weight.

Example (1-1)-44

Synthesis of P(1-1)-21

The inside of a four-neck flask fitted with a stirrer, a thermometer, a reflux condenser and a nitrogen inlet tube was flushed with nitrogen and then charged with 50 g of NTI as a monomer, and the temperature was then raised to 80° C. and held at that temperature for 2 hours. Subsequently, a solution prepared by dissolving 10 mg of an isocyanuration catalyst benzyltrimethylammonium caprate in 50 mg of isobutanol was added, an isocyanuration reaction was performed, and when the NCO % reached 47.7%, 26 mg of a 25% NTI solution of dibutyl phosphate was added to halt the reaction. The reaction liquid was then held at 120° C. for a further 15 minutes, thus obtaining a polyisocyanate composition P(1-1)-25. The theoretical reaction rate for the polyisocyanate composition P(1-1)-25 was 22.3%.

The results for the drying properties evaluation, the coating film hardness evaluation and the water resistance evaluation for the polyisocyanate composition P(1-1)-25 were recorded in Table (1-1)-7.

Examples (1-1)-45 to (1-1)-51, Comparative Examples (1-1)-19 to (1-1)-22

Synthesis of P(1-1)-26 to P(1-1)-37

With the exceptions of adjusting the monomer, the catalyst, the reaction terminator, the reaction temperature, and the NCO % at the point where the reaction was halted in the manner recorded in Table (1-1)-7, preparation was performed in the same manner as Example (1-1)-44. Further, the results for the drying properties evaluation, the theoretical reaction rate, the coating film hardness evaluation and the water resistance evaluation for each of the obtained polyisocyanate compositions were recorded in Table (1-1)-7.

TABLE (1-1)-7

| | Example (1-1)-44 | Example (1-1)-45 | Example (1-1)-46 | Example (1-1)-47 | Example (1-1)-48 | Example (1-1)-49 | Example (1-1)-50 | Example (1-1)-51 | Comparative Example (1-1)-19 | Comparative Example (1-1)-20 | Comparative Example (1-1)-21 | Comparative Example (1-1)-22 |
|---|---|---|---|---|---|---|---|---|---|---|---|---|
| | P(1-1)-26 | P(1-1)-27 | P(1-1)-28 | P(1-1)-29 | P(1-1)-30 | P(1-1)-31 | P(1-1)-32 | P(1-1)-33 | P(1-1)-34 | P(1-1)-35 | P(1-1)-36 | P(1-1)-37 |
| Reaction temperature | 80° C. | 80° C. | 80° C. | 80° C. | 80° C. | 80° C. | 80° C. | 80° C. | 90° C. | 90° C. | 90° C. | 80° C. |
| NTI | 50 g | 50 g | 50 g | 50 g | 50 g | | | | 50 g | 50 g | 50 g | |
| LTI | | | | | | 50 g | 50 g | 50 g | | | | 50 g |
| Catalyst | BTMA-A | BTMA-A | BTMA-A | TMA-A | BTMA-H | BTMA-A | BTMA-A | BTMA-A | BTMA-H | BTMA-H | BTMA-H | BTMA-A |
| (amount added) Dilution solvent (amount of solvent) | 10 mg i-BuOH 50 mg | 10 mg i-BuOH 50 mg | 10 mg i-BuOH 50 mg | 7.5 mg i-BuOH 50 mg | 5 mg MeOH 7.5 mg | 10 mg i-BuOH 50 mg | 10 mg i-BuOH 50 mg | 10 mg i-BuOH 50 mg | 25 mg MeOH 37.5 mg | 30 mg MeOH 45 mg | 24 mg MeOH 36 mg | 10 mg i-BuOH 50 mg |
| Dilution solvent (amount of solvent) | | | | | i-BuOH 50 mg | | | | PMA 385 mg | PMA 525 mg | PMA 420 mg | |
| Dilution solvent (amount of solvent) | | | | | PMA 87.5 mg | | | | | | | |
| Reaction terminator | DBP | DBP | DBP | phosphoric acid | DBP | DBP | DBP | DBP | D2EHP | D2EHP | D2EHP | DBP |
| (concentration) | 25% | 25% | 25% | 80% | 25% | 25% | 25% | 25% | 25% | 25% | 25% | 25% |
| (amount added) | 26 mg | 26 mg | 26 mg | 15 mg | 13 mg | 26 mg | 26 mg | 26 mg | 200 mg | 250 mg | 200 mg | 26 mg |
| Butyl acetate | 25 | 25 | 25 | 25 | 25 | 25 | 25 | 25 | 25 | 25 | 25 | 25 |
| Theoretical reaction rate | 100.0% | 105.0% | 110.0% | 110.0% | 110.0% | 100.0% | 105.0% | 110.0% | 48.0% | 60.0% | 90.0% | 69.5% |
| NCO % | 22.3% | 21.8% | 21.2% | 21.2% | 21.2% | 21.0% | 20.4% | 19.9% | 28.0% | 26.9% | 23.3% | 24.2% |
| Coating film hardness | Δ | ○ | ◎ | ◎ | ◎ | Δ | ○ | ◎ | × | × | × | × |
| Coating film drying properties | ○ | ○ | ◎ | ◎ | ◎ | ◎ | ◎ | ◎ | × | Δ | Δ | ○ |
| Coating film water resistance | ○ | ○ | ○ | ○ | ○ | ○ | ○ | ○ | × | × | Δ | × |

In the above Table (1-1)-7, the catalysts and reaction terminators recorded using abbreviations refer to the materials listed below.

BTMA-H: benzyltrimethylammonium hydroxide
BTMA-A: benzyltrimethylammonium caprate
TMA-A: tetramethylammonium caprate
DBP: dibutyl phosphate
D2EHP: di(2-ethylhexyl) phosphate

Example (1-1)-52

Synthesis of Blocked Polyisocyanate Composition

The inside of a four-neck flask fitted with a stirrer, a thermometer, a reflux condenser and a nitrogen inlet tube was flushed with nitrogen and then charged with 30 g of the polyisocyanate composition P(1-1)-30 obtained in Example (1-1)-48 and 25 g of butyl acetate, and the temperature was then raised to 70° C. Subsequently, 15 g of 3,5-dimethylpyrazole was added under constant stirring, and continued stirring for one hour with the temperature maintained at 70° C. resulted in an NCO content of 0.0% and yielded a blocked polyisocyanate composition. The calculated NCO content of the obtained blocked polyisocyanate composition was 9.1% by mass.

The coating film hardness and the result of the water resistance evaluation for the obtained blocked polyisocyanate composition were recorded in Table (1-1)-8.

Example (1-1)-53, Comparative Examples (1-1)-23 and (1-1)-24

Synthesis of Blocked Polyisocyanate Compositions

With the exceptions of adjusting the amount added of the 3,5-dimethylpyrazole, the amount added of the butyl acetate, and the type of polyisocyanate composition used in the manner recorded in Table (1-1)-8, preparation was performed in the same manner as Example (1-1)-52. Further, the coating film hardness and the result of the water resistance evaluation for each of the obtained blocked polyisocyanate compositions were recorded in Table (1-1)-8.

TABLE (1-1)-8

|  | Example (1-1)-52 | Example (1-1)-53 | Comparative Example (1-1)-23 | Comparative Example (1-1)-24 |
| --- | --- | --- | --- | --- |
| Polyisocyanate composition (amount used [g]) | P(1-1)-30 (30) | P(1-1)-33 (30) | P(1-1)-34 (30) | P(1-1)-37 (30) |
| 3,5-dimethylpyrazole amount added [g] | 15.0 | 14.0 | 19.8 | 17.1 |
| Butyl acetate amount added [g] | 25.0 | 24.0 | 29.8 | 27.1 |
| NCO % | 9.1 | 8.8 | 10.6 | 9.8 |
| Coating film hardness | Δ | ○ | × | × |
| Coating film water resistance | ○ | ○ | Δ | × |

Example (1-1)-54

Synthesis of Hydrophilic Polyisocyanate Composition

The inside of a four-neck flask fitted with a stirrer, a thermometer, a reflux condenser and a nitrogen inlet tube was flushed with nitrogen and then charged with 30 g of the polyisocyanate composition P(1-1)-30 obtained in Example (1-1)-48 and 9.6 g of a hydrophilic polyethylene oxide (product name: MPG-130, manufactured by Nippon Nyukazai Co., Ltd., number average molecular weight=420), and the temperature was then raised and held at 100° C. for 4 hours under constant stirring, thus obtaining a hydrophilic polyisocyanate. The NCO content of the obtained hydrophilic polyisocyanate composition was 12.9% by mass.

The results of the drying properties evaluation, the coating film hardness evaluation and the water resistance evaluation for the obtained polyisocyanate composition were recorded in Table (1-1)-9.

Example (1-1)-55, Comparative Examples (1-1)-25 and (1-1)-26

Synthesis of Hydrophilic Polyisocyanate Compositions

With the exceptions of adjusting the amount added of the MPG-130 and the type of polyisocyanate composition used in the manner recorded in Table (1-1)-9, preparation was performed in the same manner as Example (1-1)-54. Further, the results of the drying properties evaluation, the coating film hardness evaluation and the water resistance evaluation for each of the obtained hydrophilic polyisocyanate compositions were recorded in Table (1-1)-9.

TABLE (1-1)-9

|  | Example (1-1)-54 | Example (1-1)-55 | Comparative Example (1-1)-25 | Comparative Example (1-1)-26 |
| --- | --- | --- | --- | --- |
| Polyisocyanate composition | P(1-1)-30 (30) | P(1-1)-33 (30) | P(1-1)-34 (30) | P(1-1)-37 (30) |
| MPG-130 Amount added [g] | 9.6 | 8.9 | 8.4 | 7.3 |
| Butyl acetate [g] | 9.7 | 9.3 | 8.9 | 8.2 |
| NCO % | 12.9% | 12.4% | 17.7% | 16.0% |
| Coating film hardness | Δ | ○ | × | × |
| Coating film drying properties | ○ | ○ | × | Δ |
| Coating film water resistance | ○ | ○ | × | × |

Example (1-1)-56

In this example, 0.03 g of 2,2,4-trimethylpentane was added to 300 g of the polyisocyanate composition P(1-1)-26 obtained in Example (1-1)-44.

Each evaluation result for this polyisocyanate composition was similar to that for Example (1-1)-30, and the storage stability evaluation result was favorable.

Example (1-1)-57

In this example, 0.03 g of hexadecane was added to 300 g of the polyisocyanate composition P(1-1)-26 obtained in Example (1-1)-44.

Each evaluation result for this polyisocyanate composition was similar to that for Example (1-1)-44, and the storage stability evaluation result was favorable.

Synthesis Example (1-1)-9

Synthesis of C(1-1)-6

The inside of a four-neck flask fitted with a stirrer, a thermometer, a reflux condenser and a nitrogen inlet tube was flushed with nitrogen and then charged with 20 g of NTI, the flask was then heated to 60° C., 7.7 g of methanol was added, and the temperature was maintained for 4 hours under constant stirring, thus obtaining an N-substituted carbamate ester C(1-1)-6.

Example (1-1)-58

In this example, 0.03 g of the N-substituted carbamate ester C(1-1)-6 was added to 300 g of the polyisocyanate composition P(1-1)-26 obtained in Example (1-1)-44.

Each evaluation result for this polyisocyanate composition was similar to that for Example (1-1)-44, and the storage stability evaluation result was favorable.

The above results confirmed that the polyisocyanate composition, blocked polyisocyanate composition or hydrophilic polyisocyanate composition of each example that applied the present invention exhibited excellent drying properties, superior coating film hardness, and excellent water resistance.

The physical properties of the polyisocyanate compositions in Examples (1-1)-59 to (1-1)-68 and Comparative Examples (1-1)-27 to (1-1)-29 were measured using the methods described below. Unless specifically stated otherwise, "parts" and "%" mean "parts by mass" and "% by mass" respectively.

<NCO Content>

As described above.

<Conversion ratio, Polyisocyanate Compound Ratio, Trimer Ratio>

The conversion ratio was determined from the polystyrene-equivalent number average molecular weight obtained by GPC measurement using the apparatus described below, and was deemed to be the surface area proportion of peaks having a larger number average molecular weight than the unreacted triisocyanate. The polyisocyanate ratio was determined from the polystyrene-equivalent number average molecular weight obtained by GPC measurement using the apparatus described below, and was deemed to be the surface area proportion of peaks having a larger number average molecular weight than the triisocyanate (in those cases where the raw material monomer is not removed from the polyisocyanate composition following reaction, the conversion ratio=the polyisocyanate ratio).

The trimer ratio was also determined from the polystyrene-equivalent number average molecular weight obtained by GPC measurement using the apparatus described below, and was deemed to be the surface area proportion of the polyisocyanate peak corresponding with the triisocyanate trimer.

Apparatus: HLC-8320GPC (product name), manufactured by Tosoh Corporation Columns: 1×TSKgel Super H1000 column (product name), 1×TSKgel Super H2000 column (product name), and 1×TSKgel Super H3000 column (product name), all manufactured by Tosoh Corporation Carrier: tetrahydrofuran
Detection method: refractive index detector
Sample concentration: 5 wt/vol %
Elution rate: 0.6 mL/min
Column temperature: 30° C.
Analysis software: EcoSEC-WS version 1.06, from Tosoh Corporation (Analysis Conditions)
Detection sensitivity: 3.0 mV/min
Base threshold: 0.1 mV/min
Exclusion area: 10 mV x sec
Exclusion height: 0 mV
Exclusion half width: 0 sec <Polyisocyanate Composition Drying Properties Evaluation Method (2)>

As described above.

<Polyisocyanate Composition Adhesion to Base Coating Film Evaluation Method>

An acrylic polyol (resin solid fraction concentration: 55%, hydroxyl value: 30 mgKOH/g resin) was applied to a soft steel sheet in an amount sufficient to generate a resin film thickness of 40 μm, and following standing for 30 minutes at room temperature, a coating material composition, prepared by blending an acrylic polyol (SETALUX 1903, a product name of Nuplex Resin Inc., resin fraction concentration: 75%, hydroxyl value: 150 mgKOH/g resin) with any of various (blocked) polyisocyanate compositions so as to achieve an isocyanate group/hydroxyl group equivalence ratio of 1.0 and then using butyl acetate to adjust the coating material viscosity to a value of 20 seconds for a Ford cup No. 4, was applied to the above resin film in an amount sufficient to generate a resin film thickness of 30 μm. Following standing for 15 minutes at room temperature, the coating film was cured in an oven at 140° C. for 30 minutes.

The thus obtained coating film sample was subjected to a cycle test (30 cycles) in which one cycle was represented by [60° C./90%/12 hours↔10° C./25%/12 hours], and following this cycle test, an adhesion test of the coating film was performed in accordance with JIS K5600-5-6. Cases where no peeling of the coating film occurred were recorded as ⊚, cases where coating film peeling was less than half were recorded as o, cases where coating film peeling was half or more were recorded as x.

<Storage Stability Evaluation Method>

As described above.

Synthesis Example (1-1)-10

Synthesis of NTI

In a four-neck flask fitted with a stirrer, a thermometer and a gas inlet tube, 1,530 g of 4-aminomethyl-1,8-octamethyl-enediamine (hereafter referred to as "the triamine") was dissolved in 2,250 g of methanol, and 2,700 mL of a 35% concentrated hydrochloric acid solution was then added gradually to the flask in a dropwise manner under cooling.

The reaction solution was concentrated by removing the methanol and water under reduced pressure, and the residue was then dried at 60° C. and 5 mmHg for 24 hours, yielding a triamine hydrochloride as a white solid. A 975 g sample of the obtained triamine hydrochloride was converted to a fine powder and suspended in 7,500 g of o-dichlorobenzene, the temperature of the reaction liquid was raised while the liquid was stirred, and when the temperature reached 100° C., phosgene was started to be blown into the flask at a rate of 300 g/hr, the temperature was further raised and then held at 180° C., and blowing of the phosgene was continued for 12 hours. Following removal of any dissolved phosgene and the solvent by distillation under reduced pressure, vacuum distillation was used to obtain 630 g of colorless and transparent 4-isocyanatomethyl-1,8-octamethylene diisocyanate (hereafter referred to as NTI) having a boiling point of 161 to 163° C. at 1.2 mmHg. The NCO content of this compound was 50.0% by weight.

Example (1-1)-59

Synthesis of P(1-1)-38

The inside of a four-neck flask fitted with a stirrer, a thermometer, a reflux condenser and a nitrogen inlet tube was flushed with nitrogen and then charged with 500 g of NTI as a monomer and 0.5 g of isobutanol, and the temperature was then raised to 80° C. and held at that temperature for 2 hours. Subsequently, 50 mg of an isocyanuration catalyst of benzyltrimethylammonium hydroxide was added, the isocyanuration reaction was allowed to proceed, and when the yield reached 3%, dibutyl phosphate was added and the reaction liquid was held at 120° C. for 15 minutes to halt the reaction. The NCO content of the reaction liquid upon halting the reaction was 48.8%. A thin film distillation device was then used to remove unreacted NTI from the reaction liquid, yielding a polyisocyanate P(1-1)-38. The physical properties (NCO content, functional value, polyisocyanate ratio, trimer ratio) of the obtained polyisocyanate P(1-1)-38, and the results of the drying properties evaluation and the adhesion to base coating film evaluation for the polyisocyanate composition were recorded in Table (1-1)-10.

Examples (1-1)-60 to (1-1)-65

With the exceptions of adjusting the monomer, the initiator, the reaction terminator, and the conversion ratio as recorded in Table (1-1)-10, preparation was performed in the same manner as Example (1-1)-59. Further, the physical properties (NCO content, functional value, polyisocyanate ratio, trimer ratio) of the obtained polyisocyanate compositions, and the results of the drying properties evaluation and adhesion to base coating film evaluation for each polyisocyanate composition were recorded in Table (1-1)-10.

Comparative Example (1-1)-27

The inside of a four-neck flask fitted with a stirrer, a thermometer, a reflux condenser and a nitrogen inlet tube was flushed with nitrogen and then charged with 500 g of NTI as a monomer and 0.5 g of isobutanol, and the temperature was then raised to 80° C. and held at that temperature for 2 hours. Subsequently, 50 mg of an isocyanuration catalyst of benzyltrimethylammonium hydroxide was added, the isocyanuration reaction was allowed to proceed, and when the yield reached 38.5%, dibutyl phosphate was added and the reaction liquid was held at 120° C. for 15 minutes to halt the reaction. A polyisocyanate P(1-1)-45 was obtained. The NCO content of the polyisocyanate P(1-1)-45 was 48.8%. The physical properties (NCO content, functional value, polyisocyanate ratio, trimer ratio) of the obtained polyisocyanate P(1-1)-45, and the results of the drying properties evaluation and the adhesion to base coating film evaluation for the polyisocyanate composition were recorded in Table (1-1)-10.

Comparative Example (1-1)-27

The inside of a four-neck flask fitted with a stirrer, a thermometer, a reflux condenser and a nitrogen inlet tube was flushed with nitrogen and then charged with 500 g of HDI as a monomer and 0.5 g of isobutanol, and the temperature was then raised to 80° C. and held at that temperature for 2 hours. Subsequently, 50 mg of an isocyanuration catalyst of benzyltrimethylammonium hydroxide was added, the isocyanuration reaction was allowed to proceed, and when the yield reached 40%, dibutyl phosphate was added and the reaction liquid was held at 120° C. for 15 minutes to halt the reaction. A polyisocyanate P(1-1)-46 was obtained. The NCO content of the polyisocyanate P(1-1)-46 was 42.4%. The physical properties (NCO content, functional value, polyisocyanate ratio, trimer ratio) of the obtained polyisocyanate P(1-1)-46, and the results of the drying properties evaluation and the adhesion to base coating film evaluation for the polyisocyanate composition were recorded in Table (1-1)-10.

Comparative Example (1-1)-29

The reaction liquid obtained in Comparative Example (1-1)-28 was fed into a thin film evaporator, and the unreacted HDI was removed to obtain a polyisocyanate composition P(1-1)-47. The NCO content of the obtained polyisocyanate P(1-1)-47 was 23.0% by mass.

Moreover, the physical properties (NCO content, functional value, polyisocyanate ratio, trimer ratio) of the polyisocyanate P(1-1)-47, and the results of the drying properties evaluation and the adhesion to base coating film evaluation for the polyisocyanate composition were recorded in Table (1-1)-10.

TABLE (1-1)-10

| | Example (1-1)-59 | Example (1-1)-60 | Example (1-1)-61 | Example (1-1)-62 | Example (1-1)-63 | Example (1-1)-64 | Example (1-1)-65 | Comparative Example (1-1)-27 | Comparative Example (1-1)-28 | Comparative Example (1-1)-29 |
|---|---|---|---|---|---|---|---|---|---|---|
| Polyisocyanate composition | P(1-1)-38 | P(1-1)-39 | P(1-1)-40 | P(1-1)-41 | P(1-1)-42 | P(1-1)-43 | P(1-1)-44 | P(1-1)-45 | P(1-1)-46 | P(1-1)-47 |
| Monomer | NTI | NTI | NTI | NTI | NTI | NTI | NTI | NTI | HDI | Unreacted HDI removed from |
| Catalyst | BTMA-H | BTMA-A | TMA-A | BTMA-A | BTMA-A | BTMA-A | BTMA-A | BTMA-A | BTMA-A | |
| Reaction terminator | DBP | DBP | phosphoric acid | DBP | DBP | DBP | DBP | DBP | DBP | |

TABLE (1-1)-10-continued

| | | Example (1-1)-59 | Example (1-1)-60 | Example (1-1)-61 | Example (1-1)-62 | Example (1-1)-63 | Example (1-1)-64 | Example (1-1)-65 | Comparative Example (1-1)-27 | Comparative Example (1-1)-28 | Comparative Example (1-1)-29 |
|---|---|---|---|---|---|---|---|---|---|---|---|
| Reaction temperature [° C.] | | 80 | 80 | 80 | 80 | 80 | 80 | 80 | 80 | 80 | P(1-1)-41 |
| Conversion ratio [%] | | 3 | 15 | 15 | 23 | 29 | 38 | 43 | 38.5 | 40 | |
| NCO content when reaction halted [% by mass] | | 48.8 | 47.7 | 47.7 | 46.7 | 45.8 | 44.1 | 43.6 | 44.0 | 43.1 | |
| Polyisocyanate physical properties | NCO content [% by mass] | 32.9 | 31.8 | 31.7 | 31.5 | 31.2 | 30.8 | 30.7 | 44.0 | 42.4 | 23.0 |
| | Functional value | 6.3 | 6.9 | 6.9 | 7.3 | 7.6 | 8.0 | 8.3 | 3.9 | 2.6 | 3.4 |
| | Polyisocyanate ratio (A/(A + B)) [area ratio] | 0.9998 | 0.9998 | 0.9997 | 0.9998 | 0.9997 | 0.912 | 0.904 | 0.385 | 0.429 | 0.9998 |
| | Trimer ratio (C/(A + B)) [area ratio] | 0.816 | 0.597 | 0.586 | 0.531 | 0.475 | 0.391 | 0.361 | 0.163 | 0.283 | 0.660 |
| Drying properties evaluation | | ○ | ○ | ○ | ○ | ○ | ○ | ○ | ○ | × | × |
| Adhesion to base coating film evaluation | | Δ | ○ | ○ | ◎ | ◎ | ◎ | ◎ | × | × | × |

In the above Table (1-1)-10, the various materials recorded using abbreviations refer to the materials listed below.
BTMA-H: benzyltrimethylammonium hydroxide
BTMA-A: benzyltrimethylammonium caprate
TMA-A: tetramethylammonium caprate
DBP: dibutyl phosphate Example (1-1)-66

In this example, 0.03 g of 2,2,4-trimethylpentane was added to 300 g of the polyisocyanate composition P(1-1)-38 obtained in Example (1-1)-59.

Each evaluation result for this polyisocyanate composition was similar to that for Example (1-1)-59, and the storage stability evaluation result was favorable.

Example (1-1)-67

In this example, 0.03 g of hexadecane was added to 300 g of the polyisocyanate composition P(1-1)-38 obtained in Example (1-1)-59.

Each evaluation result for this polyisocyanate composition was similar to that for Example (1-1)-59, and the storage stability evaluation result was favorable.

Synthesis Example (1-1)-11

The inside of a four-neck flask fitted with a stirrer, a thermometer, a reflux condenser and a nitrogen inlet tube was flushed with nitrogen and then charged with 20 g of NTI, the flask was then heated to 60° C., 7.7 g of methanol was added, and the temperature was maintained for 4 hours under constant stirring, thus obtaining an N-substituted carbamate ester C(1-1)-7.

Example (1-1)-68

In this example, 0.03 g of the N-substituted carbamate ester C(1-1)-7 was added to 300 g of the polyisocyanate composition P(1-1)-38 obtained in Example (1-1)-59.

Each evaluation result for this polyisocyanate composition was similar to that for Example (1-1)-59, and the storage stability evaluation result was favorable.

The physical properties of the polyisocyanate compositions in Examples (1-2)-1 to (1-2)-21 and Comparative Examples (1-2)-1 to (1-2)-15 were measured using the methods described below. Unless specifically stated otherwise, "parts" and "%" mean "parts by mass" and "% by mass" respectively.

<Viscosity>
As described above.
<NCO Content>
As described above.
<Calculated NCO Content>
As described above.
<Conversion Ratio>
As described above.
<Method for Measuring Molar Ratio between Isocyanurate Structures and Allophanate Structures>

The isocyanurate structures and allophanate structure in the polyisocyanate compositions were determined by the method described below.

A Biospin Avance 600 (product name) manufactured by Bruker Corporation was used to conduct $^{13}$C-NMR measurements, and the molar ratio between isocyanurate structures and allophanate structures was determined. In terms of the peak positions for the various functional groups and structures, the values for NTI were recorded, but because the peak positions changed depending on the triisocyanate, these positions were corrected as appropriate using a standard substance or the like.

Specific measurement conditions were as follows.
$^{13}$C-NMR apparatus: AVANCE 600 (manufactured by Bruker Corporation)
CryoProbe CPDUL 600S3-C/H-D-05Z (manufactured by Bruker Corporation)
Resonance frequency: 150 MHz
Concentration: 60 wt/vol %
Shift reference: CDCl$_3$ (77 ppm)
Accumulation number: 10,000

Pulse program: zgpg 30 (proton perfect decoupling methods, waiting time: 2 sec)

The signal integral values described below were divided by the number of measured carbons, and the resulting values were used to determine the various molar ratios.

Isocyanurate structure: near 148.6 ppm: integral value÷3
Allophanate structure: near 154 ppm: integral value÷1

Subsequently, based on these obtained molar ratios for the isocyanurate structure and the allophanate structure, the molar ratio between isocyanurate structures and allophanate structures was determined.

<Polyisocyanate Composition Degree of Viscosity Reduction (3)>

Using the viscosity measurement results for the polyisocyanate mixtures, values of 250 mPa·s or less at 25° C. were evaluated as o, values exceeding 250 mPa·s at 25° C. but not higher than 2,000 mPa·s at 25° C. were evaluated as Δ, and values exceeding 2,000 mPa·s at 25° C. were evaluated as x.

<Polyisocyanate Composition Silicate Compatibility Evaluation Method>

First, 5 g of the polyisocyanate composition, 1 g of a silicate compound MKC Silicate MS58B30 (product name, a butyl-modified methyl silicate condensation product, manufactured by Mitsubishi Chemical Corporation) and 4 g of butyl acetate were blended together, and following thorough mixing, the mixture was left to stand for 2 hours in an environment at 23° C. Following this standing period, a clear mixture was evaluated as o, very slight turbidity was evaluated as Δ, and a mixture having obvious turbidity or sediment or the like was evaluated as x.

<Polyisocyanate Composition Drying Properties Evaluation Method (1)>

As described above.

<Evaluation Method for Recoat Adhesion of Coating Film from Coating Material Composition Using Polyisocyanate Composition>

On a soft steel sheet, an acrylic polyol (resin solid fraction concentration: 55%, hydroxyl value: 30 mgKOH/g resin) and the polyisocyanate composition were blended together so as to achieve an equivalence ratio between the hydroxyl groups and isocyanate groups of 1:1, and butyl acetate was then used to adjust the coating material viscosity to a value of 20 seconds for a Ford cup No. 4, thus completing preparation of a coating material composition. Subsequently, the prepared coating material composition was applied in an amount sufficient to generate a resin film thickness of 30 μm. The coating film was then left to stand for 72 hours at 23° C. and a humidity of 50%. An adhesion test of the coating film was performed in accordance with JIS K5600-5-6. Cases where no coating film peeling occurred were evaluated as ⊚, cases where some lifting of cut portions occurred were evaluated as o, cases where peeling occurred but was not more than half were evaluated as Δ, and cases where at least half of the coating film peeled were evaluated as x.

<Test and Evaluation Method for Scratch Resistance of Coating Film from Coating Material Composition Using Polyisocyanate Composition>

An acrylic polyol (SETALUX 1753, a product name of Nuplex Resin Inc., resin fraction concentration: 70%, hydroxyl value: 138.6 mgKOH/g) was blended with each of the polyisocyanate compositions so as to achieve an isocyanate group/hydroxyl group equivalence ratio of 1.0, and butyl acetate was used to adjust the solid fraction to 50% by mass, thus completing preparation of a series of coating material compositions. Each of the prepared coating material compositions was applied to a glass plate in an amount sufficient to generate a dried film thickness of 40 μm, and the composition was then cured at 100° C. for 30 minutes to obtain a coating film. A scratch resistance test of the obtained coating film was performed using a rubbing tester (manufactured by Taihei Rika Kogyo Co., Ltd.) and the method described below.

First, the 20° gloss of the coating surface was measured. An abrasive was prepared by mixing a cleanser (product name: Maruzen Cleanser, manufactured by Maruzen Cleanser Co., Ltd.) and water in a ratio of 3:2. About 1 g of this abrasive was placed on a rubbing sponge, and the sponge was rubbed 20 times back and forth across the coating film of the test piece with a load of 200 g.

Subsequently, the coating surface was washed with running water and left to dry naturally, and the 20° gloss of the coating surface was then re-measured. The 20° gloss retention ratio was calculated using the following formula, and that value was used to evaluate the scratch resistance.

20° gloss retention ratio=(20° gloss after test/20° gloss before test)×100

A 20° gloss retention ratio of 90% or higher was evaluated as ⊚, a retention ratio of at least 80% but less than 90% was evaluated as o, a retention ratio of at least 50% but less than 80% was evaluated as Δ, and a retention ratio of less than 50% was evaluated as x.

<Blocked Polyisocyanate Composition Degree of Viscosity Reduction (1)>

As described above.

<Test and Evaluation Method for Scratch Resistance of Coating Film from Coating Material Composition Using Blocked Polyisocyanate Composition>

An acrylic polyol (SETALUX 1753, a product name of Nuplex Resin Inc., resin fraction concentration: 70%, hydroxyl value: 138.6 mgKOH/g) was blended with each of the blocked polyisocyanate compositions so as to achieve an isocyanate group/hydroxyl group equivalence ratio of 1.0, and butyl acetate was used to adjust the solid fraction to 50% by mass, thus completing preparation of a series of coating material compositions. Each of the prepared coating material compositions was applied to a glass plate in an amount sufficient to generate a dried film thickness of 40 μm, and the composition was then cured at 140° C. for 30 minutes to obtain a coating film. A scratch resistance test of the obtained coating film was performed using a rubbing tester (manufactured by Taihei Rika Kogyo Co., Ltd.) and the method described below.

First, the 20° gloss of the coating surface was measured. An abrasive was prepared by mixing a cleanser (product name: Maruzen Cleanser, manufactured by Maruzen Cleanser Co., Ltd.) and water in a ratio of 3:2. About 1 g of this abrasive was placed on a rubbing sponge, and the sponge was rubbed 20 times back and forth across the coating film of the test piece with a load of 200 g.

Subsequently, the coating surface was washed with running water and left to dry naturally, and the 20° gloss of the coating surface was then re-measured. The 20° gloss retention ratio was calculated using the following formula, and that value was used to evaluate the scratch resistance.

20° gloss retention ratio=(20° gloss after test/20° gloss before test)×100

A 20° gloss retention ratio of 90% or higher was evaluated as ⊚, a retention ratio of at least 80% but less than 90% was evaluated as o, a retention ratio of at least 50% but less than 80% was evaluated as Δ, and a retention ratio of less than 50% was evaluated as x.

<Test and Evaluation Method for Scratch Resistance of Coating Film from Coating Material Composition Using Hydrophilic Polyisocyanate Composition>

An acrylic polyol (SETALUX 1753, a product name of Nuplex Resin Inc., resin fraction concentration: 70%, hydroxyl value: 138.6 mgKOH/g) was blended with each of the hydrophilic polyisocyanate compositions so as to achieve an isocyanate group/hydroxyl group equivalence ratio of 1.0, and butyl acetate was used to adjust the solid fraction to 50% by mass, thus completing preparation of a series of coating material compositions. Each of the prepared coating material compositions was applied to a glass plate in an amount sufficient to generate a dried film thickness of 40 μm, and the composition was then cured at 100° C. for 30 minutes to obtain a coating film. A scratch resistance test of the obtained coating film was performed using a rubbing tester (manufactured by Taihei Rika Kogyo Co., Ltd.) and the method described below.

First, the 20° gloss of the coating surface was measured. An abrasive was prepared by mixing a cleanser (product name: Maruzen Cleanser, manufactured by Maruzen Cleanser Co., Ltd.) and water in a ratio of 3:2. About 1 g of this abrasive was placed on a rubbing sponge, and the sponge was rubbed 20 times back and forth across the coating film of the test piece with a load of 200 g.

Subsequently, the coating surface was washed with running water and left to dry naturally, and the 20° gloss of the coating surface was then re-measured. The 20° gloss retention ratio was calculated using the following formula, and that value was used to evaluate the scratch resistance.

20° gloss retention ratio=(20° gloss after test/20° gloss before test)×100

A 20° gloss retention ratio of 90% or higher was evaluated as ⊚, a retention ratio of at least 80% but less than 90% was evaluated as o, a retention ratio of at least 50% but less than 80% was evaluated as Δ, and a retention ratio of less than 50% was evaluated as x.

<Storage Stability Evaluation Method>

As described above.

Synthesis Example (1-2)-1

Synthesis of LTI

A four-neck flask fitted with a stirrer, a thermometer and a gas inlet tube was charged with 122.2 g of ethanolamine, 100 mL of o-dichlorobenzene and 420 mL of toluene, and ice-cooled hydrogen chloride gas was then introduced into the flask to convert the ethanolamine to a hydrochloride salt. Subsequently, 182.5 g of lysine hydrochloride was added, the reaction liquid was heated to 80° C. to dissolve the ethanolamine hydrochloride, and hydrogen chloride gas was then introduced to form lysine dihydrochloride. Additional hydrogen chloride gas was then passed through the reaction liquid at 20 to 30 mL/min., the reaction liquid was heated to 116° C., and this temperature was maintained until no more water distilled from the liquid. The thus produced reaction mixture was recrystallized from a mixed solution of methanol and ethanol, thus obtaining 165 g of lysine β-aminoethyl ester trihydrochloride. Subsequently, 100 g of this lysine β-aminoethyl ester trihydrochloride was converted to a fine powder and suspended in 1,200 mL of o-dichlorobenzene, the temperature of the reaction liquid was raised while the liquid was stirred, and when the temperature reached 120° C., phosgene was started to be blown into the flask at a rate of 0.4 mol/hr, blowing of the phosgene was continued for 10 hours, and the temperature was then raised to 150° C. The suspension almost completely dissolved. Following cooling, the reaction mixture was filtered, any dissolved phosgene and the solvent were removed by distillation under reduced pressure, and vacuum distillation was used to obtain 80.4 g of colorless and transparent LTI having a boiling point of 155 to 157° C. at 0.022 mmHg. The NCO content of this compound was 47.1% by weight.

Synthesis Example (1-2)-2

Synthesis of GTI

A four-neck flask fitted with a stirrer, a thermometer and a gas inlet tube was charged with 275 g of glutamic acid hydrochloride, 800 g of ethanolamine hydrochloride and 150 ml of toluene, and with hydrogen chloride gas being blown into the flask, the reaction mixture was refluxed under heating at 110° C. for 24 hours until the azeotropic distillation of water stopped. The reaction mixture was recrystallized from a mixed solution of methanol and ethanol, thus obtaining 270 g of bis(2-aminoethyl)glutamate trihydrochloride. Next, 85 g of this bis(2-aminoethyl)glutamate trihydrochloride was suspended in 680 g of o-dichlorobenzene, the temperature of the reaction liquid was raised while the liquid was stirred, and when the temperature reached 135° C., phosgene was started to be blown into the flask at a rate of 0.8 mol/hr, blowing of the phosgene was continued for 13 hours, and the reaction product was then filtered, concentrated under reduced pressure, and then purified using a thin film evaporator, yielding 54 g of GTI. The NCO content was 39.8% by weight.

Synthesis Example (1-2)-3

Synthesis of NTI

In a four-neck flask fitted with a stirrer, a thermometer and a gas inlet tube, 1,060 g of 4-aminomethyl-1,8-octamethylenediamine (hereafter sometimes referred to as "the triamine") was dissolved in 1,500 g of methanol, and 1,800 mL of a 35% concentrated hydrochloric acid solution was then added gradually to the flask in a dropwise manner under cooling. The reaction solution was concentrated by removing the methanol and water under reduced pressure, and the residue was then dried at 60° C. and 5 mmHg for 24 hours, yielding a triamine hydrochloride as a white solid. A 650 g sample of the obtained triamine hydrochloride was converted to a fine powder and suspended in 5,000 g of o-dichlorobenzene, the temperature of the reaction liquid was raised while the liquid was stirred, and when the temperature reached 100° C., phosgene was started to be blown into the flask at a rate of 200 g/hr, the temperature was further raised and then held at 180° C., and blowing of the phosgene was continued for 12 hours. Following removal of any dissolved phosgene and the solvent by distillation under reduced pressure, vacuum distillation was used to obtain 420 g of colorless and transparent 4-isocyanatomethyl-1,8-octamethylene diisocyanate (hereafter sometimes referred to as NTI) having a boiling point of 161 to 163° C. at 1.2 mmHg. The NCO content of this compound was 50.0% by weight.

Example (1-2)-1

Synthesis of P(1-2)-1

The inside of a four-neck flask fitted with a stirrer, a thermometer, a reflux condenser and a nitrogen inlet tube was flushed with nitrogen and then charged with 100 g of NTI as a monomer and 0.2 g of methanol, and the temperature was then raised to 80° C. and held at that temperature for 2 hours. Subsequently, 0.01 g of an isocyanuration catalyst of benzyltrimethylammonium hydroxide was added, the isocyanuration reaction was allowed to proceed, and when the yield conversion ratio reached 50%, dibutyl phosphate was added to halt the reaction. The reaction liquid was held at 120° C. for a further 15 minutes, thus obtaining a polyisocyanate composition P(1-2)-1. The viscosity of the polyisocyanate P(1-2)-1 was 110 mPa·s at 25° C., and the NCO content was 41.0% by mass.

The degree of viscosity reduction for the polyisocyanate composition P(1-2)-1 was evaluated as o, the silicate compatibility was evaluated as Δ, the drying properties were evaluated as o, the recoat adhesion was evaluated as ⊚, and the scratch resistance was evaluated as o. These results were recorded in Table (1-2)-1.

Examples (1-2)-2 to (1-2)-6, Comparative Examples (1-2)-1 to (1-2)-5

Synthesis of P(1-1)-2 to P(1-2)-6, and S(1-2)-1 to S(1-2)-5

With the exceptions of adjusting the monomer, the catalyst, the reaction terminator, the reaction temperature, and the conversion ratio as recorded in Table (1-2)-1, preparation was performed in the same manner as Example (1-2)-1.

Further, the viscosity, the NCO content, and the evaluation results for the degree of viscosity reduction, the silicate compatibility, the drying properties, the recoat adhesion, and the scratch resistance for each of the obtained polyisocyanate compositions were recorded in Table (1-2)-1.

TABLE (1-2)-1

| | | Example (1-2)-1 | Example (1-2)-2 | Example (1-2)-3 | Example (1-2)-4 | Example (1-2)-5 | Example (1-2)-6 | Comparative Example (1-2)-1 | Comparative Example (1-2)-2 | Comparative Example (1-2)-3 | Comparative Example (1-2)-4 | Comparative Example (1-2)-5 |
|---|---|---|---|---|---|---|---|---|---|---|---|---|
| Polyisocyanate composition | | P(1-2)-1 | P(1-2)-2 | P(1-2)-3 | P(1-2)-4 | P(1-2)-5 | P(1-2)-6 | S(1-2)-1 | S(1-2)-2 | S(1-2)-3 | S(1-2)-4 | S(1-2)-5 |
| Raw materials | Monomer | NTI | NTI | NTI | NTI | LTI | GTI | NTI | NTI | NTI | HDI | LDI |
| | Alcohol | methanol | 1-butanol | 2-ethyl-1-hexanol | tridecanol | iso-butanol | 2-ethyl-1-hexanol | methanol | methanol | methanol | 2-ethyl-1-hexanol | 1-butanol |
| | Catalyst | BTMA-H | TMA-A | BTMA-A | TMA-A | TMA-A | BTMA-H | BTMA-H | BTMA-H | BTMA-H | BTMA-H | TMA-A |
| | Reaction terminator | DOP | DBP | phosphoric acid | DBP | phosphoric acid | DBP | DOP | DOP | DOP | DOP | phosphoric acid |
| Blend amount [g] | Monomer | 100 | 100 | 100 | 100 | 100 | 100 | 100 | 100 | 100 | 100 | 100 |
| | Alcohol | 0.2 | 0.2 | 0.5 | 0.4 | 0.3 | 0.3 | 0.6 | 0.7 | 0.6 | 0.3 | 0.6 |
| | Catalyst | 0.01 | 0.01 | 0.01 | 0.01 | 0.01 | 0.01 | 0.40 | 0.48 | 0.40 | 0.01 | 0.02 |
| | Reaction terminator | 0.05 | 0.05 | 0.05 | 0.05 | 0.05 | 0.05 | 0.10 | 0.13 | 0.10 | 0.05 | 0.05 |
| Reaction temperature [° C.] | | 80 | 80 | 80 | 80 | 80 | 80 | 90 | 90 | 90 | 80 | 80 |
| Conversion ratio [%] | | 50% | 45% | 42% | 55% | 40% | 50% | 48% | 60% | 90% | 32% | 32% |
| Polyisocyanate composition | NCO content [% by mass] | 41.0% | 41.8% | 42.6% | 40.2% | 40.1% | 33.1% | 42.0% | 40.4% | 34.9% | 43.8% | 41.3% |
| | Viscosity [mPa·s/25° C.] | 110 | 92 | 85 | 118 | 75 | 115 | 80 | 260 | 5500 | 10 | 103 |
| | Molar ratio of isocyanurate structures/allophanate structures | 100/9 | 100/4 | 100/7 | 100/3 | 100/8 | 100/4 | 100/37 | 100/37 | 100/16 | 100/5 | 100/21 |
| Evaluation results | Degree of viscosity reduction | o | o | o | o | o | o | o | Δ | × | o | o |
| | Silicate compatibility | Δ | o | o | Δ | o | o | Δ | × | × | Δ | Δ |
| | Drying properties | o | ⊚ | ⊚ | ⊚ | ⊚ | ⊚ | o | o | o | × | o |
| | Recoat adhesion | ⊚ | ⊚ | ⊚ | ⊚ | ⊚ | ⊚ | Δ | Δ | × | o | o |
| | Scratch resistance | o | ⊚ | ⊚ | Δ | o | o | × | × | × | × | × |

In the above Table (1-2)-1, the catalysts and reaction terminators recorded using abbreviations refer to the materials listed below.

BTMA-H: benzyltrimethylammonium hydroxide
BTMA-A: benzyltrimethylammonium caprate
TMA-A: tetramethylammonium caprate
DBP: dibutyl phosphate
DOP: di(2-ethylhexyl) phosphate Example (1-2)-7

Synthesis of Blocked Polyisocyanate Composition P(1-2)-7

The inside of a four-neck flask fitted with a stirrer, a thermometer, a reflux condenser and a nitrogen inlet tube was flushed with nitrogen and then charged with 20 g of the polyisocyanate composition P(1-2)-1 and 17.0 g of butyl acetate, the temperature was raised to 70° C., 19.7 g of 3,5-dimethylpyrazole was then added under constant stirring, and subsequent stirring for one hour with the temperature maintained at 70° C. resulted in an NCO content of 0.0% and yielded a blocked polyisocyanate composition.

The viscosity of the obtained blocked polyisocyanate composition was 520 mPa·s at 25° C., and the calculated NCO content was 14.5% by mass. Further, the degree of viscosity reduction for the obtained blocked polyisocyanate composition was evaluated as ○, and the scratch resistance was evaluated as Δ. These results were recorded in Table (1-2)-2.

Examples (1-2)-8 to (1-2)-12, Comparative Examples (1-2)-6 to (1-2)-10

Synthesis of P(1-2)-9 to P(1-2)-12, and S(1-2)-6 to S(1-2)-10

With the exceptions of adjusting the amount added of the 3,5-dimethylpyrazole, the amount added of the butyl acetate, and the type of polyisocyanate composition used in the manner recorded in Table (1-2)-2, preparation was performed in the same manner as Example (1-2)-7. Further, the viscosity, the calculated NCO content, the degree of viscosity reduction, and the scratch resistance evaluation result for each of the obtained blocked polyisocyanate compositions were recorded in Table (1-2)-2.

was flushed with nitrogen and then charged with 20 g of the polyisocyanate composition P(1-2)-4 obtained in Example (1-2)-4 and 8.2 g of a hydrophilic polyethylene oxide (product name: MPG-130, manufactured by Nippon Nyukazai Co., Ltd., number average molecular weight=420), and the temperature was then raised and held at 100° C. for 4 hours under constant stirring, thus obtaining a hydrophilic polyisocyanate. The viscosity of the obtained hydrophilic polyisocyanate composition was 240 mPa·s at 25° C., and the NCO content was 26.2% by mass.

Moreover, the degree of viscosity reduction was evaluated as ○, and the scratch resistance was evaluated as Δ.

Examples (1-2)-14 to (1-2)-18, Comparative Examples (1-2)-11 to (1-2)-15

Synthesis of P(1-2)-14 to P(1-2)-18, and S(1-2)-11 to S(1-2)-15

With the exceptions of adjusting the amount added of the MPG-130 and the type of polyisocyanate composition used

TABLE (1-2)-2

| | | Example (1-2)-7 | Example (1-2)-8 | Example (1-2)-9 | Example (1-2)-10 | Example (1-2)-11 | Example (1-2)-12 | Comparative Example (1-2)-6 | Comparative Example (1-2)-7 | Comparative Example (1-2)-8 | Comparative Example (1-2)-9 | Comparative Example (1-2)-10 |
|---|---|---|---|---|---|---|---|---|---|---|---|---|
| Blocked polyisocyanate composition | | P(1-2)-7 | P(1-2)-8 | P(1-2)-9 | P(1-2)-10 | P(1-2)-11 | P(1-2)-12 | S(1-2)-6 | S(1-2)-7 | S(1-2)-8 | S(1-2)-9 | S(1-2)-10 |
| Raw materials | Polyisocyanate composition | P(1-2)-1 | P(1-2)-2 | P(1-2)-3 | P(1-2)-4 | P(1-2)-5 | P(1-2)-6 | S(1-2)-1 | S(1-2)-2 | S(1-2)-3 | S(1-2)-4 | S(1-2)-5 |
| | Blocking agent | | | | | 3,5-dimethylpyrazole | | | | | | |
| | Solvent | | | | | butyl acetate | | | | | | |
| Blend amount [g] | Polyisocyanate composition | 20.0 | 20.0 | 20.0 | 20.0 | 20.0 | 20.0 | 20.0 | 20.0 | 20.0 | 20.0 | 20.0 |
| | Blocking agent | 19.7 | 20.1 | 20.3 | 19.3 | 19.3 | 15.9 | 20.2 | 19.4 | 16.8 | 21.0 | 19.9 |
| | Solvent | 17.0 | 17.2 | 17.3 | 16.8 | 16.8 | 15.4 | 17.2 | 16.9 | 15.8 | 17.6 | 17.1 |
| Reaction temperature [° C.], Time [h] | | 70° C. × 1 h | 70° C. × 1 h | 70° C. × 1 h | 70° C. × 1 h | 70° C. × 1 h | 70° C. × 1 h | 70° C. × 1 h | 70° C. × 1 h | 70° C. × 1 h | 70° C. × 1 h | 70° C. × 1 h |
| Blocked polyisocyanate composition | Calculated NCO content [% by mass] | 14.5% | 14.6% | 14.8% | 14.3% | 14.3% | 12.9% | 14.6% | 14.4% | 13.3% | 14.9% | 14.5% |
| | Viscosity [mPa·s/25° C.] | 520 | 445 | 430 | 610 | 412 | 580 | 414 | 1460 | 29000 | 60 | 505 |
| Evaluation results | Degree of viscosity reduction | ○ | ○ | ○ | ○ | ○ | ○ | ○ | × | × | ○ | ○ |
| | Scratch resistance | Δ | ◎ | ◎ | ○ | ○ | ○ | × | × | × | × | × |

Examples (1-2)-13

Synthesis of Hydrophilic Polyisocyanate Composition P(1-2)-13

The inside of a four-neck flask fitted with a stirrer, a thermometer, a reflux condenser and a nitrogen inlet tube in the manner recorded in Table (1-2)-3, preparation was performed in the same manner as Example (1-2)-13. Further, the viscosity, the NCO content, and the evaluation results for the degree of viscosity reduction and the scratch resistance for each of the obtained hydrophilic polyisocyanate compositions were recorded in Table (1-2)-3.

TABLE (1-2)-3

| | | Example (1-2)-13 | Example (1-2)-14 | Example (1-2)-15 | Example (1-2)-16 | Example (1-2)-17 | Example (1-2)-18 | Comparative Example (1-2)11 | Comparative Example (1-2)-12 | Comparative Example (1-2)-13 | Comparative Example (1-2)14 | Comparative Example (1-2)15 |
|---|---|---|---|---|---|---|---|---|---|---|---|---|
| Hydrophilic polyisocyanate composition | | P(1-2)-13 | P(1-2)-14 | P(1-2)-15 | P(1-2)-16 | P(1-2)-17 | P(1-2)-18 | S(1-2)-11 | S(1-2)-12 | S(1-2)-13 | S(1-2)-14 | S(1-2)-15 |
| Raw materials | Polyisocyanate composition | P(1-2)-1 | P(1-2)-2 | P(1-2)-3 | P(1-2)-4 | P(1-2)-5 | P(1-2)-6 | S(1-2)-1 | S(1-2)-2 | S(1-2)-3 | S(1-2)-4 | S(1-2)-5 |
| | Hydrophilic agent | | | | | MPG-130 | | | | | | |

TABLE (1-2)-3-continued

| | | Example (1-2)-13 | Example (1-2)-14 | Example (1-2)-15 | Example (1-2)-16 | Example (1-2)-17 | Example (1-2)-18 | Comparative Example (1-2)11 | Comparative Example (1-2)-12 | Comparative Example (1-2)-13 | Comparative Example (1-2)14 | Comparative Example (1-2)15 |
|---|---|---|---|---|---|---|---|---|---|---|---|---|
| Blend amount [g] | Polyisocyanate composition | 20.0 | 20.0 | 20.0 | 20.0 | 20.0 | 20.0 | 20.0 | 20.0 | 20.0 | 20.0 | 20.0 |
| | Hydrophilic agent | 8.2 | 8.4 | 8.5 | 8.0 | 8.0 | 6.6 | 8.4 | 8.1 | 7.0 | 8.8 | 8.3 |
| Reaction temperature [° C.], Time [h] | | 100° C. × 4 h | 100° C. × 4 h | 100° C. × 4 h | 100° C. × 4 h | 100° C. × 4 h | 100° C. × 4 h | 100° C. × 4 h | 100° C. × 4 h | 100° C. × 4 h | 100° C. × 4 h | 100° C. × 4 h |
| Hydrophilic polyisocyanate composition | NCO content [% by mass] | 26.2% | 26.5% | 26.9% | 25.8% | 25.8% | 22.4% | 26.6% | 25.9% | 23.3% | 27.4% | 26.3% |
| | Viscosity [mPa · s/25° C.] | 240 | 200 | 185 | 250 | 155 | 240 | 180 | 550 | 12600 | 25 | 240 |
| Evaluation results | Degree of viscosity reduction | ○ | ○ | ○ | ○ | ○ | ○ | ○ | ○ | × | ○ | ○ |
| | Scratch resistance | Δ | ◎ | ◎ | Δ | ○ | ○ | × | × | × | × | × |

Example (1-2)-19

In this example, 0.03 g of 2,2,4-trimethylpentane was added to 300 g of the polyisocyanate composition P(1-2)-1 obtained in Example (1-2)-1.

For this polyisocyanate composition, the degree of viscosity reduction was evaluated as o, the silicate compatibility was evaluated as Δ, the drying properties were evaluated as o, the recoat adhesion was evaluated as ⊚, the scratch resistance was evaluated as o, and the storage stability evaluation result was favorable.

Example (1-2)-20

In this example, 0.03 g of hexadecane was added to 300 g of the polyisocyanate composition P(1-2)-1 obtained in Example (1-2)-1.

For this polyisocyanate composition, the degree of viscosity reduction was evaluated as o, the silicate compatibility was evaluated as Δ, the drying properties were evaluated as o, the recoat adhesion was evaluated as ⊚, the scratch resistance was evaluated as o, and the storage stability evaluation result was favorable.

Synthesis Example (1-2)-4

The inside of a four-neck flask fitted with a stirrer, a thermometer, a reflux condenser and a nitrogen inlet tube was flushed with nitrogen and then charged with 20 g of NTI, the flask was then heated to 60° C., 7.7 g of methanol was added, and the temperature was maintained for 4 hours under constant stirring, thus obtaining an N-substituted carbamate ester C(1-2)-1.

Example (1-2)-21

In this example, 0.03 g of the N-substituted carbamate ester C(1-2)-1 was added to 300 g of the polyisocyanate composition P(1-2)-1 obtained in Example (1-2)-1.

For this polyisocyanate composition, the degree of viscosity reduction was evaluated as o, the silicate compatibility was evaluated as Δ, the drying properties were evaluated as o, the recoat adhesion was evaluated as ⊚, the scratch resistance was evaluated as o, and the storage stability evaluation result was favorable.

The above results confirmed that the polyisocyanate composition of each example that applied the present invention had low viscosity and excellent silicate compatibility, and the coating material compositions that used a polyisocyanate composition of the present invention exhibited excellent drying properties and recoat adhesion. Further, the coating films produced using these coating material compositions had favorable scratch resistance. Moreover, it was also confirmed that blocked polyisocyanate compositions and hydrophilic polyisocyanate compositions produced from the polyisocyanate compositions of the present invention also had low viscosity and were able to impart favorable scratch resistance to coating films The physical properties of the polyisocyanate compositions in Examples (1-3)-1 to (1-3)-16 and Comparative Examples (1-3)-1 to (1-3)-6 were measured using the methods described below. Unless specifically stated otherwise, "parts" and "%" mean "parts by mass" and "% by mass" respectively.

<Viscosity>

As described above.

<NCO Content>

As described above.

<Calculated NCO Content>

As described above.

<Conversion Ratio>

As described above.

<Method for Quantifying Molar Ratio of Uretdione Structures relative to Isocyanurate Structures>

A Biospin Avance 600 (product name) manufactured by Bruker Corporation was used to conduct $^{13}$C-NMR measurements, and the molar ratio between uretdione structures and isocyanurate structures was determined.

Specific measurement conditions were as follows.

$^{13}$C-NMR apparatus: AVANCE 600 (manufactured by Bruker Corporation)

CryoProbe CPDUL 600S3-C/H-D-05Z (manufactured by Bruker Corporation)

Resonance frequency: 150 MHz

Concentration: 60 wt/vol %

Shift reference: CDCl$_3$ (77 ppm)

Accumulation number: 10,000

Pulse program: zgpg 30 (proton perfect decoupling methods, waiting time: 2 sec)

The signal integral values described below were divided by the number of measured carbons, and the resulting values were used to determine the various molar ratios.

Uretdione structure: near 157.3 ppm: integral value÷2
Isocyanurate structure: near 148.5 ppm: integral value÷3
Subsequently, based on these obtained molar ratios for the uretdione structure and the isocyanurate structure, the molar ratio of uretdione structures relative to isocyanurate structures was determined.

<Polyisocyanate Composition Degree of Viscosity Reduction (1)>

As described above.

<Polyisocyanate Composition Drying Properties Evaluation Method (1)>

As described above.

<Blocked Polyisocyanate Composition Degree of Viscosity Reduction (1)>

As described above.

<Blocked Polyisocyanate Composition Drying Properties Evaluation Method (2)>

An acrylic polyol (SETALUX 1753, a product name of Nuplex Resin Inc., resin fraction concentration: 70%, hydroxyl value: 138.6 mgKOH/g) was blended with each of the polyisocyanate compositions so as to achieve an isocyanate group/hydroxyl group equivalence ratio of 1.0, and butyl acetate was used to adjust the solid fraction to 50% by mass. Each of the thus prepared coating material compositions was applied to a glass plate in an amount sufficient to generate a dried film thickness of 40 μm, and the composition was then cured at 120° C. for 30 minutes. A cotton ball (a circular cylindrical shape of diameter: 2.5 cm and height: 2.0 cm) was placed on the coating film, and a 100 g weight was then placed on top of the cotton ball for 60 seconds. Subsequently, the weight and the cotton were removed, and the level of cotton traces that remained on the coating film was inspected. Cases where absolutely no cotton traces were visible were evaluated as o, whereas cases where traces were visible were evaluated as x.

<(Blocked) Polyisocyanate Composition Adhesion to Base Coating Film Evaluation Method>

As described above.

<Hydrophilic Polyisocyanate Composition Degree of Viscosity Reduction (1)>

As described above.

<Hydrophilic Polyisocyanate Composition Drying Properties Evaluation Method>

As described above.

<Hydrophilic Polyisocyanate Composition Adhesion to Base Coating Film Evaluation Method>

As described above.

<Storage Stability Evaluation Method>

As described above.

Synthesis Example (1-3)-1

Synthesis of NTI

In a four-neck flask fitted with a stirrer, a thermometer and a gas inlet tube, 1,060 g of 4-aminomethyl-1,8-octamethylenediamine (hereafter sometimes referred to as "the triamine") was dissolved in 1,500 g of methanol, and 1,800 mL of a 35% concentrated hydrochloric acid solution was then added gradually to the flask in a dropwise manner under cooling. The reaction solution was concentrated by removing the methanol and water under reduced pressure, and the residue was then dried at 60° C. and 5 mmHg for 24 hours, yielding a triamine hydrochloride as a white solid. A 650 g sample of the obtained triamine hydrochloride was converted to a fine powder and suspended in 5,000 g of o-dichlorobenzene, the temperature of the reaction liquid was raised while the liquid was stirred, and when the temperature reached 100° C., phosgene was started to be blown into the flask at a rate of 200 g/hr, the temperature was further raised and then held at 180° C., and blowing of the phosgene was continued for 12 hours. Following removal of any dissolved phosgene and the solvent by distillation under reduced pressure, vacuum distillation was used to obtain 420 g of colorless and transparent 4-isocyanatomethyl-1,8-octamethylene diisocyanate (hereafter sometimes referred to as NTI) having a boiling point of 161 to 163° C. at 1.2 mmHg. The NCO content of this compound was 50.0% by weight.

Synthesis Example (1-3)-2

Synthesis of LTI

A four-neck flask fitted with a stirrer, a thermometer and a gas inlet tube was charged with 122.2 g of ethanolamine, 100 mL of o-dichlorobenzene and 420 mL of toluene, and ice-cooled hydrogen chloride gas was then introduced into the flask to convert the ethanolamine to a hydrochloride salt. Subsequently, 182.5 g of lysine hydrochloride was added, the reaction liquid was heated to 80° C. to dissolve the ethanolamine hydrochloride, and hydrogen chloride gas was then introduced to form lysine dihydrochloride. Additional hydrogen chloride gas was then passed through the reaction liquid at 20 to 30 mL/min., the reaction liquid was heated to 116° C., and this temperature was maintained until no more water distilled from the liquid. The thus produced reaction mixture was recrystallized from a mixed solution of methanol and ethanol, thus obtaining 165 g of lysine β-aminoethyl ester trihydrochloride. Subsequently, 100 g of this lysine β-aminoethyl ester trihydrochloride was converted to a fine powder and suspended in 1,200 mL of o-dichlorobenzene, the temperature of the reaction liquid was raised while the liquid was stirred, and when the temperature reached 120° C., phosgene was started to be blown into the flask at a rate of 0.4 mol/hr, blowing of the phosgene was continued for 10 hours, and the temperature was then raised to 150° C. The suspension almost completely dissolved. Following cooling, the reaction mixture was filtered, any dissolved phosgene and the solvent were removed by distillation under reduced pressure, and vacuum distillation was used to obtain 80.4 g of colorless and transparent LTI having a boiling point of 155 to 157° C. at 0.022 mmHg. The NCO content of this compound was 47.1% by weight.

Synthesis Example (1-3)-3

Synthesis of NTI Uretdione Moiety (NTI-UD)

A four-neck flask fitted with a stirrer, a thermometer and a condenser was charged with 50 g of NTI, and 0.5 g of tris(diethylamino)phosphine was then added at 60° C. under constant stirring. The reaction was allowed to proceed at 60° C., and when measurement of the isocyanate content and the refractive index of the reaction liquid indicated that the conversion ratio to a polyisocyanate had reached 43%, 0.4 g of phosphoric acid was added to halt the reaction. Within several minutes following the addition of the phosphoric acid, the deactivated catalyst precipitated as crystals. Subsequently, heating was continued at 60° C. for one hour, and the reaction liquid was then cooled to room temperature. The precipitate was removed by filtration, yielding an NTI uretdione moiety. The NCO content was 42.0% by mass.

Further, the molar ratio between uretdione structures and isocyanurate structures was 96:4.

Synthesis Example (1-3)-4

Synthesis of LTI Uretdione Moiety (LTI-UD)

A four-neck flask fitted with a stirrer, a thermometer and a condenser was charged with 50 g of LTI, and 0.5 g of tris(diethylamino)phosphine was then added at 60° C. under constant stirring. The reaction was allowed to proceed at 60° C., and when measurement of the isocyanate content and the refractive index of the reaction liquid indicated that the conversion ratio to a polyisocyanate had reached 43%, 0.4 g of phosphoric acid was added to halt the reaction. Within several minutes following the addition of the phosphoric acid, the deactivated catalyst precipitated as crystals. Subsequently, heating was continued at 60° C. for one hour, and the reaction liquid was then cooled to room temperature. The precipitate was removed by filtration, yielding an NTI uretdione moiety. The NCO content was 39.5% by mass. Further, the molar ratio between uretdione structures and isocyanurate structures was 95:5.

Synthesis Example (1-3)-5

Synthesis of HDI Uretdione Moiety (HDI-UD)

A four-neck flask fitted with a stirrer, a thermometer and a condenser was charged with 50 g of HDI, and 0.5 g of tris(diethylamino)phosphine was then added at 60° C. under constant stirring. The reaction was allowed to proceed at 60° C., and when measurement of the isocyanate content and the refractive index of the reaction liquid indicated that the conversion ratio to a polyisocyanate had reached 43%, 0.4 g of phosphoric acid was added to halt the reaction. Within several minutes following the addition of the phosphoric acid, the deactivated catalyst precipitated as crystals. Subsequently, heating was continued at 60° C. for one hour, and the reaction liquid was then cooled to room temperature. The precipitate was removed by filtration, and a falling thin film evaporator was used to remove unreacted HDI, firstly at 0.3 torr and 155° C., and secondly at 0.2 torr and 145° C. The isocyanate group content of the product containing the obtained uretdione moiety was 23.4%. Further, the molar ratio between uretdione structures and isocyanurate structures was 97:3.

Example (1-3)-1

Synthesis of P(1-3)-1

The inside of a four-neck flask fitted with a stirrer, a thermometer, a reflux condenser and a nitrogen inlet tube was flushed with nitrogen and then charged with 50 g of NTI as a monomer, and the temperature was then raised to 80° C. and held at that temperature for 2 hours. Subsequently, 5 mg of a catalyst of tetramethylammonium fluoride tetrahydrate containing 95% by mass of i-butanol was added, the reaction was allowed to proceed, and when the conversion ratio reached 43%, dibutyl phosphate was added to halt the reaction, thus obtaining a polyisocyanate P(1-3)-1. The viscosity of the obtained polyisocyanate P(1-3)-1 was 59 mPa·s at 25° C., and the NCO content was 41.6% by mass.

Moreover, the degree of viscosity reduction for the polyisocyanate composition P(1-3)-1 was evaluated as o, the drying properties evaluation result was o, and the adhesion to a base coating film evaluation result was o. These results were recorded in Table (1-3)-1.

Example (1-3)-5

Synthesis of P(1-3)-5

The inside of a four-neck flask fitted with a stirrer, a thermometer, a reflux condenser and a nitrogen inlet tube was flushed with nitrogen and then charged with 50 g of LTI as a monomer, and the temperature was then raised to 60° C. and held at that temperature for 2 hours. Subsequently, 5 mg of a catalyst of tetramethylammonium fluoride tetrahydrate containing 95% by mass of n-butanol was added, the reaction was allowed to proceed, and when the conversion ratio reached 42%, dibutyl phosphate was added to halt the reaction, thus obtaining a polyisocyanate P(1-3)-5. The viscosity of the obtained polyisocyanate P(1-3)-5 was 105 mPa·s at 25° C., and the NCO content was 39.5% by mass.

Moreover, the degree of viscosity reduction for the polyisocyanate composition P(1-3)-5 was evaluated as o, the drying properties evaluation result was ⊚, and the adhesion to a base coating film evaluation result was o. These results were recorded in Table (1-3)-1.

Examples (1-3)-2 to (1-3)-4, (1-3)-6 and (1-3)-7, and Comparative Examples (1-3)-1 and (1-3)-2

Preparation of P(1-3)-2 to P(1-3)-4, and P(1-3)-6 to P(1-3)-9

Various polyisocyanate compositions were obtained by mixing P(1-3)-1 and P(1-3)-5 with the uretdione moieties described in Synthesis Examples (1-3)-3 to (1-3)-5, and NTI and LTI in the proportions shown in Table (1-3)-1.

The physical properties of each of these polyisocyanate compositions were as recorded in Table (1-3)-1.

TABLE (1-3)-1

|  |  | Example (1-3)-1 | Example (1-3)-2 | Example (1-3)-3 | Example (1-3)-4 | Example (1-3)-5 | Example (1-3)-6 | Example (1-3)-7 | Comparative Example (1-3)-1 | Comparative Example (1-3)-2 |
|---|---|---|---|---|---|---|---|---|---|---|
|  | Polyisocyanate composition | P(1-3)-1 | P(1-3)-2 | P(1-3)-3 | P(1-3)-4 | P(1-3)-5 | P(1-3)-6 | P(1-3)-7 | P(1-3)-8 | P(1-3)-9 |
| PI-1 | Monomer | NTI | NTI | NTI | NTI | LTI | LTI | LTI | NTI | LTI |
|  | Alcohol | i-BuOH | i-BuOH | i-BuOH | i-BuOH | n-BuOH | n-BuOH | n-BuOH | n-BuOH | n-BuOH |
|  | Conversion ratio [%] | 43 | 43 | 43 | 43 | 42 | 42 | 42 | 43 | 42 |
|  | NCO % | 41.6 | 41.6 | 41.6 | 41.6 | 39.3 | 39.3 | 39.3 | 41.6 | 39.3 |
| PI-2 | Uretdione moiety | — | NTI-UD | NTI-UD | NTI-UD | — | LTI-UD | LTI-UD | HDI-UD | HDI-UD |
|  | Conversion ratio | — | 43 | 43 | 43 | — | 43 | 43 | 43 | 43 |
|  | NCO % | — | 42.0 | 42.0 | 42.0 | — | 39.5 | 39.5 | 23.4 | 23.4 |
| PI-3 | Polyisocyanate monomer | — | — | — | — | — | — | — | NTI | LTI |
|  | NCO % | — | — | — | — | — | — | — | 50.0 | 47.1 |

TABLE (1-3)-1-continued

|  |  | Example (1-3)-1 | Example (1-3)-2 | Example (1-3)-3 | Example (1-3)-4 | Example (1-3)-5 | Example (1-3)-6 | Example (1-3)-7 | Comparative Example (1-3)-1 | Comparative Example (1-3)-2 |
| --- | --- | --- | --- | --- | --- | --- | --- | --- | --- | --- |
| Polyisocyanate composition | Mixing ratio (P1/P2/P3) | 100/0/0 | 90/10/0 | 70/30/0 | 50/50/0 | 100/0/0 | 70/30/0 | 50/50/0 | 70/12.9/17.1 | 70/12.9/17.1 |
|  | NCO % | 41.6 | 42.9 | 42.7 | 42.5 | 39.3 | 39.4 | 39.4 | 40.7 | 38.6 |
|  | Nurate/uretdione | 100/0.3 | 100/10.9 | 100/40.9 | 100/92.9 | 100/0.4 | 100/41.3 | 100/93.3 | 100/61.4 | 100/65.0 |
| Results | Degree of viscosity reduction | ○ | ○ | ○ | ○ | ○ | ○ | ○ | ○ | ○ |
|  | Drying properties | ○ | ○ | ○ | Δ | ◎ | ◎ | ○ | × | × |
|  | Adhesion to base coating film | ○ | ◎ | ◎ | ◎ | ○ | ◎ | ◎ | Δ | Δ |

Example (1-3)-8

Synthesis of Blocked Polyisocyanate Composition

The inside of a four-neck flask fitted with a stirrer, a thermometer, a reflux condenser and a nitrogen inlet tube was flushed with nitrogen and then charged with 20 g of the polyisocyanate composition P(1-3)-1 obtained in Example (1-3)-1 and 16.2 g of butyl acetate, and the temperature was raised to 70° C. Subsequently, 19.6 g of 3,5-dimethylpyrazole was added under constant stirring, and subsequent stirring for one hour with the temperature maintained at 70° C. resulted in an NCO content of 0.0% and yielded a blocked polyisocyanate composition. The calculated NCO content of the obtained blocked polyisocyanate composition was 14.9% by mass.

Moreover, the degree of viscosity reduction of the obtained blocked polyisocyanate composition was evaluated as o, the drying properties evaluation result was o, and the adhesion to a base coating film evaluation result was o. These results were recorded in Table (1-3)-2.

Examples (1-3)-9 and (1-3)-10, Comparative Examples (1-3)-3 and (1-3)-4

Synthesis of Blocked Polyisocyanate Compositions

With the exceptions of adjusting the amount added of the 3,5-dimethylpyrazole, the amount added of the butyl acetate, and the type of polyisocyanate composition used in the manner recorded in Table (1-3)-2, preparation was performed in the same manner as Example (1-3)-8. Further, the calculated NCO content, the degree of viscosity reduction, the drying properties evaluation result, and the adhesion to a base coating film evaluation result for each of the obtained blocked polyisocyanate compositions were recorded in Table (1-3)-2.

Example (1-3)-11

Synthesis of Hydrophilic Polyisocyanate Composition

The inside of a four-neck flask fitted with a stirrer, a thermometer, a reflux condenser and a nitrogen inlet tube was flushed with nitrogen and then charged with 20 g of the polyisocyanate composition P(1-3)-1 obtained in Example (1-3)-1 and 8.4 g of a hydrophilic polyethylene oxide (product name: MPG-130, manufactured by Nippon Nyukazai Co., Ltd., number average molecular weight=420), and the temperature was then raised and held at 100° C. for 4 hours under constant stirring, thus obtaining a hydrophilic polyisocyanate. The NCO content of the obtained hydrophilic polyisocyanate composition was 29.3% by mass.

Moreover, the degree of viscosity reduction was evaluated as o, the drying properties evaluation result was o, and the adhesion to a base coating film evaluation result was o.

Examples (1-3)-12 and (1-3)-13, Comparative Examples (1-3)-5 and (1-3)-6

Synthesis of Hydrophilic Polyisocyanate Compositions

With the exceptions of adjusting the amount added of the MPG-130 and the type of polyisocyanate composition used in the manner recorded in Table (1-3)-3, preparation was performed in the same manner as Example (1-3)-11. Further, the NCO content, the degree of viscosity reduction, the drying properties evaluation result, and the adhesion to a base coating film evaluation result for each of the obtained hydrophilic polyisocyanate compositions were recorded in Table (1-3)-3.

TABLE (1-3)-2

|  | Example (1-3)-8 | Example (1-3)-9 | Example (1-3)-10 | Comparative Example (1-3)-3 | Comparative Example (1-3)-4 |
| --- | --- | --- | --- | --- | --- |
| Polyisocyanate composition | P(1-3)-1 | P(1-3)-3 | P(1-3)-6 | P(1-3)-8 | P(1-3)-9 |
| 3.5-dimethylpyrazole amount added (g) | 19.6 | 20.2 | 18.6 | 19.2 | 18.2 |
| Butyl acetate amount added (g) | 16.2 | 16.4 | 15.8 | 16.0 | 15.6 |
| Blocked polyisocyanate composition Calculated NCO content [% by mass] | 14.9 | 15.1 | 14.5 | 14.7 | 14.3 |
| Degree of viscosity reduction | ○ | ○ | ○ | ○ | ○ |
| Drying properties | ○ | ○ | ◎ | × | × |
| Adhesion to base coating film | ○ | ◎ | ◎ | Δ | Δ |

TABLE (1-3)-3

|  | | Example (1-3)-11 | Example (1-3)-12 | Example (1-3)-13 | Comparative Example (1-3)-5 | Comparative Example (1-3)-6 |
|---|---|---|---|---|---|---|
| Polyisocyanate composition | | P(1-3)-1 | P(1-3)-3 | P(1-3)-6 | P(1-3)-8 | P(1-3)-9 |
| MPG-130 amount added (g) | | 8.4 | 8.6 | 7.9 | 8.2 | 7.8 |
| Hydrophilic polyisocyanate composition | Calculated NCO content [% by mass] | 29.3 | 29.1 | 29.8 | 29.5 | 29.9 |
| | Degree of viscosity reduction | ○ | ○ | ○ | ○ | ○ |
| | Drying properties | ○ | ○ | ◎ | × | × |
| | Adhesion to base coating film | ○ | ◎ | ◎ | Δ | Δ |

Example (1-3)-14

In this example, 0.03 g of 2,2,4-trimethylpentane was added to 300 g of the polyisocyanate composition P(1-3)-3 obtained in Example (1-3)-3.

For this polyisocyanate composition, the degree of viscosity reduction was evaluated as o, the drying properties evaluation result was o, the adhesion to a base coating film evaluation result was o, and the storage stability evaluation result was favorable.

Example (1-3)-15

In this example, 0.03 g of hexadecane was added to 300 g of the polyisocyanate composition P(1-3)-3 obtained in Example (1-3)-3.

For this polyisocyanate composition, the degree of viscosity reduction was evaluated as o, the drying properties evaluation result was o, the adhesion to a base coating film evaluation result was o, and the storage stability evaluation result was favorable.

Synthesis Example (1-3)-6

The inside of a four-neck flask fitted with a stirrer, a thermometer, a reflux condenser and a nitrogen inlet tube was flushed with nitrogen and then charged with 20 g of NTI, the flask was then heated to 60° C., 7.7 g of methanol was added, and the temperature was maintained for 4 hours under constant stirring, thus obtaining an N-substituted carbamate ester C(1-3)-1.

Example (1-3)-16

In this example, 0.03 g of the N-substituted carbamate ester C(1-3)-1 was added to 300 g of the polyisocyanate composition P(1-3)-3 obtained in Example (1-3)-3.

For this polyisocyanate composition, the degree of viscosity reduction was evaluated as o, the drying properties evaluation result was o, the adhesion to a base coating film evaluation result was o, and the storage stability evaluation result was favorable.

The above results confirmed that the polyisocyanate composition of each example that applied the present invention had low viscosity, and the coating material compositions that used a polyisocyanate composition of the present invention exhibited favorable drying properties and adhesion to base coating films. Moreover, it was also confirmed that blocked polyisocyanate compositions and hydrophilic polyisocyanate compositions produced from the polyisocyanate compositions of the present invention also had low viscosity, and the coating material compositions that used these compositions had favorable drying properties and adhesion to base coating films.

The physical properties of the polyisocyanate compositions in Examples (1-4)-1 to (1-4)-16 and Comparative Examples (1-4)-1 to (1-4)-10 were measured using the methods described below. Unless specifically stated otherwise, "parts" and "%" mean "parts by mass" and "% by mass" respectively.

<Viscosity>

As described above. 5 rpm (in the case of viscosities of 1,280 mPa·s to 2,560 mPa·s)

<NCO Content>

As described above.

<Calculated NCO Content>

As described above.

<Conversion Ratio>

As described above.

<Polyisocyanate Composition Degree of Viscosity Reduction (4)>

Using the viscosity measurement results for the polyisocyanate mixtures, values of less than 250 mPa·s at 25° C. were evaluated as o, values of at least 350 mPa·s at 25° C. but less than 2,000 mPa·s at 25° C. were evaluated as Δ, and values of 2,000 mPa·s or greater at 25° C. were evaluated as x.

<Polyisocyanate Composition Drying Properties Evaluation Method (3)>

An acrylic polyol (SETALUX 1753, a product name of Nuplex Resin Inc., resin fraction concentration: 70%, hydroxyl value: 138.6 mgKOH/g) was blended with each of the polyisocyanate compositions so as to achieve an isocyanate group/hydroxyl group equivalence ratio of 1.0, and butyl acetate was used to adjust the solid fraction to 50% by mass. Each of the thus prepared coating material compositions was applied to a glass plate in an amount sufficient to generate a dried film thickness of 40 μm, and the composition was then cured at 23° C. and 50% RH. After a prescribed period of time had elapsed, a cotton ball (a circular cylindrical shape of diameter: 2.5 cm and height: 2.0 cm) was placed on the coating film, and a 100 g weight was then placed on top of the cotton ball for 60 seconds. Subsequently, the weight and the cotton were removed, and the level of cotton traces that remained on the coating film was inspected. Cases where the time taken for absolutely no cotton traces to be visible was 7 hours or less were evaluated as ⊚, cases where the time was greater than 7 hours but not more than 8 hours were evaluated as o, cases where the time was greater than 8 hours but not more than 10 hours were evaluated as Δ, and cases where the time was longer than 10 hours were evaluated as x.

<Reaction Rate Between Polyisocyanate Composition and Monohydric Alcohol>

The inside of a four-neck flask fitted with a stirrer, a thermometer, a reflux condenser and a nitrogen inlet tube was flushed with nitrogen and then charged with 50 g of DURANATE (a registered trademark) TKA-100 manufactured by Asahi Kasei Corporation, 33.6 g of 2-ethylhexanol and 83.6 g of butyl acetate, and the temperature was raised to 70° C. The NCO content was measured once the temperature reached 70° C., and the rate of reduction in NCO groups (=reaction rate) (A) was determined. Moreover, the inside of a separate four-neck flask fitted with a stirrer, a thermometer, a reflux condenser and a nitrogen inlet tube was flushed with nitrogen and charged with a mixture of the polyisocyanate composition and 2-ethylhexanol so that the molar ratio between the NCO groups of the polyisocyanate composition and the OH group of the 2-ethylhexanol was 1, an amount of butyl acetate equal to the combined mass of the polyisocyanate composition and the 2-ethylhexanol was added, and the temperature was increased to 70° C. The NCO content was measured once the temperature reached 70° C., and the rate of reduction in NCO groups (=reaction rate) (B) was determined.

Cases where (B)/(A) was at least 5 but less than 13 were evaluated as ⊚, cases where (B)/(A) was either greater than 1 but less than 5 or greater than 13 but less than 15 were evaluated as o, and cases where (B)/(A) was 1 or less or 15 or greater were evaluated as x.

<Blocked Polyisocyanate Composition Degree of Viscosity Reduction (1)>

As described above.

<Blocked Polyisocyanate Composition Drying Properties Evaluation Method (1)>

As described above.

<Hydrophilic Polyisocyanate Composition Degree of Viscosity Reduction (1)>

As described above.

<Hydrophilic Polyisocyanate Composition Drying Properties Evaluation Method>

As described above.

<Polar Polyol Compatibility Evaluation Method>

A polycarbonate diol DURANOL (a registered trademark) T-5652 manufactured by Asahi Kasei Corporation was blended with each of the polyisocyanate compositions so as to achieve an isocyanate group/hydroxyl group equivalence ratio of 1.0, and butyl acetate was used to adjust the solid fraction to 50% by mass. Each of the thus prepared coating material compositions was applied to a glass plate in an amount sufficient to generate a dried film thickness of 40 μm, the composition was cured at 80° C. for 30 minutes, and the haze value of the coating film was measured using the apparatus described below.

Apparatus: Direct Readout Haze Computer HGM-2DP (product name) manufactured by Suga Test Instruments Co., Ltd.

Standard plate: glass plate of thickness 2 mm

Coating films for which the haze value was 0.0 were evaluated as o, haze values of at least 0.1 but less than 0.5 were evaluated as Δ, and haze values of 0.5 or higher were evaluated as x.

<Storage Stability Evaluation Method>

As described above.

Synthesis Example (1-4)-1

Synthesis of LTI

A four-neck flask fitted with a stirrer, a thermometer and a gas inlet tube was charged with 122.2 g of ethanolamine, 100 ml of o-dichlorobenzene and 420 ml of toluene, and ice-cooled hydrogen chloride gas was then introduced into the flask to convert the ethanolamine to a hydrochloride salt. Subsequently, 182.5 g of lysine hydrochloride was added, the reaction liquid was heated to 80° C. to dissolve the ethanolamine hydrochloride, and hydrogen chloride gas was then introduced to form lysine dihydrochloride. Additional hydrogen chloride gas was then passed through the reaction liquid at 20 to 30 ml/min., the reaction liquid was heated to 116° C., and this temperature was maintained until no more water distilled from the liquid. The thus produced reaction mixture was recrystallized from a mixed solution of methanol and ethanol, thus obtaining 165 g of lysine β-aminoethyl ester trihydrochloride. Subsequently, 100 g of this lysine β-aminoethyl ester trihydrochloride was converted to a fine powder and suspended in 1,200 ml of o-dichlorobenzene, the temperature of the reaction liquid was raised while the liquid was stirred, and when the temperature reached 120° C., phosgene was started to be blown into the flask at a rate of 0.4 mol/hr, blowing of the phosgene was continued for 10 hours, and the temperature was then raised to 150° C. The suspension almost completely dissolved. Following cooling, the reaction mixture was filtered, any dissolved phosgene and the solvent were removed by distillation under reduced pressure, and vacuum distillation was used to obtain 80.4 g of colorless and transparent LTI having a boiling point of 155 to 157° C. at 0.022 mmHg. The NCO content of this compound was 47.1% by weight.

Synthesis Example (1-4)-2

Synthesis of GTI

A four-neck flask fitted with a stirrer, a thermometer and a gas inlet tube was charged with 275 g of glutamic acid hydrochloride, 800 g of ethanolamine hydrochloride and 150 ml of toluene, and with hydrogen chloride gas being blown into the flask, the reaction mixture was refluxed under heating at 110° C. for 24 hours until the azeotropic distillation of water stopped. The reaction mixture was recrystallized from a mixed solution of methanol and ethanol, thus obtaining 270 g of bis(2-aminoethyl)glutamate trihydrochloride. Next, 85 g of this bis(2-aminoethyl)glutamate trihydrochloride was suspended in 680 g of o-dichlorobenzene, the temperature of the reaction liquid was raised while the liquid was stirred, and when the temperature reached 135° C., phosgene was started to be blown into the flask at a rate of 0.8 mol/hr, blowing of the phosgene was continued for 13 hours, and the reaction product was then filtered, concentrated under reduced pressure, and then purified using a thin film evaporator, yielding 54 g of GTI. The NCO content was 39.8% by weight.

Synthesis Example (1-4)-3

Synthesis of NTI

In a four-neck flask fitted with a stirrer, a thermometer and a gas inlet tube, 1,060 g of 4-aminomethyl-1,8-octamethylenediamine (hereafter referred to as "the triamine") was dissolved in 1,500 g of methanol, and 1,800 mL of a 35% concentrated hydrochloric acid solution was then added gradually to the flask in a dropwise manner under cooling. The reaction solution was concentrated by removing the methanol and water under reduced pressure, and the residue was then dried at 60° C. and 5 mmHg for 24 hours, yielding a triamine hydrochloride as a white solid. A 650 g sample of the obtained triamine hydrochloride was converted to a fine powder and suspended in 5,000 g of o-dichlorobenzene, the temperature of the reaction liquid was raised while the liquid was stirred, and when the temperature reached 100° C., phosgene was started to be blown into the flask at a rate of 200 g/hr, the temperature was further raised and then held at 180° C., and blowing of the phosgene was continued for 12 hours. Following removal of any dissolved phosgene and the solvent by distillation under reduced pressure, vacuum distillation was used to obtain 420 g of colorless and transparent NTI having a boiling point of 161 to 163° C. at 1.2 mmHg. The NCO content of this compound was 50.0% by weight.

Example (1-4)-1

Synthesis of P(1-4)-1

The inside of a four-neck flask fitted with a stirrer, a thermometer, a reflux condenser and a nitrogen inlet tube was flushed with nitrogen and then charged with 50 g of LTI as a monomer and 0.05 g of isobutanol, and the temperature was then raised to 80° C. and held at that temperature for 2 hours. Subsequently, 5 mg of an isocyanuration catalyst of benzyltrimethylammonium hydroxide was added, the isocyanuration reaction was allowed to proceed, and when the conversion ratio reached 12%, dibutyl phosphate was added to halt the reaction. The reaction liquid was held at 120° C. for a further 15 minutes, thus obtaining a polyisocyanate composition P(1-4)-1. The viscosity of the polyisocyanate P(1-4)-1 was 37 mPa·s at 25° C., and the NCO content was 45.4% by mass.

The degree of viscosity reduction for the polyisocyanate composition P(1-4)-1 was evaluated as o, the drying properties were evaluated as Δ, the result for the reaction rate between the polyisocyanate composition and a monohydric alcohol was o, and the polar polyol compatibility evaluation result was o. These results were recorded in Table (1-4)-1.

Examples (1-4)-2 to (1-4)-8, Comparative Examples (1-4)-1 and (1-4)-2

With the exceptions of adjusting the monomer, the catalyst, the reaction terminator, the reaction temperature, and the conversion ratio as recorded in Table (1-4)-1, preparation was performed in the same manner as Example (1-4)-1. Further, the viscosity, the NCO content, and the evaluation results for the degree of viscosity reduction, the drying properties, and the polar polyol compatibility were recorded in Table (1-4)-1.

Comparative Example (1-4)-3

The reaction liquid obtained in Comparative Example (1-4)-2 was fed into a thin film evaporator, and unreacted HDI was removed to obtain a polyisocyanate composition P(1-4)-12. The viscosity of the obtained polyisocyanate composition P(1-4)-12 was 2,300 mPa·s at 25° C., and the NCO content was 21.5% by mass.

Moreover, the degree of viscosity reduction for the polyisocyanate composition P(1-4)-12 was evaluated as x, the drying properties evaluation result was o, the result for the reaction rate between the polyisocyanate composition and a monohydric alcohol was x, and the polar polyol compatibility evaluation result was x. These results were recorded in Table (1-4)-1.

Comparative Example (1-4)-4

The LTI monomer synthesized in Synthesis Example (1-4)-1 was used alone. The degree of viscosity reduction of the LTI was evaluated as o, the drying properties evaluation result was x, the result for the reaction rate between the polyisocyanate composition and a monohydric alcohol was o, and the polar polyol compatibility evaluation result was o. These results were recorded in Table (1-4)-1.

Example (1-4)-9

The inside of a four-neck flask fitted with a stirrer, a thermometer, a reflux condenser and a nitrogen inlet tube was flushed with nitrogen and then charged with 50 g of LTI as a monomer, and the temperature was then raised to 50° C. Subsequently, 29.3 g of methyl ethyl ketoxime was added dropwise under stirring, and the temperature was held at 50° C. for one hour. Next, 0.05 g of isobutanol was added, and the temperature was raised to 80° C. and held at that temperature for two hours. Subsequently, 5 mg of an isocyanuration catalyst of tetramethylammonium caprate was added, the isocyanuration reaction was allowed to proceed, and when the conversion ratio reached 40%, phosphoric acid was added to halt the reaction. The temperature was then raised to 150° C., and vacuum distillation was used to remove the methyl ethyl ketoxime by distillation, thus obtaining a polyisocyanate composition P(1-4)-9. The viscosity of the polyisocyanate P(1-4)-9 was 123 mPa·s at 25° C., and the NCO content was 42.1% by mass.

Moreover, the degree of viscosity reduction for the polyisocyanate composition P(1-4)-9 was evaluated as o, the drying properties evaluation result was ⊚, the result for the reaction rate between the polyisocyanate composition and a monohydric alcohol was ⊚, and the polar polyol compatibility evaluation result was o.

TABLE (1-4)-1

| | Example (1-4)-1 | Example (1-4)-2 | Example (1-4)-3 | Example (1-4)-4 | Example (1-4)-5 | Example (1-4)-6 | Example (1-4)-7 | Example (1-4)-8 | Comparative Example (1-4)-1 | Comparative Example (1-4)-2 | Comparative Example (1-4)-3 | Comparative Example (1-4)-4 |
|---|---|---|---|---|---|---|---|---|---|---|---|---|
| Polyisocyanate composition | P(1-4)-1 | P(1-4)-2 | P(1-4)-3 | P(1-4)-4 | P(1-4)-5 | P(1-4)-6 | P(1-4)-7 | P(1-4)-8 | P(1-4)-10 | P(1-4)-11 | P(1-4)-12 | LTI |
| Monomer | LTI | LTI | LTI | LTI | LTI | LTI | LTI | GTI | NTI | HDI | Unreacted HDI removed from P(1-4)-11 | |
| Catalyst | BTMA-H | BTMA-A | BTMA-A | TMA-A | BTMA-A | BTMA-A | BTMA-A | TMA-A | BTMA-A | BTMA-A | | |
| Reaction terminator | DBP | DBP | DBP | phosphoric acid | DBP | DBP | DBP | phosphoric acid | DBP | DBP | | |
| Reaction temperature [° C.] | 80 | 80 | 80 | 80 | 80 | 80 | 80 | 80 | 80 | 80 | | |

TABLE (1-4)-1-continued

| | | Example (1-4)-1 | Example (1-4)-2 | Example (1-4)-3 | Example (1-4)-4 | Example (1-4)-5 | Example (1-4)-6 | Example (1-4)-7 | Example (1-4)-8 | Comparative Example (1-4)-1 | Comparative Example (1-4)-2 | Comparative Example (1-4)-3 | Comparative Example (1-4)-4 |
|---|---|---|---|---|---|---|---|---|---|---|---|---|---|
| Conversion ratio [%] | | 12 | 18 | 23 | 40 | 65 | 71 | 76 | 40 | 40 | 40 | | |
| Polyisocyanate composition | NCO content [% by mass] | 45.4 | 44.6 | 43.9 | 41.5 | 37.9 | 37.1 | 36.3 | 35.2 | 44.0 | 43.1 | 21.5 | 47.1 |
| | Viscosity [mPa·s/25° C.] | 37 | 47 | 57 | 115 | 300 | 380 | 460 | 220 | 44 | 5 | 2300 | 25 |
| Degree of viscosity reduction | | ○ | ○ | ○ | ○ | ○ | Δ | Δ | ○ | ○ | ○ | × | ○ |
| Drying properties evaluation | | Δ | Δ | ○ | ○ | ○ | ○ | ○ | ○ | × | × | ○ | × |
| Reaction rate between polyisocyanate composition and monohydric alcohol | | ○ | ○ | ○ | ○ | ○ | ○ | ○ | ○ | × | × | × | ○ |
| Polar polyol compatibility evaluation | | ○ | ○ | ○ | ○ | ○ | Δ | Δ | ○ | Δ | ○ | × | ○ |

In the above Table (1-4)-1, the catalysts and reaction terminators recorded using abbreviations refer to the materials listed below.
BTMA-H: benzyltrimethylammonium hydroxide
BTMA-A: benzyltrimethylammonium caprate
TMA-A: tetramethylammonium caprate
DBP: dibutyl phosphate Example (1-4)-10

The inside of a four-neck flask fitted with a stirrer, a thermometer, a reflux condenser and a nitrogen inlet tube was flushed with nitrogen and then charged with 20 g of the polyisocyanate composition P(1-4)-4 obtained in Example (1-4)-4 and 16.1 g of butyl acetate, and the temperature was then raised to 70° C. Next, 19.5 g of 3,5-dimethylpyrazole was added under constant stirring, and subsequent stirring for one hour with the temperature maintained at 70° C. resulted in an NCO content of 0.0% and yielded a blocked polyisocyanate composition. The viscosity of the obtained blocked polyisocyanate composition was 540 mPa·s at 25° C., and the calculated NCO content was 14.9% by mass.

Moreover, the degree of viscosity reduction for the obtained blocked polyisocyanate composition was evaluated as o, the drying properties evaluation result was o, and the polar polyol compatibility evaluation result was o. These results were recorded in Table (1-4)-2.

Example (1-4)-11, Comparative Examples (1-4)-5 to (1-4)-7

With the exceptions of adjusting the amount added of the 3,5-dimethylpyrazole and the amount added of the butyl acetate as recorded in Table (1-4)-2, preparation was performed in the same manner as Example (1-4)-10. Further, the viscosity, the calculated NCO content, the degree of viscosity reduction, the drying properties evaluation result, and the polar polyol compatibility evaluation result for each of the obtained blocked polyisocyanate compositions were recorded in Table (1-4)-2.

TABLE (1-4)-2

| | | Example (1-4)-10 | Example (1-4)-11 | Comparative Example (1-4)-5 | Comparative Example (1-4)-6 | Comparative Example (1-4)-7 |
|---|---|---|---|---|---|---|
| Polyisocyanate composition | | P(1-4)-4 | P(1-4)-8 | P(1-4)-10 | P(1-4)-11 | P(1-4)-12 |
| 3,5-dimethylpyrazole amount added [g] | | 19.5 | 16.6 | 20.7 | 20.3 | 10.1 |
| Butyl acetate amount added [g] | | 16.1 | 15.0 | 16.6 | 16.4 | 12.5 |
| Blocked polyisocyanate composition | Calculated NCO content [% by mass] | 14.9 | 13.6 | 15.4 | 15.2 | 10.1 |
| | Viscosity [mPa·s/25° C.] | 540 | 890 | 200 | 105 | 1800 |
| Degree of viscosity reduction | | ○ | ○ | ○ | ○ | × |
| Drying properties evaluation | | ○ | ○ | ○ | × | ○ |
| Polar polyol compatibility evaluation | | ○ | ○ | × | ○ | × |

Example (1-4)-12

The inside of a four-neck flask fitted with a stirrer, a thermometer, a reflux condenser and a nitrogen inlet tube was flushed with nitrogen and then charged with 20 g of the polyisocyanate composition P(1-4)-4 obtained in Example (1-4)-4 and 8.3 g of a hydrophilic polyethylene oxide (product name: MPG-130, manufactured by Nippon Nyukazai Co., Ltd., number average molecular weight=420), and the temperature was then raised and held at 100° C. for 4 hours under constant stirring, thus obtaining a hydrophilic polyisocyanate. The viscosity of the obtained hydrophilic polyisocyanate composition was 110 mPa·s at 25° C., and the NCO content was 26.3% by mass.

Moreover, the degree of viscosity reduction was evaluated as ○, and the drying properties evaluation result was ○.

Example (1-4)-13, Comparative Examples (1-4)-8 to (1-4)-10

With the exceptions of adjusting the amount added of the MPG-130 as recorded in Table (1-4)-3, preparation was performed in the same manner as Example (1-4)-9. Further, the viscosity, the NCO content, degree of viscosity reduction, and the drying properties evaluation result for each of the obtained hydrophilic polyisocyanate compositions were recorded in Table (1-4)-3.

TABLE (1-4)-3

|  |  | Example (1-4)-12 | Example (1-4)-13 | Comparative Example (1-4)-8 | Comparative Example (1-4)-9 | Comparative Example (1-4)-10 |
|---|---|---|---|---|---|---|
| Polyisocyanate composition |  | P(1-4)-4 | P(1-4)-8 | P(1-4)-10 | P(1-4)-11 | P(1-4)-12 |
| MPG-130 amount added [g] |  | 8.3 | 7.0 | 8.8 | 8.6 | 4.3 |
| Hydrophilic polyisocyanate composition | NCO content [% by mass] | 26.3 | 23.5 | 27.5 | 27.1 | 15.9 |
|  | Viscosity [mPa · s/25° C.] | 110 | 205 | 52 | 33 | 2250 |
| Degree of viscosity reduction |  | ○ | ○ | ○ | ○ | × |
| Drying properties evaluation |  | ○ | ○ | × | × | × |

Example (1-4)-14

In this example, 0.03 g of 2,2,4-trimethylpentane was added to 300 g of the polyisocyanate composition P(1-4)-1 obtained in Example (1-4)-1.

For this polyisocyanate composition, the degree of viscosity reduction was evaluated as ○, the drying properties evaluation result was A, the result for the reaction rate between the polyisocyanate composition and a monohydric alcohol was ○, the polar polyol compatibility evaluation result was ○, and the storage stability evaluation result was favorable.

Example (1-4)-15

In this example, 0.03 g of hexadecane was added to 300 g of the polyisocyanate composition P(1-4)-1 obtained in Example (1-4)-1.

For this polyisocyanate composition, the degree of viscosity reduction was evaluated as ○, the drying properties evaluation result was A, the result for the reaction rate between the polyisocyanate composition and a monohydric alcohol was ○, the polar polyol compatibility evaluation result was ○, and the storage stability evaluation result was favorable.

Synthesis Example (1-4)-4

The inside of a four-neck flask fitted with a stirrer, a thermometer, a reflux condenser and a nitrogen inlet tube was flushed with nitrogen and then charged with 20 g of LTI, the flask was then heated to 60° C., 7.2 g of methanol was added, and the temperature was maintained for 4 hours under constant stirring, thus obtaining an N-substituted carbamate ester C(1-4)-1.

Example (1-4)-16

In this example, 0.03 g of the N-substituted carbamate ester C(1-4)-1 was added to 300 g of the polyisocyanate composition P(1-4)-1 obtained in Example (1-4)-1.

For this polyisocyanate composition, the degree of viscosity reduction was evaluated as ○, the drying properties evaluation result was A, the result for the reaction rate between the polyisocyanate composition and a monohydric alcohol was ○, the polar polyol compatibility evaluation result was ○, and the storage stability evaluation result was favorable.

The above results confirmed that the polyisocyanate composition, blocked polyisocyanate composition or hydrophilic polyisocyanate composition of each example that applied the present invention had low viscosity, and also exhibited excellent drying properties and polyester polyol compatibility.

The physical properties of the polyisocyanate compositions in Examples (1-5)-1 to (1-5)-13 and Comparative Examples (1-5)-1 to (1-5)-3 were measured using the methods described below. Unless specifically stated otherwise, "parts" and "%" mean "parts by mass" and "% by mass" respectively.

<Numbers of Nitrogen Elements Derived from Isocyanate Groups, and Contained in Allophanate Structures>

A Biospin Avance 600 (product name) manufactured by Bruker Corporation was used to conduct $^{13}$C-NMR measurements, the ratios of carbon elements close to structures derived from isocyanate groups and close to allophanate structures were determined, and based on these ratios, the number of nitrogen elements incorporated in each of the structures was calculated. In terms of the peak positions for the various functional groups and structures, the values for NTI were recorded, but because the peak positions changed depending on the triisocyanate, these positions were corrected as appropriate using a standard substance or the like.

The aforementioned structures derived from isocyanate groups indicate isocyanate groups, allophanate structures, isocyanurate structures, uretdione structures, iminooxadiazinedione structures, urethane structures and biuret structures.

Specific measurement conditions were as follows.

$^{13}$C-NMR apparatus: AVANCE 600 (manufactured by Bruker Corporation)

CryoProbe CPDUL 600S3-C/H-D-05Z (manufactured by Bruker Corporation)

Resonance frequency: 150 MHz

Concentration: 60 wt/vol %

Shift reference: CDCl$_3$ (77 ppm)

Accumulation number: 10,000

Pulse program: zgpg 30 (proton perfect decoupling methods, waiting time: 2 sec)

The signal integral values described below were divided by the number of measured carbons and then multiplied by the number of nitrogen atoms in the structure, and the resulting values were used to determine the ratio between the numbers of nitrogen elements.

Isocyanate group: near 121.5 ppm: integral value=1×1
Uretdione structure: near 157.5 ppm: integral value÷2×2
Iminooxadiazinedione structure: near 144.5 ppm: integral value÷1×3
Isocyanurate structure: near 148.5 ppm: integral value÷3×3
Allophanate structure: near 154 ppm: integral value÷1×2
Urethane structure: near 156.3 ppm: integral value÷1×1
Biuret structure: near 156.1 ppm: integral value÷2×3

<Viscosity>

The viscosity was measured at 25° C. using an E-type viscometer (manufactured by Tokimec Inc.). A standard rotor (1° 34'×R24) was used for the measurement. The rotational rate was set as follows.

100 rpm (in the case of viscosity less than 128 mPa·s)
50 rpm (in the case of viscosity from 128 mPa·s to 256 mPa·s)
20 rpm (in the case of viscosity from 256 mPa·s to 640 mPa·s)
10 rpm (in the case of viscosity from 640 mPa·s to 1,280 mPa·s)
5 rpm (in the case of viscosity from 1,280 mPa·s to 2,560 mPa·s)

The non-volatile fraction of the polyisocyanate compositions produced in the various examples and comparative examples described below was determined using the method described below, and compositions for which that value was 98% by mass or higher were measured as is.

<NCO Content>

As described above.

<Conversion Ratio>

As described above.

<Polyisocyanate Composition Degree of Viscosity Reduction (5)>

Using the viscosity measurement results for the polyisocyanate mixtures, values of 100 mPa·s or less at 25° C. were evaluated as o, values exceeding 100 mPa·s at 25° C. but not more than 300 mPa·s at 25° C. were evaluated as Δ, and values exceeding 300 mPa·s at 25° C. were evaluated as x.

<Polyisocyanate Composition Drying Properties Evaluation Method (4)>

An acrylic polyol (SETALUX 1753, a product name of Nuplex Resin Inc., resin fraction concentration: 70%, hydroxyl value: 138.6 mgKOH/g) was blended with each of the polyisocyanate compositions so as to achieve an isocyanate group/hydroxyl group equivalence ratio of 1.0, and butyl acetate was used to adjust the solid fraction to 50% by mass. Each of the thus prepared coating material compositions was applied to a glass plate in an amount sufficient to generate a dried film thickness of 40 μm, and the composition was then cured at 23° C. and 50% RH. After a prescribed period of time had elapsed, a cotton ball (a circular cylindrical shape of diameter: 2.5 cm and height: 2.0 cm) was placed on the coating film, and a 100 g weight was then placed on top of the cotton ball for 60 seconds. Subsequently, the weight and the cotton were removed, and the level of cotton traces that remained on the coating film was inspected. Cases where the time taken for absolutely no cotton traces to be visible was 11 hours or less were evaluated as o, cases where the time was greater than 11 hours but not more than 13 hours were evaluated as Δ, and cases where the time was longer than 13 hours were evaluated as x.

<Blocked Polyisocyanate Composition Degree of Viscosity Reduction (3)>

Using the viscosity measurement results for the blocked polyisocyanate compositions, values of less than 500 mPa·s at 25° C. were evaluated as o, and values of 500 mPa·s or greater at 25° C. were evaluated as x.

<Blocked Polyisocyanate Composition Drying Properties Evaluation Method (1)>

As described above.

<Hydrophilic Polyisocyanate Composition Degree of Viscosity Reduction (3)>

Using the viscosity measurement results for the hydrophilic polyisocyanate compositions, values of 200 mPa·s or less at 25° C. were evaluated as o, and values exceeding 200 mPa·s at 25° C. were evaluated as x.

<Hydrophilic Polyisocyanate Composition Drying Properties Evaluation Method>

As described above.

<Solubility in Low-Polarity Organic Solvents (1)>

One hundred grams of HAWS (aniline point: 15° C.) was added to 100 g of the polyisocyanate composition at 23° C., and after standing for 12 hours, the mixture was inspected, and was deemed to have dissolved if the liquid was uniformly transparent. Uniform solutions were evaluated as o, separated or turbid mixtures were evaluated as x, and mixture with slight turbidity were evaluated as Δ.

<Dispersibility in Water>

One part of the polyisocyanate composition was added to 100 parts of a mixture of water/BGA=9:1 at 23° C., and following dispersion by vigorous manual stirring, the mixture was left to stand for 3 hours and then inspected. Liquids that remained uniformly dispersed even after 3 hours were evaluated as o, mixtures in which slight sedimentation was observed were evaluated as Δ, and mixtures that had separated were evaluated as x.

<Storage Stability Evaluation Method>

As described above.

Synthesis Example (1-5)-1

Synthesis of LTI

A four-neck flask fitted with a stirrer, a thermometer and a gas inlet tube was charged with 122.2 g of ethanolamine, 100 ml of o-dichlorobenzene and 420 ml of toluene, and ice-cooled hydrogen chloride gas was then introduced into the flask to convert the ethanolamine to a hydrochloride salt. Subsequently, 182.5 g of lysine hydrochloride was added, the reaction liquid was heated to 80° C. to dissolve the ethanolamine hydrochloride, and hydrogen chloride gas was then introduced to form lysine dihydrochloride. Additional hydrogen chloride gas was then passed through the reaction liquid at 20 to 30 ml/min., the reaction liquid was heated to 116° C., and this temperature was maintained until no more water distilled from the liquid. The thus produced reaction mixture was recrystallized from a mixed solution of methanol and ethanol, thus obtaining 165 g of lysine β-aminoethyl ester trihydrochloride. Subsequently, 100 g of this lysine β-aminoethyl ester trihydrochloride was converted to a fine powder and suspended in 1,200 ml of o-dichlorobenzene, the temperature of the reaction liquid was raised while the liquid was stirred, and when the temperature reached 120° C., phosgene was started to be blown into the flask at a rate of 0.4 mol/hr, blowing of the phosgene was continued for 10 hours, and the temperature was then raised to 150° C. The suspension almost completely dissolved. Following cooling, the reaction mixture was filtered, any dissolved phosgene and the solvent were removed by distillation under reduced pressure, and vacuum distillation was used to obtain 80.4 g of colorless and transparent LTI having a boiling point of 155 to 157° C. at 0.022 mmHg. The NCO content of this compound was 47.1% by weight.

Synthesis Example (1-5)-2

Synthesis of GTI

A four-neck flask fitted with a stirrer, a thermometer and a gas inlet tube was charged with 275 g of glutamic acid hydrochloride, 800 g of ethanolamine hydrochloride and 150 ml of toluene, and with hydrogen chloride gas being blown into the flask, the reaction mixture was refluxed under heating at 110° C. for 24 hours until the azeotropic distillation of water stopped. The reaction mixture was recrystallized from a mixed solution of methanol and ethanol, thus obtaining 270 g of bis(2-aminoethyl)glutamate trihydrochloride. Next, 85 g of this bis(2-aminoethyl)glutamate trihydrochloride was suspended in 680 g of o-dichlorobenzene, the temperature of the reaction liquid was raised while the liquid was stirred, and when the temperature reached 135° C., phosgene was started to be blown into the flask at a rate of 0.8 mol/hr, blowing of the phosgene was continued for 13 hours, and the reaction product was then filtered, concentrated under reduced pressure, and then purified using a thin film evaporator, yielding 54 g of GTI. The NCO content was 39.8% by weight.

Synthesis Example (1-5)-3

Synthesis of NTI

In a four-neck flask fitted with a stirrer, a thermometer and a gas inlet tube, 1,060 g of 4-aminomethyl-1,8-octamethylenediamine (hereafter referred to as "the triamine") was dissolved in 1,500 g of methanol, and 1,800 mL of a 35% concentrated hydrochloric acid solution was then added gradually to the flask in a dropwise manner under cooling. The reaction solution was concentrated by removing the methanol and water under reduced pressure, and the residue was then dried at 60° C. and 5 mmHg for 24 hours, yielding a triamine hydrochloride as a white solid. A 650 g sample of the obtained triamine hydrochloride was converted to a fine powder and suspended in 5,000 g of o-dichlorobenzene, the temperature of the reaction liquid was raised while the liquid was stirred, and when the temperature reached 100° C., phosgene was started to be blown into the flask at a rate of 200 g/hr, the temperature was further raised and then held at 180° C., and blowing of the phosgene was continued for 12 hours. Following removal of any dissolved phosgene and the solvent by distillation under reduced pressure, vacuum distillation was used to obtain 420 g of colorless and transparent 4-isocyanatomethyl-1,8-octamethylene diisocyanate (hereafter referred to as NTI) having a boiling point of 161 to 163° C. at 1.2 mmHg. The NCO content of this compound was 50% by weight.

Example (1-5)-1

Synthesis of P(1-5)-1

The inside of a four-neck flask fitted with a stirrer, a thermometer, a reflux condenser and a nitrogen inlet tube was flushed with nitrogen and then charged with 50 g of NTI as a monomer and 11.7 g of 2-ethylhexanol, and the temperature was then raised to 90° C. and held at that temperature for one hour. The temperature was then further raised to 130° C., 2 mg of an allophanation catalyst of a mineral spirit solution containing a solid fraction of 20% of zirconyl 2-ethylhexanoate (product name: Nikka Octix Zirconium 13%, manufactured by Nihon Kagaku Sangyo Co., Ltd., diluted with mineral spirit) was added, the allophanation reaction was allowed to proceed, and when the conversion ratio reached 10%, an isobutanol solution containing a solid fraction of 50% of pyrophosphoric acid (a reagent manufactured by Katayama Chemical Ltd., diluted with isobutanol) was added to halt the reaction, thus obtaining a polyisocyanate P(1-5)-1. The viscosity of the obtained polyisocyanate P(1-5)-1 was 35 mPa·s at 25° C., and the NCO content was 39% by mass.

Moreover, the degree of viscosity reduction for the polyisocyanate composition P(1-5)-1 was evaluated as o, the drying properties evaluation result was o, the solubility in low-polarity organic solvents was evaluated as o, and the water dispersibility was evaluated as o.

Examples (1-5)-2 to (1-5)-8, Comparative Examples (1-5)-1 to (1-5)-3

With the exceptions of adjusting the monomer, the type and the amount added of the alcohol, and the conversion ratio as recorded in Table (1-5)-1, preparation was performed in the same manner as Example (1-5)-1. However, in Comparative Example (1-5)-3, residual HDI was removed by thin film distillation down to a level of 0.5% by mass. The viscosity, the NCO content, the degree of viscosity reduction, the drying properties evaluation result, the solubility in low-polarity organic solvents and the water dispersibility result for each of the obtained polyisocyanate compositions were recorded in Table (1-5)-1.

TABLE (1-5)-1

| | | Example (1-5)-1 | Example (1-5)-2 | Example (1-5)-3 | Example (1-5)-4 | Example (1-5)-5 | Example (1-5)-6 | Example (1-5)-7 | Example (1-5)-8 | Comparative Example (1-5)-1 | Comparative Example (1-5)-2 | Comparative Example (1-5)-3 |
|---|---|---|---|---|---|---|---|---|---|---|---|---|
| Polyisocyanate composition | | P(1-5)-1 | P(1-5)-2 | P(1-5)-3 | P(1-5)-4 | P(1-5)-5 | P(1-5)-6 | P(1-5)-7 | P(1-5)-8 | P(1-5)-6 | P(1-5)-7 | P(1-5)-8 |
| Monomer | | TTI | TTI | TTI | TTI | TTI | TTI | LTI | GTI | TTI | TTI | HDI |
| Alcohol type | | 2EHOH | 2EHOH | 2EHOH | 1,4-BG | PrOH | PPG | 2EHOH | 2EHOH | — | MeOH | 2EHOH |
| Alcohol amount added | | 11.7 | 1.75 | 58.3 | 16.13 | 5.38 | 35.9 | 4.1 | 9.4 | 0 | 0.3 | 4.5 |
| Conversion ratio | | 30 | 30 | 60 | 30 | 30 | 30 | 40 | 30 | 0 | 60 | 40 |
| Ratio of nitrogen elements contained in allophanate structure | | 10 | 1.5 | 50 | 20 | 10 | 10 | 3.7 | 10 | — | 1.2 | 8.3 |
| Polyisocyanate composition | NCO content [% by mass] | 39 | 44 | 17 | 35 | 40 | 34 | 39 | 32 | 50 | 40 | 44 |
| | Viscosity [mPa·s/25° C.] | 30 | 20 | 80 | 110 | 20 | 200 | 60 | 40 | 20 | 260 | 340 |

TABLE (1-5)-1-continued

|  | Example (1-5)-1 | Example (1-5)-2 | Example (1-5)-3 | Example (1-5)-4 | Example (1-5)-5 | Example (1-5)-6 | Example (1-5)-7 | Example (1-5)-8 | Comparative Example (1-5)-1 | Comparative Example (1-5)-2 | Comparative Example (1-5)-3 |
|---|---|---|---|---|---|---|---|---|---|---|---|
| Degree of viscosity reduction | o | o | o | Δ | o | Δ | o | o | o | Δ | × |
| Solubility in low-polarity organic solvents | o | Δ | o | o | o | o | o | o | × | × | o |
| Water dispersibility | o | Δ | o | o | o | o | o | o | × | × | × |
| Drying properties evaluation | o | o | o | o | o | o | o | o | Δ | o | o |

Example (1-5)-9

The inside of a four-neck flask fitted with a stirrer, a thermometer, a reflux condenser and a nitrogen inlet tube was flushed with nitrogen and then charged with 20 g of the polyisocyanate composition P(1-5)-7 obtained in Example (1-5)-7 and 15.5 g of butyl acetate, and the temperature was raised to 70° C. Subsequently, 17.9 g of 3,5-dimethylpyrazole was added under constant stirring, and subsequent stirring for one hour with the temperature maintained at 70° C. resulted in an NCO content of 0.0% and yielded a blocked polyisocyanate composition. The viscosity of the obtained blocked polyisocyanate composition was 360 mPa·s at 25° C.

Moreover, the degree of viscosity reduction was evaluated as o, and the drying properties evaluation result was o.

Example (1-5)-10

The inside of a four-neck flask fitted with a stirrer, a thermometer, a reflux condenser and a nitrogen inlet tube was flushed with nitrogen and then charged with 20 g of the polyisocyanate composition P(1-5)-7 obtained in Example (1-5)-7 and 8.3 g of a hydrophilic polyethylene oxide (product name: MPG-130, manufactured by Nippon Nyukazai Co., Ltd., number average molecular weight=420), and the temperature was then raised and held at 100° C. for 4 hours under constant stirring, thus obtaining a hydrophilic polyisocyanate. The viscosity of the obtained hydrophilic polyisocyanate composition was 85 mPa·s at 25° C.

Moreover, the degree of viscosity reduction was evaluated as o, and the drying properties evaluation result was o.

Example (1-5)-11

In this example, 0.03 g of 2,2,4-trimethylpentane was added to 300 g of the polyisocyanate composition P(1-5)-1 obtained in Example (1-5)-1.

For this polyisocyanate composition, the degree of viscosity reduction was evaluated as o, the drying properties evaluation result was o, the solubility in low-polarity organic solvents was evaluated as o, the water dispersibility was evaluated as o, and the storage stability evaluation result was favorable.

Example (1-5)-12

In this example, 0.03 g of hexadecane was added to 300 g of the polyisocyanate composition P(1-5)-1 obtained in Example (1-5)-1.

For this polyisocyanate composition, the degree of viscosity reduction was evaluated as o, the drying properties evaluation result was o, the solubility in low-polarity organic solvents was evaluated as o, the water dispersibility was evaluated as o, and the storage stability evaluation result was favorable.

Synthesis Example (1-5)-4

The inside of a four-neck flask fitted with a stirrer, a thermometer, a reflux condenser and a nitrogen inlet tube was flushed with nitrogen and then charged with 20 g of NTI, the flask was then heated to 60° C., 7.7 g of methanol was added, and the temperature was maintained for 4 hours under constant stirring, thus obtaining an N-substituted carbamate ester C(1-5)-1.

Example (1-5)-13

In this example, 0.03 g of the N-substituted carbamate ester C(1-5)-1 was added to 300 g of the polyisocyanate composition P(1-5)-1 obtained in Example (1-5)-1.

For this polyisocyanate composition, the degree of viscosity reduction was evaluated as o, the drying properties evaluation result was o, the solubility in low-polarity organic solvents was evaluated as o, the water dispersibility was evaluated as o, and the storage stability evaluation result was favorable.

The physical properties of the polyisocyanate compositions in Examples (1-6)-1 to (1-6)-11 and Comparative Examples (1-6)-1 to (1-6)-10 were measured using the methods described below. Unless specifically stated otherwise, "parts" and "%" mean "parts by mass" and "% by mass" respectively.

<Viscosity>
As described above.
<NCO Content>
As described above.
<Calculated NCO Content>
As described above.
<Conversion Ratio>
As described above.
<Method for Quantifying Molar Ratio of Allophanate Structures>

A Biospin Avance 600 (product name) manufactured by Bruker Corporation was used to conduct $^{13}$C-NMR measurements, and the molar ratios of iminooxadiazinedione structures, uretdione structures, isocyanurate structures, allophanate structures, urethane structures and biuret structures were determined.

Specific measurement conditions were as follows.
$^{13}$C-NMR apparatus: AVANCE 600 (manufactured by Bruker Corporation)
CryoProbe CPDUL 600S3-C/H-D-05Z (manufactured by Bruker Corporation)
Resonance frequency: 150 MHz
Concentration: 60 wt/vol %
Shift reference: $CDCl_3$ (77 ppm)

Accumulation number: 10,000

Pulse program: zgpg 30 (proton perfect decoupling methods, waiting time: 2 sec)

The signal integral values described below were divided by the number of measured carbons, and the resulting values were used to determine the various molar ratios.

Uretdione structure: near 157.5 ppm: integral value÷2

Iminooxadiazinedione structure: near 144.5 ppm: integral value÷1

Isocyanurate structure: near 148.5 ppm: integral value÷3

Allophanate structure: near 154 ppm: integral value÷1

Urethane structure: near 156.3 ppm: integral value÷1−allophanate structure integral value Biuret structure: near 156.1 ppm: integral value÷2

The molar ratios for the allophanate structures, uretdione structures, iminooxadiazinedione structures, isocyanurate structures, urethane structures and biuret structures were labeled a, b, c, d, e and f respectively, and the following formula was used to determine the molar ratio of allophanate structures.

$$\text{Molar ratio of allophanate structures} = a/(a+b+c+d+e+f)$$

<Polyisocyanate Composition Degree of Viscosity Reduction (4)>

As described above.

<Polyisocyanate Composition Drying Properties Evaluation Method (3)>

As described above.

<Reaction Rate Between Polyisocyanate Composition and Monohydric Alcohol>

As described above.

<Blocked Polyisocyanate Composition Degree of Viscosity Reduction (4)>

Using the viscosity measurement results for the blocked polyisocyanate compositions, values of less than 450 mPa·s at 25° C. were evaluated as o, and values of 450 mPa·s or greater at 25° C. were evaluated as x.

<Blocked Polyisocyanate Composition Drying Properties Evaluation Method (1)>

As described above.

<Hydrophilic Polyisocyanate Composition Degree of Viscosity Reduction (4)>

Using the viscosity measurement results for the hydrophilic polyisocyanate compositions, values of less than 90 mPa·s at 25° C. were evaluated as o, and values of 90 mPa·s or greater at 25° C. were evaluated as x.

<Hydrophilic Polyisocyanate Composition Drying Properties Evaluation Method>

As described above.

<Solubility in Low-Polarity Organic Solvents (2)>

One hundred grams of High Aromatic White Spirit (HAWS) (aniline point: 15° C.) was added to 100 g of the polyisocyanate composition at 0° C., and after standing for 24 hours, the mixture was inspected, and was deemed to have dissolved if the liquid was uniformly transparent. Uniform mixtures were evaluated as o, and separated or turbid mixtures were evaluated as x.

<Storage Stability Evaluation Method>

As described above.

Synthesis Example (1-6)-1

Synthesis of LTI

A four-neck flask fitted with a stirrer, a thermometer and a gas inlet tube was charged with 122.2 g of ethanolamine, 100 mL of o-dichlorobenzene and 420 mL of toluene, and ice-cooled hydrogen chloride gas was then introduced into the flask to convert the ethanolamine to a hydrochloride salt. Subsequently, 182.5 g of lysine hydrochloride was added, the reaction liquid was heated to 80° C. to dissolve the ethanolamine hydrochloride, and hydrogen chloride gas was then introduced to form lysine dihydrochloride. Additional hydrogen chloride gas was then passed through the reaction liquid at 20 to 30 mL/min., the reaction liquid was heated to 116° C., and this temperature was maintained until no more water distilled from the liquid. The thus produced reaction mixture was recrystallized from a mixed solution of methanol and ethanol, thus obtaining 165 g of lysine β-aminoethyl ester trihydrochloride. Subsequently, 100 g of this lysine β-aminoethyl ester trihydrochloride was converted to a fine powder and suspended in 1,200 mL of o-dichlorobenzene, the temperature of the reaction liquid was raised while the liquid was stirred, and when the temperature reached 120° C., phosgene was started to be blown into the flask at a rate of 0.4 mol/hr, blowing of the phosgene was continued for 10 hours, and the temperature was then raised to 150° C. The suspension almost completely dissolved. Following cooling, the reaction mixture was filtered, any dissolved phosgene and the solvent were removed by distillation under reduced pressure, and vacuum distillation was used to obtain 80.4 g of colorless and transparent LTI having a boiling point of 155 to 157° C. at 0.022 mmHg. The NCO content of this compound was 47.1% by weight.

Synthesis Example (1-6)-2

Synthesis of GTI

A four-neck flask fitted with a stirrer, a thermometer and a gas inlet tube was charged with 275 g of glutamic acid hydrochloride, 800 g of ethanolamine hydrochloride and 150 mL of toluene, and with hydrogen chloride gas being blown into the flask, the reaction mixture was refluxed under heating at 110° C. for 24 hours until the azeotropic distillation of water stopped. The reaction mixture was recrystallized from a mixed solution of methanol and ethanol, thus obtaining 270 g of bis(2-aminoethyl)glutamate trihydrochloride. Next, 85 g of this bis(2-aminoethyl)glutamate trihydrochloride was suspended in 680 g of o-dichlorobenzene, the temperature of the reaction liquid was raised while the liquid was stirred, and when the temperature reached 135° C., phosgene was started to be blown into the flask at a rate of 0.8 mol/hr, blowing of the phosgene was continued for 13 hours, and the reaction product was then filtered, concentrated under reduced pressure, and then purified using a thin film evaporator, yielding 54 g of GTI. The NCO content was 39.8% by weight.

Synthesis Example (1-6)-3

Synthesis of NTI

In a four-neck flask fitted with a stirrer, a thermometer and a gas inlet tube, 1,060 g of 4-aminomethyl-1,8-octamethylenediamine (hereafter sometimes referred to as "the triamine") was dissolved in 1,500 g of methanol, and 1,800 mL of a 35% concentrated hydrochloric acid solution was then added gradually to the flask in a dropwise manner under cooling. The reaction solution was concentrated by removing the methanol and water under reduced pressure, and the residue was then dried at 60° C. and 5 mmHg for 24 hours, yielding a triamine hydrochloride as a white solid. A 650 g sample of the obtained triamine hydrochloride was converted to a fine powder and suspended in 5,000 g of o-dichlorobenzene, the temperature of the reaction liquid was raised while the liquid was stirred, and when the temperature reached 100° C., phosgene was started to be blown into the flask at a rate of 200 g/hr, the temperature was further raised and then held at 180° C., and blowing of the phosgene was continued for 12 hours. Following removal of any dissolved phosgene and the solvent by distillation under reduced pressure, vacuum distillation was used to obtain 420 g of colorless and transparent 4-isocyanatomethyl-1,8-octamethylene diisocyanate (hereafter sometimes referred to as NTI) having a boiling point of 161 to 163° C. at 1.2 mmHg. The NCO content of this compound was 50.0% by weight.

Example (1-6)-1

Synthesis of P(1-6)-1

The inside of a four-neck flask fitted with a stirrer, a thermometer, a reflux condenser and a nitrogen inlet tube was flushed with nitrogen and then charged with 50 g of LTI as a monomer and 2.0 g of 2-ethylhexanol, and the temperature was then raised to 90° C. and held at that temperature for one hour. The temperature was then further raised to 130° C., 2 mg of an allophanation catalyst of a mineral spirit solution containing a solid fraction of 20% of zirconyl 2-ethylhexanoate (product name: Nikka Octix Zirconium 13%, manufactured by Nihon Kagaku Sangyo Co., Ltd., diluted with mineral spirit) was added, the allophanation reaction was allowed to proceed, and when the conversion ratio reached 20%, an isobutanol solution containing a solid fraction of 50% of pyrophosphoric acid (a reagent manufactured by Katayama Chemical Ltd., diluted with isobutanol) was added to halt the reaction, thus obtaining a polyisocyanate P(1-6)-1. The viscosity of the obtained polyisocyanate P(1-6)-1 was 46 mPa·s at 25° C., the NCO content was 42% by mass, and the molar ratio of allophanate structures was 0.75.

Moreover, the degree of viscosity reduction for the polyisocyanate composition P(1-6)-1 was evaluated as o, the drying properties evaluation result was o, the result for the reaction rate between the polyisocyanate composition and a monohydric alcohol was o, and the solubility in low-polarity organic solvents was evaluated as o. These results were recorded in Table (1-6)-1.

Examples (1-6)-2 to (1-6)-5, Comparative Examples (1-6)-1 and (1-6)-2

Synthesis of P(1-6)-2 to P(1-6)-5, P(1-6)-7 and P(1-6)-8

With the exceptions of adjusting the monomer, the amount added of the 2-ethylhexanol, and the conversion ratio as recorded in Table (1-6)-1, preparation was performed in the same manner as Example (1-6)-1. The viscosity, the NCO content, the molar ratio of allophanate structures, the degree of viscosity reduction, the drying properties evaluation result, and the solubility in low-polarity organic solvents for each of the obtained polyisocyanate compositions were recorded in Table (1-6)-1.

TABLE (1-6)-1

|  |  | Example (1-6)-1 | Example (1-6)-2 | Example (1-6)-3 | Example (1-6)-4 | Example (1-6)-5 | Comparative Example (1-6)-1 | Comparative Example (1-6)-2 | Comparative Example (1-6)-3 | Comparative Example (1-6)-4 |
|---|---|---|---|---|---|---|---|---|---|---|
| Polyisocyanate composition | | P(1-6)-1 | P(1-6)-2 | P(1-6)-3 | P(1-6)-4 | P(1-6)-5 | P(1-6)-7 | P(1-6)-8 | P(1-6)-9 | LTI |
| Monomer | | LTI | LTI | LTI | LTI | GTI | NTI | HDI | Unreacted HDI removed from P-8 | |
| 2-ethylhexanol amount added [g] | | 1.1 | 1.7 | 2.3 | 4.1 | 2.1 | 4.6 | 4.0 | | |
| Conversion ratio [%] | | 12 | 18 | 23 | 40 | 25 | 40 | 40 | | |
| Polyisocyanate composition | NCO content [% by mass] | 44 | 43 | 42 | 38 | 40 | 39 | 37 | 17 | 47 |
|  | Viscosity [mPa · s/25° C.] | 36 | 44 | 51 | 84 | 76 | 27 | 18 | 100 | 25 |
|  | Molar ratio of allophanate groups | 0.75 | 0.73 | 0.71 | 0.69 | 0.72 | 0.68 | 0.81 | 0.81 | |
| Degree of viscosity reduction | | o | o | o | o | o | o | o | × | o |
| Drying properties evaluation | | Δ | Δ | o | o | o | × | × | × | × |
| Reaction rate of polyisocyanate composition and monohydric alcohol | | o | o | o | o | o | × | × | × | o |
| Solubility in low-polarity organic solvents | | o | o | o | o | o | Δ | o | o | o |

Example (1-6)-6

The inside of a four-neck flask fitted with a stirrer, a thermometer, a reflux condenser and a nitrogen inlet tube was flushed with nitrogen and then charged with 50 g of LTI as a monomer, and the temperature was then raised to 50° C. Subsequently, 29.3 g of methyl ethyl ketoxime was added dropwise under stirring, and the temperature was raised and held at 50° C. for one hour. Next, 4.0 g of 2-ethylhexanol was added, and the temperature was held at 90° C. for one hour. The temperature was then raised to 130° C., 2 mg of an allophanation catalyst of a mineral spirit solution containing a solid fraction of 20% of zirconyl 2-ethylhexanoate (product name: Nikka Octix Zirconium 13%, manufactured by Nihon Kagaku Sangyo Co., Ltd., diluted with mineral spirit) was added, the allophanation reaction was allowed to proceed, and when the conversion ratio reached 40%, an isobutanol solution containing a solid fraction of 50% of pyrophosphoric acid (a reagent manufactured by Katayama Chemical Ltd., diluted with isobutanol) was added to halt the reaction. Subsequently, the temperature was raised to 150° C., and vacuum distillation was used to remove the methyl ethyl ketoxime by distillation, thus obtaining a polyisocyanate composition P(1-6)-6. The viscosity of the obtained P(1-6)-6 was 79 mPa·s at 25° C., the NCO content was 39% by mass, and the molar ratio of allophanate structures was 0.81. Moreover, the degree of viscosity reduction for the polyisocyanate composition P(1-6)-5 was evaluated as o, the drying properties evaluation result was ⊚, the result for the reaction rate between the polyisocyanate composition and a monohydric alcohol was ⊚, and the solubility in low-polarity organic solvents was evaluated as o.

Comparative Example (1-6)-3

Synthesis of P(1-6)-9

The reaction liquid obtained in Comparative Example (1-6)-2 was fed into a thin film evaporator, and the unreacted HDI was removed to obtain a polyisocyanate composition P(1-6)-9. The viscosity of the obtained polyisocyanate P(1-6)-9 was 25 mPa·s at 25° C., the NCO content was 47% by mass, and the molar ratio of allophanate structures was 0.87.

Moreover, the degree of viscosity reduction for the polyisocyanate composition P(1-6)-9 was evaluated as x, the drying properties evaluation result was x, the result for the reaction rate between the polyisocyanate composition and a monohydric alcohol was x, and the solubility in low-polarity organic solvents was evaluated as o. These results were recorded in Table (1-6)-1.

Comparative Example (1-6)-4

The viscosity of the LTI monomer was 25 mPa·s at 25° C., the NCO content was 47% by mass, and the molar ratio of allophanate structures was 0.

Moreover, the degree of viscosity reduction for the LTI monomer was evaluated as o, the drying properties evaluation result was x, the result for the reaction rate between the polyisocyanate composition and a monohydric alcohol was o, and the solubility in low-polarity organic solvents was evaluated as o. These results were recorded in Table (1-6)-1.

Example (1-6)-7

Synthesis of Blocked Polyisocyanate Composition

The inside of a four-neck flask fitted with a stirrer, a thermometer, a reflux condenser and a nitrogen inlet tube was flushed with nitrogen and then charged with 20 g of the polyisocyanate composition P(1-6)-4 obtained in Example (1-6)-4 and 15.5 g of butyl acetate, and the temperature was raised to 70° C. Subsequently, 17.9 g of 3,5-dimethylpyrazole was added under constant stirring, and subsequent stirring for one hour with the temperature maintained at 70° C. resulted in an NCO content of 0.0% and yielded a blocked polyisocyanate composition. The viscosity of the obtained blocked polyisocyanate composition was 360 mPa·s at 25° C., and the calculated NCO content was 14.2% by mass.

Moreover, the degree of viscosity reduction was evaluated as o, and the drying properties evaluation result was o. These results were recorded in Table (1-6)-2.

Comparative Examples (1-6)-5 to (1-6)-7

Synthesis of Blocked Polyisocyanate Compositions

With the exceptions of adjusting the polyisocyanate composition, the amount added of the 3,5-dimethylpyrazole, and the amount added of the butyl acetate as recorded in Table (1-6)-2, preparation was performed in the same manner as Example (1-6)-7. Further, the viscosity, the calculated NCO content, the degree of viscosity reduction, and the drying properties evaluation result for each of the obtained blocked polyisocyanate compositions were recorded in Table (1-6)-2.

TABLE (1-6)-2

|  |  | Example (1-6)-7 | Comparative Example (1-6)-5 | Comparative Example (1-6)-6 | Comparative Example (1-6)-7 |
|---|---|---|---|---|---|
| Polyisocyanate composition | | P(1-6)-4 | P(1-6)-7 | P(1-6)-8 | P(1-6)-9 |
| 3,5-dimethylpyrazole amount added [g] | | 17.9 | 18.4 | 17.4 | 8.0 |
| Butyl acetate amount added [g] | | 15.5 | 15.6 | 15.3 | 11.7 |
| Blocked polyisocyanate composition | Calculated NCO content [% by mass] | 14.2 | 14.4 | 14.0 | 8.6 |
| | Viscosity [mPa · s/25° C.] | 360 | 174 | 98 | 520 |
| Degree of viscosity reduction | | o | o | o | x |
| Drying properties evaluation | | o | x | x | x |

Example (1-6)-8

Synthesis of Hydrophilic Polyisocyanate Composition

The inside of a four-neck flask fitted with a stirrer, a thermometer, a reflux condenser and a nitrogen inlet tube was flushed with nitrogen and then charged with 20 g of the polyisocyanate composition P(1-6)-4 obtained in Example (1-6)-4 and 8.3 g of a hydrophilic polyethylene oxide (product name: MPG-130, manufactured by Nippon Nyukazai Co., Ltd., number average molecular weight=420), and the temperature was then raised and held at 100° C. for 4 hours under constant stirring, thus obtaining a hydrophilic polyisocyanate. The viscosity of the obtained hydrophilic polyisocyanate composition was 84 mPa·s at 25° C., and the NCO content was 24.8% by mass.

Moreover, the degree of viscosity reduction was evaluated as o, and the drying properties evaluation result was o. These results were recorded in Table (1-6)-3.

Comparative Examples (1-6)-8 to (1-6)-10

Synthesis of Hydrophilic Polyisocyanate Compositions

With the exceptions of adjusting the polyisocyanate composition, and the amount added of the MPG-130 as recorded in Table (1-6)-3, preparation was performed in the same manner as Example (1-6)-8. Further, the viscosity, the NCO content, the degree of viscosity reduction, and the drying properties evaluation result for each of the obtained hydrophilic polyisocyanate compositions were recorded in Table (1-6)-3.

TABLE (1-6)-3

| | | Example (1-6)-8 | Comparative Example (1-6)-8 | Comparative Example (1-6)-9 | Comparative Example (1-6)-10 |
|---|---|---|---|---|---|
| Polyisocyanate composition | | P(1-6)-4 | P(1-6)-7 | P(1-6)-8 | P(1-6)-9 |
| MPG-130 amount added [g] | | 7.6 | 7.8 | 7.4 | 3.4 |
| Hydrophilic polyisocyanate composition | NCO content [% by mass] | 24.8 | 25.3 | 24.3 | 13.1 |
| | Viscosity [mPa · s/25° C.] | 80 | 41 | 32 | 98 |
| Degree of viscosity reduction | | ○ | ○ | ○ | × |
| Drying properties evaluation | | ○ | × | × | × |

Example (1-6)-9

In this example, 0.03 g of 2,2,4-trimethylpentane was added to 300 g of the polyisocyanate composition P(1-6)-1 obtained in Example (1-6)-1.

For this polyisocyanate composition, the degree of viscosity reduction was evaluated as o, the drying properties evaluation result was o, the result for the reaction rate between the polyisocyanate composition and a monohydric alcohol was o, the solubility in low-polarity organic solvents was evaluated as o, and the storage stability evaluation result was favorable.

Example (1-6)-10

In this example, 0.03 g of hexadecane was added to 300 g of the polyisocyanate composition P(1-6)-1 obtained in Example (1-6)-1.

For this polyisocyanate composition, the degree of viscosity reduction was evaluated as o, the drying properties evaluation result was o, the result for the reaction rate between the polyisocyanate composition and a monohydric alcohol was o, the solubility in low-polarity organic solvents was evaluated as o, and the storage stability evaluation result was favorable.

Synthesis Example (1-6)-4

Synthesis of C(1-6)-1

The inside of a four-neck flask fitted with a stirrer, a thermometer, a reflux condenser and a nitrogen inlet tube was flushed with nitrogen and then charged with 20 g of LTI, the flask was then heated to 60° C., 7.2 g of methanol was added, and the temperature was maintained for 4 hours under constant stirring, thus obtaining an N-substituted carbamate ester C(1-6)-1.

Example (1-6)-11

In this example, 0.03 g of the N-substituted carbamate ester C(1-6)-1 was added to 300 g of the polyisocyanate composition P(1-6)-1 obtained in Example (1-6)-1.

For this polyisocyanate composition, the degree of viscosity reduction was evaluated as o, the drying properties evaluation result was o, the result for the reaction rate between the polyisocyanate composition and a monohydric alcohol was o, the solubility in low-polarity organic solvents was evaluated as o, and the storage stability evaluation result was favorable.

The above results confirmed that the polyisocyanate composition of each example had low viscosity, and also exhibited excellent drying properties and excellent solubility in low-polarity organic solvents.

The invention claimed is:

1. A polyisocyanate composition comprising polyisocyanate compounds represented by general formula (I) and general formula (II):

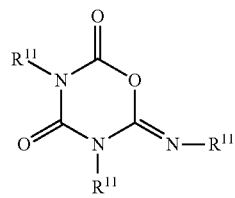

(I)

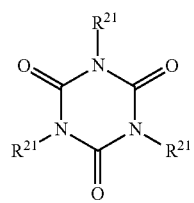

(II)

wherein in general formulas (I) and (II), pluralities of $R^{11}$ and $R^{21}$ each independently represent an organic group, at least one of the pluralities of $R^{11}$ and $R^{21}$ is a group represented by general formula (V), and the pluralities of $R^{11}$ and $R^{21}$ may be identical or different;

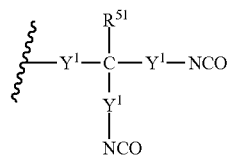

(V)

wherein in general formula (V), each of a plurality of $Y^1$ independently represents a single bond or a divalent hydrocarbon group of 1 to 20 carbon atoms that may contain an ester structure and/or an ether structure, the plurality of $Y^1$ may be identical or different, $R^{51}$ represents a hydrogen atom or a monovalent hydrocarbon group of 1 to 12 carbon atoms, and a wavy line indicates a bonding site.

2. The polyisocyanate composition according to claim 1, comprising polyisocyanate compounds represented by the general formula (I) and the general formula (II), wherein a molar ratio between iminooxadiazinedione structures and isocyanurate structures is at least 0.01 but not more than 1.5.

3. The polyisocyanate composition according to claim 1, further comprising a triisocyanate represented by general formula (V)-1:

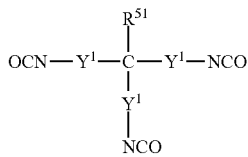

(V)-1 wherein in general formula (V)-1, each of a plurality of $Y^1$ independently represents a single bond or a divalent hydrocarbon group of 1 to 20 carbon atoms that may contain an ester structure and/or an ether structure, the plurality of $Y^1$ may be identical or different, and $R^{51}$ represents a hydrogen atom or a monovalent hydrocarbon group of 1 to 12 carbon atoms.

4. The polyisocyanate composition according to claim 1, comprising a polyisocyanate compound represented by the general formula (II), wherein a theoretical reaction rate calculated from an NCO % of the polyisocyanate composition is not more than 47%.

5. The polyisocyanate composition according to claim 1, comprising a polyisocyanate compound represented by the general formula (II), wherein a theoretical reaction rate calculated from an NCO % of the polyisocyanate composition is at least 95% but not more than 150%.

6. The polyisocyanate composition according to claim 3, comprising a polyisocyanate compound (A) represented by the general formula (II), and a triisocyanate compound (B) represented by the general formula (V)-1, wherein a surface area ratio ((A)/[(A)+(B)]) between a peak surface area (A) of a number average molecular weight of the polyisocyanate compound (A) and a peak surface area (B) of a number average molecular weight of the triisocyanate compound (B), obtained by a gel permeation chromatography (GPC) measurement, is at least 0.8 but less than 1.

7. The polyisocyanate composition according to claim 6, wherein when a monomer trimer which is a triisocyanate represented by the general formula (II) in which all the $R^{21}$ groups are represented by the above general formula (V) is deemed to be a compound (C), a peak surface area ratio ((C)/[(A)+(B)] between a peak surface area (A) of a number average molecular weight of the polyisocyanate compound (A), a peak surface area (B) of a number average molecular weight of the triisocyanate compound (B), and a peak surface area (C) of a number average molecular weight of the compound (C), obtained by a gel permeation chromatography (GPC) measurement, is at least 0.3 but less than 1.

8. The polyisocyanate composition according to claim 6, wherein an isocyanate group functional value is at least 4 but not more than 12.

9. A polyisocyanate composition comprising polyisocyanate compounds represented by general formula (II) and general formula (III), wherein a molar ratio between isocyanurate structures and allophanate structures is within a range from 100/0.1 to 100/15:

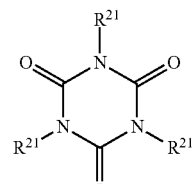

(II)

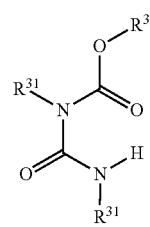

(III)

wherein in general formula (II) and general formula (III), pluralities of $R^{21}$ and $R^{31}$ each independently represent an organic group, at least one of the pluralities of $R^{21}$ and $R^{31}$ is a group represented by general formula (V), the pluralities of $R^{21}$ and $R^{31}$ may be identical or different, and $R^{32}$ represents a residue in which one hydroxyl group has been removed from a monohydric or polyhydric alcohol;

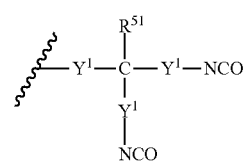

(V)

wherein in general formula (V), each of a plurality of $Y^1$ independently represents a single bond or a divalent hydrocarbon group of 1 to 20 carbon atoms that may contain an ester structure and/or an ether structure, the plurality of $Y^1$ may be identical or different, $R^{51}$ represents a hydrogen atom or a monovalent hydrocarbon group of 1 to 12 carbon atoms, and a wavy line indicates a bonding site.

10. The polyisocyanate composition according to claim 9, further comprising a triisocyanate represented by general formula (V)-1:

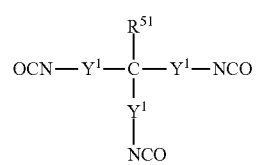

(V)-1 wherein in general formula (V)-1, each of a plurality of $Y^1$ independently represents a single bond or a divalent hydrocarbon group of 1 to 20 carbon atoms that may contain an ester structure and/or an ether structure, the plurality of $Y^1$ may be identical or different, and $R^{51}$ represents a hydrogen atom or a monovalent hydrocarbon group of 1 to 12 carbon atoms.

11. A polyisocyanate composition comprising polyisocyanate compounds represented by general formula (II) and general formula (IV), wherein a molar ratio between isocyanurate structures and uretdione structures is within a range from 100/0.1 to 100/100:

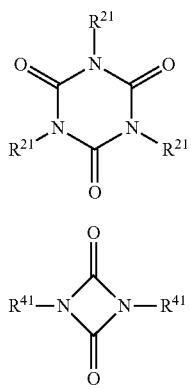

wherein in general formulas (II) and (IV), pluralities of $R^{21}$ and $R^{41}$ each independently represent an organic group, at least one of the pluralities of $R^{21}$ and $R^{41}$ is a group represented by general formula (V), and the pluralities of $R^{21}$ and $R^{41}$ may be identical or different;

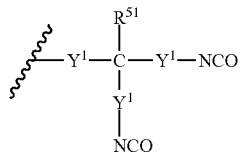

wherein in general formula (V), each of a plurality of $Y^1$ independently represents a single bond or a divalent hydrocarbon group of 1 to 20 carbon atoms that may contain an ester structure and/or an ether structure, the plurality of $Y^1$ may be identical or different, $R^{51}$ represents a hydrogen atom or a monovalent hydrocarbon group of 1 to 12 carbon atoms, and a wavy line indicates a bonding site.

12. The polyisocyanate composition according to claim 11, further comprising a triisocyanate represented by general formula (V)-1:

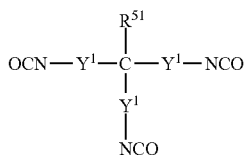

wherein in general formula (V)-1, each of a plurality of $Y^1$ independently represents a single bond or a divalent hydrocarbon group of 1 to 20 carbon atoms that may contain an ester structure and/or an ether structure, the plurality of $Y^1$ may be identical or different, and $R^{51}$ represents a hydrogen atom or a monovalent hydrocarbon group of 1 to 12 carbon atoms.

13. A polyisocyanate composition comprising a polyisocyanate compound represented by general formula (II):

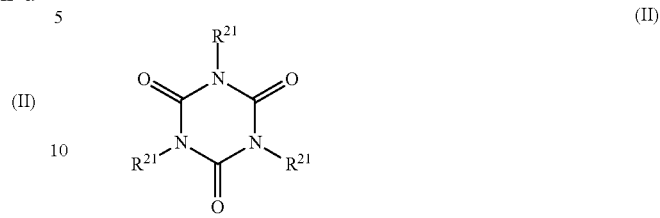

wherein in general formula (II), $R^{21}$ represents an organic group, at least one of a plurality of $R^{21}$ is a group represented by general formula (V) or a group represented by general formula (VI), and the plurality of $R^{21}$ may be identical or different;

wherein in general formula (V), each of a plurality of $Y^1$ independently represents a divalent hydrocarbon group of 1 to 20 carbon atoms containing an ester structure and/or an ether structure, the plurality of $Y^1$ may be identical or different, $R^{51}$ represents a hydrogen atom or a monovalent hydrocarbon group of 1 to 12 carbon atoms, and a wavy line indicates a bonding site;

wherein in general formula (VI), $Y^2$ represents a divalent hydrocarbon group of 1 to 20 carbon atoms containing an ester structure, and a wavy line indicates a bonding site.

14. The polyisocyanate composition according to claim 13, wherein a ratio ($V^h/V^p$) of a reaction rate ($V^p$) between the polyisocyanate composition and a monohydric alcohol, relative to a reaction rate ($V^h$) between a polyisocyanate derived from hexamethylene diisocyanate and a monohydric alcohol, is at least 5 but less than 13.

15. The polyisocyanate composition according to claim 13, further comprising a triisocyanate represented by general formula (V)-1 or a diisocyanate represented by general formula (VI)-1:

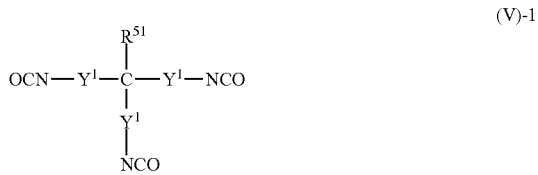

wherein in general formula (V)-1, each of a plurality of $Y^1$ independently represents a single bond or a divalent hydrocarbon group of 1 to 20 carbon atoms that may contain an ester structure and/or an ether structure, the plurality of $Y^1$ may be identical or different, and $R^{51}$ represents a hydrogen atom or a monovalent hydrocarbon group of 1 to 12 carbon atoms;

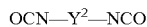 (VI)-1 wherein in general formula (VI)-1, $Y^2$ represents a divalent hydrocarbon group of 1 to 20 carbon atoms that may contain an ester structure.

16. A polyisocyanate composition comprising a polyisocyanate compound represented by general formula (III), wherein
a number of nitrogen elements contained in allophanate structures and excluding nitrogen elements contained in $R^{31}$ and $R^{32}$, relative to a total number of nitrogen elements contained in isocyanate groups, allophanate structures, isocyanurate structures, uretdione structures, iminooxadiazinedione structures, urethane structures and biuret structures contained within the polyisocyanate composition, is at least 1.5% but not more than 60%:

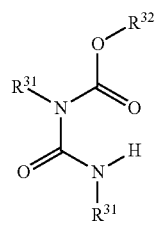 (III)

wherein in general formula (III), $R^{31}$ represents an organic group, at least one of a plurality of $R^{31}$ is a group represented by general formula (V), and $R^{32}$ represents a residue in which one hydroxyl group has been removed from a monohydric or polyhydric alcohol;

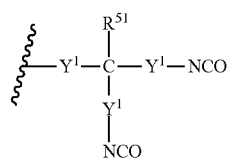 (V)

wherein in general formula (V), each of a plurality of $Y^1$ independently represents a single bond or a divalent hydrocarbon group of 1 to 20 carbon atoms that may contain an ester structure and/or an ether structure, the plurality of $Y^1$ may be identical or different, $R^{51}$ represents a hydrogen atom or a monovalent hydrocarbon group of 1 to 12 carbon atoms, and a wavy line indicates a bonding site.

17. The polyisocyanate composition according to claim 16, wherein $R^{32}$ contained in the allophanate structures is a residue in which a hydroxyl group has been removed from a dihydric or polyhydric alcohol.

18. The polyisocyanate composition according to claim 16, wherein $R^{32}$ contained in the allophanate structures is a residue in which a hydroxyl group has been removed from a monohydric or polyhydric alcohol having 3 to 50 carbon atoms.

19. A polyisocyanate composition comprising a polyisocyanate compound represented by general formula (III):

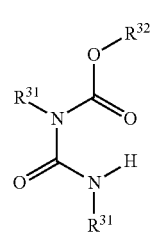 (III)

wherein in general formula (III), each of a plurality of $R^{31}$ independently represents an organic group, at least one of the plurality of $R^{31}$ is a group represented by general formula (V) or a group represented by general formula (VI), the plurality of $R^{31}$ may be identical or different, and $R^{32}$ represents a residue in which one hydroxyl group has been removed from a monohydric or polyhydric alcohol;

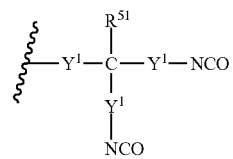 (V)

wherein in general formula (V), each of a plurality of $Y^1$ independently represents a single bond or a divalent hydrocarbon group of 1 to 20 carbon atoms that may contain an ester structure and/or an ether structure, the plurality of $Y^1$ may be identical or different, $R^{51}$ represents a hydrogen atom or a monovalent hydrocarbon group of 1 to 12 carbon atoms, and a wavy line indicates a bonding site;

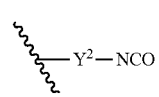 (VI)

wherein in general formula (VI), $Y^2$ represents a divalent hydrocarbon group of 1 to 20 carbon atoms containing an ester structure, and a wavy line indicates a bonding site,
wherein the polyisocyanate composition further comprises a triisocyanate represented by general formula (V)-1 or a diisocyanate represented by general formula (VI)-1:

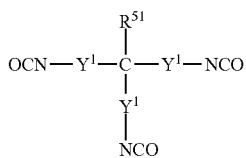 (V)-1 wherein in general formula (V)-1, each of a plurality of $Y^1$ independently represents a single bond or a divalent hydrocarbon group of 1 to 20 carbon atoms that may contain an ester structure and/or an ether structure, the plurality of $Y^1$ may be identical or different, and $R^{51}$ represents a hydrogen atom or a monovalent hydrocarbon group of 1 to 12 carbon atoms;

 (VI)-1 wherein in general formula (VI)-1, $Y^2$ represents a divalent hydrocarbon group of 1 to 20 carbon atoms that may contain an ester structure.

20. The polyisocyanate composition according to claim 19, wherein when molar ratios of allophanate structures, uretdione structures, iminooxadiazinedione structures, isocyanurate structures, urethane structures and biuret structures are termed a, b, c, d, e and f respectively, a molar ratio of allophanate structures (a/(a+b+c+d+e+f)) is at least 0.02 but not more than 0.95.

21. The polyisocyanate composition according to claim 19, wherein a ratio ($V^h/V^p$) of a reaction rate ($V^p$) between the polyisocyanate composition and a monohydric alcohol, relative to a reaction rate ($V^h$) between a polyisocyanate derived from hexamethylene diisocyanate and a monohydric alcohol, is at least 5 but less than 13.

22. A blocked polyisocyanate composition, wherein at least a portion of isocyanate groups of the polyisocyanate compound represented by the general formula (II) contained in the polyisocyanate composition according to claim 13 are protected with a blocking agent.

23. A hydrophilic polyisocyanate composition, wherein a hydrophilic group is added to at least a portion of isocyanate groups of the polyisocyanate compound represented by the general formula (I) contained in the polyisocyanate composition according to claim 13.

24. A hydrophilic polyisocyanate composition, wherein a hydrophilic group is added to at least a portion of isocyanate groups of the polyisocyanate compound represented by the general formula (II) contained in the blocked polyisocyanate composition according to claim 22.

25. A coating material composition comprising the polyisocyanate composition according to claim 13 and a polyol.

26. A coating material composition comprising the blocked polyisocyanate composition according to claim 22 and a polyol.

27. A coating material composition comprising the hydrophilic polyisocyanate composition according to claim 23 and a polyol.

28. A coating film obtained by curing the coating material composition according to claim 25.

29. A water dispersion comprising water, and the polyisocyanate composition according to claim 16 dispersed in the water.

30. A water dispersion comprising water and the blocked polyisocyanate composition according to claim 22.

31. A water dispersion comprising water and the hydrophilic polyisocyanate composition according to claim 23.

32. A blocked polyisocyanate composition, wherein at least a portion of isocyanate groups of the polyisocyanate compound represented by the general formula (III) contained in the polyisocyanate composition according to claim 16 are protected with a blocking agent.

33. A blocked polyisocyanate composition, wherein at least a portion of isocyanate groups of the polyisocyanate compound represented by the general formula (III) contained in the polyisocyanate composition according to claim 19 are protected with a blocking agent.

34. A hydrophilic polyisocyanate composition, wherein a hydrophilic group is added to at least a portion of isocyanate groups of the polyisocyanate compound represented by the general formula (III) contained in the polyisocyanate composition according to claim 16.

35. A hydrophilic polyisocyanate composition, wherein a hydrophilic group is added to at least a portion of isocyanate groups of the polyisocyanate compound represented by the general formula (III) contained in the polyisocyanate composition according to claim 19.

36. A hydrophilic polyisocyanate composition, wherein a hydrophilic group is added to at least a portion of isocyanate groups of the polyisocyanate compound represented by the general formula (III) contained in the blocked polyisocyanate composition according to claim 32.

37. A hydrophilic polyisocyanate composition, wherein a hydrophilic group is added to at least a portion of isocyanate groups of the polyisocyanate compound represented by the general formula (III) contained in the blocked polyisocyanate composition according to claim 33.

38. A water dispersion comprising water and the blocked polyisocyanate composition according to claim 32.

39. A water dispersion comprising water and the blocked polyisocyanate composition according to claim 33.

* * * * *

UNITED STATES PATENT AND TRADEMARK OFFICE
CERTIFICATE OF CORRECTION

PATENT NO. : 11,021,562 B2  
APPLICATION NO. : 16/339763  
DATED : June 1, 2021  
INVENTOR(S) : Azuma et al.

Page 1 of 1

It is certified that error appears in the above-identified patent and that said Letters Patent is hereby corrected as shown below:

In the Claims

Column 157, Line 43 (Claim 23) please change "formula (I)" to -- formula (II) --

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*